(12) United States Patent
Murphy et al.

(10) Patent No.: US 12,578,693 B1
(45) Date of Patent: Mar. 17, 2026

(54) METHODS AND APPARATUS FOR ARTIFICIAL INTELLIGENCE ENHANCED BUILDING MAINTENANCE MANAGEMENT

(71) Applicant: Togal.AI Inc., Miami, FL (US)

(72) Inventors: Patrick E Murphy, Miami, FL (US);
Johnny Maghzal, Miami, FL (US);
Patrick Hughes, Miami, FL (US);
Thomas Patrick Murphy, Miami, FL (US)

(73) Assignee: Togal.AI, Inc., Miami, FL (US)

( * ) Notice: Subject to any disclaimer, the term of this patent is extended or adjusted under 35 U.S.C. 154(b) by 0 days.

(21) Appl. No.: 19/224,819

(22) Filed: Jun. 1, 2025

Related U.S. Application Data

(60) Provisional application No. 63/764,096, filed on Feb. 27, 2025.

(51) Int. Cl.
G05B 13/02 (2006.01)

(52) U.S. Cl.
CPC .................................. G05B 13/027 (2013.01)

(58) Field of Classification Search
CPC .................................................... G05B 13/027
See application file for complete search history.

(56) References Cited

U.S. PATENT DOCUMENTS

| | | | |
|---|---|---|---|
| 11,475,174 B2 | 10/2022 | Murphy et al. | |
| 11,481,704 B2 | 10/2022 | Murphy et al. | |
| 11,625,553 B2 | 4/2023 | Powles et al. | |
| 11,797,733 B2 | 10/2023 | Murphy et al. | |
| 2002/0007225 A1* | 1/2002 | Costello | G06Q 30/0643 |
| | | | 700/106 |

(Continued)

OTHER PUBLICATIONS

Besiktepe, D.; Ozbek, M.E.; Atadero, R.A. Identification of the Criteria for Building Maintenance Decisions in Facility Management: First Step to Developing a Multi-Criteria Decision-Making Approach. Buildings 2020, 10, 166 (Year: 2020).*

(Continued)

*Primary Examiner* — Christopher E. Everett
(74) *Attorney, Agent, or Firm* — Tracnik Law, PLLC; Joseph P Kincart

(57) ABSTRACT

Methods, systems, and apparatus for automated building maintenance management using a digital representation of a physical building. A controller, operating an AI engine one or both of a GAN engine and a ViT, receives a design plan comprising dynamic components representing as-built building elements. Metadata, including historical maintenance logs, component specifications from a component database, sensor data from a Building Management System (BMS), and environmental conditions, is associated with the dynamic components. The controller detects maintenance requirements for the dynamic components based on sensor anomalies, historical failure patterns, metadata, and user inputs, determines interrelations between the dynamic components, and assigns priority levels to the maintenance tasks. A maintenance execution plan is generated, incorporating task prioritization, labor allocation, material requirements, and execution timelines. The system dynamically updates maintenance logs, the design plan, and metadata while optimizing resource utilization and predicting failures through AI-driven analysis.

16 Claims, 42 Drawing Sheets

(56)                    References Cited

U.S. PATENT DOCUMENTS

| 2003/0046174 | A1* | 3/2003 | Goldsmith | G06Q 10/087 |
| | | | | 705/29 |
| 2008/0059220 | A1 | 3/2008 | Roth et al. | |
| 2014/0089209 | A1* | 3/2014 | Akcamete | G06Q 10/20 |
| | | | | 705/305 |
| 2016/0117785 | A1* | 4/2016 | Lerick | G06Q 30/012 |
| | | | | 705/305 |
| 2016/0132046 | A1* | 5/2016 | Beoughter | G06F 16/248 |
| | | | | 700/17 |
| 2017/0323238 | A1* | 11/2017 | Tanaka | G06Q 10/06314 |
| 2018/0130260 | A1* | 5/2018 | Schmirler | G06F 3/011 |
| 2021/0381661 | A1 | 12/2021 | Ohkawa | |
| 2022/0292230 | A1* | 9/2022 | Murphy | G06F 30/13 |

OTHER PUBLICATIONS

Shen, Qiping, Kak-Keung Lo, and Qian Wang. "Priority Setting in
Maintenance Management: A Modified Multi-Attribute Approach
Using Analytic Hierarchy Process." Construction management and
economics 16.6 (1998): 693-702 (Year: 1998).*
Besiktepe, D.: M.E..; Atadero, R.A. Identification of the Criteria for
Building Maintenance Decisions in Facility Management: First Step
to Developing a Multi-Criteria Decision Making Approach. Build-
ings 2020, 10, 166.

* cited by examiner

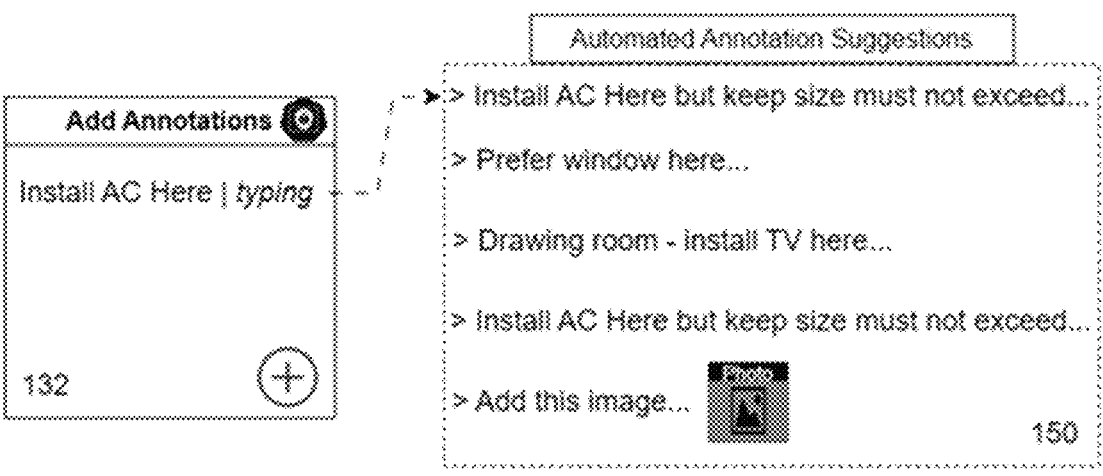
FIG. 1D
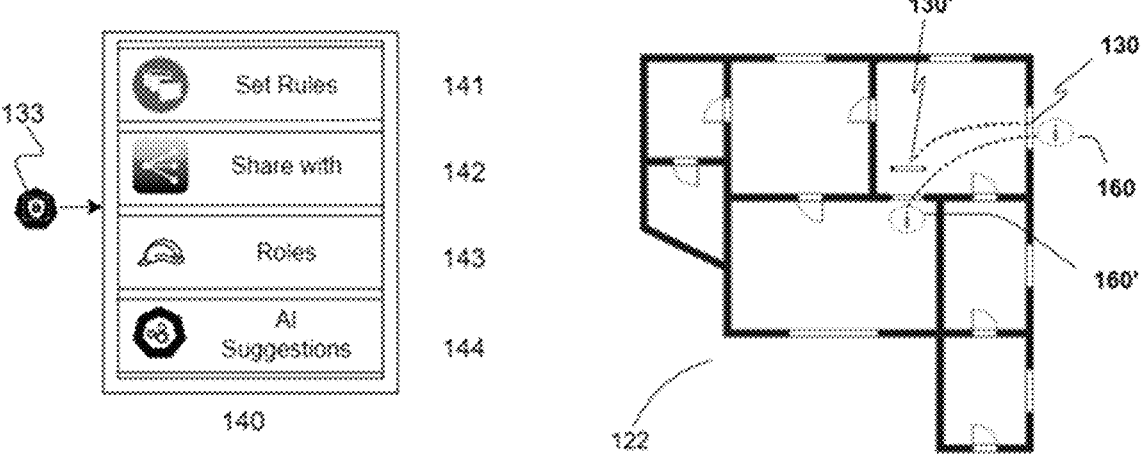
FIG. 1E                              FIG. 1F

Components & Maintenance Log

| Repair/Install Date | Component/ System | Location/ Room | Description Of Work | Quantity Replaced or Repaired | Part/Material Used | Vendor/Technician |
|---|---|---|---|---|---|---|
| 1/1/2025 | HVAC System | Room-301 | Replaced air Filter | 2 | Filter-X | ABC HVAC Service |
| 5/5/2025 | Lighting | Hallway | Replaced Burnt-Out Light Bulb | 5 | Led Bulb-15w | Building Staff |
| 9/8/2024 | Plumbing | Restroom | Repaired leaking Faucet | 1 | Faucet Repair | XYZ Plumbing |
| 16/5/2024 | Fire Alarm System | Entire Building | Inspected and tested Smoke Detectors | N/A | N/A | Fire Safety Co. |
| 27/11/24 | Roofing | Roof | Repaired Minor roof leak | N/A | Roofing Sealant | Building Staff |
| 24/12/24 | Elevators | Elevator 1 | Routine Maintenance Check | N/A | N/A | Elevator Maint. Co. |
| 02/1/2025 | Landscaping | Front Lawn | Trimmed Bushes and Mowed Lawn | N/A | N/A | Landscaping Service |
| 16/5/2024 | Security System | Main Entrance | Replaced Faulty Security Camera | 1 | Security Camera | Security Company |
| 27/11/24 | Doors & Locks | Room 105 | Repaired Broken Door Handle | 1 | Door Handle Set | Building Staff |
| 24/12/24 | Painting | Hall way, 1st floor | Touch-Up Paint On Walls | N/A | Interior Paint-Color xyz | Building Staff |

Components & Maintenance Log — 197J

| Cost | Notes/Comments | Next Scheduled Maintenance |
|---|---|---|
| $50 | Filter was heavily Soiled. Improved Airflow | 3 Months |
| $10 | Upgraded to energy-efficient LEDs. | As Needed |
| $75 | Leak fixed. Checked other faucets in restroom | 6 Months |
| $150 | All detectors functioning correctly | Annually |
| $20 | Small leak near vent pipe.  Monitor for recurrence | Annually |
| $200 | All systems operating within specifications | Monthly |
| $50 | Regular maintenance. | Weekly/Monthly |
| $100 | New camera installed and tested | As Needed |
| $15 | Handle replaced, door functioning properly | As Needed |
| $30 | Minor scuffs and marks covered | As Needed |

| Material Details | Size | Qt. | Price per Pcs. | Cost(Vendor 1) |
|---|---|---|---|---|
| 1. Pillar Cock 243 | 4x2 Inch. | 25 Pcs. | $10 | $250 |
| | | | $12 | Cost(Vendor 2) |
| | | | | $300 |
| | | | $9 | Cost(Vendor 3) |
| | | | | $225 |

255B

255C

| Material Details | | Size | Inventory | Qt. Needed | Maintenance Time | Cost |
|---|---|---|---|---|---|---|
| 1. Wooden Tile 265A | | 1x2 ft | 13 Pcs. | 587 Pcs. | 75 Hr | $2348 |
| 2. Ceramic Tile 265B | | 2x4 ft | NO | 150 Pcs. | 28 Hr | $6000 |
| 3. Porcelain 265C | | 2x2 ft | NO | 300 Pcs. | 40 Hr | $ 4500 |
| 4. Glossy Tiles 265D | | 4x4 ft | NO | 75 Pcs. | 24 Hr | $3000 |
| 5. Natural Stone 265E | | 2x6 ft | NO | 100 Pcs. | 36 Hr | $ 2500 |
| 6. Mosaic 265F | | 1x1 ft | 55 Pcs. | 1145 Pcs. | 120 Hr | $11450 |
| 7. Paving Block 265G | | 0.6x2 ft | NO | 1000 | 96 Hr | $12000 |

270

270A 270B 270C 270D 270E

301C

309

315

310

311

312

313

318

ROOM 1:
GROSS AREA
EXTERIOR
PERIMETER

ROOM 2:
GROSS AREA
EXTERIOR
PERIMETER

316

310

311

312A

ROOM 3:
GROSS AREA
EXTERIOR
PERIMETER

317

310

311

| AREA TYPE | PRIVATE OFFICE | GENERAL OFFICE SPACE | PUBLIC CONF. ROOM | PRIVATE CONF. ROOM | PRIVATE WATER CLOSET | PUBLIC WATER CLOSET |
|---|---|---|---|---|---|---|
| PRIVATE OFFICE | 50/50 | 50/40 | 40/50 | 50/50 | 50/50 | 40/60 |
| GENERAL OFFICE SPACE | | | | | | |
| PUBLIC CONF. ROOM | | | | | | |
| PRIVATE CONF. ROOM | | | | | | |
| PRIVATE WATER CLOSET | | | | | | |
| PUBLIC WATER CLOSET | | | | | | |

FIG. 3D

| AREA TYPE MAPPING | | |
|---|---|---|
| CASUAL NAME | CLASS NAME | # |
| NONE | non | 0 |
| RESIDENTIAL | residential | I |
| HOTEL | hotel | I |
| RETAIL | office | I |
| OFFICE | amenity | I |
| AMENITIES | foh | I |
| FOH | bohAc | I |
| BOH AC | bohNonAc | I |
| PARKING | parking | I |
| STAIRS | stair | I |
| PUBLIC TERRACES | public terrace | I |
| PRIVATE BALCONIES | privateBalcony | I |
| NON-ACCESSIBLE | nonAccessible | I |

413, 411, 412

422

| 414 | UNIT | WORK TYPE | WORK QTY. | WORK HRS. | ADDTL. COST | EXPEDITE COST | LINE ITEM COST |
|---|---|---|---|---|---|---|---|
| ITEM ONE | A | ELEC. | 1 | 650 | $200 | $550 | $770 |
| ITEM TWO | | | | | | | |
| ITEM THREE | | | | | | | |
| ITEM FOUR | | | | | | | |
| TOTAL 422 | | | | | | | |

415  416  417  418  419  420  421

TABLE B

Figures 10A, 10B:
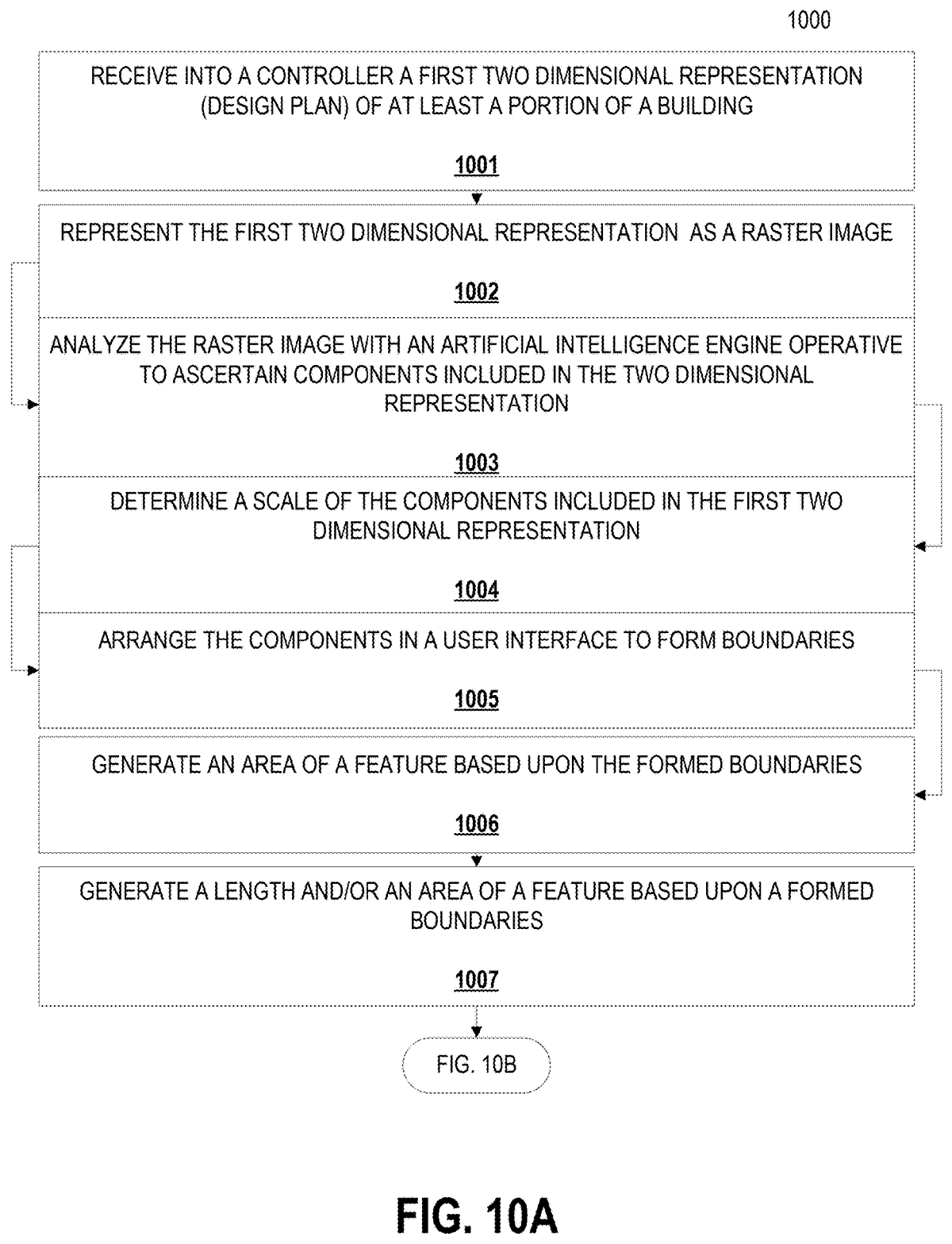

RECEIVE INTO A CONTROLLER A FIRST TWO DIMENSIONAL REPRESENTATION (DESIGN PLAN) OF AT LEAST A PORTION OF A BUILDING

1001

REPRESENT THE FIRST TWO DIMENSIONAL REPRESENTATION AS A RASTER IMAGE

1002

ANALYZE THE RASTER IMAGE WITH AN ARTIFICIAL INTELLIGENCE ENGINE OPERATIVE TO ASCERTAIN COMPONENTS INCLUDED IN THE TWO DIMENSIONAL REPRESENTATION

1003

DETERMINE A SCALE OF THE COMPONENTS INCLUDED IN THE FIRST TWO DIMENSIONAL REPRESENTATION

1004

ARRANGE THE COMPONENTS IN A USER INTERFACE TO FORM BOUNDARIES

1005

GENERATE AN AREA OF A FEATURE BASED UPON THE FORMED BOUNDARIES

1006

GENERATE A LENGTH AND/OR AN AREA OF A FEATURE BASED UPON A FORMED BOUNDARIES

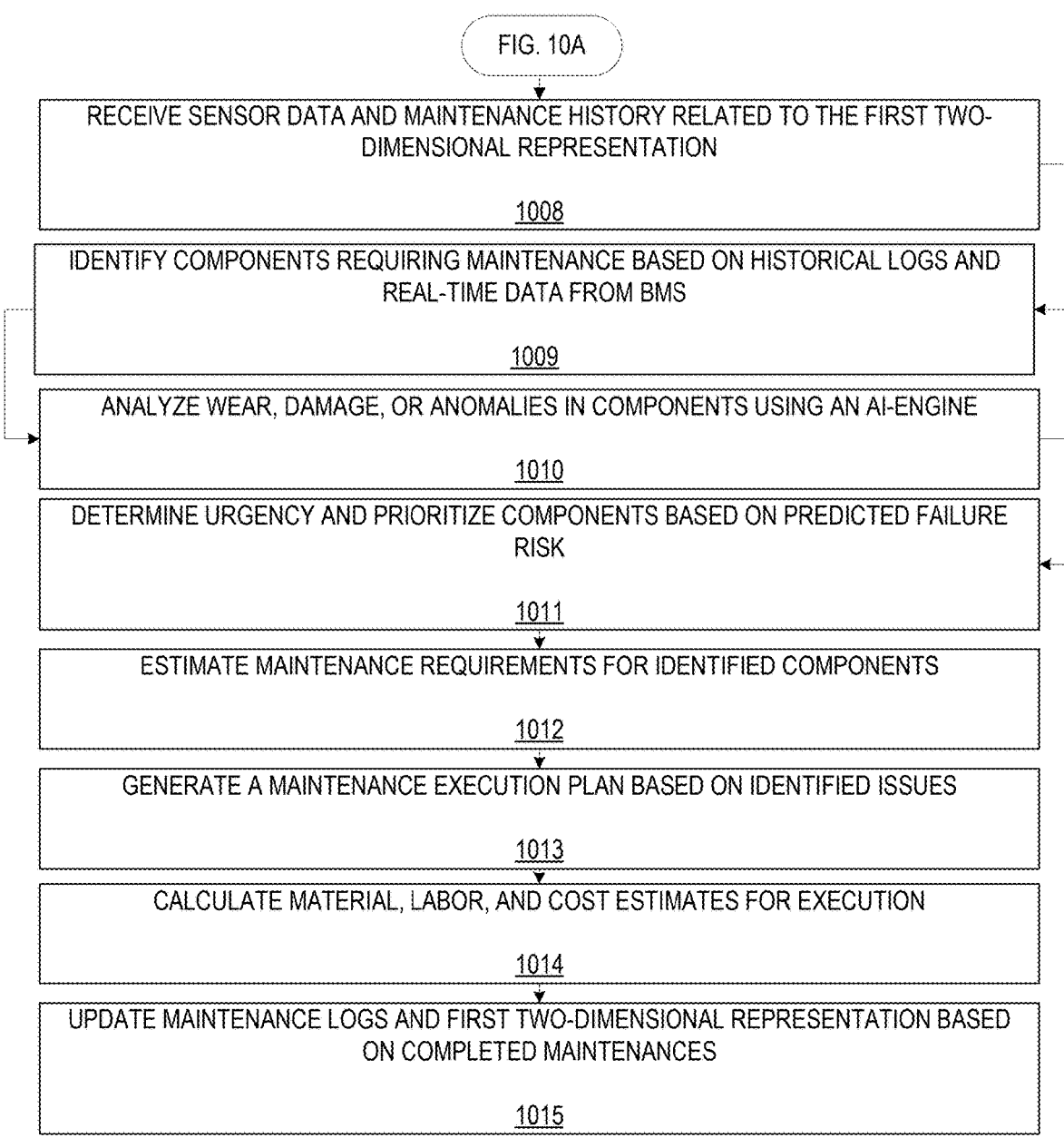

FIG. 10A

RECEIVE SENSOR DATA AND MAINTENANCE HISTORY RELATED TO THE FIRST TWO-DIMENSIONAL REPRESENTATION

1008

IDENTIFY COMPONENTS REQUIRING MAINTENANCE BASED ON HISTORICAL LOGS AND REAL-TIME DATA FROM BMS

1009

ANALYZE WEAR, DAMAGE, OR ANOMALIES IN COMPONENTS USING AN AI-ENGINE

1010

DETERMINE URGENCY AND PRIORITIZE COMPONENTS BASED ON PREDICTED FAILURE RISK

1011

ESTIMATE MAINTENANCE REQUIREMENTS FOR IDENTIFIED COMPONENTS

1012

GENERATE A MAINTENANCE EXECUTION PLAN BASED ON IDENTIFIED ISSUES

1013

CALCULATE MATERIAL, LABOR, AND COST ESTIMATES FOR EXECUTION

1014

UPDATE MAINTENANCE LOGS AND FIRST TWO-DIMENSIONAL REPRESENTATION BASED ON COMPLETED MAINTENANCES

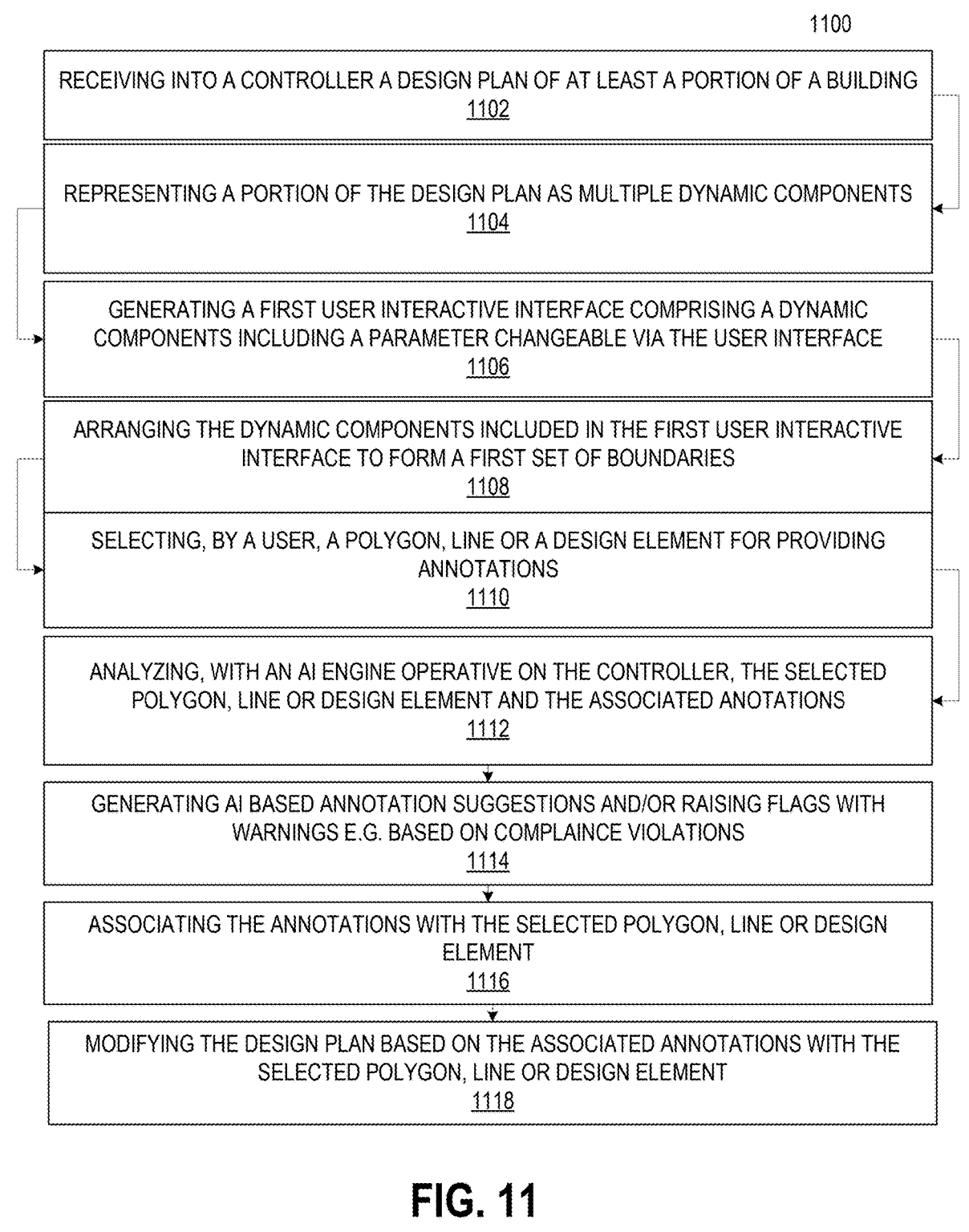

RECEIVING INTO A CONTROLLER A DESIGN PLAN OF AT LEAST A PORTION OF A BUILDING
1102

REPRESENTING A PORTION OF THE DESIGN PLAN AS MULTIPLE DYNAMIC COMPONENTS
1104

GENERATING A FIRST USER INTERACTIVE INTERFACE COMPRISING A DYNAMIC COMPONENTS INCLUDING A PARAMETER CHANGEABLE VIA THE USER INTERFACE
1106

ARRANGING THE DYNAMIC COMPONENTS INCLUDED IN THE FIRST USER INTERACTIVE INTERFACE TO FORM A FIRST SET OF BOUNDARIES
1108

SELECTING, BY A USER, A POLYGON, LINE OR A DESIGN ELEMENT FOR PROVIDING ANNOTATIONS
1110

ANALYZING, WITH AN AI ENGINE OPERATIVE ON THE CONTROLLER, THE SELECTED POLYGON, LINE OR DESIGN ELEMENT AND THE ASSOCIATED ANOTATIONS
1112

GENERATING AI BASED ANNOTATION SUGGESTIONS AND/OR RAISING FLAGS WITH WARNINGS E.G. BASED ON COMPLAINCE VIOLATIONS
1114

ASSOCIATING THE ANNOTATIONS WITH THE SELECTED POLYGON, LINE OR DESIGN ELEMENT
1116

MODIFYING THE DESIGN PLAN BASED ON THE ASSOCIATED ANNOTATIONS WITH THE SELECTED POLYGON, LINE OR DESIGN ELEMENT
1118

FIG. 11

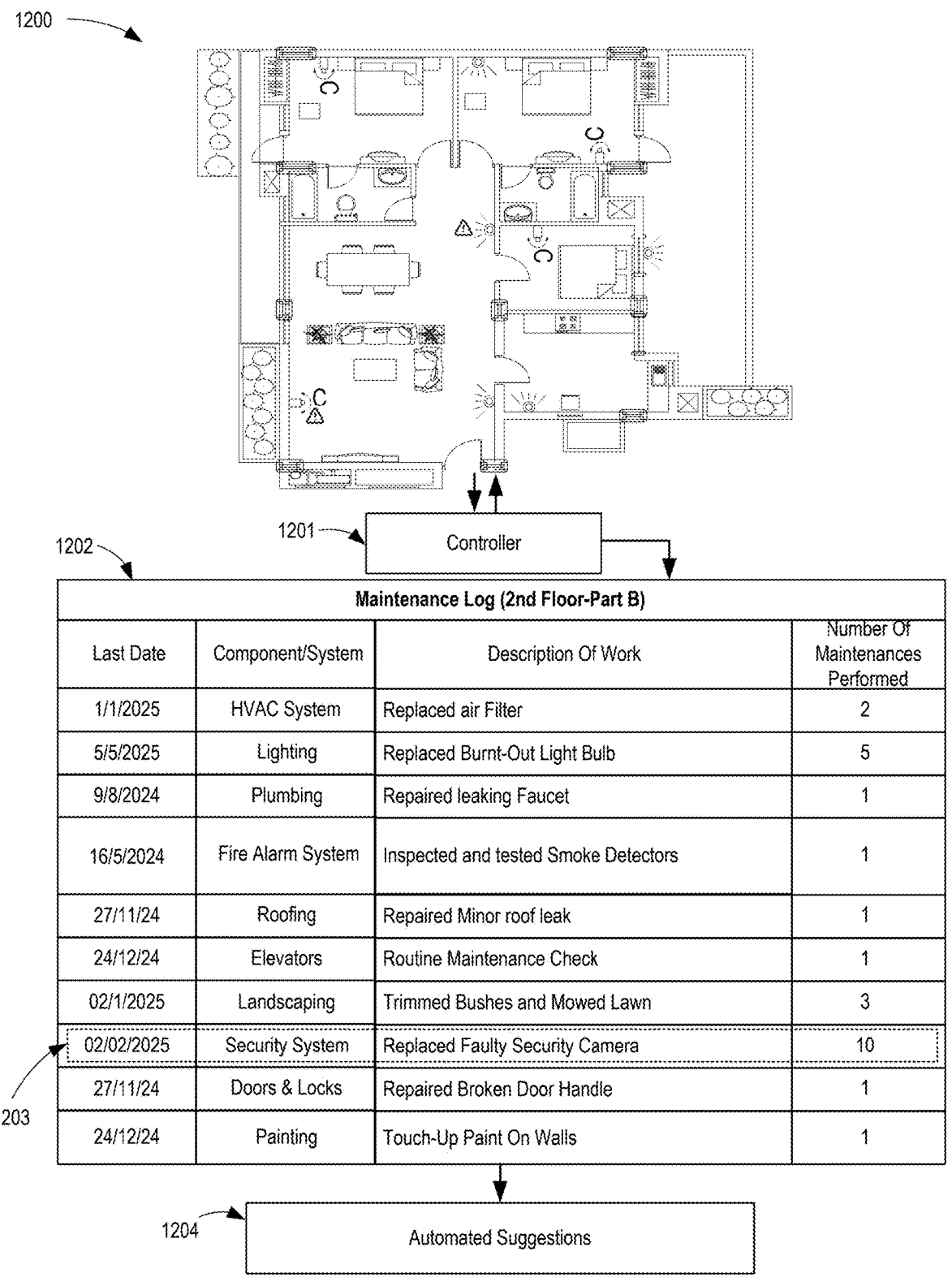

1200

1201 — Controller

1202

| Maintenance Log (2nd Floor-Part B) | | | |
|---|---|---|---|
| Last Date | Component/System | Description Of Work | Number Of Maintenances Performed |
| 1/1/2025 | HVAC System | Replaced air Filter | 2 |
| 5/5/2025 | Lighting | Replaced Burnt-Out Light Bulb | 5 |
| 9/8/2024 | Plumbing | Repaired leaking Faucet | 1 |
| 16/5/2024 | Fire Alarm System | Inspected and tested Smoke Detectors | 1 |
| 27/11/24 | Roofing | Repaired Minor roof leak | 1 |
| 24/12/24 | Elevators | Routine Maintenance Check | 1 |
| 02/1/2025 | Landscaping | Trimmed Bushes and Mowed Lawn | 3 |
| 02/02/2025 | Security System | Replaced Faulty Security Camera | 10 |
| 27/11/24 | Doors & Locks | Repaired Broken Door Handle | 1 |
| 24/12/24 | Painting | Touch-Up Paint On Walls | 1 |

1203

1204 — Automated Suggestions

Figures 14A, 14B:
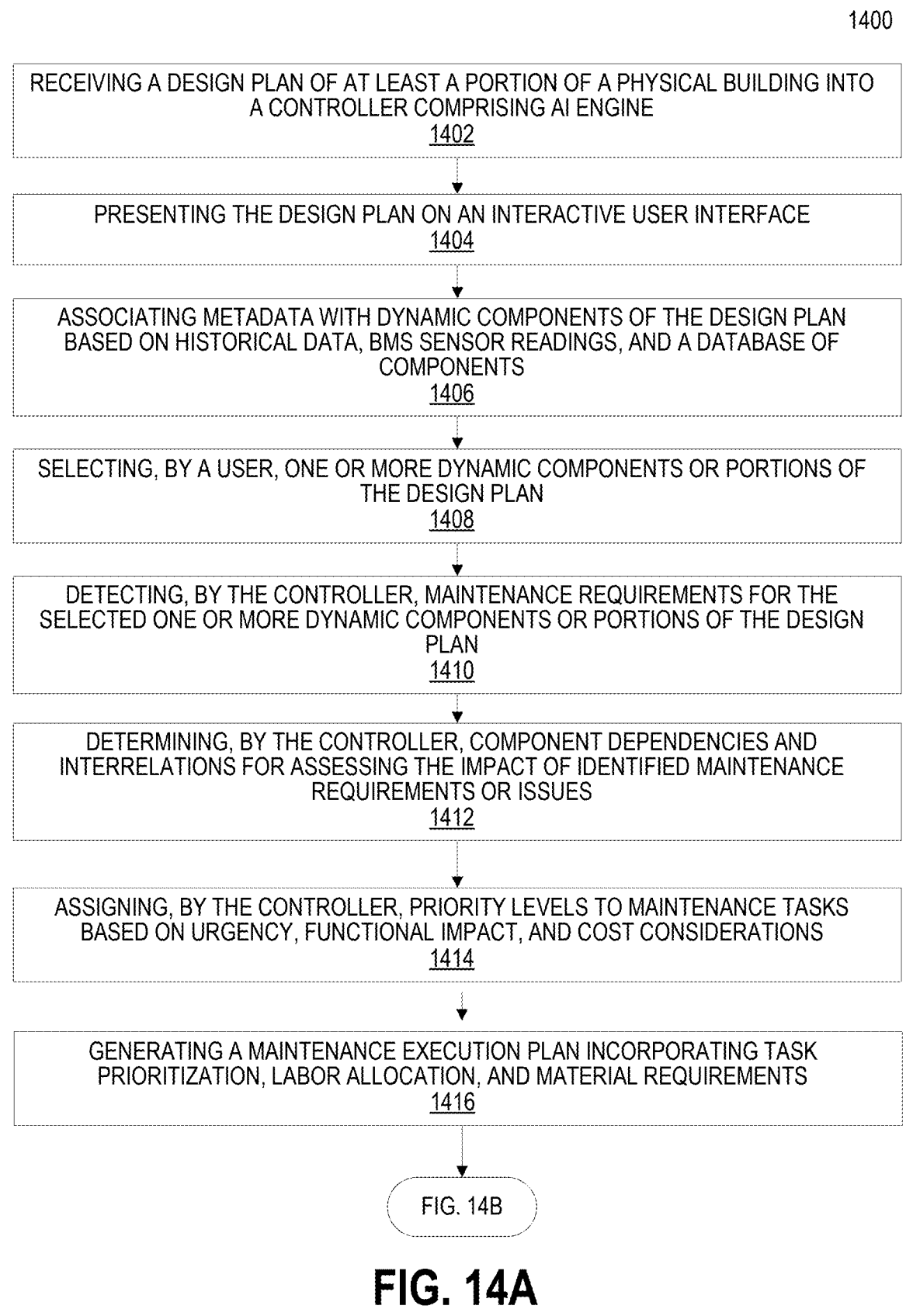

RECEIVING A DESIGN PLAN OF AT LEAST A PORTION OF A PHYSICAL BUILDING INTO A CONTROLLER COMPRISING AI ENGINE
1402

PRESENTING THE DESIGN PLAN ON AN INTERACTIVE USER INTERFACE
1404

ASSOCIATING METADATA WITH DYNAMIC COMPONENTS OF THE DESIGN PLAN BASED ON HISTORICAL DATA, BMS SENSOR READINGS, AND A DATABASE OF COMPONENTS
1406

SELECTING, BY A USER, ONE OR MORE DYNAMIC COMPONENTS OR PORTIONS OF THE DESIGN PLAN
1408

DETECTING, BY THE CONTROLLER, MAINTENANCE REQUIREMENTS FOR THE SELECTED ONE OR MORE DYNAMIC COMPONENTS OR PORTIONS OF THE DESIGN PLAN
1410

DETERMINING, BY THE CONTROLLER, COMPONENT DEPENDENCIES AND INTERRELATIONS FOR ASSESSING THE IMPACT OF IDENTIFIED MAINTENANCE REQUIREMENTS OR ISSUES
1412

ASSIGNING, BY THE CONTROLLER, PRIORITY LEVELS TO MAINTENANCE TASKS BASED ON URGENCY, FUNCTIONAL IMPACT, AND COST CONSIDERATIONS
1414

GENERATING A MAINTENANCE EXECUTION PLAN INCORPORATING TASK PRIORITIZATION, LABOR ALLOCATION, AND MATERIAL REQUIREMENTS
1416

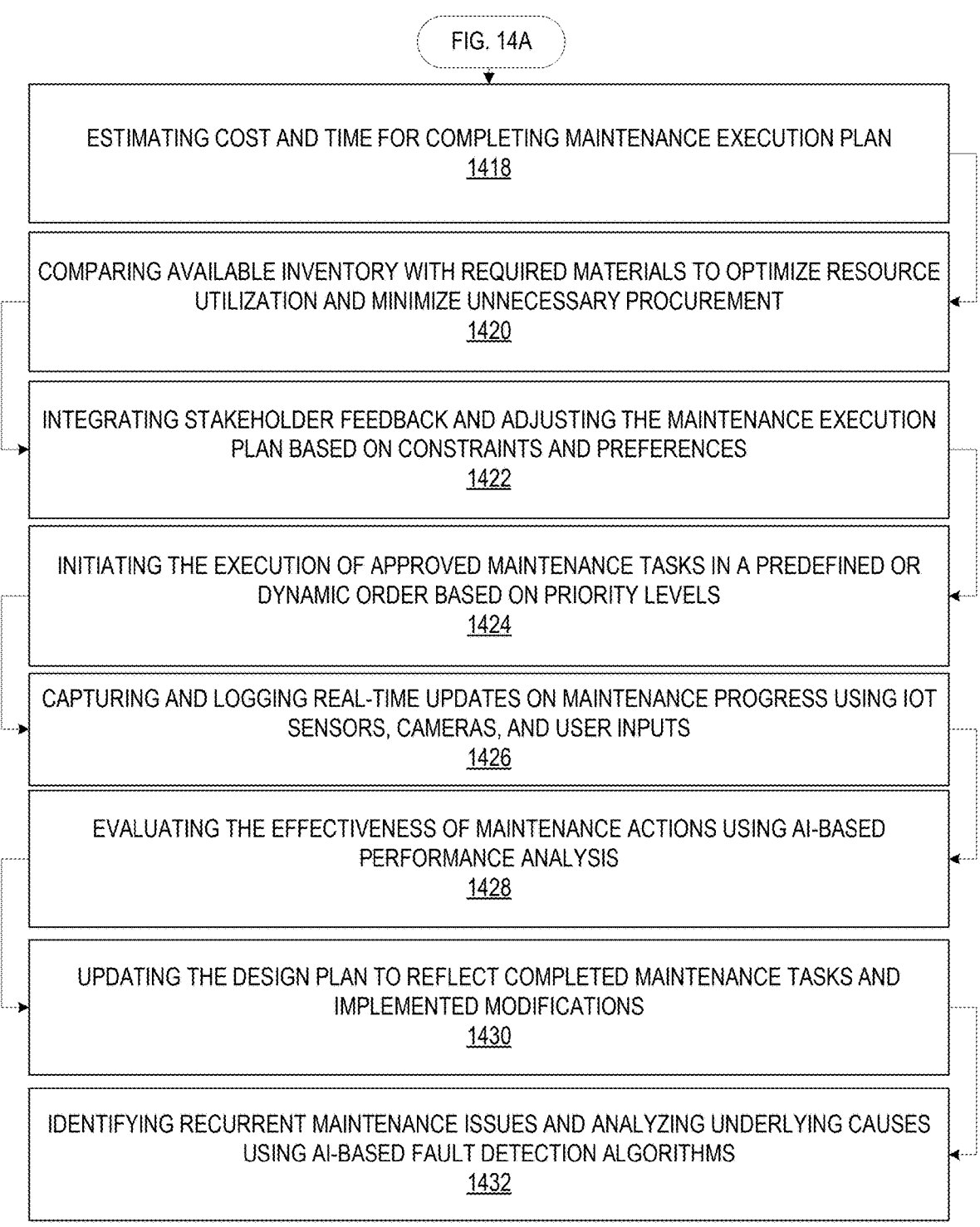

FIG. 14A

ESTIMATING COST AND TIME FOR COMPLETING MAINTENANCE EXECUTION PLAN
1418

COMPARING AVAILABLE INVENTORY WITH REQUIRED MATERIALS TO OPTIMIZE RESOURCE
UTILIZATION AND MINIMIZE UNNECESSARY PROCUREMENT
1420

INTEGRATING STAKEHOLDER FEEDBACK AND ADJUSTING THE MAINTENANCE EXECUTION
PLAN BASED ON CONSTRAINTS AND PREFERENCES
1422

INITIATING THE EXECUTION OF APPROVED MAINTENANCE TASKS IN A PREDEFINED OR
DYNAMIC ORDER BASED ON PRIORITY LEVELS
1424

CAPTURING AND LOGGING REAL-TIME UPDATES ON MAINTENANCE PROGRESS USING IOT
SENSORS, CAMERAS, AND USER INPUTS
1426

EVALUATING THE EFFECTIVENESS OF MAINTENANCE ACTIONS USING AI-BASED
PERFORMANCE ANALYSIS
1428

UPDATING THE DESIGN PLAN TO REFLECT COMPLETED MAINTENANCE TASKS AND
IMPLEMENTED MODIFICATIONS
1430

IDENTIFYING RECURRENT MAINTENANCE ISSUES AND ANALYZING UNDERLYING CAUSES
USING AI-BASED FAULT DETECTION ALGORITHMS
1432

FIG. 14B

METHODS AND APPARATUS FOR ARTIFICIAL INTELLIGENCE ENHANCED BUILDING MAINTENANCE MANAGEMENT

CROSS REFERENCE TO RELATED APPLICATIONS

This application claims the benefit of U.S. Provisional Application No. 63/764,096, filed Feb. 27, 2025, and entitled METHODS AND APPARATUS FOR ARTIFI-CIAL-INTELLIGENCE-BASED BUILDING MAINTE-NANCE MANAGEMENT USING A DESIGN PLAN OF A PHYSICAL BUILDING, the entire disclosure of which is incorporated herein by reference.

FIELD OF THE INVENTION

The present invention relates to methods, systems, and apparatus for managing building maintenance using a digital representation of a physical building. More particularly, the invention pertains to an automated, AI-driven maintenance detection, prioritization, and execution system that utilizes a design plan comprising As-Built dynamic components to assess, predict, and manage maintenance tasks efficiently. The invention further relates to integrating real-time sensor data from a Building Management System (BMS) or Internet of Things (IoT) devices, historical maintenance records, and artificial intelligence (AI)-based analysis to detect anomalies, schedule maintenance, and optimize resource allocation.

BACKGROUND OF THE INVENTION

Buildings, whether residential, commercial, or industrial, require regular maintenance to ensure their structural integrity, functionality, and longevity. Various parts, portions, items, spaces, and materials within a building degrade over time due to environmental exposure, daily usage, and aging of construction materials. Traditional maintenance methods rely on periodic inspections, reports from occupants, or identification of visible deterioration. These methods are reactive in nature, as maintenance activities are typically initiated only after a problem becomes apparent. Property owners, facility managers, or tenants often inspect different parts of the building manually to determine areas requiring maintenance. However, manual inspections are subjective and may overlook maintenance needs that are not immediately visible, leading to delayed interventions and potential damage escalation.

Once a specific area requiring maintenance is identified, an assessment is conducted to determine the scope of repairs or replacements needed. This assessment is generally performed by an individual with technical knowledge, such as a contractor, engineer, or skilled laborer. The assessment involves determining the materials required, estimating labor costs, and scheduling the work. However, reliance on manual assessments introduces inconsistencies and human errors, often leading to miscalculations in cost estimation, labor requirements, and material quantities. For example, if a section of wooden flooring is found to be deteriorating due to moisture exposure, the owner may decide to replace only the visibly affected portion without realizing that the moisture may have spread beneath adjacent sections, which may lead to further deterioration and the need for repeated maintenance.

Another significant drawback of traditional maintenance planning is the failure to recognize similar parts of the building that may require maintenance. When an issue is identified in one section, there is often no systematic approach to inspect other areas with similar conditions. For example, if paint is peeling in a particular room due to humidity, other rooms exposed to similar conditions may also be experiencing the same issue. However, without a comprehensive assessment, these areas remain unnoticed until visible damage occurs. This results in a fragmented approach where maintenance is conducted sporadically, leading to higher overall costs and inefficiencies.

Once the maintenance need is identified and planned, execution involves sourcing materials, hiring skilled professionals, and carrying out repairs or replacements. However, finding skilled labor at the right time and within budget can be a challenge, particularly in regions where experienced maintenance personnel are scarce. In cases where skilled workers are not immediately available, building owners may attempt to perform maintenance tasks themselves or hire unqualified labor, often leading to suboptimal outcomes. For example, an improperly repaired plumbing leak may cause further water seepage, damaging adjacent walls and floors, necessitating additional repairs in the future.

Another challenge in traditional maintenance methods is the miscalculation of costs. Estimates for materials and labor are often based on rough calculations or past experiences rather than precise measurements. As a result, when maintenance work begins, unforeseen expenses frequently arise, causing the total cost to exceed initial projections. For example, during the replacement of a damaged ceiling, the workers may discover that the underlying support beams have also weakened, requiring additional repairs. Since these extra costs were not accounted for in the initial estimate, the property owner faces financial strain and project delays.

Prioritization of maintenance tasks is another area where traditional methods fall short. Building owners, particularly those without technical knowledge, often struggle to determine the correct sequence of repairs to minimize disruptions and avoid unnecessary rework. If maintenance is performed in an incorrect order, previously repaired parts may suffer further damage. For example, if a property owner repaints the walls of a bathroom without first addressing underlying water leakage issues, the newly applied paint may soon deteriorate due to moisture exposure. Similarly, if new flooring is installed in a kitchen before addressing an underlying structural issue, the newly laid tiles may crack or shift once the structural repair is undertaken.

Random or uncoordinated maintenance efforts can also result in situations where one repaired part is affected by subsequent maintenance of another part. Consider a case where a property owner replaces wall tiles in a section of a bathroom without realizing that the sewage pipes behind the walls are corroded and require replacement. If the pipes burst or start leaking at a later stage, the newly installed tiles must be removed, leading to unnecessary material waste and additional expenses. Similarly, in large commercial buildings, maintenance staff may conduct repairs on electrical wiring after a false ceiling has already been installed, requiring sections of the ceiling to be removed again, increasing time and costs.

Another major drawback of traditional maintenance methods is the absence of a centralized system for tracking past maintenance activities. Without proper records, property owners and facility managers have no way of knowing when specific components were last serviced, what materials were used, and whether warranty coverage is still valid for replaced parts. This lack of documentation leads to inefficiencies, as repeated repairs may be performed on the same components without leveraging historical data to make informed decisions. For example, if a water heater in an apartment complex was repaired six months ago but fails again, the owner may be unaware that the part is still under warranty, leading to unnecessary expenditures for repairs that could have been covered.

Inventory management is another challenge in traditional maintenance practices. Materials required for maintenance are often purchased on an as-needed basis, leading to delays if required materials are not readily available. In cases where surplus materials are purchased to avoid shortages, storage becomes an issue, and excess materials may go unused or become obsolete over time. For example, a contractor replacing damaged tiles in a hallway may overestimate the required quantity and order extra tiles, which remain unused once the job is complete. If these excess tiles are stored improperly or become unavailable for future purchases, they may go to waste, increasing costs.

Another drawback of traditional maintenance approaches is the difficulty in obtaining reliable vendor recommendations for sourcing materials and hiring labor. Building owners often rely on word-of-mouth referrals or online searches, which may not always lead to the most cost-effective or high-quality solutions. Additionally, vendor pricing may fluctuate based on demand, and property owners may end up paying higher prices due to a lack of comparative data. For example, a facility manager looking to replace air conditioning units in a commercial building may receive vastly different price quotes from different vendors, making it difficult to determine the most cost-effective option without extensive research.

The absence of real-time monitoring and automation in maintenance processes further exacerbates inefficiencies. In most cases, property owners or facility managers must manually follow up with contractors, track progress, and ensure that work is completed as expected. Delays in maintenance execution often go unnoticed until the project timeline is significantly affected. Without real-time status updates, maintenance activities may take longer than anticipated, disrupting building operations and causing inconvenience to occupants.

The limitations of traditional maintenance methods highlight the need for an improved solution that can streamline the identification, planning, and execution of maintenance activities. A more efficient approach should enable property owners and facility managers to identify maintenance needs accurately, consider all related components that may require attention, calculate costs with precision, and prioritize repairs effectively. It should also incorporate data-driven decision-making, automate routine processes, provide real-time updates, and ensure seamless coordination between all stakeholders involved in building maintenance. A system that overcomes these limitations would reduce costs, improve efficiency, and enhance the longevity of building components.

SUMMARY OF THE DISCLOSURE

Accordingly, the present invention provides a system, apparatus, and method for managing building maintenance using a digital representation of a constructed physical building. The method involves a controller receiving a design plan corresponding to the as-built data of at least a portion of a constructed building. The controller operates one or more of: an Artificial Intelligence (AI) engine, a Vision Transformer (ViT), and a Generative Adversarial Network (GAN) engine to analyze the received design plan. The design plan represents the structural and functional components of the building as actually constructed, including architectural elements, mechanical systems, electrical layouts, plumbing networks, and installed fixtures. The as-built design plan may be obtained from a digital repository, a building information modeling (BIM) system, a scanned blueprint, or any other source containing the finalized configuration of the constructed building. The controller processes the design plan to extract details related to its physical structure, spatial configurations, and interconnected systems.

The controller is configured to analyze the design plan to identify dynamic components and their spatial configurations, where the dynamic components include one or more of a structural element, a fixture, a space, an appliance, or a building system within the building. The controller is further configured to retrieve and associate metadata with some or all of the dynamic components, wherein the metadata includes at least one of an installation date, material type, expected lifespan, maintenance history, maintenance schedule, real-time sensor data, or environmental conditions. The dynamic components may include elements such as walls, beams, ceilings, floors, HVAC ducts, ventilation units, electrical panels, circuit wiring, plumbing fixtures, piping networks, doors, windows, insulation materials, security systems, and other components installed as part of the constructed building. The metadata may be preloaded into the design plan at the time of construction, dynamically updated based on real-time sensor data, or manually entered by users to maintain an accurate record of the building's components and maintenance needs. In some implementations, the metadata may be retrieved from external data sources, including manufacturer specifications, historical maintenance logs, or facility management databases.

The controller is also configured to generate an interactive user interface based upon artificial intelligence analysis of the design plan. The interactive user interface displays the design plan along with the identified dynamic components, enabling users to view, select, and interact with one or more dynamic components of the design plan. The user interface may be accessed via a computing device such as a desktop computer, a tablet, a smartphone, or a facility management dashboard, providing real-time access to building maintenance information. The controller processes user interactions to facilitate intuitive selection and review of maintenance-relevant components. The interactive user interface may provide functionalities such as zooming, panning, filtering, and color-coded overlays to distinguish components based on maintenance priority, wear condition, or operational status. The controller may further allow users to navigate through different layers of the building design plan, enabling visualization of specific systems such as electrical wiring, plumbing routes, ventilation ducts, or flooring materials. The user interface may also incorporate data visualization elements such as graphs, trend analysis reports, and maintenance alerts to assist users in making informed decisions regarding maintenance planning.

The system or controller receives a selection of one or more dynamic components via the interactive user interface. The selection corresponds to a maintenance request or inspection initiated by the user. The selection may be made by clicking, tapping, or otherwise selecting a component from the digital representation of the design plan. In some cases, the controller may suggest or highlight components for selection based on AI-based analysis of historical maintenance data, predictive failure models, or real-time sensor readings. The system may also facilitate group selections, allowing a user to select multiple components or entire sections of the building to initiate a collective maintenance evaluation. The selection may further be refined using search and filter criteria, enabling users to focus on specific maintenance categories such as plumbing systems, electrical circuits, HVAC components, or flooring materials. The controller may dynamically update the display of the selected components to provide additional contextual information, such as past maintenance records, manufacturer specifications, or estimated time-to-failure data.

The controller detects maintenance requirements for the one or more selected dynamic components based on the associated metadata and other analytical factors. The detection process may involve cross-referencing installation dates with predefined maintenance schedules to determine whether a component is due for servicing. The system may evaluate real-time sensor data to detect operational anomalies, such as temperature fluctuations in HVAC units, pressure inconsistencies in plumbing lines, or voltage irregularities in electrical circuits. The controller may further employ AI-based image analysis techniques to process visual inputs from cameras installed in the building, detecting physical wear, material degradation, cracks, discoloration, or other visual indicators of component failure. The detection of maintenance requirements may also involve AI-driven pattern recognition, wherein the controller analyzes past maintenance trends and failure patterns to identify potential issues before they escalate into critical failures. In some cases, the system may suggest preventive maintenance actions based on projected degradation rates of materials and expected wear cycles of installed components.

Based on the detected maintenance requirements, the controller generates a maintenance execution plan for the selected dynamic components. The execution plan includes a detailed breakdown of the required maintenance actions, specifying the type and quantity of materials needed for repairs, replacements, or refurbishments. The system calculates estimated labor requirements, factoring in the complexity of the maintenance task, the availability of skilled personnel, and the expected duration of the maintenance operation. The maintenance execution plan further incorporates cost estimates, presenting a financial breakdown of projected expenses, including material costs, labor fees, service charges, and contingency allocations. The controller may also identify optimal scheduling windows for executing maintenance activities, minimizing disruptions to building occupants and coordinating with other scheduled maintenance tasks. In some embodiments, the system may provide recommendations for vendors, suppliers, or service contractors who can perform the required maintenance, ranking them based on pricing, historical performance, or proximity to the building location. The execution plan may further include alternative maintenance solutions, presenting different repair methodologies, material substitution options, or phased implementation strategies to optimize cost and efficiency.

The system enables users to review, modify, and approve the maintenance execution plan before initiating maintenance operations. Users may adjust cost parameters, select preferred vendors, modify material choices, or reschedule maintenance tasks to align with budgetary constraints and operational requirements. Once the execution plan is finalized, the system facilitates communication with maintenance personnel, transmitting work orders, task assignments, and scheduling notifications. The system may further provide real-time tracking of maintenance progress, updating the building's digital representation to reflect completed repairs and newly installed components. Upon completion of a maintenance task, the system updates the maintenance history records for the corresponding components, so that future maintenance decisions are informed by accurate historical data. The updated records may include time-stamped maintenance logs, photographic evidence of completed repairs, and performance test results verifying the effectiveness of the maintenance operation.

In some embodiments, the present invention provides a comprehensive, AI-driven approach to building maintenance management, leveraging digital representations of constructed buildings to automate maintenance detection, planning, and execution. By integrating real-time sensor data, AI-driven predictive analysis, and interactive user interfaces, the system provides proactive and efficient maintenance workflows, reducing operational downtime, optimizing resource allocation, and extending the lifespan of building components. This method eliminates the inefficiencies of traditional manual inspections, providing a data-driven and scalable solution for maintaining complex building infrastructures.

The present invention relates to a system and method for managing building maintenance using a digital representation (design plan) of a constructed building. More specifically, the present invention enables a building design plan to be used as an interactive digital twin of the constructed building, allowing users to identify, plan, and execute maintenance activities through a controller. The system provides an automated approach for selecting portions, spaces, or individual components requiring maintenance directly from the design plan and facilitates a structured workflow that calculates the required resources, estimates costs, and prioritizes tasks based on impact and dependencies.

In an embodiment, a controller receives a building design plan and associates it with the current, as-built condition of the constructed building. The design plan includes multiple dynamic components representing structural elements, fixtures, appliances, and building systems such as plumbing, HVAC, electrical wiring, flooring, walls, ceilings, and other materials. Each dynamic component is associated with metadata, including installation date, material type, expected lifespan, past maintenance history, and real-time data, if available, from connected IoT devices and sensors. The controller enables users to interact with the design plan through a user interface and select specific areas or components requiring maintenance.

Upon selection of a portion of the building, the controller analyzes various parameters to determine the maintenance requirements for the selected area. The analysis includes calculating the dimensions of the space, identifying materials and components present within the selected area, determining their expected wear and degradation based on historical data, and assessing maintenance priorities based on dependencies with other building components. The system may also suggest additional areas within the building that exhibit similar conditions and may require maintenance, providing comprehensive maintenance planning rather than isolated repairs.

In some embodiments, the controller integrates real-time data from IoT sensors embedded in the building's infrastructure. For example, temperature and humidity sensors may indicate excessive moisture levels, prompting the system to suggest preventive maintenance before visible damage occurs. Additionally, cameras installed in the building may provide image and video data, which can be analyzed using image processing techniques to detect cracks, stains, or material degradation, allowing for automated detection of maintenance needs.

In an embodiment, the controller calculates the precise quantities of materials required for maintenance based on the selected area's dimensions and material properties. If a user selects a flooring upgrade for a particular room, the system determines the total square footage, analyzes the types of flooring materials compatible with the space, and generates an estimate of how many tiles, planks, or other materials will be needed. The system further calculates associated costs, including labor charges, taxes, and potential additional expenses based on regional pricing and historical maintenance records.

In another embodiment, the system prioritizes maintenance tasks based on logical dependencies between building components. The controller analyzes whether performing maintenance in a particular order would prevent rework or damage to previously repaired components. For example, if a user selects a bathroom wall for repainting but the system detects underlying leakage in the plumbing system behind that wall, it may recommend addressing the plumbing issue first to prevent subsequent damage to the newly painted surface. The system may also suggest delaying certain maintenance activities if they are expected to be impacted by future planned repairs in adjacent areas.

In some embodiments, the controller provides vendor and contractor recommendations based on location, availability, pricing, and user ratings. Upon selecting a maintenance task, the system may retrieve a list of verified service providers who specialize in the required repairs, along with cost estimates and timelines for project completion. Users may select a vendor directly through the user interface, schedule maintenance appointments, and track progress in real-time.

In another embodiment, the system maintains a comprehensive maintenance log that records all past and ongoing maintenance activities for the building. The log includes timestamps, details of completed repairs, materials used, associated costs, and responsible service providers. The maintenance log serves as a reference for future maintenance planning and helps optimize decision-making by learning from past maintenance activities.

In some embodiments, the system integrates an inventory management feature that tracks the availability of spare parts, replacement materials, and other resources within the building. Before initiating a new maintenance task, the controller checks whether required materials are already available in storage, reducing the need for unnecessary purchases and minimizing costs.

In some embodiments, the system incorporates augmented reality (AR) and virtual reality (VR) features that enable users to visualize how maintenance changes will appear before actual implementation. Users can simulate different flooring, wall finishes, or fixture replacements using AR overlays on the digital twin, allowing them to make informed decisions about aesthetic and functional upgrades.

In other embodiments, the system provides automated alerts for upcoming maintenance based on the predicted lifespan of building components. The controller analyzes the installation date and usage conditions of various materials and fixtures and notifies users when maintenance should be scheduled. This predictive maintenance approach helps prevent unexpected failures and costly emergency repairs.

In some embodiments, the system allows multiple stakeholders, including property owners, facility managers, tenants, and contractors, to collaborate on maintenance planning through an integrated platform. Authorized users can receive notifications, provide approvals, and track progress, providing seamless communication and efficient execution of maintenance tasks.

In another embodiment, the system dynamically updates the building's digital twin as maintenance activities are performed. When repairs or modifications are made, the design plan is automatically updated to reflect the new conditions, so that future maintenance decisions are based on the most accurate representation of the building's structure and components.

In some embodiments, the controller incorporates environmental and sustainability considerations into maintenance planning. The system may recommend energy-efficient appliances, eco-friendly materials, and sustainable building practices based on user preferences and regulatory guidelines.

In another embodiment, the system provides a cost comparison feature that allows users to evaluate different maintenance options, material choices, and service providers based on budget constraints. The system generates detailed reports outlining various cost scenarios, helping users make financially optimized maintenance decisions.

In an embodiment, the system incorporates compliance checks so that maintenance activities adhere to preferred building objectives and construction practices. Before executing maintenance tasks, the controller verifies that the selected materials, modifications, and procedures comply with legal and safety standards, reducing the risk of violations and penalties.

In another embodiment, the system allows users to schedule maintenance tasks based on seasonal conditions, minimizing weather-related impacts. For example, exterior painting or roofing repairs may be scheduled during dry weather conditions, while insulation upgrades may be prioritized before the winter season.

In some embodiments, the system integrates emergency maintenance handling capabilities. If a critical issue such as a burst pipe, electrical failure, or structural instability is detected, the system prioritizes the repair, identifies emergency service providers, and notifies relevant stakeholders for immediate action.

In an embodiment, the system incorporates AI-driven analytics to provide insights into long-term maintenance trends. Users can access reports that highlight frequently recurring maintenance issues, cost patterns, and potential areas of improvement. These insights help optimize building management strategies and reduce overall maintenance expenditures.

The proposed invention aims to significantly improve communication and efficiency among architects, engineers, and stakeholders by providing a shared space where users can collaboratively annotate, discuss, and modify design plans in real time. This environment fosters a more inclusive and dynamic design process, where feedback and changes are instantly shared and addressed (through AI-assisted analysis), reducing the need for multiple meetings or extensive email chains.

Accordingly, the present disclosure provides methods, apparatus and systems for users (e.g.: architects, owners, developers, engineers, compliance reviewers, builders, and other users to annotate a dynamic interface based upon a static two-dimensional (sometimes referred to herein as "2D") or three dimensional (sometimes referred to herein as "3D") references, such as floorplans, design plans, blueprints, and the like, with the aid of artificial intelligence (sometimes referred to herein as "AI" and an AI platform programmed to accomplish the methods described herein as an "AI Engine").

According to the present invention, automated systems, apparatus, and methods provide tools that empower users to select spatial designations, such as those associated with specific segments, elements or components within a design plan and associate one or more annotations (e.g., metadata) with the spatial designation and/or segment, element, or component. In some embodiments, automated processes discern a specific type of element present within a design plan based on a pixel-level examination by the AI engine. Elements may encompass a diverse array of features, including but not limited to: walls, windows, doors, stairwells, staircases, ramps, ceilings, floors, columns, beams, roofs, skylights, facades, and an assortment of other architectural components. Furthermore, the present invention provides users with the capability to intelligently annotate these elements (including annotating lines and polygons), significantly enhancing the precision and utility of design plan modifications. This dynamic annotation process, (which may be powered by the AI engine) allows for annotations to adapt in real time to changes within the design plans.

In some embodiments, annotations may be designated to remain accurately aligned with an intended design element, even as modifications are made to the design element and/or other aspects of the design plan. The AI engine may facilitate spatial alignment of an annotation by automatically updating annotations based on the AI Engine's analysis of design components' spatial relationships and dimensions. This level of intelligence in annotation not only streamlines the design review and modification process but also enhances collaborative efforts by maintaining a consistent and up-to-date representation of the design intent across all user interactions.

By enabling detailed and dynamic annotations in a user interface based upon a static design plan, the present disclosure empowers stakeholders involved in a process referencing the design plan to achieve a higher degree of accuracy, efficiency, and collaboration, ultimately leading to the realization of more sophisticated and well-coordinated projects.

Artificial Intelligence (AI) has permeated various sectors, automating, and enhancing tasks that require data analysis, pattern recognition, and decision-making. In the context of design and planning, AI can dramatically transform how annotations, modifications, and interactions with design plans are handled. An AI-powered platform can intelligently interpret and process spatial annotations, automate repetitive tasks, and provide predictive insights, thereby enhancing the design process's efficiency and accuracy.

In some embodiments, automated systems described by the present invention may maintain a dynamic user interface similar to an up-to-date digital twin of a portion of a physical building. The dynamic user interface may reflect thought processes, alterations in a physical environment, or suggestions for improvements, back to the dynamic user interface based upon the static design plan. Such synchronization may facilitate (by way of non-limiting example) more accurate material lists, cost assessments, workforce allocation, and adherence to best practices, thereby optimizing the collaborative process in planning, executing, and managing architectural projects.

In general, the present invention provides for apparatus and methods related to receiving as input static representations (either physical or electronic, and either two-dimensional or three-dimensional) and generating one or more pixel patterns based upon automated processing of the static representations. The pixel patterns are analyzed using computerized processing techniques to mimic the perception, learning, problem-solving, and decision-making formerly performed by human workers (sometimes referred to herein as artificial intelligence or "AI"). The AI analysis process is repeated for multiple static representations over time, each static representation including a change to the design of a physical building. The AI processes denote, and track changes made in the sequence of static representations of design documents.

Based upon AI analysis of pixel patterns derived from the two-dimensional references and knowledge accumulated from increasing volumes of analyzed two-dimensional references, interactive user interfaces may be generated that allow for a user to modify dynamic static representations of features gleaned from the two-dimensional reference. The interactive user interfaces may enable users to select specific portions or segments on the design plans, wherein the AI engine employs AI processing to determine the elements or components present within the chosen segment by analyzing the pixel patterns of the two-dimensional references. AI processing of the pixel patterns, based upon the two-dimensional references, may include mathematical analysis of polygons formed by joining select vectors included in the two-dimensional reference. The analysis of pixel patterns and manipulatable vector interfaces and/or polygon-based interfaces is advantageous over human processing in that AI analysis of pixel patterns, vectors and polygons is capable of leveraging knowledge gained from previous work, whether or not a human was involved, hence the importance of integrating our AI with existing databases.

In still another aspect, in some embodiments, enhanced interactive interfaces may include one or more of: user definable and/or editable lines; user definable and/or editable vectors; and user-definable and/or editable polygons. The interactive interface may also be referenced to generate diagrams based on the lines, vectors and polygons defined in the interactive interface. Still further, various embodiments include values for variables that are definable via the interactive interface with AI processing and human input.

According to the present invention, analysis of pixel patterns and enhanced vector diagrams and/or polygon-based diagrams may include one or more of: neural network analysis, opposing (or adversarial) neural networks analysis, machine learning, deep learning, artificial intelligence techniques (including strong AI and weak AI), forward propagation, reverse propagation and other method steps that mimic capabilities normally associated with the human mind, including learning from examples and experience, recognizing patterns and/or objects, understanding and responding to patterns in positions relative to other patterns, making decisions, solving problems. The analysis also combines these and other capabilities to perform functions the skilled labor force traditionally performed.

Moreover, the invention dynamically updates annotations within the design plan in response to modifications or determined maintenance requirements within the constructed building. This responsiveness is not merely reactive; it may be anticipatory, guided by the AI engine's analysis of existing annotation threads and historical data pertaining to similar design elements or modifications. Through this advanced analysis, the platform identifies patterns and commonalities in how certain design changes have been annotated in the past, applying this insight to suggest or automatically adjust annotations in the current context. By integrating past learnings and contextual understanding, the system facilitates that annotations are consistently aligned with best practices and the specific nuances of the project at hand. Consequently, this invention not only adapts to the evolving needs of the design plan but also evolves itself, learning from each interaction to provide more informed, precise, and helpful annotations (or annotation suggestions) over time.

In some specific examples, the present invention uses machine learning and/or artificial intelligence to identify architectural aspects and materials, such as walls, stairwells, floors, ceilings, doors, windows, and HVAC components, within the selected portion of the design plan. The present invention identifies such architectural aspects and other building features, and provides dynamic association between design plan elements such as objects, polygons, or lines and their corresponding annotations. Such embodiment facilitates that when a user moves a design plan element within the digital workspace as part of design plan modification, any associated annotations are automatically moved in tandem with the element. This feature is powered by the underlying AI engine, which intelligently recognizes the linkage between the spatial characteristics of design elements and their annotated descriptions or markers.

Further, the system is equipped to generate automated annotations (e.g., automated metadata) in response to changes within the design plan, specific design plan elements, or changes in physical counterparts within the physical building, thereby offering a proactive approach to documenting and communicating these modifications. This functionality may particularly be valuable for tracking alterations over the course of a project's development, so that all stakeholders are promptly informed of updates. Additionally, in instances where changes occur to elements that previously lacked annotations, the system leverages its AI engine to intelligently create appropriate annotations for these newly modified elements. These automated annotations or metadata are generated based on a sophisticated analysis conducted by the AI engine, which considers the nature of the change, the context within the overall design plan, and historical data on similar modifications. This capability facilitates that every change, regardless of its prior annotation status, is accurately documented and communicated, enhancing the collaborative and iterative nature of the design process.

In some preferred embodiments, the AI Engine is seamlessly integrated with databases housing a repository of similar past projects. These databases serve as invaluable resources, facilitating the AI engine's learning process by drawing insights from diverse user decisions made in comparable prior works. This integration empowers the AI Engine with a wealth of accumulated knowledge, enhancing its ability to offer informed and contextually relevant recommendations.

Furthermore, according to some embodiments of the present invention, the system can be integrated with advertisement platforms that deliver advertisements to users on the interactive user interfaces. The advertisement may comprise but is not limited to: components from particular brands that align with both the required quality standards and the user's budget, alternative components from diverse brands, comprehensive lists of materials complete with pricing and purchase options, and even contact information or details of contractors and architects available for hire, specializing in the realization of the actual building based on the design plan.

A two-dimensional reference, such as a design floorplan is input into an AI engine and the AI engine converts aspects of the floorplan into components that may be processed by the AI engine, such as, for example, a rasterized version of the floorplan. The floorplan is then processed with machine learning to specify portions that may be specified as discernable components. Discernable components may include, for example, rooms, residential units, hallways, stairs, dead ends, windows, or other discrete aspects of a building.

A scaling process is applied to the floorplan and size descriptors are assigned to the discernable components. In addition, distances, such as, for example, a distance to an exit from the furthest point in a residential unit are calculated.

In specific embodiments of the invention, the method involves several key processes: receiving static representations of a design plan as input into a controller housing the AI engine; generating pixel patterns through automated processing of these representations; analyzing multiple static representations over time using the AI engine; representing the design plan (or a portion of it) as a raster image; utilizing the AI engine on the controller to analyze the raster image, identifying components depicted in the design plan; determining the scale of these components; constructing a user interface featuring various components, arranging them to establish boundaries; generating features' areas or lengths based on these boundaries; enabling user selection of a segment within the design plan via the user interface; leveraging the AI engine to identify the component(s) within the chosen segment, employing AI analysis of the segment's polygons; and finally, displaying maintenance requirements related to the identified component(s) on the user interface. Furthermore, alternative embodiments may comprise computer systems, apparatus, and computer programs stored on one or more computer storage devices. Each configuration is tailored to execute the aforementioned methods and functionalities.

In specific embodiments of the invention, the process of selecting a segment may involve one or both of the following actions: marking around or on the desired segment or design element directly within the user interface or utilizing a polygon shape tool accessible on the interface, enabling users to drag and position the shape onto the desired segment. Moreover, the selection of a segment can be initiated either manually by a user or automatically by the AI engine. Additionally, when employing the polygon shape tool, users may choose from a range of polygon shapes provided by the AI engine within the user interface for selection and placement.

In specific embodiments of the invention, the AI engine analyzes the selected segment or design element based on pixel-level analysis of the selected segment or design element area within the design plan covered by the user-provided marking or the selected polygon shape. The pixel-level analysis may comprise considering the pixels of the static representation for analysis if the pixels are at and/or around a tolerable distance from the marking or boundaries of the polygon shape. The pixel-level analysis may comprise analyzing the polygon pixel patterns of the segment covered by the selected polygon shape. The pixel-level analysis may further comprise considering the pixels of the static representation for analysis if the pixels are at a predefined distance from each other creating a particular spatial relationship. The spatial relationship may be defined by a user or automatically learned by the AI engine.

In some embodiments of the present invention, the system may include management and interaction of annotations within the design plan to facilitate the integrity and utility of collaborative feedback. In such a system, annotations made by any user cannot be directly deleted or significantly altered by others without the original annotator's consent. Should any user attempt to modify or delete an annotation, the system, powered by the AI Engine, automatically triggers a notification process. This notification is sent to the original user who added the annotation, providing them with the option to approve or disapprove the proposed change or deletion. This mechanism facilitates that each annotation's original intent and value are preserved until the contributor validates the necessity for alteration, thereby maintaining a coherent and collaborative annotation history.

For example, if an architect decides to expand a room's dimensions, the AI engine updates the material list to reflect the increased quantity of flooring needed, adjust the cost estimation to account for this change, and analyze whether additional labor is required. By automating these calculations, the system streamlines the planning and estimation phases, significantly enhancing communication and collaboration among all stakeholders.

In specific embodiments of the invention, the method encompasses receiving a static representation of at least a portion of a physical building into a controller and analyzing this representation with an AI engine to identify various components within it, which are then represented as a pattern of pixels in a raster image. This is followed by generating an interactive user interface that includes multiple vertices, utilizing dynamic lines and polygons to depict these identified components as dynamic, interactive elements. The process advances to selecting a design element within this interface for annotation, allowing users to input annotations directly associated with selected design element. Subsequently, the AI engine determines the precise positional coordinates (x, y, z) of the selected design element, so that these coordinates are accurately associated with the corresponding annotations. This methodology facilitates that annotations are not only relevant and accurately placed within the digital representation but also perfectly aligned with the physical location of the design element within the building, thereby maintaining a coherent and synchronized digital-physical mapping of the architectural space.

In one embodiment of the present invention, the system features a sophisticated mechanism for tracking and reflecting real-world modifications within a building's physical structure directly onto its digital counterpart (design plans), effectively maintaining an up-to-date digital twin. Utilizing an array of sensors, IoT devices, and cameras strategically installed throughout the physical building, the system captures any changes or alterations made to the structure. These changes may include architectural modifications, interior design updates, or structural enhancements.

Once a change is detected, the AI Engine analyzes the collected data to understand the nature and scope of the modification. This analysis includes identifying the specific design elements affected, the extent of the changes, and any potential impacts on related components within the design plan. The AI Engine then automatically updates the digital design plan to accurately mirror these physical alterations, so that the digital twin remains a true reflection of the current state of the building.

Moreover, in-depth pixel-level analysis may involve considering spatial relationships between pixels within the static representation, facilitating a predefined distance between them, thus refining the precision of the analysis process.

In some embodiments, the two-dimensional reference input may be file extensions that include but are not limited to: DWG, DXF, PDF, TIFF, PNG, JPEG, GIF, or other types of files based upon a set of engineering drawings. Some two-dimensional reference references may already be in a pixel format, such as, by way of a non-limiting example, a two-dimensional reference in a JPEG, GIF, or PNG file format. The engineering drawings may be hand drawings, or they may be computer-generated drawings, such as may be created as the output of CAD files associated with software programs such as AutoDesk™, Microstation™ etc. As some architects, design firms and others who generate engineering designs for buildings may be reluctant to share raw CAD files with others, the present invention provides a solution that does not require raw CAD files.

In other examples, such as for older structures, a drawing or other 2D representation may be stored in paper format or digital version or may not exist or may never have existed. The input may also be in any raster graphics image or vector image format.

The input process may occur with a user creating, scanning into, or accessing such a file containing a raster graphics image or a vector graphics image. The user may access the file on a desktop or standalone computing device or In some embodiments, via an application running on a smart device. In some embodiments, a user may operate a scanner or a smart device with a camera to create the file containing the image on the smart device.

In some embodiments, a system utilizes pixel patterns and polygon patterns in sizing analysis of the selected segments or design elements of design plans. The system incorporates a user-adjustable and/or AI-adjustable feature for sizing variations, utilizing percentage variation in pixel positions relative to other pixel positions within a defined window of the segment selection. It may involve convolutional filters for zero-shot and one-shot approaches, leveraging generative models and template matching. Another embodiment may incorporate relative positioning of pixels, employing mathematical representations, algorithms, and vector-based approaches for analyzing distances, angles, and clustering vectors into symbols. The system aims for optimization based on speed, quality, cost-effectiveness, durability, aesthetics, financial criteria, supply chain, labor costs, subcontractor selection, scope of work, location, equipment, spatial relevance, clearance, covering area, floor, ceiling, paths, plumbing, gas/chemical lines, cables, electrical wiring, and rule-based criteria. Users can select measurements such as length, area, volume, atmospheric volume, and relative height, further refining the system's analysis. This versatile approach prioritizes user-defined preferences and customizable variables to streamline decision-making and planning.

A primary advantage of AI analysis in this scenario is its capacity to analyze complex pixel patterns, vectors, and polygons using knowledge derived from previous experiences. This knowledge is not confined to the work of a single individual but can be harnessed from a select group of experts or shared learnings from similar past projects. This means that the AI system has access to a vast pool of information and insights, enabling it to make informed and effective decisions. Furthermore, the speed at which AI analysis can derive new and improved work based on the current design plan is a remarkable asset. The capabilities of the AI Engine in generating and managing annotations far exceed human processing abilities, positioning it as an invaluable asset for innovating and enhancing design plans. Through its advanced computational power, the AI Engine can swiftly analyze complex design elements, identifying opportunities for optimization and suggesting refinements that may not be immediately apparent to human users. This functionality extends to the automated generation of annotations, where the AI Engine documents each suggested alteration, providing a detailed rationale and potential impact analysis for the change.

According to the present invention, analysis of pixel patterns and enhanced vector diagrams and/or polygon based diagrams may include one or more of: neural network analysis, opposing (or adversarial) neural networks analysis, machine learning, deep learning, artificial-intelligence techniques (including strong AI and weak AI), forward propagation, reverse propagation and other method steps that mimic capabilities normally associated with the human mind-including learning from examples and experience, recognizing patterns and/or objects, understanding and responding to patterns in positions relative to other patterns, making decisions, solving problems. The analysis also combines these and other capabilities to perform functions the skilled labor force traditionally performed.

BRIEF DESCRIPTION OF THE DRAWINGS

The accompanying drawings, which are incorporated into and constitute a part of this specification, illustrate several embodiments of the present invention. Together with the description, these drawings serve to illustrate some aspects of the present invention.

FIG. 1D illustrates an exemplary interface for providing automated annotation or metadata suggestions to users during annotation process.

FIG. 1E illustrates an exemplary settings window with various setting options as per some embodiments of the present invention.

FIG. 1F illustrates an exemplary method for relocating a design element from one position to another on a design plan in some embodiments of the present invention.

FIGS. 1K and 1L illustrate exemplary maintenance logs for a selected portion of a design plan, tracking repairs, replacements, costs, and scheduled maintenance for building components.

FIGS. 3A-3D show various views of the AI-analyzed boundaries and design elements overlaid on the original floorplan including a table illustrated to contain hierarchical dominance relationships between area types.

FIGS. 4A-4B illustrate various aspects of dominance-based area allocation.

FIGS. 10A-10B illustrate additional method steps that may be executed in some embodiments of the present invention.

FIG. 11 illustrates additional method steps that may be executed in some embodiments of the present invention.

FIG. 12 illustrates an exemplary system and method where the controller analyzes maintenance logs, detects recurring issues in a constructed building, and provides automated suggestions to minimize frequent maintenance.

FIGS. 14A-14B illustrate additional method steps that may be performed in some implementations of the present invention.

DETAILED DESCRIPTION

Figure 1A:
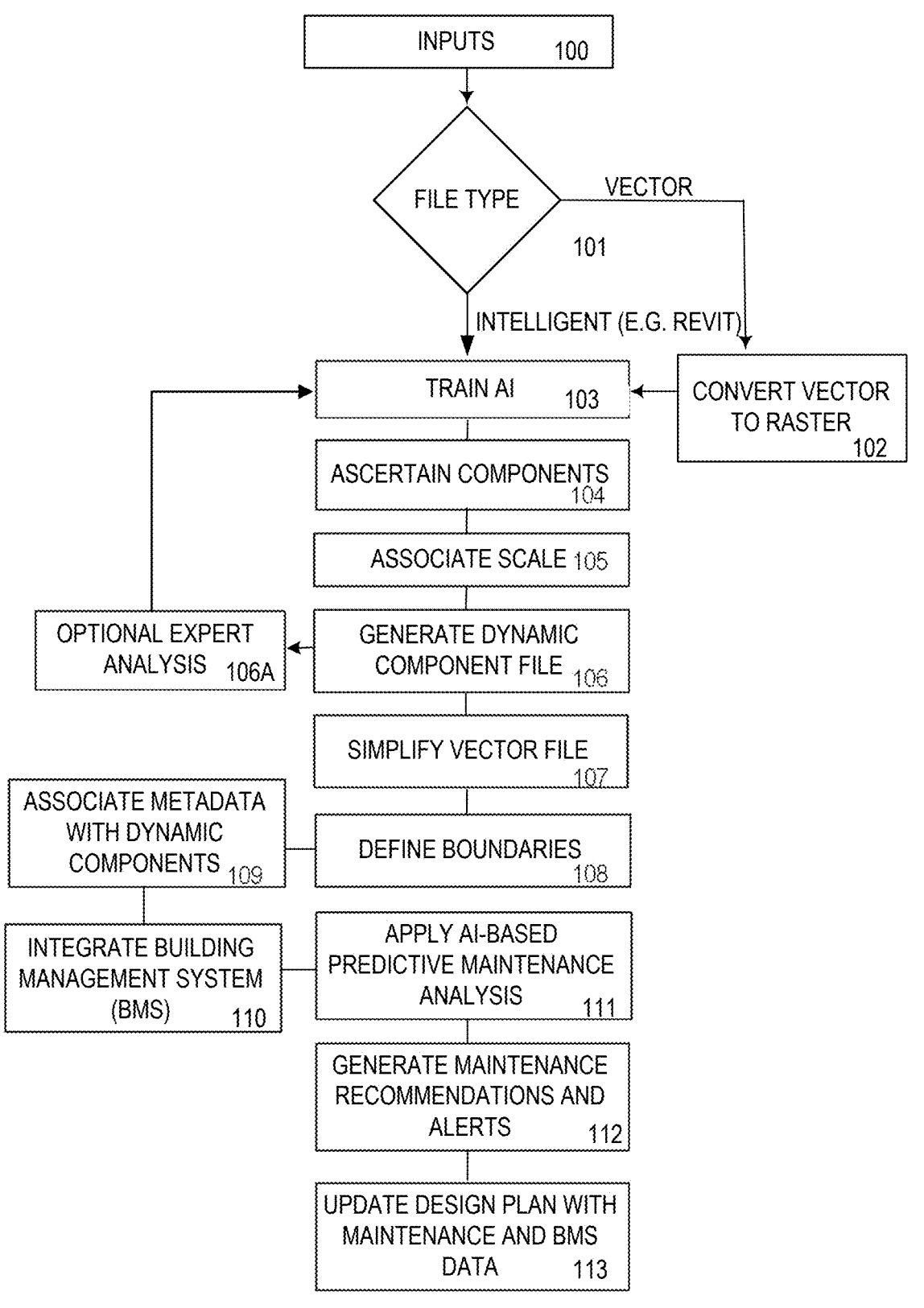
FIG. 1A illustrates method steps that may be implemented in some embodiments of the present invention.

The present invention provides systems, methods, and apparatus for managing building maintenance using a digital representation (design plan) of a physical building, wherein an advanced controller utilizes an Artificial Intelligence (AI) engine and/or a Generative Adversarial Network (GAN) engine to analyze a design plan, determine maintenance requirements, and generate execution plans. The controller receives a design plan of at least a portion of the physical building, wherein the design plan comprises dynamic components representing as-built building elements. The dynamic components include structural elements, fixtures, spaces, appliances, and building systems, each associated with metadata that may include installation date, warranty details, material type, expected lifespan, maintenance history, maintenance schedule, real-time sensor data, and environmental conditions. The system processes this information to provide an interactive user interface that allows users to view, select, and interact with the dynamic components, submit maintenance requests, and receive automated maintenance recommendations.

The controller is configured to analyze the design plan to identify the dynamic components and their spatial relationships. The analysis includes cross-referencing with historical maintenance logs, real-time sensor readings from a building management system (BMS), and predictive AI-driven assessments to anticipate potential issues before they occur. The associated metadata may be supplemented with user-entered custom annotations, allowing maintenance personnel to document observations, past repairs, or recommended actions. Additionally, metadata may be automatically assigned by the controller based on real-time data from IoT sensors, performance analytics, and compliance parameters. By continuously updating the metadata, the system maintains an accurate representation of the physical building's operational state.

Upon receiving a maintenance request through the interactive user interface, the controller detects maintenance requirements for the selected dynamic components. This detection process leverages AI analysis to assess real-time sensor inputs, historical degradation trends, and expected component lifespan. The AI engine further generates predictive maintenance schedules, identifying components likely to require maintenance based on material degradation rates, operational stress, and environmental conditions. These predictive schedules enable facility managers to proactively address issues before they escalate into critical failures, reducing downtime and extending the longevity of building components.

Once maintenance requirements are identified, the controller generates a maintenance execution plan, which includes detailed specifications such as required materials, labor allocation, estimated repair duration, and associated costs. The plan further incorporates a prioritization framework, organizing tasks based on interdependencies between different building components. For example, if a ceiling requires structural reinforcement due to water damage, the system may prioritize resolving the underlying leakage issue before executing any painting or finishing tasks. The AI engine also evaluates vendor and contractor availability, providing recommendations based on pricing, historical service quality, and geographic proximity.

The interactive user interface displays real-time updates from IoT sensors embedded in the building, allowing users to monitor the current status of structural elements, fixtures, and appliances. The interface also features a maintenance timeline, visually representing past and upcoming maintenance activities for selected components. Users can navigate through historical maintenance records to track completed repairs, identify recurring issues, and analyze long-term performance trends. Additionally, the system continuously refines maintenance strategies by analyzing historical data to predict future maintenance requirements for similar components.

To enhance early fault detection, the AI engine is capable of identifying abnormal conditions based on historical degradation patterns and generating early maintenance alerts. If an HVAC system exhibits irregular energy consumption or a plumbing system registers unexpected moisture fluctuations, the AI engine will flag these anomalies and suggest pre-emptive inspections. The system also identifies hidden dependencies between dynamic components to prevent redundant or conflicting maintenance activities. For example, if replacement of a floor tile risks damaging underlying electrical wiring, the controller may recommend consolidating both maintenance tasks within a single execution plan.

Environmental conditions such as humidity, temperature, and occupancy levels are factored into the maintenance execution plan to determine optimal repair schedules. If a particular season or time of day presents more favorable conditions for executing maintenance tasks, the controller dynamically adjusts schedules to align with these variables. The AI engine also integrates image-processing capabilities, receiving real-time images from cameras installed throughout the building and analyzing visual indicators of material wear, structural degradation, or damage.

The system extends its functionality to various building systems, including electrical, plumbing, ventilation, and structural integrity monitoring. Electrical maintenance requirements are identified based on energy consumption anomalies, with the controller detecting deviations that may indicate overloaded circuits or failing components. Water leakage is detected through a combination of IoT moisture sensors and AI-powered image analysis of walls and ceilings. Air quality sensors track pollutant levels, prompting ventilation system maintenance when air purity falls below predefined thresholds. The AI engine also monitors corrosion in metallic components, assessing oxidation levels to determine when protective treatments or replacements are required.

To optimize efficiency, the controller generates an optimal sequence of maintenance tasks, avoiding unnecessary overlapping repairs and reducing rework. The system intelligently sequences tasks to minimize disruption to building operations, scheduling activities such as painting or resurfacing only after all structural and mechanical repairs are completed. By coordinating labor, materials, and resources in a structured manner, the system enhances overall maintenance efficiency while reducing operational costs.

Additionally, the system integrates real-time stakeholder feedback into the maintenance execution plan, adjusting strategies based on input from facility managers, maintenance crews, and building occupants. If cost constraints or scheduling conflicts arise, the controller dynamically modifies execution plans to accommodate new constraints while maintaining efficiency. Automated procurement capabilities streamline material sourcing, with the system generating purchase orders for required components based on available inventory and vendor comparisons.

By continuously refining its predictive maintenance capabilities, the system evolves into a proactive asset management tool, reducing reactive repairs and improving long-term facility sustainability. AI-based fault detection algorithms analyze historical trends to identify recurrent maintenance issues and recommend corrective actions that address underlying causes rather than merely treating symptoms. The combination of AI-driven insights, real-time data monitoring, and user interaction within a digital twin framework provides a comprehensive solution for intelligent building maintenance management.

In some embodiments, the present invention provides systems, methods, and apparatus for automated detection, prioritization, and management of maintenance tasks in a physical building using a digital representation of the physical building. The system utilizes a controller that receives a design plan of at least a portion of the physical building, wherein the design plan comprises dynamic components representing various building elements. The controller analyzes these dynamic components by associating metadata derived from historical maintenance logs, real-time sensor data from a building management system (BMS), and a component database. By integrating real-time monitoring and predictive analytics, the system effectively detects maintenance requirements, prioritizes tasks based on urgency and impact, and generates optimized maintenance execution plans.

The controller detects maintenance requirements for at least one dynamic component or portion of the design plan based on sensor anomalies, historical failure patterns, metadata insights, and user-input data. This detection process includes identifying deviations from expected operational parameters, such as excessive vibration in HVAC units, abnormal power consumption in electrical systems, or moisture levels indicating potential leakage. The AI engine of the controller cross-references real-time sensor data with historical failure trends to predict potential issues before they escalate into costly repairs. For example, if an elevator system consistently experiences minor faults within short intervals, the system may classify the component as high-risk and recommend preemptive maintenance.

Once maintenance requirements are detected, the controller determines interrelations between dynamic components to assess how maintenance actions may impact other building elements. This determination prevents unintended disruptions caused by interdependent systems. For example, a water pipeline replacement may require temporary shutdown of adjacent heating systems, or a ceiling repair may necessitate relocation of electrical fixtures. The AI-driven analysis enables the system to provide an optimized maintenance sequence that minimizes operational downtime and cost inefficiencies.

After identifying maintenance requirements and their impact, the controller assigns priority levels to tasks based on urgency, functional significance, cost factors, and predicted failure risks. For example, a fire suppression system requiring servicing is assigned a higher priority than a minor wall paint retouch. The prioritization framework considers environmental factors such as seasonal weather conditions, building occupancy schedules, and the availability of maintenance personnel to determine the most efficient execution timeline. By dynamically adjusting task priorities, the system enhances resource utilization and reduces reactive maintenance.

The controller then generates a maintenance execution plan that outlines prioritized tasks, labor allocation, required materials, and estimated completion timelines. The plan includes specifications such as task dependencies, vendor selection, and workforce scheduling. The system optimizes the execution plan by evaluating available inventory for required maintenance materials and comparing existing stock with material requirements to minimize unnecessary procurement. If a required material is unavailable in inventory, the controller retrieves vendor pricing comparisons and recommends the most cost-effective sourcing option.

The system further captures and logs real-time updates on maintenance progress using IoT sensors, cameras, and user-input mechanisms, storing this data in a maintenance database. This feature allows facility managers to monitor ongoing maintenance activities remotely and make informed decisions based on live status updates. The system also integrates AI-based performance analysis to evaluate the effectiveness of completed maintenance tasks. By assessing recurring maintenance patterns and post-repair component reliability, the AI engine identifies areas for improvement in future maintenance strategies.

To enhance cost efficiency, the controller suggests alternative maintenance solutions, including partial replacements, full replacements, or temporary fixes, based on the nature of the detected issue. For example, if a section of roofing material shows minor wear, the system may recommend reinforcement rather than a complete replacement. Additionally, the controller calculates total estimated costs, including materials, labor, and time-based expenditures, enabling building owners to plan budgets effectively.

The system prioritizes maintenance tasks covered under warranties, reducing costs for building owners by recommending in-warranty repairs over out-of-pocket expenses. Furthermore, the controller identifies potential risks associated with the maintenance execution plan, such as hazardous material exposure, adjacent space disruptions, or safety hazards. If maintenance activities require adherence to regulatory safety standards, the system provides compliance guidelines for execution.

Vendor recommendations are retrieved based on service quality ratings, geographic proximity, and pricing structures, so that maintenance tasks are assigned to reliable contractors. The system compares pricing from multiple vendors and suggests the most cost-efficient option, optimizing procurement without compromising quality. Additionally, the controller customizes maintenance strategies based on building type, adapting execution plans to suit residential, commercial, or industrial properties. For example, in a commercial setting, maintenance may be scheduled during off-hours to prevent business disruptions, while industrial maintenance may prioritize heavy machinery inspections to prevent production delays.

In some embodiments, the present invention provides systems, methods and apparatus for an interactive platform that significantly enhances collaborative processes associated with a dynamic user interface based upon a static design plan reference. Within this interactive platform, users can seamlessly select a spatial designation, (such as, for example, a spatial designation associated with a design element) for annotation (e.g., manually adding metadata) within an interactive user interface based upon a static design plan document descriptive of at least a portion of a physical building.

An AI engine leverages one or more of machine learning, user input, reference documents, applicable standards, applicable codes, external references, databases, digital content accessible via a communications platform (e.g. the Internet), historical data, and current context to suggest automated annotations or metadata, optimizing an annotation process by providing users with intelligent, contextually relevant suggestions that align with a project's specifications and goals.

Coordinates may be associated with corresponding annotations, facilitating that a piece of information is accurately linked to a physical counterpart in a relevant building. This integration of detailed spatial awareness with the platform's annotation capabilities facilitates a dynamic, real-time connection between the digital design plan and the actual physical structure, enhancing the accuracy, efficiency, and effectiveness of the collaborative design and maintenance process.

In some embodiments of the present invention, the platform incorporates social interaction features that enable users to engage with the annotations made by other users through mechanisms such as commenting, liking, disliking, insertion of a symbol (e.g., emoji, signature, authorization, or other recognizable digital representation).

The present invention provides interaction enabling a dialogue between users, and/or an AI Engine, about design elements and annotations. In another aspect, it also contributes to a feedback system where the AI engine can observe and learn from user interactions. As users comment on or react to annotations, the AI engine may analyze responses, utilizing them for machine learning to refine a quality and relevance of future automated annotation suggestions. Moreover, the systems according to the present invention may also allow for an approval workflow, wherein annotations can be approved or disapproved by authorized users or automatically by the AI engine depending upon positive or negative reactions to the annotations.

Machine monitoring of spatially relevant annotations facilitates machine and user input capability that becomes more accurate over time and adheres to a collective knowledge and preferences of a team, thereby enhancing collaborative processes.

In some embodiments of the present invention, an AI engine may leverage sophisticated analysis of annotations associated with a design plan to intelligently determine an order of actions associated with a particular design plan, such as, by way of non-limiting example, an order of installation, service, modification, or other action included in a maintenance or renovation process associated with a design plan. By evaluating factors such as availability of resources, supply chain, urgency, best practices requirements, project timelines, and skilled labor availability, an AI engine may be used to prioritize tasks in a manner that optimizes workflow efficiency and facilitates that important project milestones are met.

By way of non-limiting illustrative example, if an annotation on a structural aspect (e.g., a support beam) indicates an issue with a safety standard (or other best practice), the AI engine assigns a higher severity level to a task directed to ascertaining whether to prioritize it over less important modifications. Similarly, if an electrical installation is annotated as a prerequisite for subsequent tasks within the project, the AI engine schedules this installation early in the action order. Dynamic prioritization may enable project progression in a logical and efficient manner, minimizing delays and optimizing resource allocation.

In further embodiments of the invention, a sophisticated dynamic cost estimation functionality is embedded within the system, enabling the real-time assessment of the financial implications stemming from alterations made to the digital design plan. When users initiate changes to design elements or make new annotations, the AI engine evaluates these modifications. It does this by calculating the expected changes in material requirements, updating labor needs based on the scope and scale of the adjustments, and revising cost estimations to reflect these new calculations accurately.

This embodiment is particularly innovative in how it leverages connectivity with third-party vendor platforms. Through seamless integration, the platform facilitates immediate access to a wide range of quotes for required materials, enables the efficient hiring of labor tailored to the project's revised needs, and even supports the direct procurement of services and goods. Users benefit from a streamlined interface where design modifications, cost implications, and procurement actions converge in a cohesive workflow.

In some embodiments of the invention, a focus may be placed upon enforcement of best practices, standards, and enumerated requirements within one or more of: design planning activities; design review; construction activities; cost estimation; supply chain activities; contractor (and/or subcontractor) engagements, by leveraging the sophisticated capabilities of the AI engine. An AI system may receive as input one or more annotations and design elements represented as polygons and/or lines, presented within an interactive user interface. In some embodiments, a data source of relevant input or criteria relevant to architecture, engineering, and construction standards may be made available to one or both of a user and an AI Engine to provide input relevant to a spatial designation of a design plan. Input of relevant annotation content and data source content enables an AI Engine to provide notification of one or more of: identification of discrepancies, potential action adverse to a preferred practice, or area of non-compliance with a preferred practice or standard that may exist within a design plan.

In some embodiments, an AI engine may actively engage users by flagging AI noted concerns directly within the user interface. Further, in some embodiments, an automated process may highlight specific elements and/or features included in a design plan and describe a potential concern. For example, actionable modifications or alternative solutions that may place a design into a more desired state may be included in AI and/or user generated spatially relevant annotations. Users may receive tailored alerts and guidance, effectively offering a consultative approach to rectify compliance issues.

In some embodiments, an AI assisted system may preemptively address potential issues of adherence with a desired practice, or design relevant documents, and/or other criteria, thereby significantly reducing the likelihood of encountering costly modifications during or after the maintenance or renovation phase.

Moreover, some embodiments may serve to streamline interactions with review bodies and approval processes. By providing a platform that inherently aligns with regulatory expectations, the system facilitates a smoother, more efficient pathway from project conception through to completion. The preemptive adherence to a preferred design criteria may accelerate an acceptance process, minimizing delays and fostering a more productive relationship between project stakeholders and/or other parties of interest.

In some other embodiments of the present invention, an AI engine is equipped to simulate "What If" scenarios, providing a dynamic tool for planning and decision-making within the architectural and construction domains. This feature enables users to explore various hypothetical modifications to the design plan, design elements, and annotations and assess their potential impacts without committing to actual changes. By inputting different "What If" conditions, such as altering the materials of a design element, repositioning structural components, or changing the dimensions of space, the AI engine projects the consequent effects on the design's overall integrity, cost implications, compliance with best practices, and even the projected timeline for completion.

For example, a user considering the replacement of a building material with a more sustainable alternative can engage the "What If" simulation to understand how this choice may affect insulation properties, overall building sustainability ratings, and cost. The AI engine analyzes the proposed change, leveraging historical data, current standards, and predictive algorithms to furnish detailed insights, including potential energy savings, adjustments in material costs, and any required alterations to construction techniques.

In some embodiments of the present invention, the collaborative platform integrates a comprehensive question-and-answer feature designed to facilitate communication among the various parties involved in a construction or renovation project. This feature allows users to pose questions directly within the interface, specifically targeting aspects of the design plan or related to specific annotations. Utilizing natural language processing and a deep understanding of the project's context, the AI engine sifts through the database of annotations, design elements, and associated documentation to provide accurate, automated answers.

For example, a subcontractor on-site may query the system about the specifications of a particular material annotated within the design plan. The AI engine processes this inquiry, referencing the annotation database and any related documents or comments to furnish a detailed response, including material properties, recommended installation practices, and potential suppliers. This instant access to information accelerates decision-making and problem-solving on the construction or maintenance site.

Additionally, in some embodiments, a platform may catalog interactions, creating a searchable knowledge base that grows increasingly relevant over time. As questions are asked and answered, an associated AI engine may refine its ability to understand and respond to inquiries, improving the accuracy and relevance of its automated responses.

In the following sections, detailed descriptions of examples and methods will be given. The description of both preferred and alternative examples, though thorough, are exemplary only. It is understood by those skilled in the art, that various modifications and alterations may be apparent and within the scope of the present invention. Unless otherwise indicated by the language of the claims, the examples do not limit the broadness of the aspects of the underlying invention as defined by the claims.

Referring to FIG. 1A, a general flow diagram showing some preferred embodiments of the present invention as illustrated. At step 100, a design plan (which may be a design plan or dynamic architectural design file e.g., a Revit® compatible file) indicating As-Built aspects of a constructed physical building; is input into a controller or other data processing system using a computing device. The design plan may include an item of a known size, such as, by way of a non-limiting example, a scale bar that allows a user to ascertain a scale of the drawing (e.g., 1"=100' etc.) or an architectural aspect of a known dimension, such as a wall or doorway of a known length (e.g., a doorway known to be three feet wide).

Input of a two-dimensional reference (i.e., design plan) into the controller may occur, for example, via known ways of rendering an image as a vector diagram, such as via a scan of paper-based initial drawings; upload of a vector image file (e.g., encapsulated postscript file (epf file); adobe illustrator file (ai file); or portable document file (pdf file). In other examples, a starting point for estimation may be drawing file in an electronic file containing a model output for an architectural floor plan. In still further examples, other types of images stored in electronic files such as those generated by cameras may be used as inputs for automated processes.

In some embodiments, the design plan may be file extensions that include but are not limited to: DWG, DXF, PDF, TIFF, PNG, JPEG, GIF, or other types of files based upon a set of engineering drawings. Some design plans may already be in a pixel format, such as, by way of a non-limiting example, a two-dimensional reference in a JPEG, GIF, or PNG file format. The engineering drawings may be hand drawings, or they may be computer-generated drawings, such as may be created as the output of CAD files associated with software programs such as AutoDesk™, Microstation™ etc. In other examples, such as for older structures, a drawing or other design plan may be stored in paper format or digital version or may not exist or may never have existed. The input may also be in any raster graphics image or vector image format.

The input process may occur with a user creating, scanning into, or accessing such a file containing a raster graphics image or a vector graphics image. The user may access the file on a desktop or standalone computing device or, in some embodiments, via an application running on a smart device. In some embodiments, a user may operate a scanner or a smart device with a charged coupled device to create the file containing the image on the smart device.

In some embodiments, a degree of the processing as described herein may be performed on a controller, which may include a cloud server, a standalone computing device or a smart device. In many examples, the input file may be communicated by the smart device to a controller embodied in a remote server. In some embodiments, the remote server, which is preferably a cloud server, may have significant computing resources that may be applied to AI algorithmic calculations analyzing the image.

In some embodiments, dedicated integrated circuits tailored for deep learning AI calculations (AI Chips) may be utilized within a controller or in concert with a controller. Dedicated AI chips may be located on a controller, such as a server that supports a cloud service or a local setting directly.

In some embodiments, an AI chip tailored to a particular artificial intelligence calculation may be configured into a case that may be connected to a smart device in a wired or wireless manner and may perform a deep learning AI calculation. Such AI chips may be configurable to match a number of hidden levels to be connected, the manner of connection, and physical parameters that correspond to the weighting factors of the connection in the AI engine (sometimes referred to herein as an AI model). In other examples, software-only embodiments of the AI engine may be run on one or more of: local computers, cloud servers, or on smart device processing environments.

At step 101, a controller may determine if a design plan received into the controller includes a vector diagram. If a file type of the received design plan, such as an input architectural floor plan technical drawing, includes at least a portion that is not already in raster graphics image format (for example, that it is in vector format), then the input architectural floor plan technical drawing may be transformed into a pixel or raster graphics image format in step 102. Vector-to-image transforming software may be executed by the controller, or via a specialized processor and associated software.

In some embodiments, the controller may determine the pixel count of a resulting rasterized file. The rasterized file will be rendered suitable for the controller hosting an artificial intelligence engine ("AI engine") to process, the AI engine may function best with a particular image size or range of image size and may include steps to scale input images to a pixel count range in order to achieve a desired result. Pixel counts may also be assigned to a file to establish the scale of a drawing—for example, 100 pixels equals 10 feet. As an illustrative example, images can be resized to dimensions such as 1024×1024, 512×512, or other dimensions that may be appropriate for the AI engine to function in a better way.

In various examples, the controller may be operative to scale up small images with interleaved average values with superimposed Gaussian noise as an example, or the controller may be operative to scale down large images with pixel removal. A desired result may be detectable by one or both the controller and a user. For example, a desired result may be a most efficient analysis, a highest quality analysis, a fastest analysis, a version suitable for transmission over an available bandwidth for processing, or other metric.

At step 103, training (and/or retraining) of the AI engine is performed. Training may include, for example, manual identification of patterns in a rasterized version of an image included in a design plan that correspond with architectural aspects, walls, fixtures, piping, duct work, wiring or other features that may be present in the two-dimensional reference. The training may also include one or more of: identification of relative positions and/or frequencies and sizes of identified patterns in a rasterized version of the image included in the design plan.

In some embodiments, and in a non-limiting sense, an AI engine used to analyze the design plan may be based on a deep learning artificial neural network framework. The AI engine image processing may extract different aspects of an image included in the design plan that is under analysis. At a high level, the processing may perform segmentation to define boundaries between important features. In engineering drawings defined boundaries may be based on the presence of architectural features, such as walls, doorways, windows, stairs, and the like.

In some embodiments, a structure of the artificial neural network may include multiple layers, such as input layers and hidden layers with designed interconnections with weighting factors. For learning optimization, the input architectural floor plan technical drawings may be used for artificial intelligence (AI) training to enhance the AI's ability to detect what is inside a boundary. A boundary is an area on a digital image that is defined by a user and tells the software what needs to be analyzed by the AI. Boundaries may also be automatically defined by a controller executing software during certain process steps, such as a user query. A boundary within the context of a design plan may signify the presence of a wall. Using deep artificial neural networks, original architectural floor plans (along with any labeled boundaries) may be used to train AI models to make predictions about what is inside a boundary. In exemplary embodiments, the AI model may be given over ~50,000 similar architectural floor plans to improve boundary-prediction capabilities.

In some embodiments, a training database may utilize a collection of design data that may include one or more of: a combination of a vector graphic two-dimensional references such as floor plans and associated raster graphic version of the two-dimensional references; raster graphic patterns associated with features; and a determination of boundaries may be automatically or manually derived. (An exemplary AI-processed two-dimensional reference that includes a design plan and/or a floorplan 210, with boundaries 211 predicted, is shown in FIG. 2B, based on the floorplan of FIG. 2A).

In still another aspect, in some embodiments, a controller may access data from various types of BIM and Computer Aided Drafting (CAD) design programs and import dimensional and shape aspects of select spaces or portions of the designs as they are related to a design plan.

At step 104, an AI engine may ascertain features included in the design plan, the AI engine may additionally ascertain that a feature is located within a particular set of boundaries or external to the set of boundaries. Features may include, by way of non-limiting example, one or more of: architectural aspects, fixtures, duct work, wiring, piping, or other items included in a two-dimensional reference submitted to be analyzed. The features and boundaries may be determined, for example, via algorithmically processing an input design plan image with a trained AI model. As a non-limiting example, the AI engine may process a raster file that is converted for output as an image file of a floorplan (as illustrated in FIG. 2B, a boundary is represented as a line, a boundary may also be represented as a polygon, which may be a patterned polygon or other user discernable representation, such as a colored line etc.). Features may also be designated on a user interface. A feature may be represented via an artifact, such as, for example, one or more of: a point, a polygon, an icon, or other shapes.

At step 105, a scale (e.g., FIG. 2B item 217) is associated with the two-dimensional reference. In preferred embodiments, the scale is based upon a portion of the two-dimensional reference dedicated for indicating a scale, such as a ruler of a specific length relative to features included in a technical drawing included in the two-dimensional reference. The software then performs a pixel count on the image and applies this scale to the bitmapped image. Alternatively, a user may input a drawing scale or dimension for a particular image, building component, a wall, a boundary, a drawing, or other two-dimensional reference. The drawing scale, may for example, be in inches: feet, centimeters: meters, or any other appropriate scale.

In some embodiments, a scale may be determined by manually measuring a room, a component, or other empirical basis for assessing a scale (including the ruler discussed above). Examples therefore include a scale included as a printed parameter on two-dimensional reference or derived via reference to one or more dimensioned features in the design plan. For example, if it is known that a particular wall is thirty feet in length, a scale may be based upon a length of the wall in a particular rendition of the two-dimensional reference (or design plan) and proportioned according to that length. The known length of the wall can be determined from the markings or text on the design plan or can be specified by a user as an input. A known length or width of any other building component can be determined or entered by the user. Based on such known length or width of one building component, the scale can be proportioned, and dimensions of other building components can be calculated.

At step 106, a controller is operative to generate an interactive user interface with dynamic components (design elements) that may be manipulated by one or both of user interaction and automated processes. Any or all of the components in a user interface may be converted to a version that allows a user to modify an attribute of the components, such as the length, size, beginning point, end point, thickness, or other attribute. In some embodiments, a boundary may be treated as a component or a wall and manipulated in a similar manner.

Other components included in the user interface may include, one or more of: AI engine predicted components, user training aspects, and AI training aspects. In some non-limiting examples of the present invention, a generative adversarial network may include a controller with an AI engine operative to generate a user interface that includes dynamic components. In some embodiments, a generative adversarial network may be trained based on a training database for initial AI feature recognition processes.

An interactive user interface may include one or more of: lines, arcs, or other geometric shapes and/or polygons. In some embodiments, the geometric shapes and/or polygons may comprise boundaries. The components may be dynamic in that they are further definable via user and/or machine manipulation. Components in the interactive user interface may be defined by one or more vertices. In general, a vertex is a data structure that can describe certain attributes, like the position of a point in a two-dimensional or three-dimensional space. It may also include other attributes, such as normal vectors, texture coordinates, colors, or other useful attributes.

At step 106A, in some embodiments, components presented in the interactive user interface may be analyzed by a user and refinements may be made to one or more components (e.g., size, shape and/or position of the component). In some embodiments, user modifications may also be input back to the AI engine to train the AI engine. User modifications provided back to the AI Engine may be referenced to make subsequent AI processes more accurate, efficient, fast, trained and/or enable additional types of AI processes.

At step 107, some embodiments may include a simplification or component refinement process that is performed by the controller. The component refinement process is functional to reduce a number of vertices generated by a transformation process executed via a controller generating the user interface and to further enhance an image included in the user interface. Improvements may include, by way of non-limiting example, one or more of: smooth an edge, define a start, or endpoint, associate a pattern of pixels with a predefined shape corresponding with a known component or otherwise modify a shape formed by a pattern of pixels.

In addition, some embodiments that utilize the recognition step transform features such as windows, doorways, vias and the like to other features and may remove them and/or replace them as elements-such as line segments, vectors, or polygons referenceable to other neighboring features. In a simplification step, one or more steps the AI performs (which may in some embodiments be referred to as an algorithm or a succession of algorithms) may make a determination that wall line segments, and other line segments represent a single element and then proceeds to merge them into a single element (line, vector, or polygon). In some embodiments, straight lines may be specified as a default for simplified elements, but it may also be possible to simplify collections of elements into other types of primitive or complex elements including polylines, polygons, arcs, circles, ellipses, splines, and non-uniform rational basis spline (NURBS) where a single feature object with definitional parameters may supplant a collection of lines and vertices.

The interaction of two elements at a vertex may define one or more new elements. For example, an intersection of two lines at a vertex may be assessed by the AI as an angle that is formed by this combination. As many construction plan drawings are rectilinear in nature, it may be that the simplification step inside a boundary can be considered a reduction in lines and vertices and replacing them with elements and/or polygons.

In another aspect, in some embodiments, one or both of a user and a controller may indicate a component type for a boundary. Component types may include, for example, one or more of line segments, polygons, multiple line segments, multiple polygons, and combinations of line segments and polygons.

At step 108, a controller (such as, by way of non-limiting example, a cloud server) operative as an AI engine may create AI-predicted dynamic boundaries that are arranged to form a representation of the submitted design plan that does not include the boundaries that bound it.

In various embodiments, a boundary may be used to define a unit, such as a residential unit, a commercial office unit, a common area unit, a manufacturing area, a recreational area, a dining area, or other areas delineated according to a permitted use.

Some embodiments include an interface that enables user modifications of boundaries and areas defined by the modified boundaries. For example, a boundary may be selected and "dragged" to a new location. The user interface may enable a user to select a line end, a polygon portion, an apex, or other convenient portion and move the selected portion to a new position and thereby redefine the line and/or polygon. An area that includes a boundary as a border will be redefined based upon the modification to the boundary. As such, an area of a room or unit may be redefined by a user via the user interface. Changing an area of a room and/or unit may in turn be used as a basis for modifying an occupant load, defining an egress path, classifying a space, or other purposes.

For example, a change in a boundary may make an area larger. The larger area may be a basis for an increase in occupancy load. The larger area may also result in a longer path from the furthest point in the defined area to a point of egress (e.g., if a user chooses to use a worst case in determining an egress route). Empowering users with flexibility, the present invention allows for modifications to room boundaries, lines, and polygons, enabling the alteration of shapes and sizes to adhere to best practices with automated revision suggestions to design plans. This dynamic feature not only facilitates compliance with regulatory standards but also caters to user preferences or priorities, allowing them to retain the opulence and aesthetic appeal of their spaces. Whether it is aligning with specific best practice requirements or enhancing the overall user experience by accommodating individual tastes, the present invention offers a harmonious blend of functionality and personalization. Users can effortlessly tailor their rooms to meet both regulatory guidelines and their own vision, striking a balance between compliance and the creation of spaces that truly reflect their unique style and preferences.

At step 109, the system associates metadata with dynamic components within the digital representation of the constructed physical building. The metadata may include information related to the installation details, material specifications, brand, warranty details, component lifespan, maintenance schedules, real-time sensor data, historical repair logs, environmental exposure conditions, and compliance with industry regulations. The association of metadata with dynamic components enables AI-driven decision-making for predictive maintenance planning and facilitates real-time monitoring of building conditions. The metadata may be obtained from various sources, including construction records, manufacturer specifications, historical maintenance logs, facility management systems, a component database, and real-time IoT sensor feeds from a BMS. The metadata may be structured in a relational database that allows cross-referencing between different components, so that each dynamic component is linked to its operational history and predicted performance trends.

The metadata associated with each component serves as a dynamic reference for evaluating maintenance requirements and predicting potential failures. The metadata may include component-specific details such as the manufacturer's recommended maintenance intervals, known failure modes, and compatibility with replacement parts. The metadata may also be updated dynamically based on sensor readings, allowing the system to adjust maintenance recommendations in response to changing building conditions. In one embodiment, the system retrieves real-time energy consumption metrics for electrical components, allowing AI algorithms to detect efficiency loss and schedule preemptive maintenance before performance degradation leads to operational failures. The metadata may also incorporate environmental conditions such as temperature fluctuations, humidity levels, and exposure to chemicals, allowing the AI engine to correlate external influences with component wear patterns.

In some embodiments, metadata may be used to automate warranty tracking and component lifecycle management. The system cross-references component metadata with warranty expiration dates, allowing facility managers to identify repairable components that are still under warranty coverage. When a component approaches the end of its lifespan, the system may generate recommendations for replacement, considering cost efficiency, compatibility with other building systems, and long-term performance benefits. The metadata may also integrate with procurement databases, allowing automated generation of purchase orders for replacement parts. The integration of metadata with dynamic components enables the system to function as a centralized knowledge base for managing building maintenance, reducing reliance on manual inspections, and improving decision-making through AI-driven insights.

At step 110, the system integrates with a Building Management System (BMS 110) to retrieve real-time operational data from various building systems. The BMS continuously monitors and controls mechanical, electrical, and plumbing (MEP) systems within the building, providing data on energy consumption, HVAC performance, plumbing efficiency, security operations, and lighting controls. The integration of the BMS enables AI-based analysis of real-time building conditions, allowing predictive maintenance models to incorporate live operational data rather than relying solely on historical records. The BMS serves as an automated control layer that regulates building systems based on predefined settings, user inputs, and sensor-based triggers. The integration between the maintenance system and the BMS allows real-time synchronization between detected maintenance needs and operational control mechanisms.

The BMS integration enables continuous monitoring of component conditions, allowing the system to detect anomalies indicative of wear and degradation. In an embodiment, the system retrieves live sensor readings from connected components, analyzing fluctuations in temperature, airflow, electrical load, and fluid pressure to detect abnormal conditions that indicate potential failures. The system may monitor HVAC compressor efficiency, identifying patterns of reduced performance that suggest component wear or refrigerant leakage. Similarly, the system may track water consumption patterns within plumbing networks, detecting leaks or pressure drops that indicate pipe deterioration. By leveraging real-time BMS data, the system enhances its predictive maintenance capabilities, reducing the likelihood of unexpected failures and improving operational efficiency.

In some embodiments, the BMS integration enables automated adjustments to system settings based on detected maintenance needs. If the system detects excessive power consumption from a specific lighting circuit, it may automatically adjust brightness levels or activate energy-saving modes to mitigate further degradation. If an HVAC system exhibits airflow inconsistencies, the system may temporarily adjust ventilation settings to compensate for the issue while scheduling maintenance. The AI engine continuously evaluates operational data from the BMS, refining maintenance schedules based on real-world performance trends rather than static manufacturer recommendations. The integration of the BMS facilitates that maintenance activities are aligned with building usage patterns, reducing unnecessary interventions and optimizing resource allocation.

At step 111, the system applies AI-based predictive maintenance analysis to detect potential component failures before they occur. The AI engine processes metadata from step 109 in conjunction with real-time operational data from step 110, identifying degradation trends across building components. The predictive analysis relies on machine learning models trained on historical maintenance data, allowing the system to recognize common failure patterns. The AI engine evaluates each dynamic component's probability of failure within a predefined time window, generating maintenance forecasts that rank components based on urgency. The system uses statistical models and deep learning techniques to refine predictions, continuously adjusting maintenance priorities as new data becomes available. The predictive maintenance analysis enables proactive decision-making, reducing reliance on reactive repairs and minimizing operational disruptions.

The AI engine dynamically adjusts its predictive models based on new data inputs, improving accuracy over time. The system continuously refines its predictions by incorporating updated sensor readings, external environmental conditions, and user-confirmed maintenance outcomes. The AI model employs adaptive learning techniques, allowing it to improve its reliability with each maintenance cycle. The system may classify maintenance predictions into different priority levels, distinguishing between minor performance fluctuations and high-risk failure conditions. In one embodiment, the AI engine identifies vibration anomalies in rotating machinery, predicting mechanical wear before failure occurs. In another embodiment, the system correlates temperature variations in electrical circuits with historical overheating incidents, recommending preventive inspections before potential fire hazards develop.

At step 112, the system generates maintenance recommendations and alerts based on the predictive analysis performed in step 111. The alerts provide facility personnel with actionable insights regarding maintenance priorities, resource requirements, and scheduling constraints. The system categorizes alerts based on severity, distinguishing between urgent repairs, scheduled maintenance, and long-term component degradation trends. Maintenance recommendations specify the required replacement parts, estimated labor hours, and projected downtime associated with each intervention. The AI engine evaluates cost factors associated with each maintenance task, allowing the system to generate alternative strategies that optimize cost efficiency while maintaining operational reliability.

Users can configure alert thresholds to adjust the sensitivity of AI-based anomaly detection. Facility managers may define custom parameters for generating alerts, balancing responsiveness with operational constraints. The system supports integration with third-party notification platforms, allowing alerts to be delivered via email, SMS, or mobile app notifications. In an embodiment, the system integrates with facility management dashboards, providing a centralized interface where users can review maintenance recommendations and approve interventions. The AI engine continuously refines its alert generation criteria, reducing false positives and improving the relevance of maintenance recommendations.

At step 113, the system updates the design plan with maintenance and BMS 110 data, so that digital representations of the building remain accurate. The updated design plan reflects component replacements, repaired fixtures, and newly installed systems, maintaining a real-time digital twin of the constructed environment. The system logs maintenance activities within the metadata repository, allowing future AI models to reference past interventions for improved predictive accuracy. The updated design plan enables users to track maintenance history at a granular level, facilitating long-term planning for facility management.

The system enables automated compliance tracking, verifying that maintenance actions align with regulatory requirements. The updated design plan may include compliance records, so that facility managers can demonstrate adherence to safety and operational guidelines. The system generates audit reports summarizing completed maintenance tasks, allowing organizations to maintain regulatory documentation for inspections. The AI engine cross-references compliance data with maintenance history, identifying instances where additional corrective actions may be required to achieve regulatory standards.

The updated design plan serves as an interactive interface for future modifications and enhancements. Facility managers can use the digital twin to simulate renovation scenarios, assessing the impact of upgrades on overall building efficiency. The system generates predictive maintenance roadmaps, displaying projected component lifespans and estimated repair costs over extended time horizons. By maintaining an accurate, AI-driven representation of the building's operational history, the system improves facility-wide decision-making and enhances the long-term sustainability of building infrastructure.

In some embodiments of the present invention, the AI engine is responsible for managing and enforcing associated rules pertaining to the movement or alteration of design elements that have associated annotations. The system is configured to recognize user roles and privileges, so that only those users with the appropriate permissions can make changes, move, or alter design elements or their associated annotations. If a user without the required rights attempts such actions, the AI engine intervenes, restricting these unauthorized modifications. This enforcement of rules maintains the integrity of the design plan and facilitates compliance with collaborative protocols. It also protects the annotations' continuity and relevance, as any changes to design elements are reflected in real-time, preserving the accuracy and context of the collaborative effort.

In some embodiments of the present invention, the AI engine may include a learning mechanism that constantly evaluates past annotations in relation to similar design elements. This historical analysis allows the AI engine to identify patterns and preferences in the annotation behaviors of users. Consequently, when a specific design element is selected for annotation, the AI engine may proactively suggest potential annotations, drawing from its repository of learned data. These automated annotation suggestions aim to streamline the annotation process by anticipating user needs and promoting consistency across the design plan. This feature not only saves time but also enhances the overall quality of the annotations by leveraging the collective intelligence gathered from previous interactions within the platform.

Figure 1B:
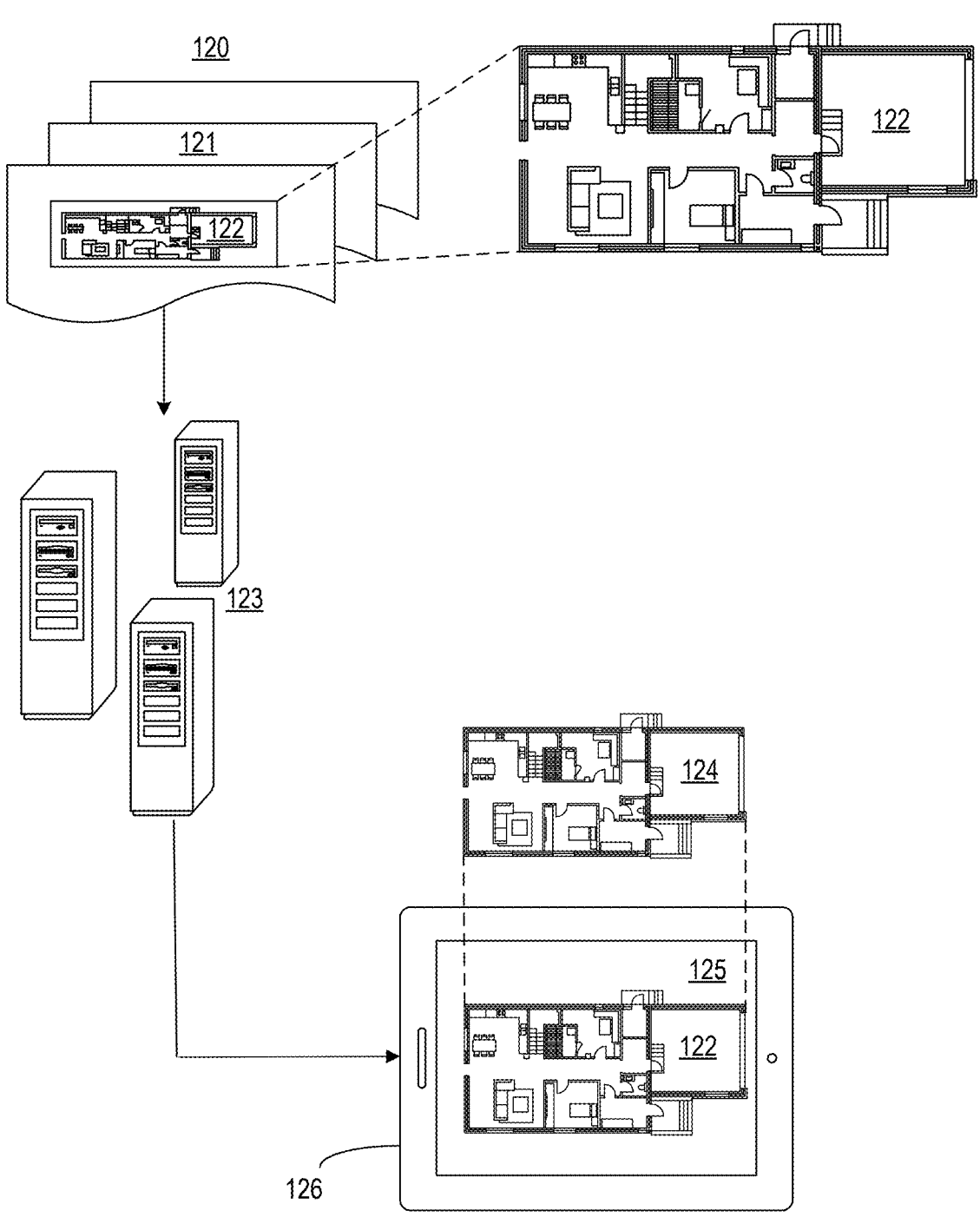
FIG. 1B illustrates a high-level diagram of components included in a system that uses AI to generate an interactive user interface.

Referring now to FIG. 1B, a high-level diagram illustrates components included in a system 120 that uses AI to generate an interactive and collaborative user interface 125 and programmable apparatus (controller) 123 operative to execute method steps useful in one or both of: adding annotations to design elements within a static representation of a design plan, and managing alterations to these design elements while automatically adjusting the associated annotations and rules in real-time. This process may involve identifying design elements that may benefit from additional information or clarification, prompting users to add relevant annotations. Furthermore, when design elements are moved or altered, the AI engine facilitates that all related annotations are dynamically updated, altered or kept intact to reflect these changes, maintaining the accuracy, association, and relevance of the annotations. Simultaneously, the system may enforce automated, predefined, or user-defined rules regarding who can make alterations to those design elements and/or associated annotations, based on user roles and permissions, thereby preserving the integrity of the design plan, and facilitating a collaborative yet controlled design environment.

According to some embodiments of the present invention, a two-dimensional reference 121, such as a design plan, floorplan, blueprint, or other document includes a pictorial representation 122 of at least a portion of a physical building. The pictorial representation 122 may include, for example, a portable document format (PDF) document, jpeg, PNG, or other important non-dynamic file format, or a hardcopy document. The pictorial representation 122 includes an image descriptive of architectural aspects of the building, such as, by way of non-limiting example, one or more of: walls, doors, doorways, hallways, rooms, residential units, office units, bathrooms, stairs, stairwells, windows, fixtures, real estate accouterments, and the like.

The two-dimensional reference 121 may be electronically provided to a controller 123 running an AI engine and a GAN engine. The controller 123 may include, for example, one or more of: a cloud server, an onsite server, a network server, or other computing device, capable of running executable software and thereby activating the AI engine. Presentation of the two-dimensional reference may include, for example, scanning a hardcopy version of the two-dimensional document into electronic format and transmitting the electronic format to the controller 123 running the AI engine.

According to the present invention, the AI engine may use raw data, manipulated data, interpreted data, new data and data types generated from existing data. Data may include one or more of: text, image, numerical, pixel patterns, polygons, vectors, molecular, neural, digital, and analog data modalities.

Data sources may include, one or more of: a user portal; Internet accessible resources; shipping data, fuel use tracking; manufacturer data; product data sheet; geolocation device, or other receptacle or generator of data related to material used in a building or other construction project.

AI engine processing may include one more of: converting image data to pixel patterns and/or polygon patterns, manipulating pixel patterns and/or polygon patterns, analyzing pixel patterns and/or polygon patterns, optical character recognition, alphanumeric analysis, symbol recognition and the like. Proposed action strategies, protocols and opportunities may be associated with an ascertained state.

The present invention provides for the deployment of computational frameworks combining disparate aspects of technology to perform tasks that are beyond the ability of traditional design and build systems or human intelligence. These systems aggregate large volumes of disparate data that may or may not be intuitively linked to building design, carbon footprint, eco-friendliness, compliance codes, supply chain availability, anticipated ambient climate conditions, measured ambient climate conditions, building activities, or other data source, and utilize multiple modalities data manipulation, algorithms, and statistical models to generate proposed action strategies for a patient (or group of similarly situated patients). Modalities of data manipulation may include, but are not limited to:

Machine Learning (ML): A subset of AI where systems learn from data. Instead of being explicitly programmed, they adjust their operations to optimize for a certain outcome based on the input they receive.

Deep Learning: A subfield of ML using neural networks with many layers (hence "deep") to analyze various factors of data, such as, for example, convolutional neural networks (CNNs) used in image recognition. For example, convolutional neural networks may receive as input image data from scans of various types and generate pixel patterns representative of the scans. The pixel patterns may be compared to a library of other pixel patterns and/or manipulated to emulate progression of a disease state and/or a treatment protocol over time.

Natural Language Processing (NLP): Allows systems to understand, interpret, and generate human language. NLP may provide interpretations of voice data. Voice data may be made accessible, for example, via recording made during design plan review and assessment and/or during supply chain activities.

Robotics: Robots may operate using AI principles, enabling the robots to perform tasks in accurate, specific, and consistent ways. Robots may also be utilized during data collection, such as during building scans (e.g., 3D image acquisition scans), as built measurement acquisition, infrared heat image acquisition and the like.

Knowledge Representation: The methods and apparatus taught herein may receive data in a native or enhanced state and manipulate and transform the received data into a machine learning understandable form.

Reasoning: The methods and apparatus taught herein may solve deploy logical deduction via expert systems and the like to facilitate decision-making.

Perception: The methods and apparatus taught herein may use algorithms and complex relational processes that allow machines to interpret disparate data sets, including image data, sound data, and alphanumeric data.

Apparatus and methods may be arranged to form one or more of: Neural Networks; Genetic Algorithms; Expert Systems; and Reinforcement Learning.

In some embodiments, GPUs may be used to accomplish large-scale machine-learning models using parallel processing capabilities. Hardware accelerators may be utilized for deep learning tasks. In some embodiments, tensor processing units and/or neuromorphic computing mechanisms may be used to analyze data sets. Cloud platforms may be used with AI processes, such as deep learning that require significant computational resources.

Electronic and/or electromechanical apparatus may provide data to be processed using the methods and apparatus presented herein. Apparatus may include, by way of a non-limiting example, one or more of: three-dimensional (3D) image scans, heat imaging acquisition, design plan scanners, building monitoring electronic sensors, drone-based electronic scans, satellite-based data acquisition or other means of acquiring data that may be transformed into digital and/or analog data sets.

Some AI Engine generated treatment strategies may include suggested courses of action that may be weighted based upon one or more of: projected effectiveness; timing, geographic location, and a material's ability to be transported; cost; and project criticality, including timeline relative to other actions and/or tasks that must be completed, such as for example, a sequence of construction or maintenance steps, inspections, and financing requirements.

The controller is operative to generate a collaborative user interface 125 on a user computing device 126. The user computing device may include a smart device, workstation, tablet, laptop or other user equipment with a processor, storage, and display.

The user interface 125 includes a reproduction of the pictorial representation 122 and an overlay 124 with one or more user-manipulatable components, such as, by way of non-limiting examples: boundaries, line segments, polygons, images, icons, points, and the like. The line segments may have calculated lengths that may be mathematically manipulated and/or summarized. Aspects such as polygons, line segments, shapes, icons, and points may be counted, added, subtracted, extrapolated, and have other functions performed on them.

In addition, renditions of the user interface 125 may be created and saved, and/or communicated to other users, or controllers, compared to subsequent interface renditions, archived and/or submitted to additional AI analysis.

In some embodiments, a first user interface 125 rendition may be modified by a user to create a second user interface 125 and submitted to AI analysis to perform tasks including assisting users in adding better annotations to a selected design element. This assistance is based on the AI's analysis of the selected design element and a historical review of similar annotations associated with such design elements. The AI engine continuously learns from the ways users add annotations to different types of design elements, enabling it to suggest the most relevant and useful annotations for any given element. This learning process allows the AI engine to provide tailored suggestions that improve over time, reflecting the collective experience and insights of the user community on the collaborative platform of the present invention. By leveraging past annotation patterns, the AI facilitates a more intuitive and efficient annotation process, enhancing the collaborative design effort.

In the context of the present invention, design elements may also refer to the various components that contribute to the overall layout, functionality, and aesthetic appeal of a building or space. These elements include, but are not limited to, rooms, walls, doors, windows, staircases, partitions, fixtures, furniture, and finishes. Rooms may be designated for specific functions, such as living rooms, bedrooms, kitchens, or bathrooms, with their size and shape tailored to the intended use. Walls define the boundaries of spaces and may serve structural, aesthetic, or privacy functions, while partitions provide flexible divisions within open areas. Doors and windows are important for access, ventilation, natural light, and aesthetics, with their placement affecting the flow and usability of a space. Fixtures, such as sinks, toilets, lighting, and built-in cabinetry, are important for the functionality of spaces like bathrooms and kitchens. Furniture placement, including beds, desks, sofas, and dining tables, defines how a space will be used, enhancing comfort and practicality. Additionally, design elements may include aesthetic features such as color schemes, textures, flooring materials, and decorative finishes, which contribute to the visual and tactile experience within a space. These elements are also configured to comply with spatial and functional requirements, user preferences, and environmental factors such as lighting, acoustics, and air circulation, all of which are considered in the design plan generated by the system.

Figure 1C:
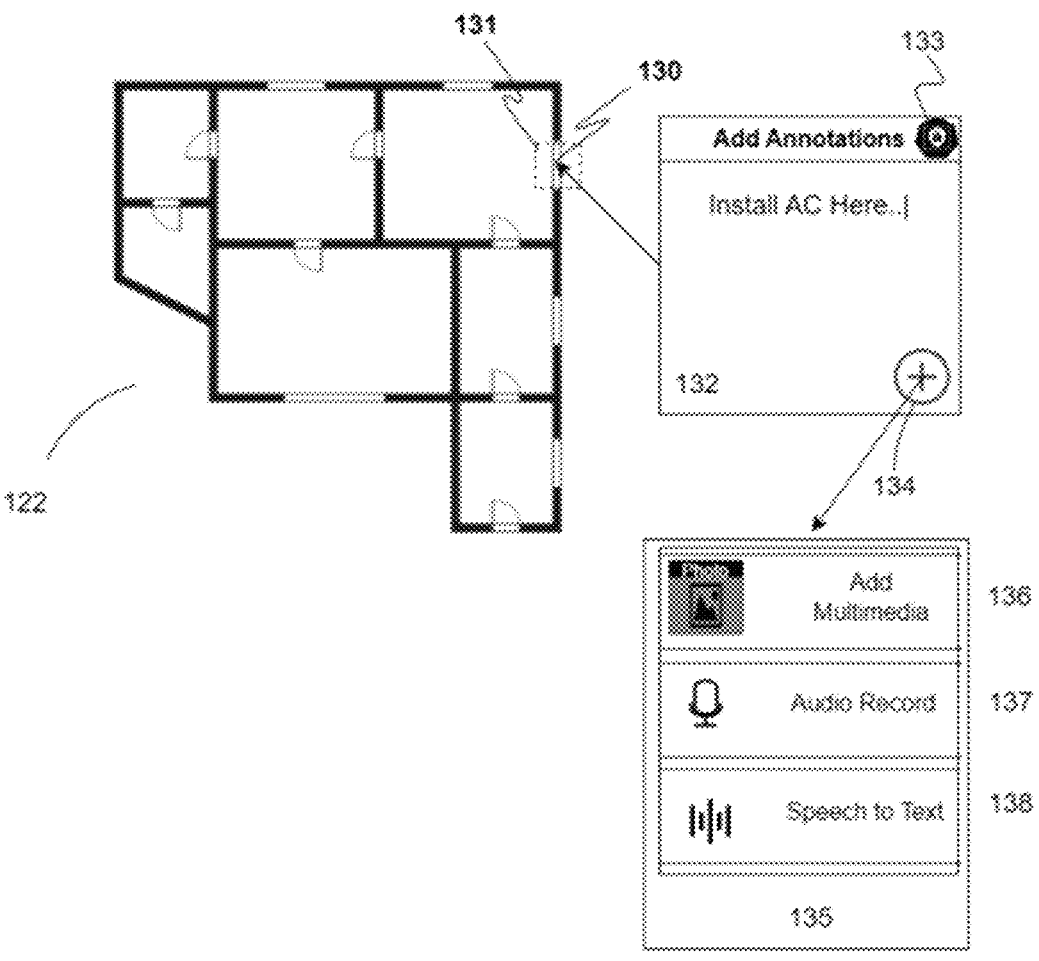
FIG. 1C illustrates an exemplary method for annotating or adding metadata to a design element on the design plan in the collaborative environment of the present invention.

Referring now to FIG. 1C, the illustration showcases an exemplary aspect of the present invention's collaborative environment, demonstrating how a user may annotate (e.g., manually add metadata) a design element on a design plan. In this exemplary embodiment, the user interface 125 displays a static pictorial representation 122 of a design plan, containing various dynamic design elements such as lines, polygons, rooms, walls, and boundaries. A user may initiate the annotation process by selecting 131 a design element 130 on the design plan 122, which can be done by marking on or around the desired design element 130 or by simply double-clicking on the design element 130.

Upon selection, a pop-up window 132 appears, providing a space where the user can type in text annotations that will be linked with the chosen design element 130. Alongside the text entry field, the pop-up window 132 may also include an additional options button 134. This button 134, when selected, unveils a suite of annotation tools 135, offering a range of methods to enrich the annotations.

For example, the user can choose to attach multimedia content 136, like photos or video clips, which may serve as a visual supplement to the textual annotations for the selected design element 130. If the user wishes to add an audio note, they can do so using the audio record function 137, capturing their verbal instructions or comments directly via a microphone. Moreover, the user also has the convenience of using a speech-to-text feature 138, where spoken words are transcribed into written text annotations. This functionality simplifies the process of adding detailed descriptions or instructions, as the user's voice is automatically converted to text and associated with the selected design element 130 as an annotation.

In some embodiments of the present invention, the interactive user interface may be engineered to offer an intuitive mechanism for annotating within a shared design plan. When a user selects a design element, such as a polygon, a line, a room or a wall, the system may respond by presenting a context-sensitive annotation interface. This interface is contextually programmed to suggest annotation tools and options relevant to the type of design element selected. For example, upon selecting an area where an air conditioning unit is to be installed, the interface may prioritize or suggest multimedia annotations that provide visual cues or installation guidelines.

Referring now to FIG. 1D, the diagram illustrates an exemplary feature of the present invention's interface, specifically designed to aid users in the annotation process. The figure displays a user actively engaging with an annotation pop-up window 132 for a selected design element within the collaborative platform. As the user begins to type, for example, "Install AC Here," the system's AI engine intervenes with automated annotation suggestions as shown in an automated annotation suggestions window 150.

These suggestions, shown in the automated annotation suggestions window 150, are generated based on a variety of factors, including the current context of the design element, the user's typing activity, and historical data collected from past user interactions with similar design elements. The exemplary annotation suggestions may include but are not limited to: "Install AC Here but size must not exceed . . . ", "Prefer window here . . . ", or other recommendations like "Drawing room-install TV here . . . ". Each suggestion aims to prompt the user with common annotations or considerations that align with the selected design element's purpose and location.

Additionally, the interface may also facilitate inclusion of multimedia annotations, as evidenced by the "Add this image . . . " option accompanied by a photo icon for a recommended photo extracted from an annotation database to be associated with the annotation. This interactive feature suggests that users can enrich their annotations with visual aids directly related to the selected design element, which may include images or diagrams relevant to the installation or positioning instructions (i.e., annotations) being entered.

This automated annotation suggestions feature is facilitated by the system's dynamic response to user input, effectively marrying the AI's predictive capabilities with the user's manual annotations. It enhances user experience by minimizing repetitive typing, guiding users through a library of common annotations, and providing quick-access options for multimedia attachments. This intelligent assistance is indicative of the platform's design to expedite the annotation process, reduce potential errors, and facilitate consistency in documentation throughout the collaborative design environment.

In some embodiments of the present invention, the system's AI engine utilizes an extensive annotation database to provide automated annotation suggestions that may also include a multimedia library. When a user initiates an annotation-adding process for a selected design element, the AI engine queries this library to retrieve and suggest one or more images (or maybe video clips) that are relevant to the design element in question. This library comprises a collection of images and video clips previously used in annotations, which have been tagged and indexed according to the design elements they correspond to.

Furthermore, the AI is capable of generating automated images and video clips based on its historical analysis of similar past annotations. It uses learned patterns and user behavior to predict and present the most pertinent visual aids that could enhance the current annotation. This predictive ability is grounded in the AI's continuous learning process, where it assimilates information from each annotation interaction, gradually refining the relevance and precision of its image suggestions.

Such an embodiment streamlines the annotation process by providing users with quick access to a curated set of images and video clips, reducing the need for manual searches, and facilitating a high level of consistency and detail in the annotations associated with specific design elements. Whether the user is specifying installation details, highlighting design features, or indicating modifications, the AI engine's integration with a multimedia library enriches the collaborative experience and aids in the conveyance of clear, concise, and visually supported information.

By way of non-limiting examples, according to the present invention, a design plan may be received as a static image two-dimensional reference. The design plan may be described using lines and arcs, and represent architectural layouts in a simplified geometrical way. In such a representation, architectural elements, such as, by way of non-limiting examples: walls, doors, windows, and architectural details, may be shown using straight lines (for linear elements) and arcs (for curved elements). A floorplan interpreted in terms of lines and arcs and/or patterns of pixels may include one or more of:

Exterior Walls: typically represented by thick lines. The thickness of a line may indicate the wall's thickness.

Interior Walls: which may be shown as slightly thinner lines compared to exterior walls, representing partitions or dividers within a space or other interior area.

Hinged Doors: a straight line representing a door's location and an arc showing the door's swing direction and extent.

Sliding Doors: two parallel lines (representing door panels) may include an arrow or dashed line indicating a sliding direction.

Double Doors: two straight lines representing door panels with arcs indicating each door's swing direction.

Which may, for example, be represented as thin lines or breaks in walls, sometimes with a zigzag line to indicate a window's presence or with a double line indicating a double-pane window.

Straight Stairs: a series of parallel lines showing steps. Often, an arrow may be used to indicate the upward direction.

Spiral Stairs: may be represented using concentric arcs or circles, showing the curvature of the stairwell.

Cabinets, Countertops, Islands: straight lines and arcs may represent a shape and placement of cabinets, countertops, and islands.

Sinks, bathtubs: may typically be represented using a combination of lines and arcs to depict their shapes.

Rounded Corners: instead of sharp, angular intersections between walls, arcs are used to show the curve.

Circular Rooms or Features: may be represented using full circles or arcs.

Electrical: may be shown with dotted lines or specific symbols indicating outlets, switches, and fixtures.

Plumbing: may be represented via dotted or dashed lines to represent hidden plumbing within walls or under floors.

When interpreting or representing a floorplan using lines and arcs, conventions used in architectural drawings may be referenced. In some embodiments, a legend or key that describes what each line, arc, or symbol means, may facilitate clarity in understanding the design.

FIG. 1E shows a settings window 140 that emerges when a user engages with the settings option 133 on the annotations pop-up window 132. This settings window 140 serves as a control panel for managing the collaborative and interactive features of the platform tailored to user annotations and design elements.

The "Set Rules" function 141 enables users to establish comprehensive guidelines for managing interactions with the design plan. Users can define protocols for editing, altering, deleting, or relocating both design elements and their associated annotations within the collaborative platform. Serving as a robust governance mechanism, this function facilitates that any modifications to the design plan or its components are consistent with predefined conditions. These conditions may be customized to meet the unique demands of a specific project, cater to individual user preferences, align with organizational policies, or comply with applicable best practices and regulations. Furthermore, the "Set Rules" function 141 is designed to be flexible, allowing for an automated or manual adjustment of rules as the project evolves or as new information becomes available to the AI engine, facilitating ongoing relevance and adherence to the latest standards and practices.

In some embodiments of the present invention, the settings window may be a nexus of innovative controls that adapt to the intricate dynamics of the collaborative design environment. The "Set Rules" function 141 may be engineered with an algorithm that can predict and propose rule sets based on the project type, historical data, and individual user performance, thus preempting the need for manual input, and offering a starting point for rule customization. The "Set Rules" function 141 may allow users to construct a detailed matrix of permissions, specifying who can make edits, how elements may be adjusted, and under what circumstances annotations can be moved or deleted. This rule-setting may go beyond general restrictions, offering granular control, such as time-bound editing rights or element-specific permissions that facilitate changes made responsibly and in accordance with the project's lifecycle or phase-specific requirements.

With the "Share with" function 142, users can distribute the annotations and design elements to selected team members or stakeholders. Beyond standard methods like email, the system may incorporate features such as direct in-platform tagging, integration with project management tools for task assignments, or even using unique identifiers like QR codes that, when scanned, grant access to specific annotations or design elements. In some embodiments of the present invention, the "Share with" function 142 may employ machine learning algorithms to suggest potential team members for collaboration based on their past contributions, expertise, and current availability, going beyond manual tagging and email sharing. This feature may integrate with organizational calendars and resource planning tools to automatically suggest the best times and team members for collaborative sessions within the platform.

The "Share with" function 142 may extend collaboration by integrating with advanced user identification systems, enabling sharing through biometric recognitions, such as fingerprint or retina scans, for high-security projects. It may also incorporate smart notifications that alert users when a relevant component is shared with them, streamlining the review and feedback process.

The "Roles" setting 143 is designed to define and assign specific permissions to different users or team members. This feature not only controls who can change or approve annotations but also can extend to defining hierarchies of approval, enabling tiered levels of access where senior designers or project managers may have override capabilities or exclusive editing rights. In some embodiments of the present invention, for "Roles" setting 143, the system may dynamically suggest role changes for users by analyzing their interaction patterns with the platform. For example, if a user frequently adds substantial contributions to a particular design element, the system may suggest elevating their role for that element or similar elements, streamlining the workflow and empowering effective contributors.

Lastly, the "AI Suggestions" option 144 may provide users with the ability to influence the AI engine's learning path, particularly concerning the relevance of automated annotation suggestions. Users can give feedback on the AI's suggestions to enhance its future performance. For example, a senior architect may train the AI to recognize and suggest energy efficiency tips for certain design elements, or an engineer may focus the AI's learning on structural integrity notes. Additionally, depending on their authority, users may influence the AI's learning on a personal level for individualized suggestions or on a collective level to improve the engine's utility for the entire team.

In some embodiments of the present invention, the "AI Suggestions" option 144 may include a feedback loop where the AI engine not only learns from the annotations made but also from the user's response to its suggestions, including ignored, accepted, or modified inputs. This allows the AI engine to refine its suggestion accuracy, not just in the context of the current project but across similar future projects. Additionally, the AI engine may offer versioning control suggestions, advising on the ideal moments to create new versions of the design plan, design element and annotations based on the volume and significance of recent annotations and changes.

Referring now to FIG. 1F, an exemplary process is illustrated wherein a user engages with the collaborative platform to relocate a design element 130 which carries an associated annotation 160. Upon moving the design element (e.g., when a physical counterpart of the design element is also moved) to a new position, now indicated as 130', the system's AI engine automatically relocates the associated annotation to 160' associated with the moved design element 130', maintaining the contextual link between the annotation and the design element.

In some embodiments, the AI engine is equipped to not only move the annotation (or metadata) but also to assess and implement slight adjustments to the annotation's content or presentation. These modifications may be based on factors such as the nature of the movement, the final placement of the design element, or the spatial relationship to other design elements and annotations. For example, if a window, originally on the north-facing wall, is moved to a south-facing wall, the annotation may be updated to reflect the change in sunlight exposure.

Additionally, the AI engine may provide visual cues to indicate that an element has been moved, such as highlighting the original and new locations or creating a trail from the original to the new position. In some other embodiments, the AI engine may suggest updates to related annotations based on the element's new location, such as recommending changes in material or dimensions that are more suited to the new position within the structure or building.

Furthermore, the system may track the movement history, allowing users to view and revert to previous positions if needed. This feature supports iterative design processes where relocation decisions are explored and evaluated in real time. It may also aid in maintaining a comprehensive audit trail that can be invaluable during the review stages or in post-project analyses.

Figure 1G:
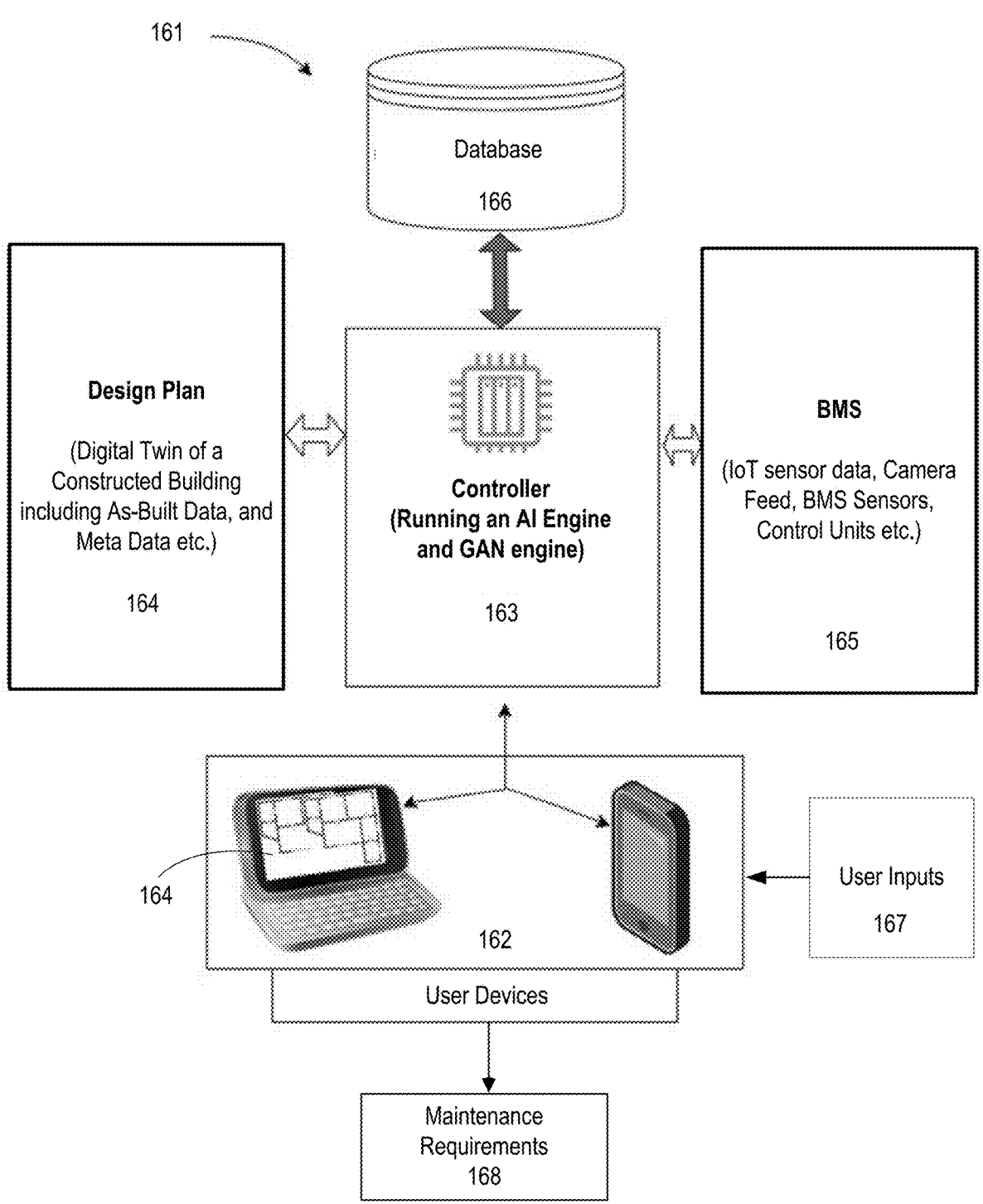
FIG. 1G illustrates an exemplary system for managing a design plan of a constructed building by integrating a controller with a Building Management System (BMS) in accordance with the present invention.

Referring now to FIG. 1G, an exemplary system 161 is illustrated for managing a design plan 164 of a constructed building by integrating a controller 163 with a Building Management System (BMS) 165 in accordance with the present invention. The system 161 comprises a controller 163, which may either be incorporated within user devices 162 or hosted on a cloud server. The controller 163 operates an AI engine and a GAN engine, enabling it to analyze the design plan 164, retrieve and process real-time data, and facilitate maintenance-based decision-making using information from multiple sources, including the BMS 165, the database 166, and user inputs 167.

The user device 162 provides an interactive interface for accessing and modifying the design plan 164. The user device 162 may be implemented as a tablet, smartphone, desktop computer, touchscreen panel, or AR/VR headset, allowing users to interact with the design plan 164 in different ways. In an embodiment where the user device 162 is an augmented reality (AR) or virtual reality (VR) device, the user may interact with the design plan 164 using gesture-based inputs, voice commands, or motion controllers. In an example scenario, a user wearing a VR headset may virtually explore the building's design plan 164, interactively select faulty components, and initiate maintenance procedures by performing specific hand gestures.

The controller 163 processes the design plan 164, which represents a digital twin of the constructed building, including as-built data and metadata. The controller 163 is designed to recognize dynamic components within the design plan 164 by retrieving corresponding metadata from the database 166 (may be referred to as a component database, a maintenance database, and a regulatory database). The database 166 serves as a repository containing pre-stored details of known items that may be present in a design plan 164, such as appliances, structural elements, plumbing fixtures, HVAC units, electrical wiring, fire safety systems, flooring materials, and security systems. When processing the design plan 164, the controller 163 automatically detects and categorizes these components while associating them with relevant metadata from the database 166.

The metadata stored in the database 166 may include one or more of the following details: component name, brand, model number, manufacturer specifications, performance ratings, warranty information, previous maintenance records, associated images, and pricing details. The controller 163 can retrieve this metadata and associate it with the respective dynamic components present in the design plan 164. In one example, when the controller 163 identifies an air conditioning unit within the design plan 164, it may determine the brand and model from the database 166 or the BMS 165. Once the brand and model are identified, additional metadata such as installation date, last serviced date, energy efficiency rating, and expected lifespan may also be associated with the AC unit within the design plan 164.

The database 166 may also be configured to store construction constraints, rules, and building codes, which may be referenced by the controller 163 to determine whether the design plan 164 complies with preferred building practices. The database 166 may reside locally on the user device 162 or be hosted on a cloud-based server, where it is continuously updated with new information. In an embodiment, the database 166 automatically synchronizes with external construction databases, so that it remains updated with the latest regulatory standards, component specifications, and industry guidelines.

The BMS 165 comprises an array of sensors, cameras, and control units that provide real-time data regarding the operational status of various building components. The BMS 165 continuously monitors elements such as HVAC efficiency, lighting conditions, security systems, fire alarms, water leakage sensors, and power consumption metrics. The BMS 165 transmits this real-time data to the controller 163, which then processes the information to detect potential maintenance issues and updates the design plan 164 accordingly. In one embodiment, if the BMS 165 detects that an HVAC unit is operating inefficiently due to a clogged air filter, the controller 163 reflects this issue on the design plan 164 by marking the affected HVAC system as requiring maintenance.

The controller 163 is capable of dynamically associating real-time data with components in the design plan 164. For example, if the BMS 165 reports a malfunctioning security camera, the controller 163 updates the design plan 164 to display the exact location of the faulty camera and suggests an appropriate maintenance action. Similarly, if water leakage sensors detect moisture buildup in a particular plumbing line, the controller 163 highlights the affected area within the design plan 164, allowing maintenance personnel to quickly identify and address the issue.

The metadata associated with each dynamic component in the design plan 164 is continuously updated based on real-time inputs. If the controller 163 encounters a new component that lacks pre-existing metadata, the system prompts the user to manually input relevant information using user inputs 167. The user inputs 167 allow the user to enter details such as installation date, manufacturer specifications, maintenance history, and expected lifespan. In an embodiment, the user may also attach supporting documents, such as warranty certificates, invoices, or product manuals, to enhance the metadata associated with a given component.

The user inputs 167 enable direct interaction with the design plan 164, allowing users to select, annotate, and modify dynamic components for various maintenance-related actions. A user may choose a specific HVAC unit, electrical circuit, or plumbing fixture and initiate maintenance or replacement procedures directly from the design plan 164. The user inputs 167 may also allow users to perform simulations, such as checking the impact of replacing an HVAC unit with a higher-efficiency model.

In addition to maintenance selection, the user inputs 167 may serve as control commands for physical building components. For example, a user may select a lighting fixture on the design plan 164 and toggle it on or off, thereby triggering the corresponding physical light through the BMS 165. Similarly, a smart thermostat may be adjusted within the design plan 164, allowing the user to modify temperature settings in the actual building environment.

The controller 163 also enables users to select one or more dynamic components or an entire portion of the design plan 164 to determine maintenance requirements 168. The controller 163 processes the selected area and provides a detailed maintenance execution plan, including required materials, estimated repair costs, labor requirements, and expected downtime. For example, if a user selects an entire floor's HVAC system for maintenance, the controller 163 may calculate replacement air filters, service time estimates, and workforce allocation required for completion.

The maintenance requirements 168 may include detailed information regarding identified issues within a component or part of the building, along with the corresponding maintenance actions needed to address them. The controller 163, upon detecting a malfunction, degradation, or inefficiency in a component through analysis of the design plan 164, database 166, or real-time data from the BMS 165, determines the nature of the issue and the specific steps required for maintenance. For example, if a plumbing fixture is detected to have a leakage, the maintenance requirements 168 may specify the exact location of the leak, the required replacement parts (e.g., pipes, washers, or sealants), and the estimated repair time. Similarly, if an HVAC unit is underperforming due to a clogged filter, the maintenance requirements 168 may indicate the need for a filter replacement, system cleaning, or refrigerant refill, along with associated costs and labor requirements. The maintenance requirements 168 may also provide scheduling recommendations, technician assignments, and estimated downtime for executing the repairs. Additionally, for components that frequently require maintenance, the system may suggest preventive measures, upgrades, or complete replacements to enhance operational efficiency and reduce recurring issues. The identified requirements may be presented in an interactive format, allowing users to approve, modify, or prioritize maintenance tasks directly within the design plan 164 through user inputs 167.

The maintenance requirements 168 may further include inventory assessments, where the controller 163 cross-references available stock levels stored in the database 166. If required materials are in stock, the system proceeds with maintenance execution. If materials are unavailable, the controller 163 generates procurement recommendations, listing vendor options and price comparisons.

By integrating the design plan 164, BMS 165, database 166, user inputs 167, and maintenance requirements 168, the controller 163 facilitates a real-time, automated maintenance workflow. Users can interact with a live digital twin of the physical building, assess maintenance needs, and initiate corrective actions without requiring physical inspections.

The system enables efficient decision-making through AI-powered analysis, predictive maintenance, and real-time data synchronization, optimizing building management operations.

In some embodiments, the database 166 may serve as a repository containing information about various components and items that may be present in a building or represented within a design plan 164. The database 166 may store details about multiple types of doors, lighting fixtures, bulbs, cameras, appliances, plumbing fixtures, piping networks, electrical wiring, circuit components, HVAC systems, security systems, flooring materials, windows, structural elements, and other dynamic components commonly found in a building. When the controller 163 processes the design plan 164, it analyzes and identifies these components, retrieving relevant information from the database 166 and associating it with each respective component in the design plan 164.

The information retrieved from the database 166 may include component name, manufacturer details, model number, specifications, material composition, installation date, expected lifespan, maintenance history, power consumption, compliance data, warranty information, and pricing details. For example, when the controller 163 detects an air conditioning unit within the design plan 164, it may extract metadata from the database 166, associating details such as brand, cooling capacity, energy efficiency rating, last maintenance date, and recommended servicing schedule with the corresponding AC unit in the design plan 164. Similarly, if a lighting system is identified, the controller 163 may retrieve associated details like wattage, LED lifespan, smart control compatibility, and replacement part availability.

The database 166 may be stored locally within the user device 162, allowing quick retrieval and processing, or it may be hosted on a cloud-based system, enabling real-time updates and access to an extensive repository of component details. If a new or unidentified component is present in the design plan 164, the controller 163 may allow manual entry of metadata through user inputs 167, adding the new component's information to the database 166 for future reference. Additionally, the controller 163 may be capable of dynamically updating the database 166 by syncing with external sources such as construction databases, manufacturer records, or facility management platforms.

The BMS 165 is responsible for monitoring and managing various operational aspects of a constructed building. The BMS 165 may be linked to multiple sensors, cameras, control units, and IoT devices, continuously collecting and analyzing data related to environmental conditions, system performance, security, and energy efficiency. The BMS 165 provides real-time insights into the operational state of various building components and transmits this data to the controller 163, which then reflects the information on the design plan 164.

The BMS 165 may determine multiple conditions affecting building components, including temperature fluctuations, humidity levels, HVAC efficiency, energy consumption trends, water leakage detection, fire alarm status, lighting conditions, door and window lock status, security system functionality, and structural integrity monitoring. For example, if the BMS 165 detects an issue such as an HVAC unit consuming excessive energy, it transmits this information to the controller 163, which updates the design plan 164 by highlighting the affected HVAC unit, indicating a possible malfunction or need for maintenance.

Similarly, if water leakage sensors connected to the BMS 165 identify moisture buildup or a potential pipe leak, the controller 163 updates the design plan 164, marking the exact location of the affected plumbing fixture and providing relevant details from the database 166, such as pipe material, installation date, previous maintenance logs, and replacement part availability. The system may also generate alerts or maintenance recommendations based on the severity of the issue.

In an embodiment, security cameras and motion sensors linked to the BMS 165 detect abnormal activity within a specific zone of the building. The controller 163 updates the design plan 164 to reflect the camera's status, field of view, and detected anomalies, allowing building managers to assess security risks in real time. Similarly, if smoke detectors or fire alarms are triggered, the controller 163 marks the affected region within the design plan 164, providing emergency response teams with precise location details.

The BMS 165 also facilitates predictive maintenance by continuously monitoring equipment performance and comparing real-time data with historical records stored in the database 166. If an elevator motor shows signs of degradation based on vibration sensor readings, the controller 163 updates the design plan 164, indicating an upcoming maintenance requirement and linking related metadata, such as manufacturer service guidelines, repair history, and spare part details.

In some embodiments, the present invention provides an apparatus (162) for managing building maintenance using a digital representation of a physical building. The apparatus comprises a display screen configured to present an interactive user interface, a digital storage medium storing executable software code, and a controller operating one or both of an AI engine and a GAN engine. The controller may include a processor that executes the software code to perform automated maintenance management, leveraging AI-driven predictive analysis and real-time sensor data integration. The apparatus enables facility managers, building owners, and maintenance personnel to efficiently oversee building operations, detect maintenance issues, and execute planned repairs with minimal disruptions.

The controller receives a design plan of at least a portion of the physical building, wherein the design plan comprises dynamic components representing as-built building elements. These dynamic components may include structural elements, fixtures, appliances, and building systems such as HVAC, electrical, plumbing, and security systems. The digital representation serves as an interactive model that allows users to visually inspect and interact with different components of the building. The controller continuously updates the design plan with real-time data received from IoT sensors, cameras, and a connected BMS, so that the digital model accurately reflects the current state of the physical building.

Metadata may be associated with some or all of the dynamic components based on historical maintenance logs, real-time sensor data from the BMS (165), and a component database (166). The metadata may include installation date, warranty status, material specifications, operational history, maintenance schedules, failure probability, brand name, model number, and environmental factors such as humidity and temperature. The AI engine utilizes this metadata to assess each component's condition, predict maintenance needs, and provide early alerts for potential failures. For example, if the metadata indicates that a water heater is nearing the end of its expected lifespan, the system may proactively schedule an inspection before it malfunctions.

The apparatus detects maintenance requirements for at least one dynamic component or portion of the design plan based on sensor data from the BMS, historical failure patterns, associated metadata, and user-input data. The AI engine continuously monitors sensor readings to identify anomalies such as increased energy consumption in HVAC units, unusual moisture levels indicating a water leak, or excessive wear on mechanical components. By comparing these anomalies with historical failure trends, the system predicts potential malfunctions and prioritizes corrective actions before they escalate into major issues. If a plumbing fixture exhibits fluctuating pressure levels, for example, the AI engine may infer potential pipe blockages or leaks and recommend immediate maintenance.

The controller determines interrelations between dynamic components for assessing the impact of maintenance requirements on other building elements. This step may be particularly useful in preventing secondary damages or operational inefficiencies caused by interdependent systems. For example, if a structural beam requires reinforcement, the controller evaluates how this may affect adjacent walls, ceiling fixtures, and HVAC ductwork. Similarly, replacing a faulty electrical panel may necessitate adjustments in lighting, security systems, and power distribution. The AI engine maps dependencies between components and suggests optimized sequences for maintenance tasks to minimize disruptions and cost.

Once maintenance requirements and their interdependencies are identified, the controller assigns priority levels based on urgency, functional impact, cost considerations, and predicted failure risk. The priority levels determine which tasks should be completed first to prevent cascading failures. For example, an overheating electrical system that poses a fire hazard is ranked as a high-priority issue, whereas minor cosmetic damage such as chipped paint is assigned a lower priority. The prioritization process considers environmental conditions, such as extreme weather or seasonal demand fluctuations, to schedule maintenance at optimal times.

The controller generates a maintenance execution plan comprising task prioritization, labor allocation, material requirements, and estimated execution timelines. The execution plan details the steps required to address each maintenance task efficiently. It may include sourcing required materials, scheduling workforce deployment, and estimating completion times. The system also identifies cost-effective solutions by comparing available inventory with required materials, reducing procurement expenses. If a specific component is unavailable in stock, the controller retrieves vendor recommendations based on location, pricing, and service ratings to streamline purchasing decisions.

Additionally, the apparatus facilitates real-time monitoring of maintenance progress using IoT sensors, cameras, and user-input logs. Facility managers can access the interactive user interface to track live updates, review completed tasks, and adjust schedules dynamically. AI-based performance analysis evaluates the effectiveness of performed maintenance tasks, identifying recurring patterns and optimizing future repair strategies. For example, if an HVAC system requires frequent repairs due to inadequate airflow, the system may suggest upgrading the ductwork layout or replacing filters more frequently.

The apparatus also assists in cost management by calculating total maintenance costs, including material expenses, labor fees, and downtime-related costs. The AI engine suggests cost-effective alternatives, such as partial repairs instead of full replacements when feasible. Furthermore, the system prioritizes tasks covered under warranties, reducing out-of-pocket expenses for building owners. For example, if a faulty security camera is still under warranty, the system automatically schedules a service request with the manufacturer instead of initiating a costly third-party repair.

Figure 1H:
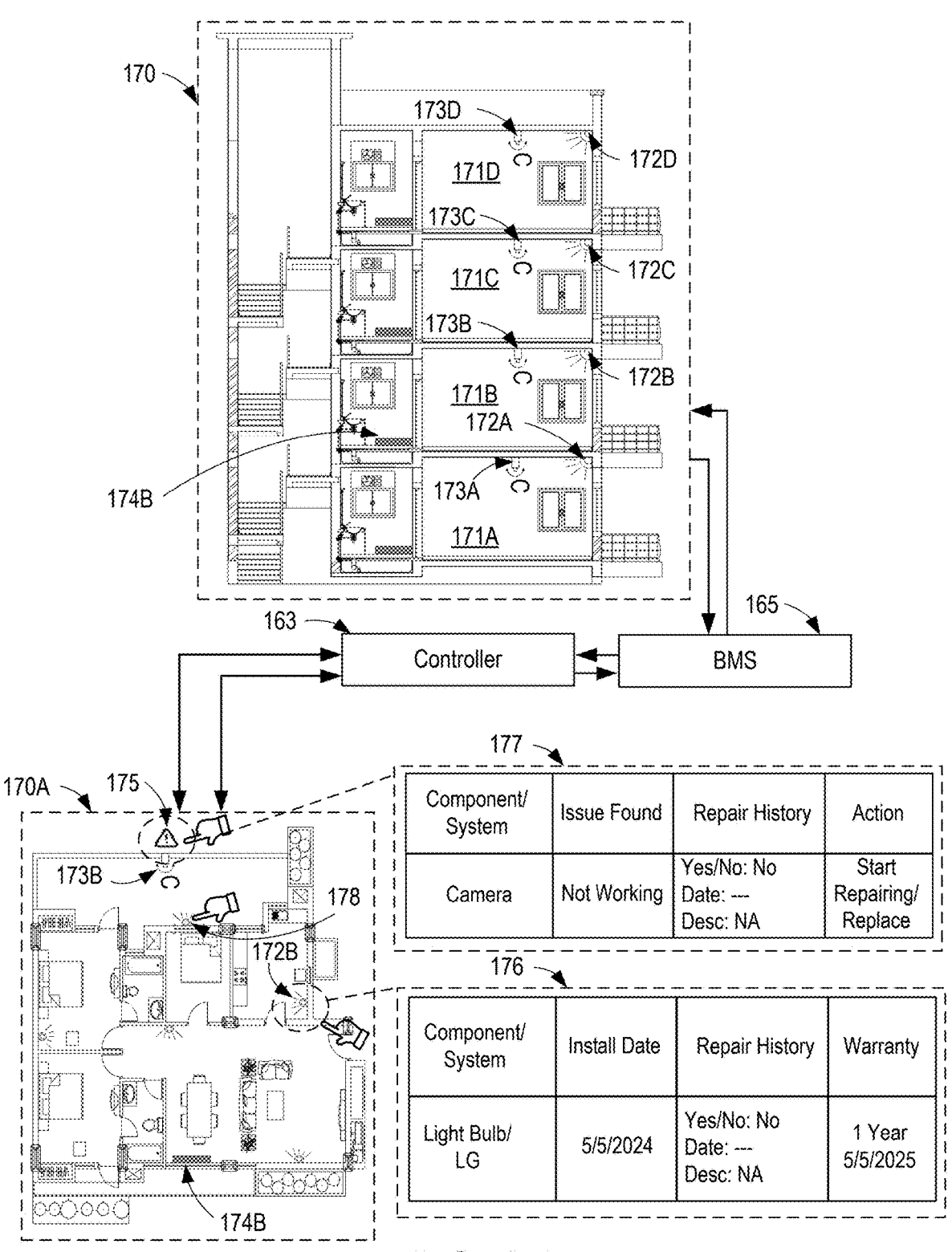
FIG. 1H illustrates an exemplary system for detecting and managing maintenance requirements in a building using a controller integrated with a Building Management System (BMS) in accordance with the present invention.

Referring now to FIG. 1H, the figure illustrates an exemplary system for detecting and managing maintenance requirements in a physical building 170 using a controller 163 integrated with the BMS 165 in accordance with the present invention. The building 170 comprises multiple floors, labeled as 171A-171D, where each floor may include various components, such as sensors, cameras, electrical fixtures, and appliances, which may be connected to the BMS 165 for monitoring and maintenance analysis. The BMS 165 serves as a centralized system that continuously collects data from connected sensors and devices, transmitting the collected information to the controller 163 for further processing and updating a digital twin design plan 170A.

The building 170 may comprise one or more electric bulbs 172A-172D, which may represent different types of lighting fixtures, such as LED lights, fluorescent bulbs, emergency lighting, or smart lighting systems. These lighting components may be monitored through the BMS 165, which may analyze operational efficiency, power consumption, and failure detection. If an electric bulb 172B is determined to be non-functional or operating inefficiently, the BMS 165 communicates this information to the controller 163, which then reflects the issue within the digital twin design plan 170A, visually marking the affected component and providing maintenance personnel with detailed information regarding the issue, such as the type of bulb, last replacement date, estimated lifespan, and required replacement specifications.

The building 170 also comprises multiple cameras 173A-173D, which may be positioned throughout different floors for security monitoring, surveillance, and building inspection purposes. These cameras may be of various types, such as thermal cameras, infrared cameras, high-resolution CCTV units, or smart cameras with AI-based analytics. The cameras 173A-173D may be monitored by the BMS 165 to detect anomalies, such as loss of video feed, misalignment, physical obstruction, or component degradation. In an embodiment, if the BMS 165 detects an issue with camera 173B, such as a damaged lens, recording failure, or obstructed view, the BMS 165 transmits this information to the controller 163, which then marks the affected camera location on the digital twin design plan 170A with a warning indicator 175, alerting building personnel to inspect or replace the faulty unit.

In addition to cameras, the building 170 includes multiple sensors 174B, which may monitor various environmental and structural parameters, such as air quality, temperature, humidity, pressure changes, gas leaks, fire detection, or water leakage. These sensors continuously collect real-time data and transmit it to the BMS 165, allowing the system to detect conditions requiring maintenance or intervention. In one embodiment, the BMS 165 detects abnormal temperature fluctuations on floor 171C, indicating a potential HVAC system failure or overheating electrical component. Upon receiving this data, the controller 163 updates the digital twin design plan 170A, associating the detected issue with a specific HVAC component or electrical system, allowing the maintenance personnel to take corrective action.

The BMS 165 may also include water leakage sensors that detect moisture levels or unexpected water flow within the building 170. If a sensor 174B identifies a leak near plumbing fixtures, piping, or structural components, the BMS 165 transmits the information to the controller 163, which then highlights the affected area on the digital twin design plan 170A with an alert marker, allowing maintenance teams to quickly locate and resolve the issue before further damage occurs. In another embodiment, if the BMS 165 detects low water pressure or irregular flow rates in plumbing lines, it may suggest pipe blockages or partial obstructions, prompting a visual indication of the affected area on the digital twin design plan 170A for further investigation.

The controller 163 receives a digital twin design plan 170A, representing the As-Built data of the building 170. The As-Built data reflects the actual structural layout, installed components, and operational systems currently present in the constructed building 170, rather than just an initial blueprint or conceptual design. The digital twin design plan 170A dynamically updates based on real-time data received from the BMS 165, reflecting the most up-to-date conditions and maintenance needs. In one embodiment, if an appliance or system is upgraded, replaced, or relocated, the controller 163 automatically updates the digital twin design plan 170A to match the modifications, maintaining an accurate digital representation of the building 170.

A user may interact with the digital twin design plan 170A using an interactive interface available on a user device, which may include a tablet, computer, smartphone, or an augmented/virtual reality (AR/VR) device. This user may be an owner, building manager, maintenance personnel, or a technician, depending on the building's operational requirements. Through the interactive interface, the user can navigate the digital twin design plan 170A, access real-time status updates, analyze detected issues, and initiate maintenance tasks. In one embodiment, if the user selects a camera 173C from the interface, the controller 163 may display detailed metadata about the camera, including installation date, last serviced date, model specifications, and live diagnostic data.

An issue detected within the building 170 by the BMS 165 may be reflected within the digital twin design plan 170A through alerts, notifications, or warning indicators 175. For example, if the BMS 165 detects that camera 173B is experiencing connection failure or recording issues, it sends the data to the controller 163, which then updates the digital twin design plan 170A by marking the camera's location with a warning indicator 175. This allows maintenance personnel to identify the issue without requiring a physical inspection, reducing response time, and improving maintenance efficiency.

In another embodiment, if a sensor 174B detects excessive humidity levels in a room on floor 171A, potentially indicating HVAC inefficiency or mold formation, the BMS 165 transmits the detected data to the controller 163. The controller 163 updates the digital twin design plan 170A to highlight the affected area, providing recommended maintenance actions, such as air quality testing, HVAC recalibration, or moisture control procedures.

The controller 163 may also facilitate predictive maintenance by analyzing historical maintenance records and real-time sensor data received from the BMS 165. If a lighting fixture 172D repeatedly requires replacement within short intervals, the system may predict an underlying electrical issue and provide a maintenance recommendation on the digital twin design plan 170A. The user can then schedule preventive repairs, such as wiring inspection or voltage regulation adjustments, to prevent further failures.

In an embodiment, the controller 163 allows users to select specific floors, rooms, or building sections within the digital twin design plan 170A to analyze component conditions and maintenance histories. If the user selects a specific sensor 174B, the system may provide detailed analytics, including sensor readings over time, detection frequency, and past maintenance interventions, assisting in long-term facility management decisions.

By integrating BMS 165, controller 163, sensors 174B, cameras 173A-173D, and the digital twin design plan 170A, the system 161 enables a real-time, automated maintenance workflow, allowing building personnel to monitor, diagnose, and address issues remotely. The BMS 165 continuously transmits operational data, which is processed by the controller 163 to keep the digital twin design plan 170A updated with the most accurate representation of the building 170 and its components. This integration eliminates the need for manual inspections, enhances maintenance efficiency, and provides a comprehensive visualization of real-time building conditions, thereby enabling proactive facility management and reduced downtime for important systems.

In some embodiments, the user may interact with the issue indicator 175 displayed on the digital twin design plan 170A to access detailed information 177 regarding the detected issue associated with camera 173B. The controller 163, upon receiving data from the BMS 165, updates the digital twin design plan 170A to reflect the status of the camera 173B, marking it as non-functional or experiencing operational issues. Upon user interaction with the indicator 175, the system retrieves and displays metadata 177, which may include details such as the issue type (e.g., not working, low resolution, obstructed view), last operational status, repair history, manufacturer details, model specifications, and any previous maintenance logs. The metadata 177 may also indicate whether the camera is under warranty, provide a recommendation for repair or replacement, and suggest nearby available cameras that may compensate for the camera failure.

The metadata table 177 may further include timestamps for detected failures, allowing maintenance personnel to determine the duration of the issue. The controller 163 may also analyze historical data from the BMS 165 to indicate whether camera 173B has previously exhibited performance issues, providing insights into potential recurring failures. Additionally, the system may present live diagnostic information, such as whether the camera is receiving power, transmitting data, or responding to control signals. The user may also view related environmental factors, such as recent power fluctuations, physical tampering, or connectivity issues, which may have contributed to the detected malfunction.

In addition to viewing issue-related metadata, the user may interact with other components on the digital twin design plan 170A to retrieve and modify their respective metadata. The controller 163 enables users to select components within the digital twin representation of the building 170, prompting an interactive table displaying associated metadata. For example, upon selecting light bulb 172B, the controller 163 may display table 176, presenting data such as installation date, repair history, manufacturer details, warranty period, and expected lifespan. If any of the metadata fields are incomplete, inaccurate, or missing, the user may manually enter corrections or updates through the interactive user interface. The system may allow users to attach additional metadata, such as images, receipts, serial numbers, or technician notes, to enhance the database records.

In an embodiment, the controller 163 enables users to correct discrepancies within table 176 if the actual physical component in building 170 does not match the metadata stored in the database. For example, if the database records for light bulb 172B indicate an LED bulb, but upon physical verification, it is identified as a fluorescent bulb, the user may modify the record in table 176 to reflect the correct bulb type. Similarly, if the system incorrectly logs an installation date or warranty period, the user may adjust the information accordingly. Such corrections are then stored in the database and reflected in future maintenance schedules, allowing the system to maintain an accurate digital representation of the building 170.

Beyond metadata retrieval and correction, the user may also control various components within the building 170 through the digital twin design plan 170A. By selecting specific indicators, such as indicator 178, the user may toggle bulbs, appliances, security devices, or HVAC systems in real-time. For example, selecting bulb indicator 178 on the digital twin design plan 170A may trigger a corresponding command to the BMS 165, which then transmits the signal to the actual lighting fixture in the building 170, turning it on or off. Similarly, the system may allow users to adjust brightness levels, activate motion detection settings for security lights, or schedule automated lighting operations.

In another embodiment, the user may interact with the BMS 165 via the digital twin design plan 170A to adjust HVAC settings, such as modifying temperature, fan speed, airflow direction, or enabling energy-saving modes. The user may also switch between heating and cooling modes, adjust humidity levels, or schedule HVAC system operations based on occupancy patterns. The system may integrate real-time sensor feedback to allow automatic climate adjustments based on temperature, humidity, or carbon dioxide levels detected within the building.

The controller 163 may also facilitate calibration and configuration of sensors or smart devices within the building 170 through the digital twin design plan 170A. A user may select an air quality sensor, a smoke detector, or a water leakage sensor, and initiate calibration tests, reset operations, or sensitivity adjustments. If a sensor malfunctions or requires recalibration, the digital twin design plan 170A may provide on-screen instructions for performing calibration steps or allow the user to initiate automatic recalibration through remote commands. For example, selecting a temperature sensor may prompt an option to adjust threshold levels or initiate a self-diagnostic check to validate accuracy.

In addition to real-time control, the controller 163 may allow users to set automated rules or sequences for system operations. The user may create if-then scenarios, such as automatically turning off all non-essential lights at night, activating motion-detection mode for security cameras after business hours, or triggering HVAC adjustments based on occupancy data. The BMS 165 executes these predefined rules, dynamically adjusting building components without requiring manual intervention.

The controller 163 may further enable security system integrations, allowing users to monitor and control access control systems, smart locks, or intrusion detection mechanisms directly from the digital twin design plan 170A. A user may, for example, remotely lock or unlock doors, restrict access to certain building areas, or receive alerts if unauthorized access is detected. If a security breach occurs, the BMS 165 may update the digital twin design plan 170A to highlight affected entry points, providing immediate situational awareness to building managers.

Figure 1I:
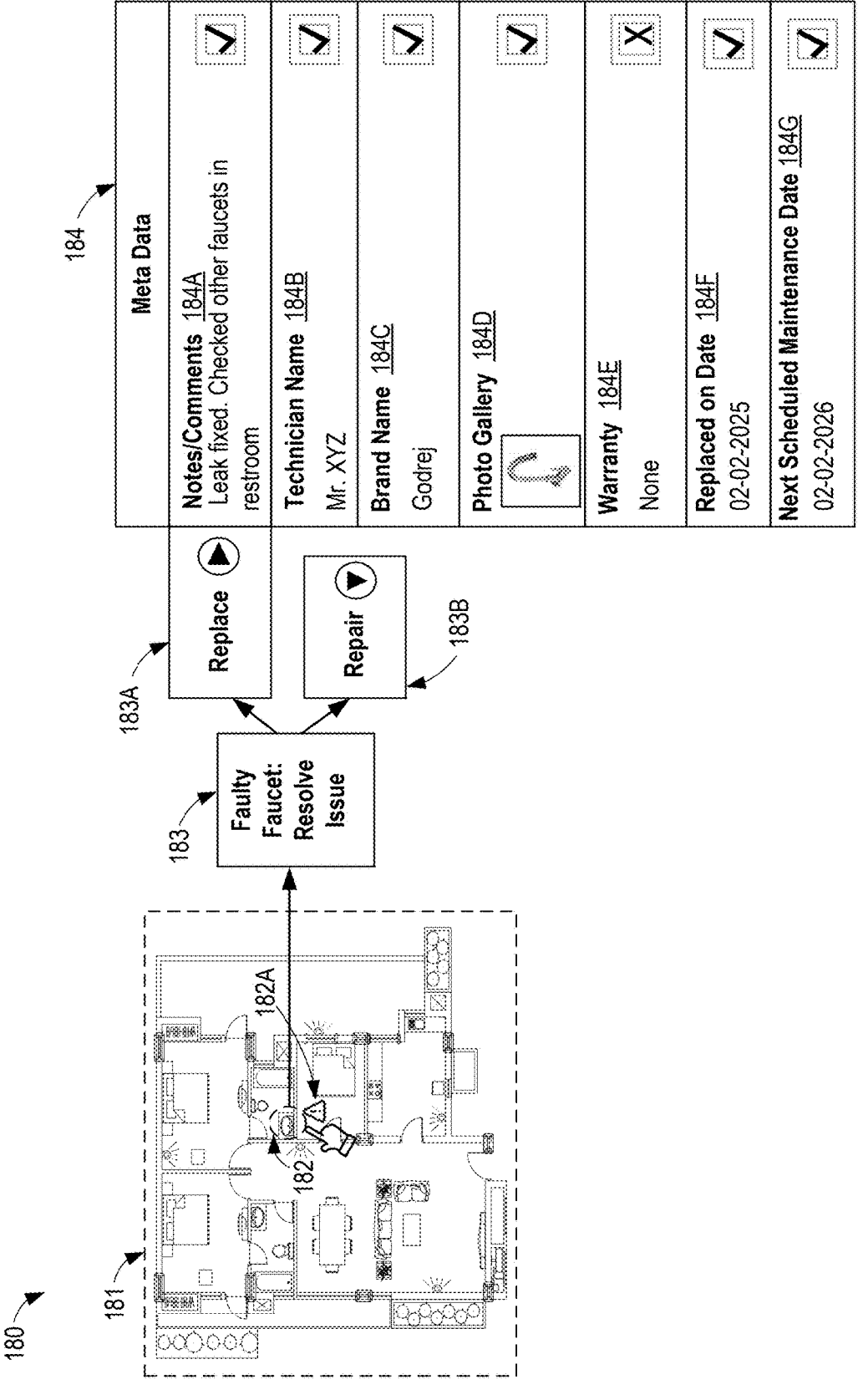
FIG. 1I illustrates an exemplary method for maintaining, repairing, or replacing a dynamic component within a building and updating maintenance metadata for the design plan in accordance with the present invention.

Referring now to FIG. 1I, an exemplary method 180 is illustrated for maintaining, repairing, or replacing a dynamic component, such as a faucet 182, within a constructed building while updating maintenance metadata 184 for the design plan 181, in accordance with the present invention.

The design plan 181 represents the as-built data of the constructed building, where any detected issues within the building are reflected in real-time. When a fault is detected in the faucet 182, a fault indicator 182A may be associated with the faucet 182 in the design plan 181, signaling an issue and notifying relevant stakeholders, such as building owners, facility managers, or maintenance personnel.

The faults associated with the faucet 182 may include but are not limited to leakage, low water pressure, rust buildup, broken handle, clogged aerator, improper water flow, or malfunctioning temperature control. The fault indicator 182A may be displayed in various formats, such as a highlighted alert, a color-coded marker, a warning icon, or a notification within the interactive user interface of the design plan 181. The BMS 165 may detect the fault in the faucet 182 using sensors, water flow monitors, or pressure sensors, and communicate the detected issue to the controller 163, which updates the design plan 181 accordingly. Additionally, if the fault is manually reported by a building occupant or maintenance personnel, the system allows manual entry of the issue into the design plan 181, associating the reported fault with the respective dynamic component.

Once a maintenance personnel or user identifies the issue within the building and prepares to conduct maintenance, they may access the design plan 181 via a user device, such as a tablet, smartphone, or workstation. The user selects the faucet 182 from the design plan 181, which prompts a detailed fault summary, displaying real-time diagnostics, past maintenance records, and the specific problem identified. The user interface then presents an option 183 to resolve the fault, allowing the user to proceed with maintenance.

Upon initiating the fault resolution process, the user may be provided with two selectable options: "replace" 183A and "repair" 183B. If the user selects the replace option 183A, the system processes the request to document the removal of the faulty faucet 182 and the installation of a new faucet. If the user selects the repair option 183B, the system records the steps performed for repairing the faucet 182, along with the parts used, the service performed, and additional notes regarding the corrective measures taken. In both cases, once the maintenance activity is selected, the system prompts the metadata table 184, which allows the user to document the completed maintenance activities.

The metadata table 184 consists of multiple fields 184A-184G, each designed to capture and store specific maintenance-related information. The metadata table 184 may provide structured checklists, dropdown menus, auto-suggested entries, or manual text fields, allowing the user to input data related to the completed maintenance process. The metadata 184 is subsequently stored in the database 166, allowing for future retrieval and analysis.

The Notes/Comments field 184A allows the user to enter text-based descriptions of the maintenance activity performed. In this example, the entry states: "Leak fixed. Checked other faucets in the restroom." The notes field 184A provides flexibility for the user to document specific actions taken, additional observations, or follow-up recommendations. If required, the user may attach audio notes, annotated diagrams, or supplementary images for enhanced documentation.

The Technician Name field 184B records the name of the individual or service provider responsible for the maintenance. In this example, the technician is listed as "Mr. XYZ", providing accountability and reference for future maintenance activities. The system may automatically suggest technician names based on previous maintenance records or allow manual input.

The Brand Name field 184C specifies the manufacturer or model of the installed faucet. In this case, the brand name is listed as "Godrej", indicating that a faucet manufactured by Godrej was installed as a replacement. If the user enters the brand manually, the system may prompt preloaded brand options based on the available inventory or previously installed faucets, allowing for faster data entry.

The Photo Gallery field 184D allows users to attach images of the replaced or repaired faucet. If a new faucet is installed, the system may automatically suggest image options based on the entered brand name and model. The user may select the most appropriate image, or they may manually upload photos of the physical installation taken during the maintenance process. This provides visual verification of completed work.

The Warranty field 184E records whether the component is covered under an existing warranty. In this example, the system indicates "None", meaning that the replaced faucet was not under an active warranty. If applicable, the system may cross-reference previous warranty records and installation dates to determine whether the component was still covered. If a new faucet is installed, the system may prompt the user to enter the warranty expiration date and terms.

The Replaced on Date field 184F logs the date of the maintenance activity. In this case, the replacement occurred on "Feb. 2, 2025", providing a reference point for future maintenance scheduling. The system may auto-populate this date based on the current system date or allow manual input.

The Next Scheduled Maintenance Date field 184G determines when the next service check-up is due. In this example, the next scheduled maintenance is set for "02-02-2026", indicating that the system recommends an annual service cycle for the faucet. The system may dynamically adjust maintenance schedules based on usage patterns, manufacturer recommendations, or previous maintenance frequency.

In an alternative embodiment, if partial data is entered, the system may automatically populate relevant fields based on historical maintenance logs. For example, if the user enters "Grohe" as the brand name, the system may suggest preloaded models, warranty information, and compatible replacement parts, expediting data entry. If the system detects a similar previous maintenance entry, it may suggest pre-filled templates based on prior work orders, reducing manual input effort.

The controller 163, upon receiving the completed metadata entry, updates the design plan 181 to reflect the new maintenance status of the faucet 182. The fault indicator 182A may be removed or changed to a different status indicator, signifying that the issue has been resolved. If the replacement was unsuccessful or required additional repairs, the system may retain the indicator 182A but update the associated metadata 184 to reflect the pending work.

By integrating interactive fault resolution, structured metadata recording, automated data suggestions, and visual tracking, the system enables efficient maintenance logging and building management. The design plan 181 continuously updates with the most recent maintenance activities, issue resolutions, and component replacements, allowing for real-time tracking, historical data analysis, and predictive maintenance scheduling. The controller 163 facilitates that all maintenance activities are recorded, validated, and accessible for future reference, streamlining facility management operations.

In some embodiments, where the user forgets to register maintenance performed in the physical building within the design plan 181, the cameras 173A-173D may automatically detect maintenance work and reflect a change indicator on the design plan 181, alerting users to update the corresponding maintenance records. The cameras 173A-173D, which may be part of the BMS 165, continuously monitor various locations, rooms, or dynamic components of the building and detect alterations based on image processing, motion detection, or AI-based change analysis. The BMS 165 transmits the detected changes to the controller 163, which then processes the information and marks the corresponding location on the design plan 181 with a visual alert prompting users to verify whether maintenance has been performed.

The change indicator may be in the form of a notification, a blinking icon, a timestamped log entry, or a highlighted component on the design plan 181, signifying that the cameras 173A-173D detected modifications in the physical environment. For example, if a technician replaces a faulty faucet 182 but does not update the metadata 184, the camera 173B positioned within the area may detect the technician's activity and identify differences between pre-maintenance and post-maintenance images. Upon detecting such a change, the controller 163 updates the design plan 181, placing a change indicator near the faucet 182, prompting the user to confirm and register the maintenance details.

In some implementations, the BMS 165 may compare captured images or video feeds with previously stored images of the same location or component, analyzing differences such as component shape, position, color, or additional human activity. If a significant difference is detected, the controller 163 may generate an automated alert, notifying building managers or maintenance personnel through a user interface, an email notification, or a push alert on a mobile device. In an embodiment, the controller 163 may also generate a list of recently modified areas, allowing users to systematically review and update missing records.

When prompted by the change indicator, the user may interact with the design plan 181 to view suggested updates, confirming or modifying the detected maintenance work. The system may present pre-filled metadata fields, suggesting possible changes such as "Faucet replaced," "Bulb changed," or "Air filter cleaned", based on the observed activities. The user may then finalize the update by selecting from dropdown menus, typing additional details, or uploading images of the replaced component. If no maintenance was performed and the detection was inaccurate, the user may dismiss the change indicator, preventing unnecessary record updates.

In another embodiment, the BMS 165 may integrate with IoT-based sensors, smart tools, or technician-worn devices, such as RFID-enabled equipment or smart glasses, to cross-reference detected maintenance work with technician logs. If a technician replaces an HVAC unit or adjusts a plumbing fixture, but the maintenance record is not immediately updated, the system may flag the location within the design plan 181, prompting the user to enter the missing metadata 184 at a later time.

Additionally, the controller 163 may use historical maintenance data to infer missing records when a detected maintenance action matches a recurring pattern. For example, if an air filter in an HVAC system is consistently replaced every six months, but a recent change was detected without documentation, the system may automatically suggest "Filter replacement may have occurred", prompting the user to confirm and complete the metadata entry.

Figure 1J:
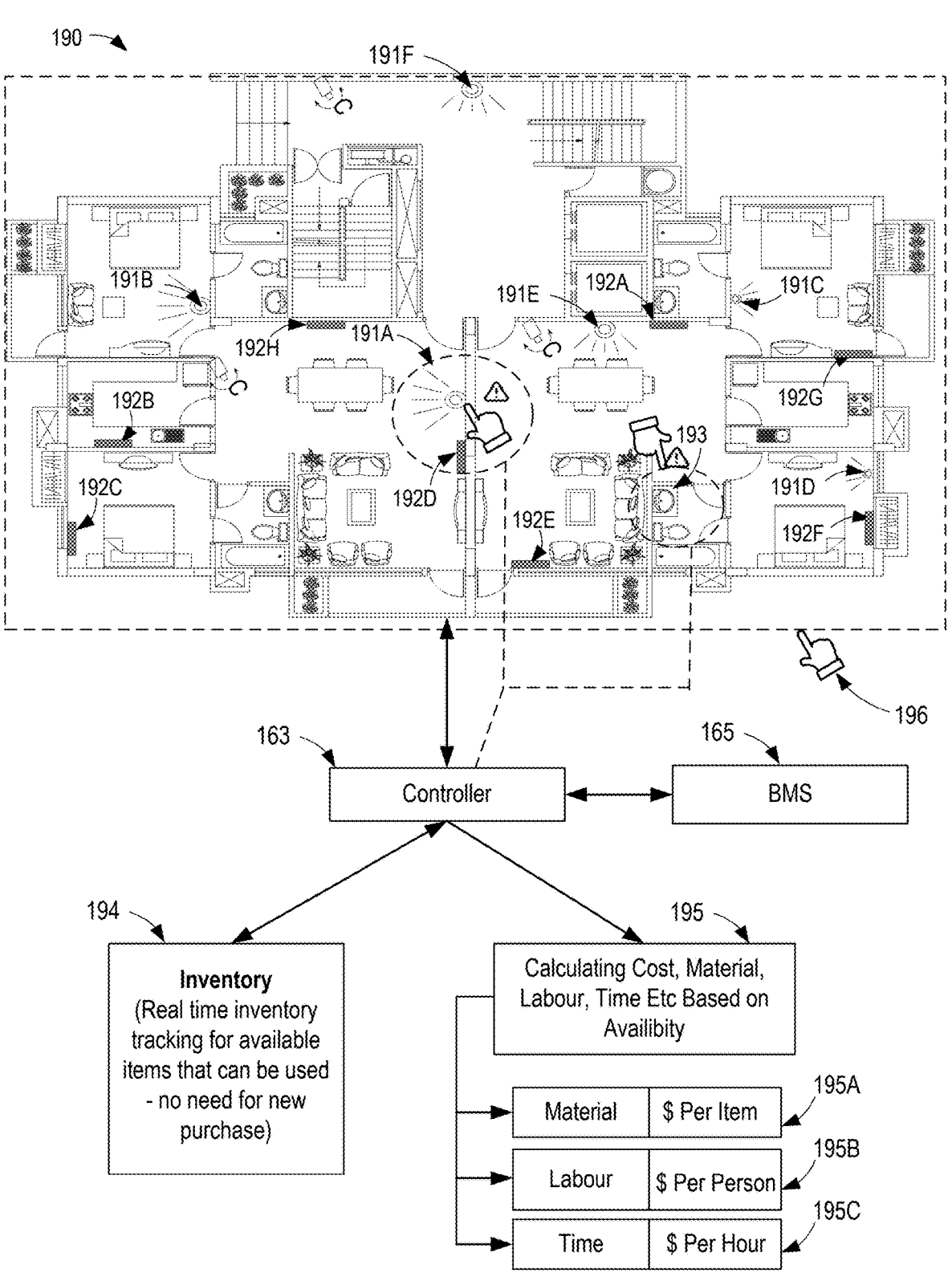
FIG. 1J illustrates a design plan comprising As-Built data of a building, where maintenance issues are identified and reflected on the design plan, and the controller processes these issues to generate a maintenance execution plan while considering inventory availability.

Referring now to FIG. 1J, a design plan 190 comprises As-Built data of a physical building, where maintenance issues are identified and reflected within the design plan 190, and the controller 163 processes these issues to generate a maintenance execution plan while considering inventory availability. The design plan 190 visually represents various spaces, fixtures, furniture, appliances, and dynamic components present within the physical building. The design plan 190 serves as the latest digital representation of the physical building, dynamically updating itself based on real-time inputs, including sensor data and camera feeds obtained from the BMS 165, which is integrated with the controller 163.

The design plan 190 is not a static representation but an interactive, continuously updated model that reflects the current state of building components. In some embodiments, the controller 163 processes data from sensors, IoT devices, and cameras deployed within the physical building and reflects corresponding changes within the design plan 190. As part of this real-time monitoring system, various sensors 192A-192H and cameras may collect environmental, structural, and operational data. The controller 163, upon receiving this data, processes and analyzes it to identify components requiring maintenance, assess failure probabilities, and predict upcoming maintenance needs.

For exemplary illustrative purposes, FIG. 1J depicts multiple light bulbs 191A-191F, representing various types of lighting fixtures installed throughout the building, including ceiling-mounted lights, wall-mounted lamps, emergency lighting, or smart-controlled LEDs. These light bulbs 191A-191F may be monitored by the BMS 165, which assesses operational efficiency, power consumption, and status indicators. If a bulb 191A is detected to be non-functional, flickering, or experiencing an inconsistent voltage supply, the BMS 165 transmits a fault signal to the controller 163, which then marks the affected bulb 191A on the design plan 190 with a fault indicator. This allows maintenance personnel to quickly identify and prioritize required repairs or replacements.

Similarly, the sink 193 is depicted as another example of a dynamic component within the design plan 190. If the BMS 165 detects low water pressure, leakage, clogged drainage, or irregular water flow through sensors installed near the sink 193, the controller 163 updates the design plan 190 by associating a fault indicator with the sink 193. The fault indicator may provide further details, including real-time water consumption levels, error logs, previous maintenance history, and suggested corrective actions. The controller 163 may also assess whether the sink 193 has undergone repeated maintenance requests, which may indicate the need for component replacement instead of repair.

The design plan 190 also integrates various sensors 192A-192H, which provide continuous environmental and structural monitoring. These sensors may include temperature sensors, air quality monitors, motion detectors, fire alarms, humidity sensors, and vibration sensors. In one embodiment, if the BMS 165 detects abnormal temperature fluctuations in a particular room, the controller 163 may correlate this data with sensor 192A and reflect an alert on the design plan 190, indicating potential HVAC system inefficiencies. Additionally, if sensor 192B detects higher-than-normal humidity levels, the controller 163 may generate a maintenance request for HVAC calibration or dehumidifier servicing.

The controller 163, in addition to reflecting maintenance issues, is also responsible for generating a maintenance execution plan. The execution plan accounts for the urgency of each maintenance request, available inventory, estimated repair time, and cost factors. If a light bulb 191A is marked as requiring replacement, the controller 163 may check the available inventory and provide recommendations based on stored stock levels. If a matching replacement bulb is available in inventory, the controller 163 schedules the replacement job and updates the design plan 190 to reflect the pending maintenance request. If no replacement bulb is available, the system may generate a purchase request, providing vendor options, estimated delivery time, and cost comparisons.

The design plan 190 may be accessed by different users, including building owners, facility managers, maintenance personnel, and technicians, through user devices. Each user may have specific access permissions, allowing them to review maintenance requests, approve repairs, modify building parameters, or initiate procurement orders. A facility manager, for example, may access the design plan 190 to approve repair costs, while a technician may view diagnostic data and step-by-step instructions for component repair.

In an alternative embodiment, the controller 163 may integrate historical maintenance data and predictive analytics, allowing it to suggest preventive maintenance tasks before failures occur. If the light bulb 191B has a record of frequent replacements, the system may analyze past maintenance cycles, estimate remaining lifespan, and recommend proactive replacement before failure occurs. This capability reduces unplanned downtime and unexpected repair costs.

The design plan 190 may further assist in prioritizing maintenance tasks based on dependency analysis. For example, if both light bulb 191A and sink 193 require maintenance, the controller 163 may determine that sink 193 repairs take priority due to potential water damage risks. The system may also factor in safety regulations, compliance requirements, and energy efficiency considerations when generating the maintenance execution plan.

In some embodiments, the design plan 190 may be presented and interacted with on an interactive user interface, where a user may view, select, and interact with various dynamic components of the design plan 190. The interactive user interface may be accessible through user devices such as tablets, smartphones, computers, augmented reality (AR) headsets, or virtual reality (VR) systems, allowing real-time engagement with the building's digital twin. The user may click on a faulty light bulb 191A or the faulty sink 193, and the controller 163 processes these interactions, analyzing each fault either automatically or based on the user's selection to determine corresponding maintenance requirements and generate a maintenance execution plan 195.

The controller 163 may analyze faults using AI-driven analysis models, which may incorporate historical maintenance data, sensor readings, real-time operational status, and predictive failure models to assess the severity, urgency, and nature of the fault. The maintenance requirements determined by the controller 163 may include detailed diagnostics, specifying what the issue is, why it occurred, whether it requires immediate attention, and the best corrective course of action. For example, for the faulty light bulb 191A, the controller 163 may detect that it has exceeded its expected lifespan, was subjected to voltage fluctuations, or has experienced circuit-related failures. Similarly, for the faulty sink 193, the controller 163 may determine that the water pressure has decreased, the drainage system is clogged, or the faucet has physical damage.

Once the maintenance requirements are determined, the controller 163 generates the maintenance execution plan 195, specifying how the fault can be resolved. The maintenance execution plan 195 may be created dynamically, considering factors such as availability of replacement parts, labor costs, estimated repair time, and the impact of delaying maintenance. In some cases, the controller 163 may provide multiple maintenance execution plans for a single identified fault, allowing the user to select the most efficient, cost-effective, or sustainable solution. For example, if the faulty light bulb 191A requires replacement, the controller 163 may generate an execution plan for immediate replacement with an LED alternative, an execution plan for bulk replacement of all similar light bulbs in the facility to minimize long-term costs, or an execution plan recommending adjustments to the electrical circuit to prevent future failures.

To enhance decision-making, the maintenance execution plan 195 may include a detailed breakdown of materials 195A, labor 195B, and time 195C required for implementing the maintenance. The materials 195A section of the execution plan 195 may specify what items are required for repair or replacement, their respective quantities, compatibility with existing systems, and estimated procurement costs. For example, if a plumbing repair requires PVC pipes, washers, or sealants, the materials 195A breakdown may list each component along with the vendor details, pricing comparisons, and availability status. The labor 195B section may provide an estimate of the number of technicians required for the job, their expertise level, and the hourly or fixed service costs. The time 195C section may estimate the repair duration, considering factors such as complexity of the issue, required approvals, and expected downtime.

The controller 163, while preparing the maintenance execution plan 195, may also refer to an inventory 194 to determine if required materials are already available within the facility. The inventory 194 serves as a real-time repository of available maintenance supplies, including spare components, tools, replacement parts, and consumables. If the required materials are available in inventory, the execution plan 195 may automatically prioritize using existing stock, reducing unnecessary procurement costs and delays. If items are not available, the controller 163 may initiate an automated purchase request, presenting vendor comparisons, delivery timelines, and cost breakdowns for ordering the required materials.

The inventory 194 may be stored within a database 166 (as shown in FIG. 1G) or may be physically integrated within the building and associated with the BMS 165. If the inventory 194 is managed through automated tracking systems, such as RFID tags, barcode scanning, or IoT-based inventory sensors, the controller 163 may access real-time stock levels, preventing discrepancies between the digital inventory and actual physical stock. For example, if a technician removes a replacement light bulb from storage, the inventory 194 may update in real time, providing accurate tracking.

The controller 163 may also assess whether certain maintenance tasks can be consolidated to reduce costs and downtime. If multiple light bulbs 191A-191F across different rooms exhibit similar failures, the maintenance execution plan 195 may suggest performing all replacements simultaneously, minimizing technician deployment costs and improving efficiency. Similarly, if the faulty sink 193 is due for repairs, the system may suggest checking all connected plumbing components, so that no overlooked issues arise later.

Furthermore, the maintenance execution plan 195 may incorporate external factors such as budget constraints, regulatory compliance requirements, and sustainability considerations. If energy-efficient replacements are preferred, the controller 163 may highlight LED bulbs that meet energy-saving standards, or if the building adheres to green building certifications, the execution plan may propose eco-friendly materials and practices.

To facilitate user interaction, the controller 163 may display alternative recommendations for implementing the maintenance execution plan 195. If an issue has multiple resolution options, the system may rank them based on cost, time efficiency, and impact on building operations. Users may then compare, select, or modify the suggested execution plans before finalizing maintenance actions.

Referring now to FIGS. 1K-1L, the figures illustrate an exemplary maintenance log 197 for a selected portion of a design plan, such as a section 196 of the design plan 190 in FIG. 1J, tracking repairs, replacements, costs, and scheduled maintenance for various building components. The maintenance log 197 comprises multiple fields, including repair/install date 197A, component/system 197B, location/room 197C, description of work 197D, quantity replaced or repaired 197E, part/material used 197F, vendor/technician 197G, cost 197H, notes/comments 197I, and next scheduled maintenance 197J. These fields provide a structured log of performed maintenance tasks, enabling efficient tracking, future planning, and predictive maintenance scheduling.

The repair/install date 197A represents the date when a maintenance or installation activity was performed. Each entry in the maintenance log 197 may be timestamped with a specific date, allowing users to track past repairs and schedule future maintenance tasks accordingly. For example, on Jan. 1, 2025, an HVAC system air filter was replaced in Room-301, which may indicate routine maintenance or a required replacement due to wear and tear. By maintaining chronological records, facility managers can analyze maintenance trends, identify recurring failures, and optimize preventive maintenance schedules.

The component/system 197B field specifies the part of the building or system that underwent maintenance, which may include HVAC systems, lighting fixtures, plumbing, fire alarm systems, roofing, security systems, doors, locks, elevators, and painting. Each component/system 197B corresponds to a physical counterpart within the building, allowing technicians to track the operational history of each dynamic component. For example, an entry for a security system in the entrance on 16 May 2024 indicates that a faulty security camera was replaced, improving the building's security monitoring capabilities.

The location/room 197C field specifies the precise area where maintenance was conducted. This may include specific rooms, hallways, front lawns, or entire buildings, facilitating that maintenance activities are well-documented and easy to trace. For example, a routine maintenance check for an elevator is listed under 'Elevator 1', helping maintenance teams pinpoint the exact system that requires service. If multiple similar systems exist, the location/room field provides clarity in scheduling and execution.

The description of work 197D field details the specific maintenance actions performed, such as replacing an air filter, repairing a leaking faucet, inspecting smoke detectors, trimming bushes, or touching up paint on walls. Each description entry provides insight into the maintenance process, allowing users to review the work done and assess whether additional repairs are required. For example, the entry for roofing on 27 Nov. 2024 notes 'Repaired minor roof leak', indicating that the maintenance was conducted to prevent further water damage.

The quantity replaced or repaired 197E field records the exact number of items replaced or repaired. This may include values such as five LED bulbs replaced in a hallway, or one door handle set installed in Room 105. The ability to track quantity-based replacements allows users to determine material consumption rates and assess future inventory needs. If a particular item is frequently replaced, it may indicate a recurring issue that requires investigation.

The part/material used 197F field specifies the components or consumables used during the maintenance process, such as air filters, LED bulbs, roofing sealants, security cameras, or interior paint. By keeping an inventory of used materials, the system helps in budgeting, procurement planning, and assessing the lifespan of building components. For example, the entry for security system repair lists '1 Security Camera', showing that a new camera was installed to replace the faulty one.

The vendor/technician 197G field records the service provider or maintenance personnel responsible for performing the maintenance task. This field helps track technician performance, assign responsibility for specific repairs, and maintain accountability. If a repair is conducted by building staff, third-party vendors, or specialized maintenance firms, the information is logged accordingly. For example, the repair of a leaking faucet was performed by 'XYZ Plumbing,' while fire alarm system inspection was handled by 'Fire Safety Co.'

The cost 197H field tracks the financial expenses associated with each maintenance task, providing insight into operational expenditures and budget allocations. Costs may be categorized based on materials, labor, and other associated expenses. For example, replacing a security camera cost $100, while trimming bushes and mowing the front lawn cost $200. This cost tracking feature enables better financial planning and cost analysis for building management.

The notes/comments 197I field allows for additional observations or remarks related to each maintenance task, including status updates, issues encountered, or follow-up recommendations. For example, an entry for HVAC filter replacement states 'Filter was heavily soiled. Improved airflow,' suggesting that future preventive maintenance scheduling may be beneficial. Similarly, the plumbing entry notes 'Leak fixed. Checked other faucets in restroom,' indicating a thorough maintenance process.

The next scheduled maintenance 197J field determines when the next maintenance activity for a given component is due, preventing unexpected failures and optimizing service intervals. The system may recommend specific maintenance cycles, such as '3 months,' 'annually,' or 'as needed', depending on component wear, usage patterns, and manufacturer recommendations. For example, fire detectors are scheduled for annual maintenance, while routine landscaping is planned monthly.

The controller 163, upon reviewing the maintenance log 197, may automate scheduling recommendations, prioritize urgent repairs, and suggest predictive maintenance strategies. If certain components require frequent maintenance, the controller 163 may recommend permanent solutions such as full replacements or system upgrades. For example, if light bulbs in a hallway frequently burn out, the system may suggest switching to longer-lasting LED alternatives.

Figure 2A:
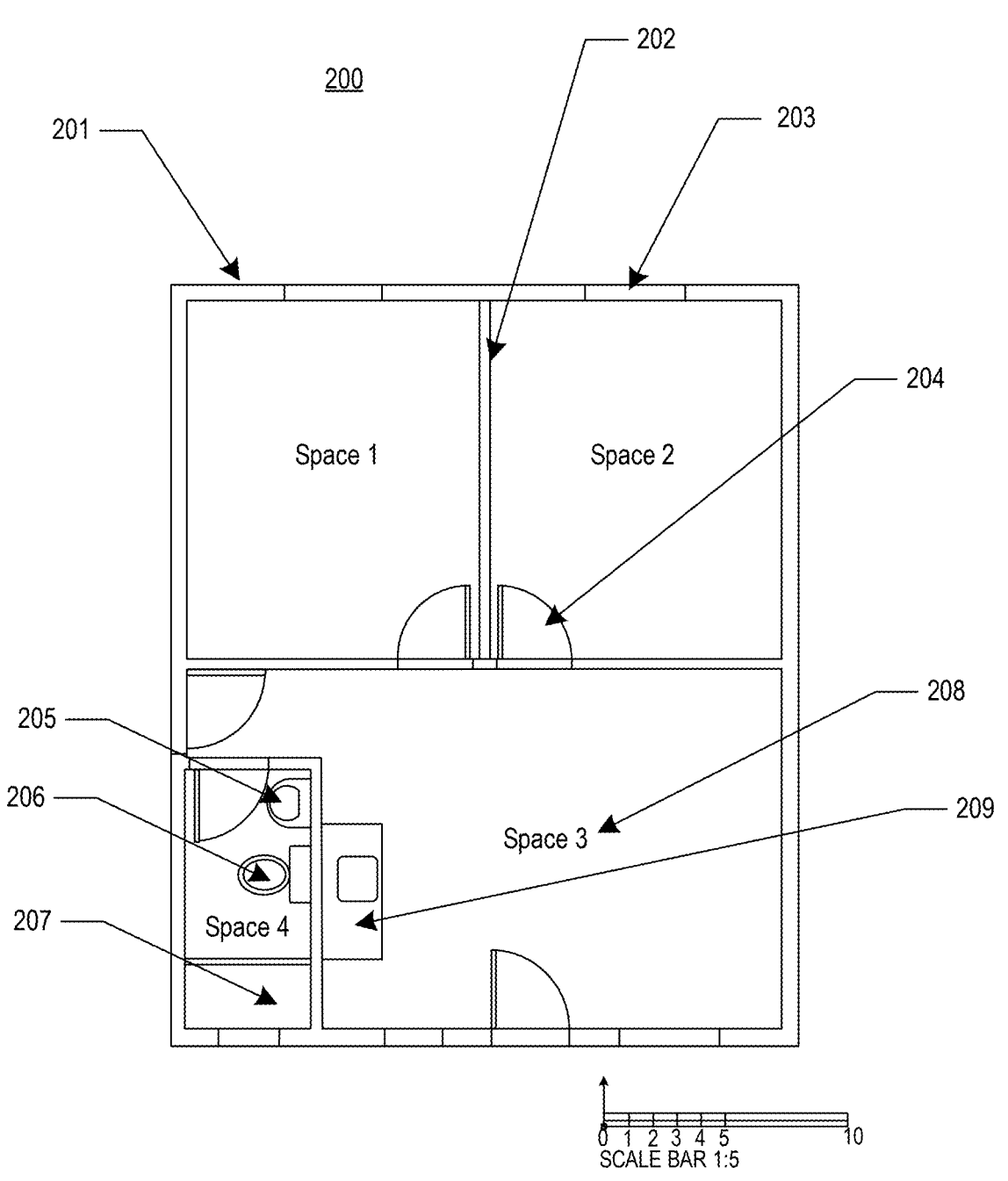
FIGS. 2A, 2B, 2C, and 2D illustrate a static representation of a floor plan and an AI analysis of the same to assess boundaries and design elements.
Figure 2B:
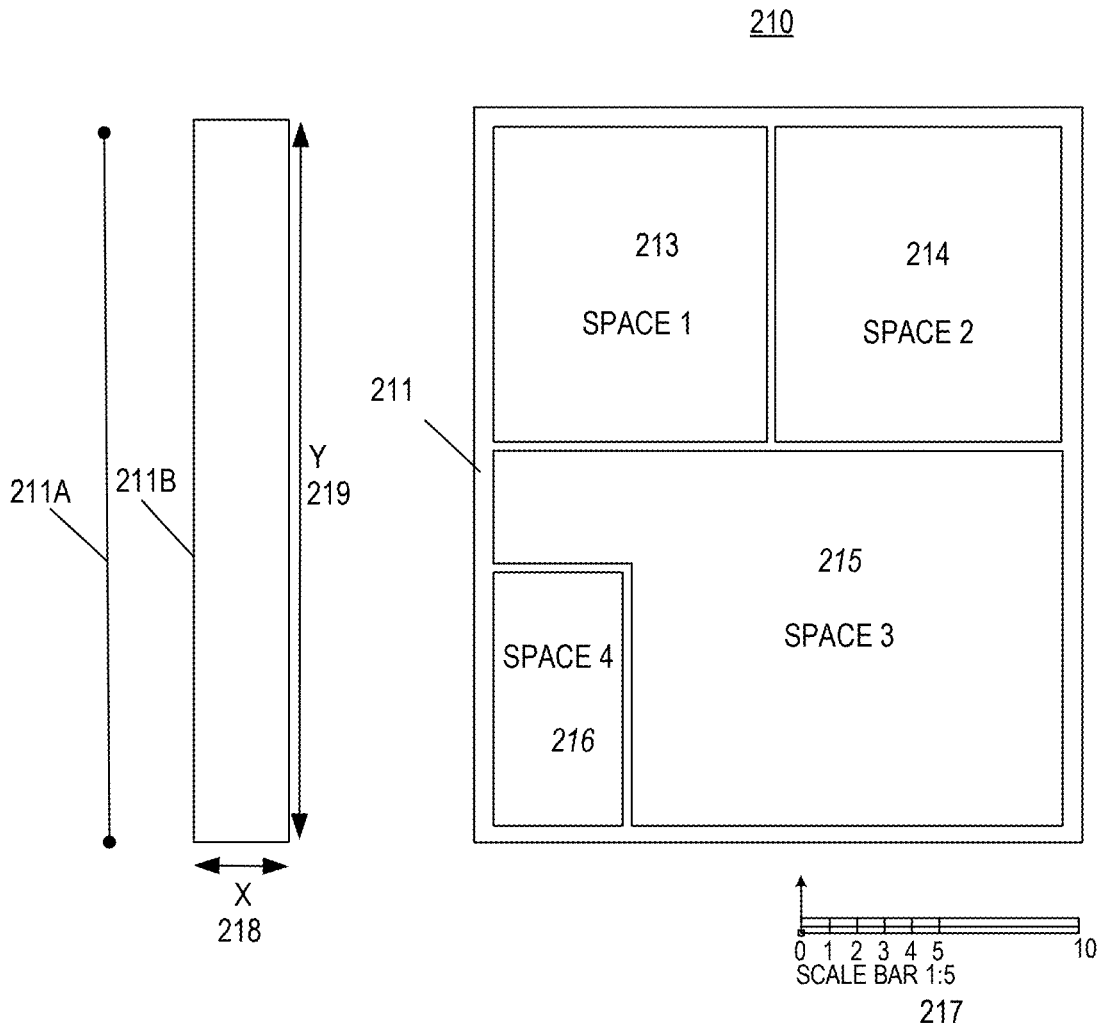

Referring now to FIG. 2A, a given two-dimensional reference 200 may have a number of elements that an observer and/or an AI engine may classify as features 201-209 such as, for example, one or more of: exterior walls 201; interior walls 202; doorways 204; windows 203; plumbing components, such as sinks 205, toilets 206, showers 207, water closets or other water or gas related items; kitchen counters 209 and the like. The two-dimensional references 200 may also include narrative or text 208 of various kinds throughout the two-dimensional references.

Identification and characterization of various features 201-209 and/or text may be included in the input two-dimensional references. Generation of values for variables included in generating a bid may be facilitated by splitting features into groups called 'disparate features' 201-209 and boundary definitions and generation of a numerical value associated with the features, wherein numerical values may include one or more of: a quantity of a particular type of feature; size parameters associated with features, such as the square area of a wall or floor; complexity of features (e.g. a number of angles or curves included in a perimeter of an area; a type of hardware that may be used to construct a portion of a building, a quantity of a type of hardware that may be used to construct a portion of the building; or other variable value.

In some embodiments, a recognition step may function to replace or ignore a feature. For example, for a task goal of the result shown in FIG. 2B, features such as windows 203, and doorways, 204, may be recognized and replaced with other features consistent with exterior walls 201 or interior walls 202 (as shown in FIG. 2A). Other features may be removed, such as the text 208, the plumbing features and other internal appliances and furniture which may be shown on drawings used as input to the processing. Again, such feature recognition may be useful to accomplish other goals, but for a goal of boundary 211 definition that delineates a floorplan 210 as illustrated in FIG. 2B a pictorial representation may be purposefully devoid of such features, as illustrated.

Referring now to FIG. 2B, a boundary 211 is illustrated around a grouping of defined spaces 213-216. Spaces are areas within a boundary (which may include but are not limited to rooms, hallways, stairwells etc.).

FIG. 2B illustrates an AI predicted boundary 211 based upon an analysis of the floorplan 210 illustrated in FIG. 2A. A transition from FIG. 2A to FIG. 2B illustrates how an AI engine successfully distinguishes between wall features and other features such as a shower 207, kitchen counter 209, toilet 206, bathroom sink 205, etc. shown in FIG. 2A.

In another aspect, in some embodiments, a boundary may include a polygon 211B. A polygon may be any shape that is consistent with a design submitted for AI analysis. For example, a rectangular polygon 211B may be based upon a wall segment 211A and have a width X 218 and a length Y 219. Boundaries that include polygons are useful, for example, in creating a three-dimensional representation of a design plan.

According to the present invention, a boundary may be represented on a user interface as one or both of: one or more line segments, and one or more polygons. In addition, a feature may be represented as a single point, a polygon, an icon, or a set of polygons. In some embodiments, a point may be placed in a centroid position for the feature and the centroid points may be counted, summarized, subtracted, averaged, or otherwise included in mathematical processes.

In some embodiments, an analytical use for a boundary may influence how a boundary is represented. For example, determination of a length of a wall section, or size of a feature may be supported via a boundary that includes a line segment. A count of feature type may be supported with a boundary that includes a single point or predefined polygon or set of polygons. Extrapolation of a two-dimensional reference into a three-dimensional representation may be supported with a boundary that includes polygons.

In one embodiment of the present invention, the AI engine is adept at analyzing a static representation of a floor plan to identify and generate a selectable array of editable components, such as walls, doors, and fixtures. These dynamic elements are then presented in an interactive user interface, where users can effortlessly select specific design elements to add annotations or to modify those elements directly. For example, a user can choose a window on the digital floor plan and opt to change its dimensions, or select a wall to annotate with instructions for material specifications. The AI's analytical prowess facilitates that these selections and subsequent modifications are intelligently integrated within the overall design framework, enabling a fluid and intuitive design alteration experience that supports real-time collaboration and planning accuracy.

A scale 217 may be used to indicate a size of features included in a technical drawing included in the two-dimensional reference. As indicated above, executable software may be operative with a controller to count pixels on an image and apply a scale to a bitmapped image. Alternatively, a user may input a drawing scale for a particular image, drawing or other two-dimensional reference. Typical units referenced in a scale include inches: feet, centimeters: meters, or any other appropriate unit.

In some embodiments, a scale 217 may be determined by manually measuring a room, a component, or other empirical basis for assessing a relative size. Examples therefore include a scale included as a printed parameter on two-dimensional reference or obtained from dimensioned features in the drawing. For example, if it is known that a particular wall is thirty feet in length, a scale may be based upon a length of the wall in a particular rendition of the two-dimensional reference and proportioned according to that length.

Figure 2C:
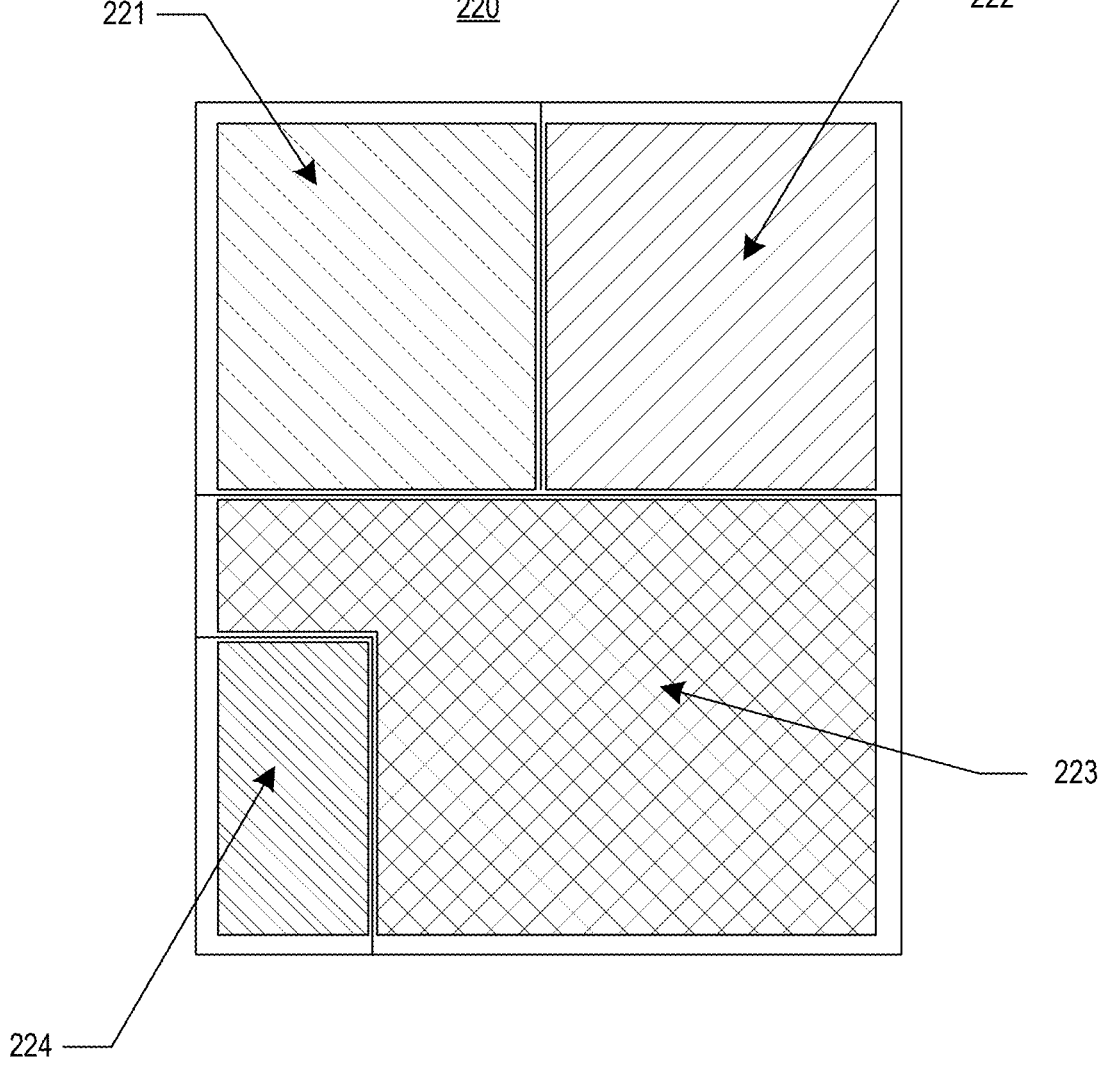

Referring now to FIG. 2C, a user interface 220 is illustrated with multiple regions 221-224. The multiple regions 221-224 may be presented via different hatch representations or other distinguishing pattern (in some embodiments regions may also be represented as various colors etc.). During training of AI engines, and in some embodiments, when a submitted design drawing includes highly customized or unique features, a user may wish to adjust an automated identification of boundaries and automated filling of space within the boundaries.

During training of processes executed by a controller, such as those included in an AI engine made operative by the controller, and in some embodiments, when a submitted design drawing includes highly customized or unique features, an automated identification of boundaries and automated filling of space within the boundaries may be included in the interactive user interface may not be according to a particular need of a user. Therefore, in some embodiments of the present invention, an interactive user interface may be generated that presents a user with a display of one or more boundaries and pattern or color filled areas arranged as a reproduction of a two-dimensional reference input into the AI engine.

In some embodiments, the controller may generate a user interface 220 that includes indications of assigned vertices and boundaries, and one or more filled areas or regions with user changeable editing features to allow the user to modify the vertices and boundaries. For example, the user interface may enable a user to transition an element such as a vertex to a different location, change an arc of a curve, move a boundary, or change an aspect of polylines, polygons, arcs, circles, ellipses, splines, NURBS or predefined subsets of the interface. The user can thereby "correct" an assignment error made by the AI engine, or simply rearrange aspects included in the interface for a particular purpose or liking.

In some embodiments, modifications and/or corrections of this type can be documented and included in training datasets of the AI model, also in processes described in later portions of the specification.

Discrete regions may be regions associated with an estimation function. A region that is contained within a defined wall feature may be treated in different ways such as ignoring all areas within a boundary, to counting all areas within a boundary (even though regions do not include boundaries). If the AI engine counts the area, it may also make an automated decision on how to allocate the region to an adjacent region or regions that the region defines.

Figure 2D:
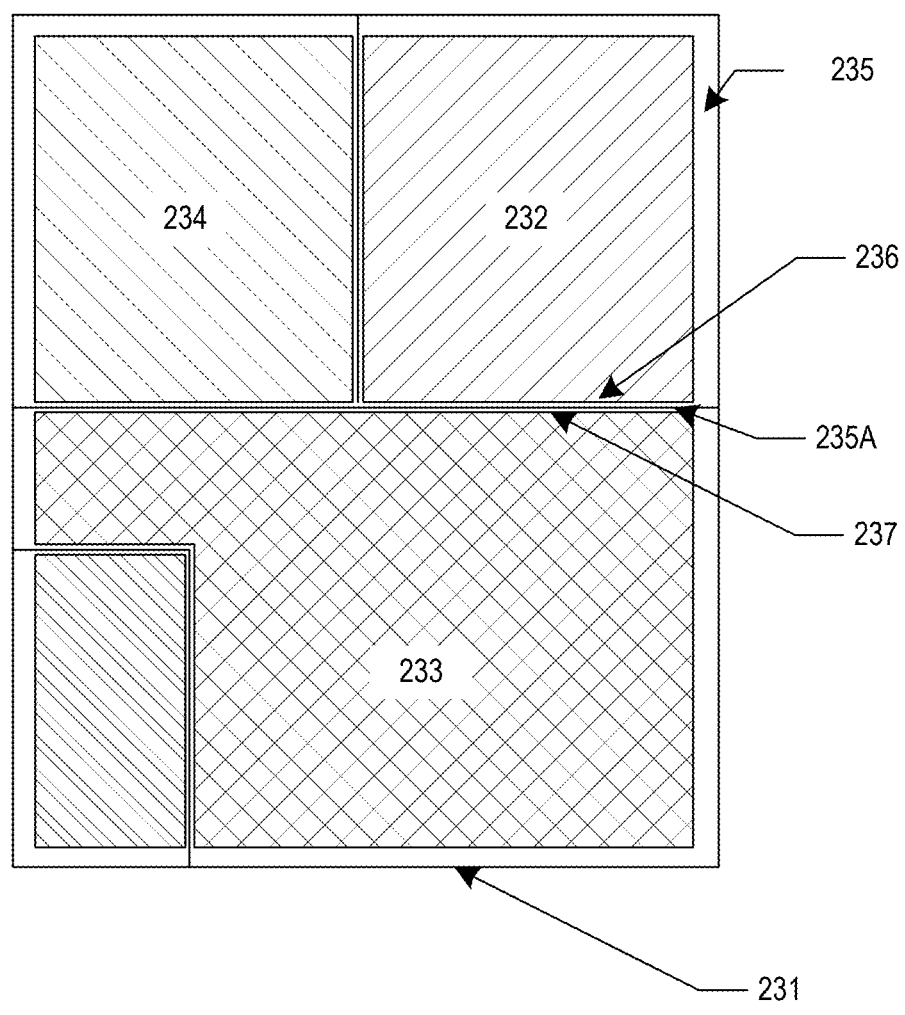

Referring to FIG. 2D, an exemplary user interface 230 illustrates a user interface floorplan model 231 with boundaries 236-237 between adjacent regions 233-234 with interior boundaries 236-237 that may be included in an appropriate region of a dynamic component. The AI may incorporate a hierarchy where some types of regions may be dominant over others, as described in more detail in later sections. Regions with similar dominance ranks may share space, or regions with higher dominance ranks may be automatically assigned to a boundary. In general, a dominance ranking schema will result in an area being allocated to the space with the higher dominance rank. In some embodiments, a dominance rank will allocate an area that may be used in determining an occupancy load. Moreover, in those embodiments that analyze a dynamic file (such as, for example, a Revit® compatible file) a dominance rank may be included, or added to, one or more dynamic features and be modified as the dynamic feature is modified. In some embodiments, the incorporation of a dominance rank may be instrumental in delivering automated suggestions for the revision of design plans. The dominance rank may serve as a strategic guide, steering the focus towards regions (or design elements) of higher dominance rank. For example, regions with a higher dominance rank are recommended to remain as unchanged as possible in the suggested revisions besides making sure that the revised designs of the regions comply with the best practices. The annotation process related to the selected design elements or dynamic components may also be presented based on the dominance rank of regions, dynamic components representing the regions, and the selected design elements on the design plans. This approach scrutinizes the annotations added to the regions or design elements with a higher dominance rank on the overall design, facilitating that modifications align with both regulatory requirements and the foundational elements that contribute significantly to the design's integrity.

In some embodiments, an area 235A between interior boundaries 236-237 and an exterior boundary 235 may be fully assigned to an adjacent region 232-234. An area 235A between interior boundaries 236-237 may be divided between adjacent regions 232-234 to the interior boundaries 236-237. In some embodiments, an area 235A between boundaries 236-237 may be allocated equally, or it may be allocated based upon a dominance scheme where one type of area is parametrically assessed as dominant based upon parameters such as its area, its perimeter, its exterior perimeter, its interior perimeter, and the like. Parameters may also be based upon items that are automatically counted using AI analysis of pixel patterns that identify a pattern as an item, such as, by way of non-limiting example, one or more of: doors or other paths of egress; plumbing fixtures; fixed obstacles; stairs; inclines; and declines.

In some examples, a boundary 235-237 and associated area 235A may be allocated to a region 232-234 according to an allocation schema, such as, for example, an area dominance hierarchy, to prioritize a kitchen over a bathroom, or a larger space over a smaller space. In some embodiments, user selectable parameters (e.g., a bathroom having parameters such as two showers and two sinks may be more dominant over a kitchen having parameters of a single sink with no dishwasher). These parameters may be used to determine boundary and/or area dominance. A resulting computed floorplan model may include a designation of an area associated with a region as illustrated in FIG. 2D. In various embodiments, different calculated features are included in a user interface floorplan model 231 such as features representing aspects of a wall, such as, for example, center lines, the extent of the walls, zones where doors open and the like, and these features may be displayed in selected circumstances.

Some embodiments may also include AI analysis of a dynamic file, such as a Revit or Revit compatible file and/or a raster file with patterns of dots, the AI may generate a likelihood that a region or area represented by one or both of a polygon or pattern of dots, includes a common path or dead end or an area definable for determining an occupancy load, egress capacity, travel distance and/or other factor that may influence annotation process as discussed above for FIGS. 1A-11.

Once boundaries have been defined a variety of calculations may be made by the system. A controller may be operative to perform method steps resulting in calculation of a variable representative of a floorplan area, which in some embodiments may be performed by integrating areas between different line features that define the regions.

Alternatively, or in addition to method steps operative to calculate a value for a variable representative of an area, a controller may be operative to generate a value for element lengths, which values may also be calculated. For example, if ceiling heights are measured, presented in drawings, or otherwise determined, then volume for the room and surface area calculations for the walls may be made. There may be numerous dimensional calculations that may be made based on the different types of model output and the user-inputted calibration factors and other parameters entered by the user.

In some embodiments, a controller may be provided with two-dimensional references that include a series of architectural drawings with disparate drawings representing different elevations within a structure. A three-dimensional model may be effectively built based upon a sequenced stacking of the disparate drawings representing different levels of elevations. In other examples, the series of drawings may include cross-sectional representation as well as elevation representation. A cross-section drawing, for example, may be used to infer a common three-dimensional nature that can be attributed to the features, boundaries and areas that are extracted by the processes discussed herein. Elevation drawings may also present a structure in a three-dimensional perspective. Feature recognition processes may also be used to create three-dimensional model aspects.

Figure 2E:
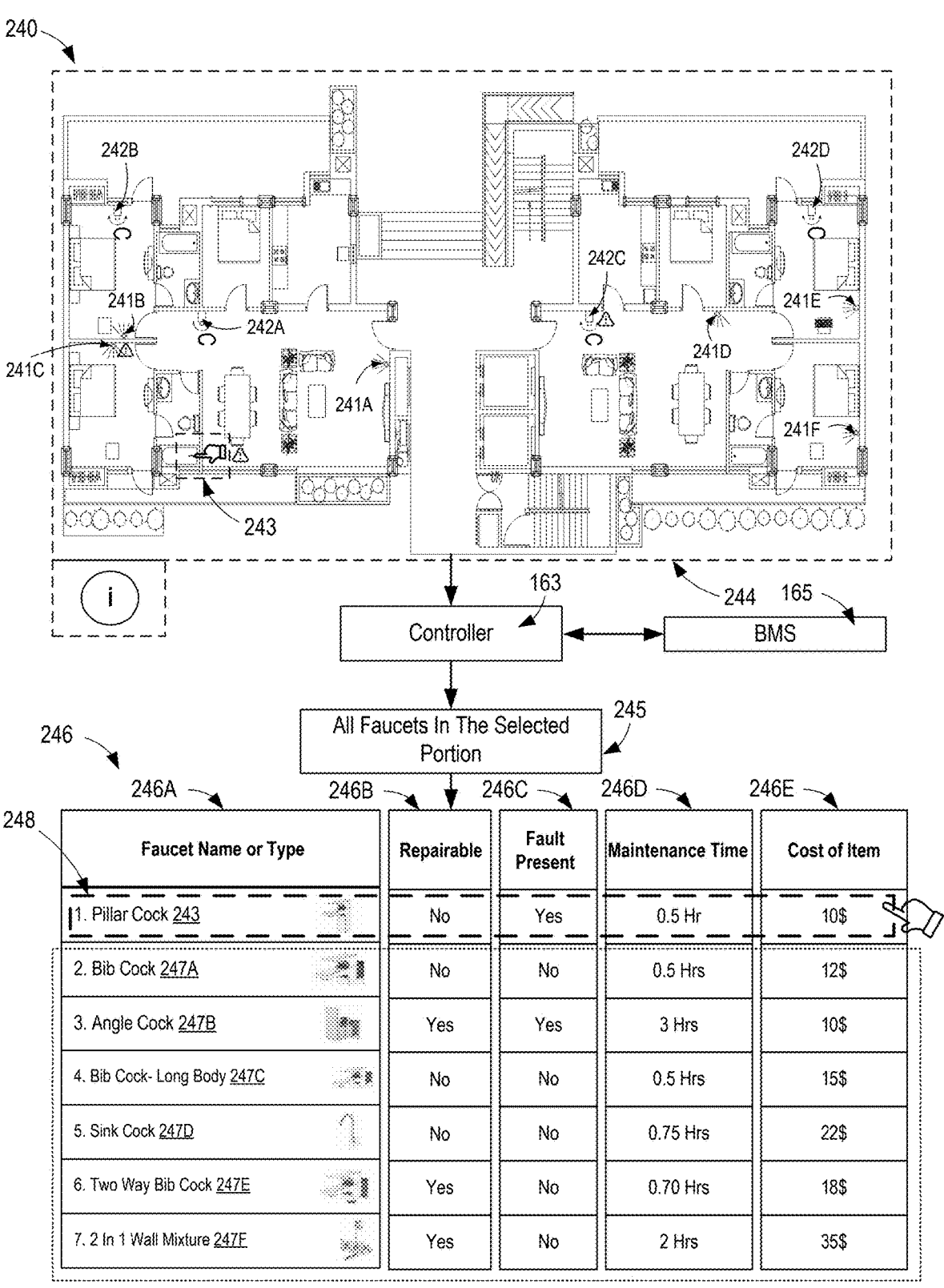
FIGS. 2E-2F illustrate a system for user interaction with dynamic components on a digital twin design plan, where the controller identifies similar components, repair options, and cost comparisons for replacements.
Figure 2F:
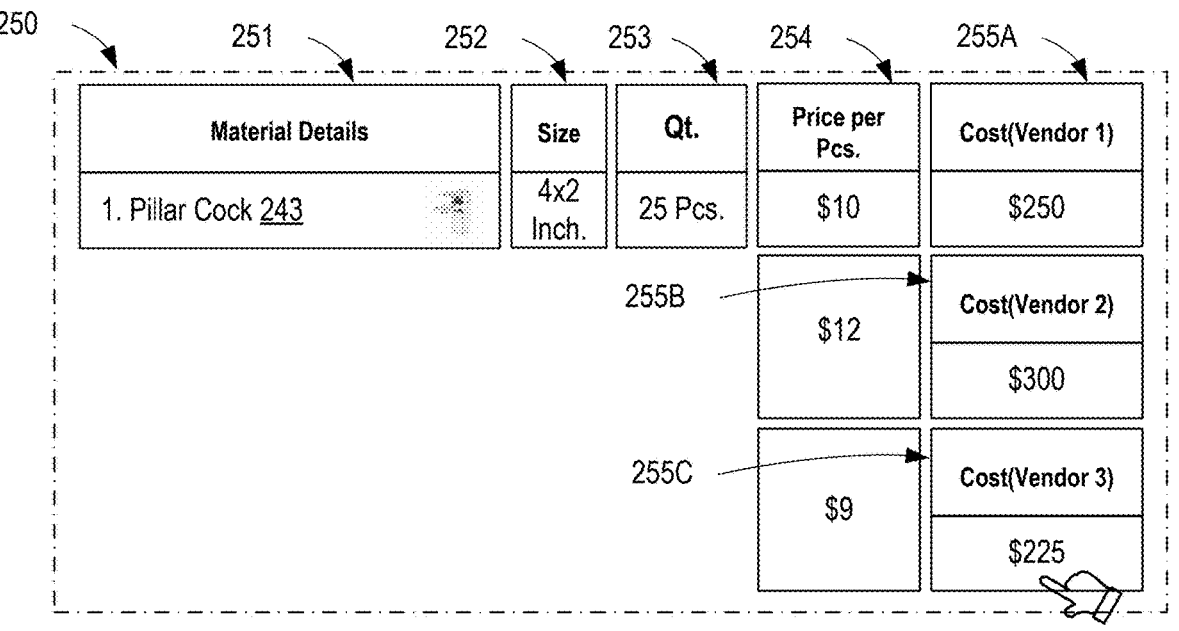

Referring now to FIG. 2E, it illustrates an exemplary design plan 240 of at least a portion of a physical building, incorporating as-built data that represents various spaces, fixtures, and dynamic components within the building. The design plan 240 may include several electric components, monitoring devices, and plumbing fixtures, such as a plurality of light bulbs 241A-241F, which may be installed in various rooms, hallways, and spaces for illumination and energy efficiency tracking. The design plan 240 may also include monitoring devices, such as cameras 242A-242D, which may be utilized for security, surveillance, or fault detection. Additionally, the design plan 240 incorporates various fixtures, such as a faucet 243, which may be tracked for usage, maintenance history, and operational status.

The design plan 240 is interactive, enabling a user to select one or more components or spaces to prompt the controller 163 to determine maintenance requirements for the selected components or spaces in real time. When a component or space is selected, the controller 163 retrieves relevant data regarding previous maintenance records, real-time operational status, estimated lifespan, and maintenance recommendations. For example, when the user selects the faucet 243, the controller 163 may analyze the faucet's metadata, including installation date, material type, prior maintenance records, and detected faults. The user may also select a portion 244 of the design plan 240, prompting the controller 163 to analyze whether there are similar faucets within the selected portion 244 that may also require maintenance.

In some embodiments, the controller 163 provides a list of all faucets present within the selected portion 244, facilitating that maintenance planning accounts for all relevant components. In some embodiments, the user may provide an additional input 245, prompting the controller 163 to specify a maintenance requirement for the selected portion 244. For example, if the user provides an additional input 245 requesting a comprehensive maintenance analysis, the controller 163 may process the request and generate a complete list of faucets 246, which includes the selected faucet 243 and additional faucets 247A-247F present within the selected portion 244.

The list of faucets 246 includes detailed information 246A-246E about each faucet 243 and faucets 247A-247F, assisting the user in determining which faucets need repairs, replacements, or adjustments. The detailed information 246A-246E consists of various fields, including faucet name/type 246A, repairable status 246B, fault presence 246C, maintenance time estimate 246D, and cost of item 246E, each providing important information regarding maintenance requirements, estimated labor, and material costs.

The faucet name or type 246A identifies the specific type of faucet present within the selected portion 244, allowing the controller 163 to categorize faucets based on design, material, or function. The listed faucets 247A-247F may include various types such as bib cocks, angle cocks, sink cocks, two-way bib cocks, and wall mixers, all of which may have different maintenance requirements and compatibility considerations. By categorizing faucets based on type, the system facilitates that replacement or repair tasks use appropriate components, preventing incompatibility issues during execution.

The repairable status 246B field indicates whether a faucet is repairable or requires full replacement. Some faucets 247B, 247E, and 247F may be marked as repairable, meaning that maintenance personnel may perform repairs instead of replacing the entire fixture, which may lead to reduced costs and optimized maintenance planning. Conversely, faucets 243, 247A, 247C, and 247D may be labeled as non-repairable, meaning that if a fault is present, the entire faucet must be replaced to restore functionality.

The fault presence 246C field indicates whether a fault has been detected within each faucet. The controller 163, upon receiving sensor data from the BMS 165, may automatically detect water leakage, low water pressure, clogging, or structural damage in the faucets. In this case, the faucet 243 has been detected with a fault, while the other faucets 247A-247F have no active fault indications. The controller 163 may also use AI-based predictive maintenance models to determine whether a faucet is likely to develop a fault based on previous maintenance history, material degradation analysis, and sensor-based flow rate evaluations.

The maintenance time estimate 246D provides an approximate duration required for maintenance or replacement of each faucet. The estimated time may vary based on repair complexity, accessibility, and required labor. The controller 163 computes the estimated maintenance time dynamically, considering historical data from prior maintenance tasks and technician efficiency rates. In this example, the maintenance time for faucet 243 is estimated at 0.5 hours, whereas faucet 247B, which may be more complex to repair, has an estimated maintenance time of 3 hours.

The cost of item 246E field provides the price associated with each faucet, which may be used for budgeting, procurement planning, and cost estimation. The controller 163 may retrieve cost data from a centralized inventory system (e.g., inventory 194 in FIG. 1J) or external vendor databases. In some embodiments, the cost of each faucet may be determined dynamically based on vendor pricing, availability, and bulk purchase discounts. In this example, the cost of replacing faucet 243 may be $10, while faucet 247F, a two-in-one wall mixer, may be priced at $35.

The controller 163, based on the detailed information 246A-246E, may generate multiple maintenance execution plans, allowing the user to select the most suitable repair strategy. If multiple faulty faucets are identified within the selected portion 244, the system may suggest consolidating maintenance tasks, reducing labor costs and operational disruptions. Furthermore, the controller 163 may compare historical maintenance data and warranty details to determine whether a faucet repair or replacement is cost-effective.

In some embodiments, the user may select any of the faucets 243, 247A-247F presented within the design plan to access detailed information regarding the selected component, including maintenance history, material specifications, estimated maintenance costs, and procurement options. When a user selects faucet 243 via selection input 248, the controller 163 retrieves relevant metadata and dynamically generates a procurement interface such as the table 250 shown in FIG. 2F, which provides a comparative analysis of pricing, vendor options, and procurement details. The table 250 allows the user to compare prices from different vendors 255A-255C, select the required quantity of items, and review additional specifications related to the selected faucet.

The table 250 comprises multiple fields, each displaying detailed procurement-related information. The material details 251 field may provide an expanded description of the selected faucet 243, including the type, model, and material composition. In some implementations, the controller 163 retrieves this information from a centralized building management database (e.g., database 166 in FIG. 1G), which stores data about existing fixtures within the building. If the controller 163 detects that the selected faucet has a history of frequent failure, it may recommend alternative models with better durability or lower maintenance costs.

The size 252 field specifies the physical dimensions of the faucet 243, providing compatibility with pre-existing plumbing connections and mounting configurations. If the selected faucet's size does not match the current system requirements, the controller 163 may suggest alternative size variations. For example, if the user selects a 4×2 inch faucet, but the existing system requires a 6×2 inch fixture, the system may prompt the user to consider an alternative model to avoid installation issues.

The quantity field 253 allows the user to input the number of units required for purchase. This may particularly be useful if multiple faulty faucets have been identified within the building and need to be replaced simultaneously. The controller 163 may automatically suggest a required quantity based on previous maintenance data or the number of similar faulty components detected within the building. In some implementations, the controller 163 may provide bulk purchase recommendations, offering discounted pricing based on order volume.

The price per unit field 254 displays pricing information for the selected faucet from multiple vendors, allowing the user to compare and select the most cost-effective option. The controller 163 may retrieve real-time pricing updates from vendor databases or supplier APIs, so that users receive the most competitive pricing options. The table 250 may also include options for filtering vendors based on delivery time, warranty coverage, or customer ratings.

The vendor selection fields 255A-255C provide a comparative cost breakdown for the faucet 243 from multiple vendors, enabling the user to select the most suitable supplier based on price, reliability, and availability. The controller 163 may automatically rank vendors based on historical reliability, past procurement records, and delivery timelines. If a preferred vendor (e.g., 255C) offers a lower price of $225 compared to vendor 255A's price of $250, the user may opt for the lower-cost option while considering additional factors such as delivery speed and product warranty.

In some implementations, the controller 163 may recommend procurement strategies to optimize building-wide maintenance operations. If multiple components across different sections of the building require replacement, the controller 163 may consolidate orders, reducing shipping costs and improving procurement efficiency. Additionally, the controller 163 may suggest scheduled procurement, so that replacement components are stocked before anticipated failures occur, thereby reducing downtime.

Furthermore, table 250 may provide additional metadata such as estimated delivery time, warranty coverage, installation complexity, and return policies. The user interface may allow facility managers to assess procurement risks, negotiate bulk discounts, or opt for extended warranty protection. If the controller 163 identifies that the selected faucet is already available within the facility's existing inventory (e.g., inventory 194 in FIG. 1J), it may recommend utilizing the in-stock component instead of purchasing a new one, thereby minimizing costs.

The procurement interface within table 250 may also support automated order placement, allowing users to directly purchase components through an integrated procurement management system. If the user finalizes the selection of vendor 255C, the controller 163 may automatically generate a purchase request, notify procurement personnel, and initiate an approval workflow. In some embodiments, the controller 163 may also integrate with financial management systems, facilitating budget allocation, payment authorization, and invoicing.

Figure 2G:
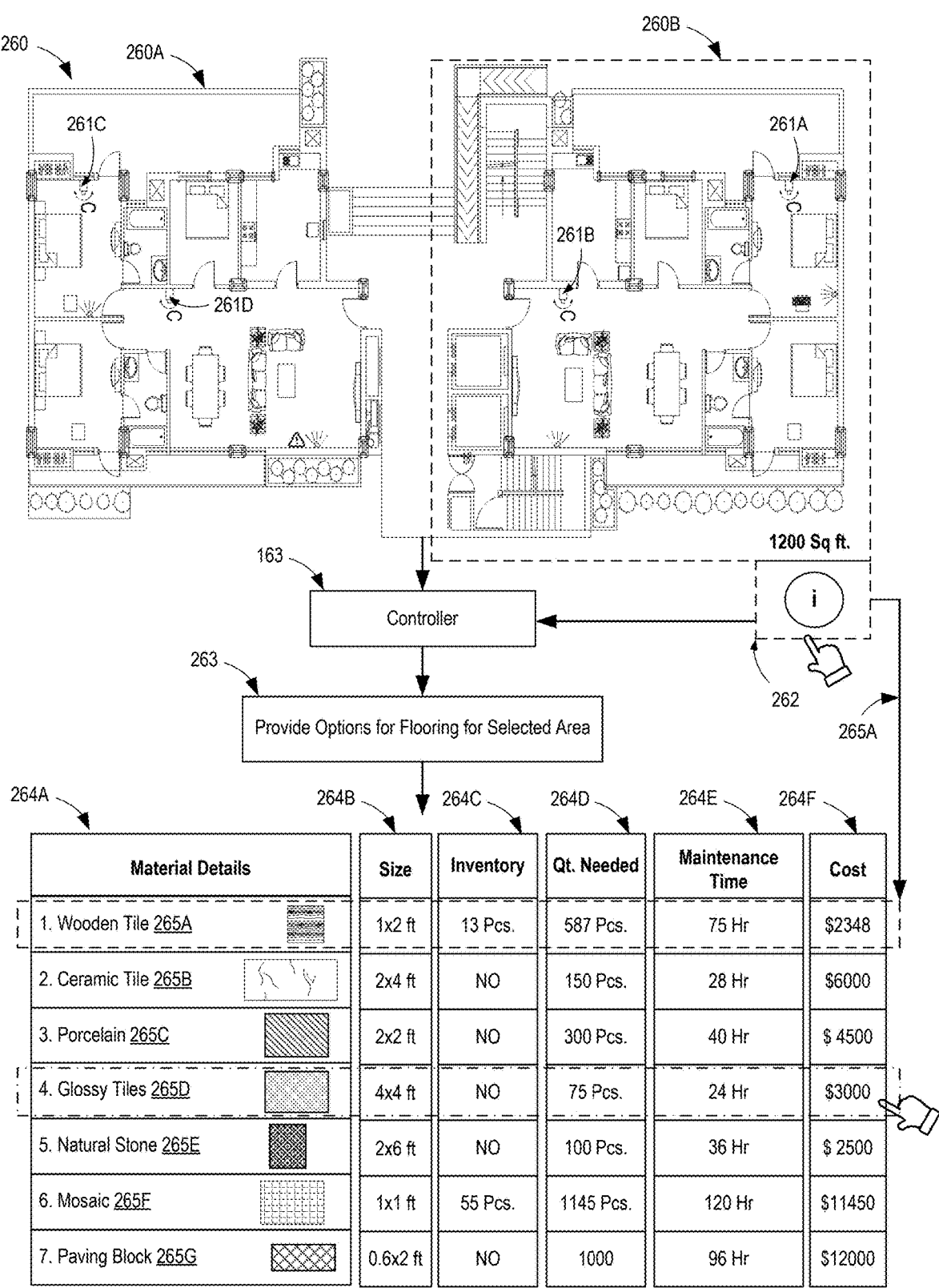
FIGS. 2G-2H illustrate a system for selecting a portion on a design plan for repair or replacement, where the controller calculates required materials, provides options, and enables cost comparison.

Referring now to FIG. 2G, it illustrates an exemplary design plan 260 comprising one or more portions 260A-260B of a physical building, where the as-built arrangement of various components, items, fixtures, and appliances present within the building are represented. The design plan 260 provides a digital twin representation of the physical building, which may continuously update based on real-time inputs from sensors, cameras, and manual annotations. In some embodiments, a user may interact with the design plan 260 via an interactive user interface to inspect maintenance conditions, identify required repairs, and execute restoration tasks. For example, a user may select (262) a specific portion 260B of the design plan 260 to assess the maintenance requirements for the flooring within the selected portion.

Upon selection of a specific portion, such as portion 260B, the controller 163 may analyze the flooring condition by referring to historical maintenance logs, real-time sensor readings, and image or video feeds from cameras 261A-261D positioned within the physical building. In some embodiments, the controller 163 may determine degradation, cracks, surface wear, or material stress within the flooring of one or more building portions 261A-261B. This analysis may be performed using image recognition algorithms, AI-based defect detection, or material aging prediction models. For example, if the camera 261C detects visible cracks in a tile or marble flooring section, the controller 163 may classify the extent of damage and generate an appropriate maintenance action.

In some implementations, once a portion such as 260B is selected, the controller 163 may calculate the total area of the selected portion to determine the exact quantity of flooring material required for repair or complete replacement. The area calculation may be based on dimension markings on the design plan 260, which may correspond to the real-world physical dimensions of the building. Alternatively, the controller 163 may determine the area based on the dimensions of known elements within the design plan 260. For example, if a table, doorway, or furniture piece of predefined size is detected in the space, the controller 163 may extrapolate the dimensions of the flooring area based on proportional scaling.

In further embodiments, the controller 163 may determine whether the entire flooring requires maintenance or only specific sections within the selected portion 260B. For example, if cameras 261A-261D capture images indicating wear and tear localized in one corner of the room, the controller 163 may isolate that section for maintenance rather than replacing the entire floor. This targeted maintenance approach may significantly reduce material costs and labor requirements, optimizing repair strategies while preserving structural integrity.

The controller 163 may also integrate historical maintenance records to assess whether a specific flooring section within 260B has undergone previous repairs. If a particular flooring material has repeatedly failed in the same location, the controller 163 may recommend using an alternative material or upgrading to a higher durability surface. For example, if a marble section has shown recurrent cracks, the system may suggest replacing it with reinforced tiles that offer greater resistance to load-bearing stress.

In some embodiments, the controller 163 may generate multiple maintenance execution plans based on different approaches to resolving the flooring issue. For example, the controller 163 may present the user with an option to patch repair damaged sections, completely replace the flooring with the same material, or upgrade to a new flooring type with enhanced durability. Each maintenance execution plan may include cost estimations, material requirements, and projected labor time.

The system may further automate procurement recommendations by cross-referencing the required materials with available inventory. If the controller 163 determines that sufficient flooring material is available within an inventory database (e.g., inventory 194 in FIG. 1J), it may suggest using in-stock items rather than ordering new materials. If the required materials are not available, the controller 163 may present real-time purchase options from different vendors, similar to the procurement interface shown in FIG. 2F.

To enhance decision-making, the user may receive a detailed comparison of repair options, showing the differences in cost, material longevity, and labor time. In some embodiments, the controller 163 may apply AI-based simulations to predict the long-term performance of each repair option, estimating how various materials will age over time based on environmental conditions and usage patterns.

The interactive user interface may allow the user to modify maintenance execution plans, such as selecting an alternative flooring pattern, adjusting the scope of repair, or assigning priority levels to specific sections of the flooring. In scenarios where maintenance is urgent, the controller 163 may expedite procurement workflows by directly initiating vendor orders or notifying maintenance teams for immediate action.

Furthermore, in some implementations, the controller 163 may synchronize with building management schedules to minimize disruption during flooring repairs. If the selected portion 260B is a high-traffic area, the system may suggest conducting maintenance during off-peak hours or in scheduled phases to avoid inconvenience. Additionally, the controller 163 may provide estimated completion timelines, allowing building occupants to plan accordingly.

In some embodiments, for example, if the selected portion 260B has a total area of 1200 square feet, the controller 163 may determine the number of flooring units required based on the dimensions of available tiles or marble pieces. If the user selects a tile size of 2 feet by 2 feet (4 square feet per tile), the controller 163 may compute the total number of tiles required by dividing the total area by the tile area, yielding 300 tiles (1200 sq ft÷4 sq ft per tile=300 tiles). Similarly, if the user selects smaller tiles measuring 1 foot by 1 foot (1 square foot per tile), the controller 163 may determine that 1200 tiles are required for complete flooring replacement. The controller 163 may dynamically adjust these calculations if the user selects different tile sizes, such as 3 feet by 3 feet (9 sq ft per tile), which would require 134 tiles (1200 sq ft÷9 sq ft per tile=134 tiles).

Additionally, the controller 163 may account for tile wastage due to cutting, breakage, or improper alignment during installation. In some implementations, the controller 163 may add an extra 5-10% of tiles to compensate for waste, depending on the floor layout and complexity of installation. For example, if the wastage factor is set at 10%, the controller 163 may recommend procuring 330 tiles instead of 300 (300 tiles+10% extra=330 tiles) for a 2×2 foot tile configuration. The system may also allow users to adjust this waste margin manually or automatically determine it based on prior installation data and historical maintenance logs.

In some embodiments, the controller 163 may enable a user to specify what aspects need to be analyzed for the selected portion 260B through an additional user input 263. The additional user input 263 may be provided via an interactive user interface that allows the user to define specific parameters for analysis. The user input 263 may include, but is not limited to, selecting a flooring material type, specifying a maintenance action such as repair or replacement, defining a budget constraint, or setting a time limit for completing the flooring modification. Upon receiving the additional user input 263, the controller 163 may analyze the input parameters in conjunction with the existing data associated with the selected portion 260B, including but not limited to, floor conditions, previous maintenance history, material availability, and environmental factors such as temperature and humidity that may affect the choice of flooring materials.

The controller 163 may then generate detailed information based on the additional user input 263. The generated information may include a list of flooring options 265A-265G, which presents various materials that can be used for the selected portion 260B. The list may include details such as the currently installed flooring material in the selected portion 260B, which in this example may be wooden tile 265A. The user may decide to proceed with repairing the existing flooring using the same material or may opt to replace the flooring entirely with another option from 265B-265G. The selection of a new flooring material may depend on various factors such as material durability, cost constraints, installation time, and the specific aesthetic or functional requirements of the building.

The list of material options 265A-265G may include additional fields 264A-264F, each representing important attributes associated with the flooring options. Field 264A represents Material Details, listing different flooring materials such as wooden tile 265A, ceramic tile 265B, porcelain 265C, glossy tiles 265D, natural stone 265E, mosaic tile 265F, and paving blocks 265G. Each material may have unique properties influencing its suitability for different environments. For example, ceramic tile 265B may offer enhanced moisture resistance, making it preferable for bathrooms or kitchens, whereas natural stone 265E may be chosen for its aesthetic appeal and durability in high-traffic areas.

Field 264B represents Size, which indicates the dimensions of each flooring material. Different flooring sizes may impact installation efficiency and material utilization. For example, wooden tile 265A has a size of 1×2 ft, whereas glossy tiles 265D have a size of 4×4 ft. The controller 163 may calculate the number of tiles required for the selected portion 260B based on its area and the selected tile size.

Field 264C represents Inventory Availability, which may indicate whether a particular flooring material is available in stock or requires procurement. For example, the wooden tile 265A has 13 pieces available in inventory, whereas the ceramic tile 265B has no stock and would require ordering from a supplier.

Field 264D represents the Quantity Needed, which specifies the number of flooring units required to cover the selected portion 260B. The controller 163 may determine the required quantity based on the area dimensions and the chosen tile size. For example, for a 1200 sq ft selected portion 260B, if glossy tiles 265D (4×4 ft) are chosen, the required quantity would be 75 pieces. However, if mosaic tiles 265F (1×1 ft) are selected, the required quantity would be significantly higher at 1145 pieces.

Field 264E represents Maintenance Time, which provides an estimate of how long it would take to install or repair the flooring with the selected material. The controller 163 may calculate this based on previous maintenance records, real-time workforce availability, and estimated work rates per material. For example, installing porcelain tiles 265C may take 40 hours, whereas laying paving blocks 265G may require 96 hours due to additional preparation and curing time.

Field 264F represents the Cost associated with each flooring material, which may include both material cost and estimated labor expenses. The cost may vary based on the material type, availability, and vendor pricing. For example, the wooden tile 265A costs $2348 for the required quantity, whereas the ceramic tile 265B costs $6000 due to its higher price per unit and lack of stock.

The controller 163 may provide comparative data to help the user make an informed decision regarding the flooring material selection. This comparative data may include durability ratings, slip resistance, moisture resistance, environmental impact, and historical performance records from previous installations within the same or similar buildings. Additionally, the controller 163 may suggest alternative flooring combinations, such as using natural stone 265E in high-traffic areas while using glossy tiles 265D in decorative spaces.

In some embodiments, the controller 163 may also consider wastage factors when calculating the required quantity of flooring materials. For example, if porcelain tiles 265C require 300 pieces based on surface area calculations, the controller 163 may recommend procuring an additional 5-10% to account for cutting losses, breakage during handling, or future maintenance needs. This facilitates the availability of sufficient material without unnecessary excess.

Furthermore, the controller 163 may provide a breakdown of installation costs, including labor costs per hour, specialized tool requirements, and any surface preparation needed before installing a specific flooring material. For example, the controller 163 may determine that installing natural stone 265E requires additional leveling work, leading to increased labor hours compared to installing glossy tiles 265D.

Once the user selects a flooring material from the available options 265A-265G, the controller 163 may generate a finalized maintenance execution plan, including procurement details, labor scheduling, estimated completion timeline, and cost summary. The plan may be stored in a centralized database, allowing stakeholders to review and approve the proposed modifications before initiating the flooring work.

Figure 2H:
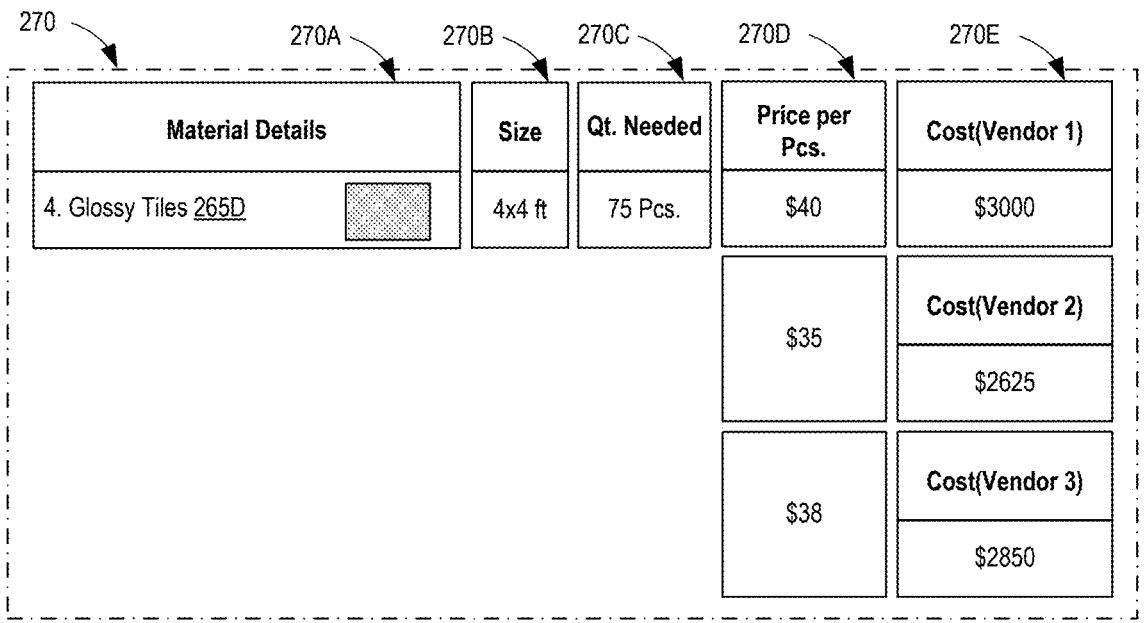

In some embodiments, the system may allow a user to select any of the flooring options 265A-265G, which may prompt the controller 163 to provide more detailed information about the selected component. This interaction may also provide an option to procure the selected flooring material directly through the user interface. For example, if the user selects glossy tiles 265D, the controller 163 may generate and display a secondary table 270, as shown in FIG. 2H. The table 270 may present a detailed breakdown of the selected flooring material, including specifications, available quantity, pricing, and vendor options.

The table 270 comprises multiple fields 270A-270E, each representing distinct attributes associated with the glossy tiles 265D. Field 270A represents Material Details, which specifies the flooring material that has been selected by the user for further analysis. In this instance, the glossy tiles 265D may be displayed along with a visual representation of its texture or pattern. The user may reference this image to confirm that the material meets their aesthetic or functional requirements.

Field 270B represents Size, which denotes the dimensions of the selected flooring material. In this example, glossy tiles 265D is specified as 4×4 ft, meaning that each tile covers 16 square feet of flooring space. The system may use this size information to calculate the required quantity of tiles based on the total area selected for flooring replacement.

Field 270C represents Quantity Needed, which provides an estimate of how many units of the selected flooring material may be required to cover the designated area. The controller 163 may determine this value based on the total area that needs to be covered and the size of the selected tile. For example, if the user has selected a 1200 sq ft section for renovation, the controller 163 calculates that 75 pieces of glossy tiles 265D are required.

Field 270D represents Price per Piece, which lists the individual cost of each glossy tile 265D from different suppliers. The system may retrieve real-time pricing data from an integrated procurement database or external vendor catalogs. In this example, the price per piece varies among vendors, with one vendor offering the tiles for $40 per piece, another vendor offering them at $35 per piece, and a third vendor listing them at $38 per piece.

Field 270E represents Vendor Pricing Comparisons, allowing the user to compare the total cost of purchasing the required number of tiles from different suppliers. The controller 163 calculates the total cost for each vendor by multiplying the price per piece by the quantity needed (75 pieces). As shown in FIG. 2H, the total cost for Vendor 1 may be $3000, for Vendor 2 may be $2625, and for Vendor 3 may be $2850. The user may select any vendor based on cost-effectiveness, availability, delivery time, or brand preference.

In some embodiments, the table 270 may also present additional procurement details, such as bulk discounts, delivery times, material warranties, and installation services offered by different vendors. For example, Vendor 1 may offer a discount for orders exceeding 100 pieces, while Vendor 2 may provide faster delivery times or free installation services. The system may highlight such incentives to assist the user in making an informed selection.

The system may also allow the user to modify the quantity required before finalizing the purchase. If the user believes that additional tiles are needed to account for breakage, wastage, or future repairs, they may manually increase the required quantity in Field 270C. The controller 163 may also suggest purchasing extra tiles based on historical maintenance records, industry standards, or real-time waste factor calculations.

Additionally, the system may provide alternative material recommendations in case the selected flooring option 265D is unavailable or out of stock. The user may receive suggestions for comparable flooring materials (e.g., ceramic tile 265B or natural stone 265E) based on factors such as price, durability, slip resistance, and aesthetic similarity. The user may then compare these alternatives within the same procurement table 270 and make a final decision.

Once the user selects a vendor from field 270E, the system may initiate automated procurement processing, which may include placing an order with the selected vendor, generating an invoice, and updating the maintenance execution plan. The controller 163 may log the procurement details in the building's maintenance history, so that records are maintained for future reference. The system may also provide the user with an estimated delivery date and installation schedule, facilitating smooth execution of the flooring replacement process.

In some embodiments, the procurement system may integrate with external supplier networks or online marketplaces, allowing real-time comparison of material availability and pricing. The user may access additional product specifications, reviews, or certifications from manufacturers before finalizing the purchase. This integration enhances transparency and enables the user to make informed decisions based on cost, quality, and vendor reputation.

A structural element refers to a fundamental physical component that contributes to the integrity, stability, and load-bearing capacity of a building. Structural elements include walls, columns, beams, slabs, foundations, flooring, and roofs, among others. These components form the framework of a building, supporting both static and dynamic loads and ensuring the durability of the construction. Structural elements may also encompass prefabricated modules, reinforced concrete structures, and metal frameworks that contribute to the architectural and functional aspects of the building.

A fixture is a permanently or semi-permanently attached component within a building that serves a specific function and is typically integrated into the infrastructure. Fixtures include plumbing elements such as sinks, faucets, toilets, and bathtubs, as well as electrical fixtures like light fittings, switches, ceiling fans, and HVAC vents. Fixtures may also extend to built-in storage units, kitchen cabinets, and countertops. Unlike appliances, fixtures are generally intended to remain fixed in place unless they require replacement or maintenance.

A space within a physical building refers to a designated area enclosed or defined by structural elements, intended for specific purposes such as residential, commercial, industrial, or institutional use. Spaces may include rooms, hallways, lobbies, offices, staircases, and open-plan areas. Spaces are defined based on functional requirements, occupancy, and accessibility, and they can be subdivided further into zones based on usage, such as living spaces, utility spaces, mechanical rooms, or common areas. Spaces may also be classified based on regulatory compliance, such as fire-rated zones, accessibility-compliant areas, and security-restricted sections.

An appliance is an independent functional unit installed within a building to perform specific mechanical, electrical, or electronic operations. Appliances include refrigerators, ovens, dishwashers, washing machines, dryers, water heaters, air conditioning units, and smart home devices. Unlike fixtures, appliances are not permanently fixed to the building's structure and may be relocated or replaced without modifying the building itself. Some appliances may be integrated with a BMS to provide real-time operational data, energy consumption analysis, and predictive maintenance alerts.

A building system refers to an interconnected network of components and subsystems that enable the efficient operation and management of a building's functional aspects. Building systems include electrical distribution systems, plumbing networks, fire suppression systems, HVAC (Heating, Ventilation, and Air Conditioning) systems, security and surveillance systems, and IoT-based smart building systems. These systems work collectively to regulate environmental conditions, provide utilities, maintain safety, and enhance occupant comfort. A building system may also integrate automated controls, predictive analytics, and remote monitoring capabilities to optimize operational efficiency and reduce maintenance costs.

Figure 2I:
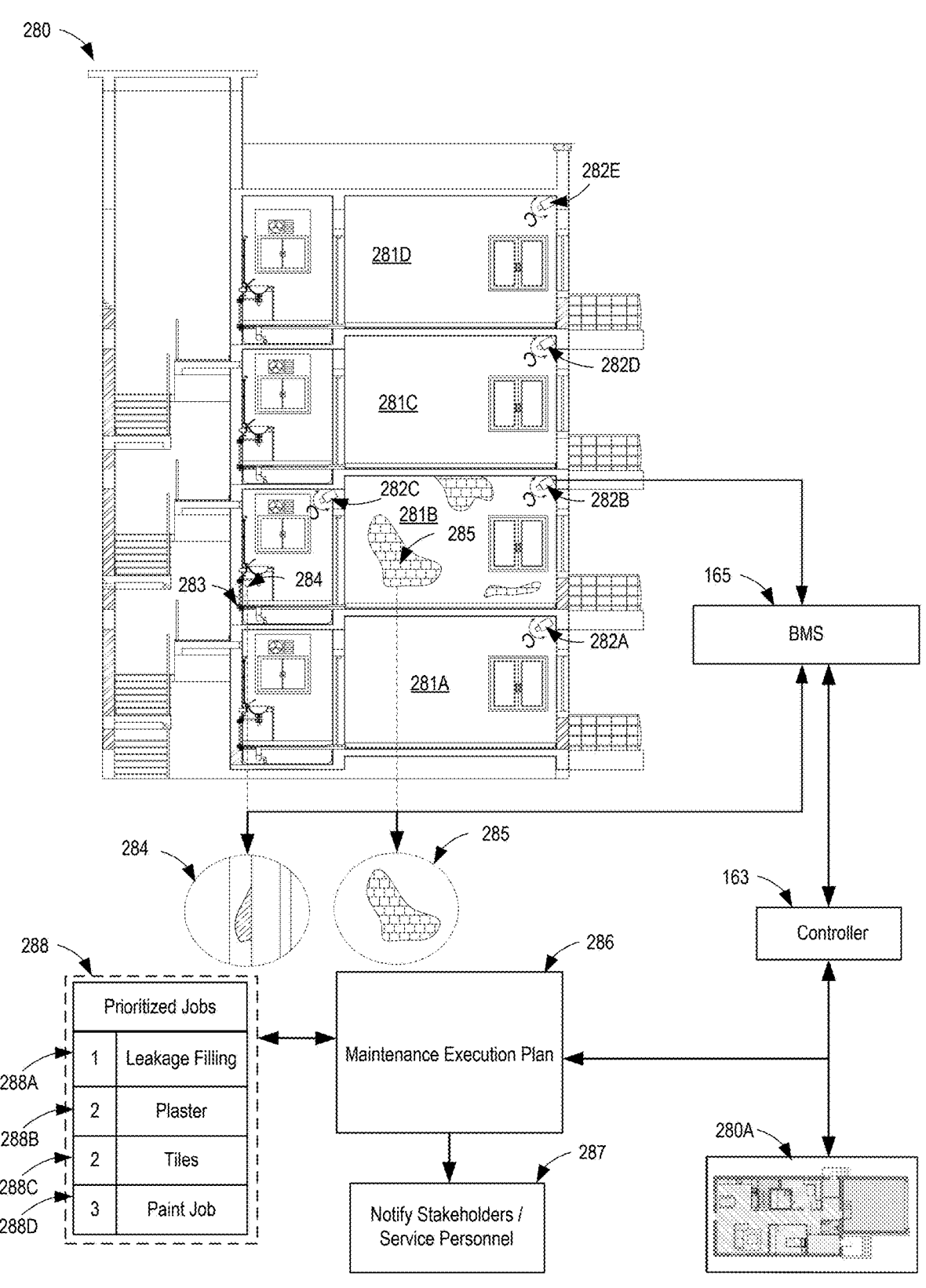
FIG. 2I illustrates a system for detecting problems in a constructed building using sensors or cameras, reflecting identified issues on the design plan, and prioritizing maintenance tasks for execution.

Referring now to FIG. 2I, an exemplary system and method are illustrated for detecting problems in a constructed physical building 280 using sensors or cameras, reflecting identified issues on the design plan 280A, and prioritizing maintenance tasks for execution. The building 280 comprises a plurality of floors 281A-281D, where each floor may include various sensors and monitoring devices that facilitate the detection of real-time conditions within the building 280. The sensors 282A-282E (e.g., cameras, or other IoT sensors) and a leakage sensor 283 may be connected to the BMS 165, which is responsible for aggregating and analyzing sensor data. The BMS 165 may be further connected to a cloud server that enables seamless data storage, retrieval, and processing, allowing for remote access by the controller 163. In some embodiments, the BMS 165 may also communicate directly and wirelessly with the controller 163 through a user device, utilizing the internet or a local network connection.

The controller 163 acts as the central processing unit for analyzing real-time sensor data and integrating it into the design plan 280A. The design plan 280A represents a digital twin of the constructed building 280, which is continuously updated based on the real-time sensor data and camera feeds. If changes occur in the building 280, such as newly installed components, replacements, damages, or faults detected in any elements, the controller 163 may automatically reflect these changes in the design plan 280A. In this way, the design plan 280A serves as a real-time visualization tool, allowing users such as maintenance personnel, building managers, or property owners to access up-to-date information regarding the building's status.

In some embodiments, the sensors 282A-282E installed across different floors 281A-281D may include environmental monitoring sensors, such as temperature sensors, humidity sensors, air quality sensors, pressure sensors, and motion detectors. These sensors may continuously monitor the environmental conditions inside the building 280 and relay data to the BMS 165, which further transmits the data to the controller 163 for analysis. The controller 163 may compare the collected data with predefined operational thresholds and determine whether any abnormalities or maintenance requirements exist. If a sensor detects a temperature anomaly (e.g., extreme heat or cold), the controller 163 may flag the issue on the design plan 280A and indicate potential causes, such as HVAC system failure, insulation degradation, or excessive power consumption.

The leakage sensor 283 may be strategically positioned in areas where water leakage is likely to occur, such as near water pipelines, sinks, restrooms, basements, or HVAC systems. If the leakage sensor 283 detects moisture beyond a predefined threshold, it may transmit a fault signal to the BMS 165, which further relays the information to the controller 163. The controller 163 may then identify the affected area on the design plan 280A and highlight the leakage issue for immediate attention. In addition, the controller 163 may analyze the historical maintenance logs to determine whether similar leaks have been previously detected in the same area. Based on this analysis, the controller 163 may suggest preventive actions, such as replacing old pipes, sealing cracks, or installing waterproofing materials.

The cameras 282A-282E positioned across different floors 281A-281D may be configured to capture real-time video feeds and images of the building 280. These cameras may serve multiple functions, such as detecting unauthorized access, monitoring maintenance activities, capturing visible damage to surfaces and fixtures, and analyzing wear-and-tear of structural components. If a camera 282C detects visible cracks in the wall of a room on the third floor (281B), the controller 163 may process the camera feed using image recognition algorithms and identify the severity of the crack. The controller 163 may then annotate the design plan 280A with an alert indicating that structural integrity assessment is required for that area. The controller 163 may also retrieve past records of maintenance work in that location to assess whether the crack has been previously reported or repaired.

In some embodiments, the BMS 165 may interface with smart home devices and IoT-enabled appliances within the building 280 to detect anomalies in their operation. For example, if a connected HVAC unit on the second floor (281C) experiences power fluctuations or unexpected shutdowns, the BMS 165 may register these incidents and notify the controller 163. The controller 163 may correlate this information with sensor data from temperature and humidity sensors, determining whether environmental changes in the building are linked to HVAC malfunction. The controller 163 may then mark the affected HVAC unit on the design plan 280A, providing maintenance personnel with real-time diagnostic insights.

The controller 163 may also facilitate predictive maintenance by analyzing long-term data trends collected from the BMS 165 and sensors 282A-282E. Instead of reacting to faults only when they occur, the controller 163 may anticipate potential failures based on historical data. For example, if a vibration sensor installed on an elevator motor consistently records increasing vibration levels, the controller 163 may predict an impending mechanical failure and suggest preemptive maintenance before the issue escalates.

The controller 163 may integrate user input mechanisms, allowing users to interact with the design plan 280A through a touchscreen interface, voice commands, or augmented reality (AR) devices. If a maintenance worker inspects a particular sensor or camera 282B in the physical building 280, they may manually confirm whether the detected issue matches real-world observations. If any discrepancy exists, the user may override the automated system's diagnosis and manually update the status of the affected component within the design plan 280A.

The BMS 165 may also facilitate energy monitoring and efficiency tracking by aggregating data from power meters, smart lighting systems, and HVAC units. The controller 163 may process this information to determine energy consumption trends, detect abnormal power usage, and recommend energy-saving actions. If a particular section of the building 280 consistently consumes excessive electricity, the controller 163 may notify facility managers through the design plan 280A, enabling them to investigate inefficiencies such as outdated lighting, excessive HVAC use, or faulty electrical wiring.

In some embodiments, the controller 163 may utilize machine learning algorithms to improve fault detection accuracy over time. By analyzing large datasets of historical faults, maintenance actions, and sensor readings, the controller 163 may enhance its ability to distinguish between minor anomalies and major faults, reducing false alarms and unnecessary maintenance interventions.

The BMS 165 may also connect to external regulatory databases to facilitate adherence to safety codes and compliance standards. If a detected issue violates a building regulation, the controller 163 may generate a compliance report and recommend actions for rectification.

In some embodiments, the sensing elements integrated within the building 280 may continuously monitor the condition of various components and structural elements, detecting faults or degradations that require maintenance. For example, in the floor 281B, the camera 282B may capture images or video feeds of the flooring installed within that section. The captured images or video feeds may then be transmitted to the BMS 165, which subsequently forwards them to the controller 163 for further analysis. The BMS 165 may perform preliminary image processing, extracting relevant structural information from the images, and identifying surface irregularities, such as cracks, discoloration, chipping, or tile displacement. In some cases, the BMS 165 may utilize edge-detection techniques, pattern recognition algorithms, and machine learning models to analyze visual defects in the flooring. Alternatively, the controller 163 may perform an in-depth image analysis, comparing the captured flooring images with historical images stored in a database, identifying progressive degradation over time, and determining the severity of the identified faults.

Similarly, in the floor 281A, the BMS 165 and/or the controller 163 may determine the presence of a leakage 284 on a bathroom wall using data from the camera 282C and/or the leakage sensor 283. The leakage sensor 283 may detect abnormal moisture levels or water seepage, transmitting this information to the BMS 165. The BMS 165 may analyze the moisture intensity, spread pattern, and leakage rate, while the controller 163 may correlate this information with data from temperature sensors, humidity sensors, and previous maintenance logs to determine the cause and potential consequences of the leakage. If the leakage is detected near an electrical panel, the controller 163 may flag it as a high-risk issue, requiring immediate intervention. The controller 163 may also determine whether the leakage has been previously reported or whether similar issues have been detected in adjacent areas, helping maintenance personnel identify recurring problems.

Once the controller 163 has identified faults, such as the tile degradation 285 and the leakage 284, it may reflect these issues as maintenance requirements on the digital twin design plan 280A. The controller 163 may overlay graphical indicators on the affected areas, providing real-time alerts that notify users, facility managers, and maintenance personnel about the issues detected. The digital twin representation 280A allows users to interact with the detected faults, retrieving additional details about the nature, severity, and potential causes of each issue. Additionally, if multiple faults are identified within a single floor or across different levels of the building 280, the controller 163 may analyze their interdependencies and evaluate how one fault may impact other elements within the building.

Based on the analysis, the controller 163 may generate a maintenance execution plan 286, outlining what actions need to be taken to resolve the detected faults, along with detailed specifications for labor, materials, costs, and the estimated completion time for each identified maintenance task. For example, for the tile degradation 285, the maintenance execution plan 286 may include steps for removing broken tiles, cleaning the affected area, installing replacement tiles, and applying finishing treatments. Additionally, the controller 163 may retrieve inventory data to check whether the required tiles are available within the building's stored materials, or whether new tiles need to be procured. If tiles need to be ordered, the controller 163 may generate a list of available vendors, providing cost comparisons and estimated delivery timelines.

Similarly, for the leakage 284, the controller 163 may generate a set of maintenance steps, including isolating the water source, identifying cracks or pipe failures, repairing the damaged section, and applying waterproofing materials to prevent future leaks. The controller 163 may also analyze whether the leakage 284 has affected adjacent areas, such as wooden flooring, electrical wiring, or structural supports, and include remedial actions for these elements in the maintenance execution plan 286.

The controller 163 may also send notifications or alerts 287 to stakeholders, informing them of pending maintenance tasks and the execution timeline. These notifications may be sent to building owners, facility managers, maintenance teams, or external contractors, depending on the nature of the issue and the level of expertise required to address it. For urgent or high-priority issues, the controller 163 may generate immediate alerts, prompting an emergency response.

Additionally, in some embodiments, the controller 163 may prioritize maintenance tasks based on their interdependencies and urgency levels, assigning a priority ranking 288 to each task. The priority ranking 288 may be determined based on several factors, including the severity of the fault, the potential risk to the building's structural integrity, the impact on occupant safety, and the efficiency of performing related tasks together. In the present embodiment, the controller 163 assigns the leakage filling task 288A as priority 1, meaning it must be addressed first before any other maintenance task is executed. The controller 163 recognizes that if the leakage 284 is not repaired first, subsequent repairs, such as plastering 288B or tile replacement 288C, may be compromised if moisture continues to affect the area.

The plastering task 288B and tile replacement task 288C are assigned the same priority level (2), meaning that they may be executed in any order, as long as the leakage repair 288A is completed beforehand. This flexibility allows maintenance teams to optimize their workflow, scheduling plastering and tiling work based on resource availability. Finally, the paint job 288D may be given the lowest priority (3) since painting should only be done after the underlying structural issues are resolved.

By systematically ranking maintenance tasks, the controller 163 prevents redundant work and facilitates that repairs are performed in the most efficient sequence. For example, if the paint job 288D were performed before fixing the leakage 284, the fresh paint could get damaged when the leak repair work is done later, leading to additional costs and unnecessary rework. Similarly, if the tiles 285 were replaced before the plastering 288B, the plastering process could cause dust accumulation on new tiles, necessitating additional cleaning efforts.

In some embodiments, the controller 163 may be configured to establish direct communication with sensing elements (282A-282E, 283), including IoT sensors and cameras, within the physical building 280 through network-based connections such as the Internet, Wi-Fi, Bluetooth, or other wireless communication protocols, without requiring integration with the BMS 165. The controller 163 may independently access real-time data streams from these sensing elements to monitor conditions such as temperature, humidity, air quality, electrical load fluctuations, water leakage, structural stress, or material degradation. For example, a set of temperature sensors installed in different zones of the building 280 may transmit data directly to the controller 163 over a Wi-Fi network, enabling the controller 163 to detect overheating in a specific area and trigger an alert. Similarly, a smart camera positioned in a maintenance zone may continuously capture and analyze images to identify physical degradation, such as cracks in walls or flooring, and relay the detected issue directly to the controller 163 without relying on intermediary processing via the BMS 165. This direct communication capability allows for a more flexible and scalable maintenance management system, particularly in buildings where a centralized BMS 165 is either absent, outdated, or incapable of supporting advanced predictive maintenance analytics. Additionally, the controller 163 may execute real-time analysis on the received data, generating maintenance alerts, associating detected anomalies with corresponding dynamic components in the design plan, and updating maintenance logs accordingly.

Figure 3A:
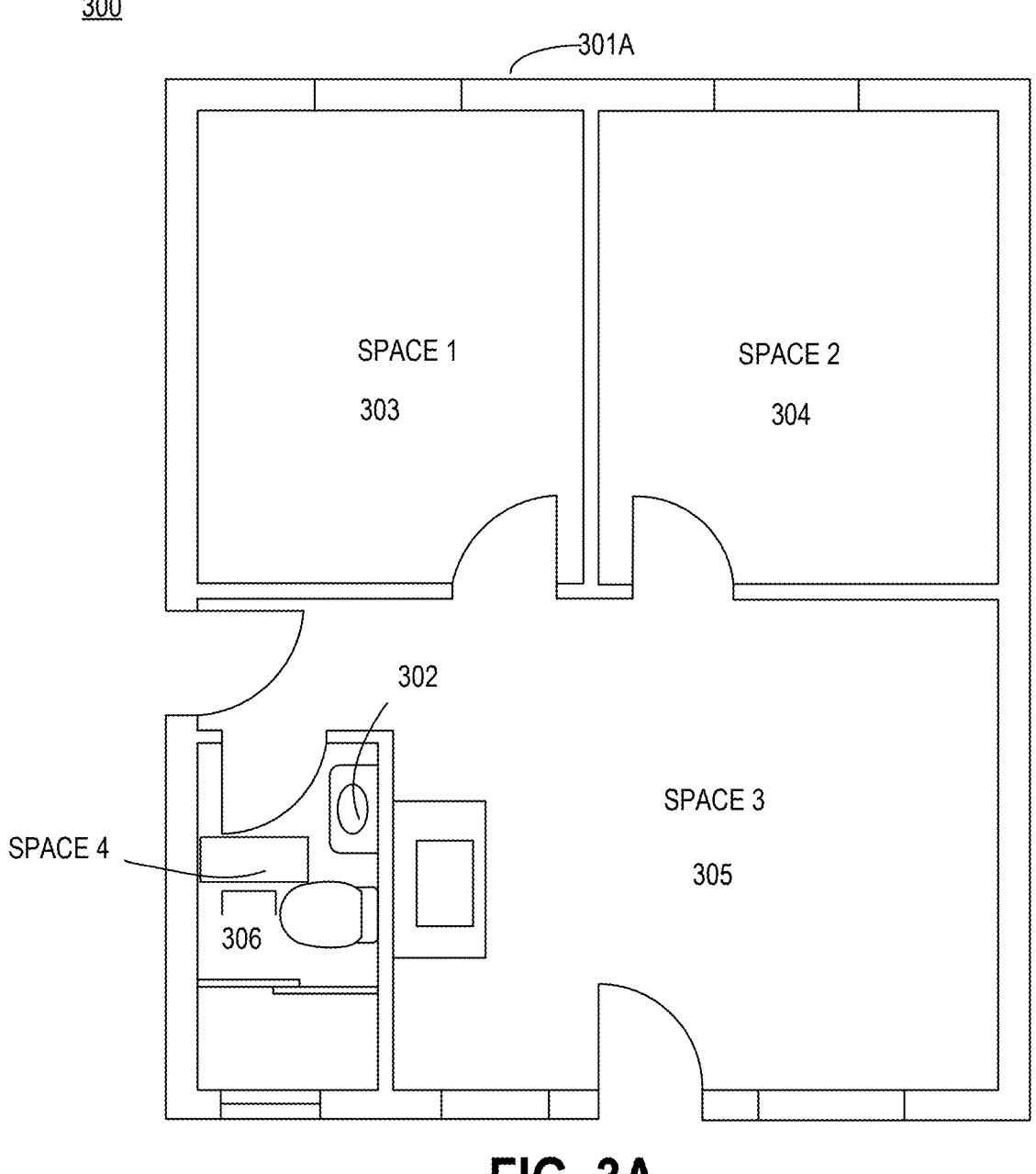
Figure 3B:
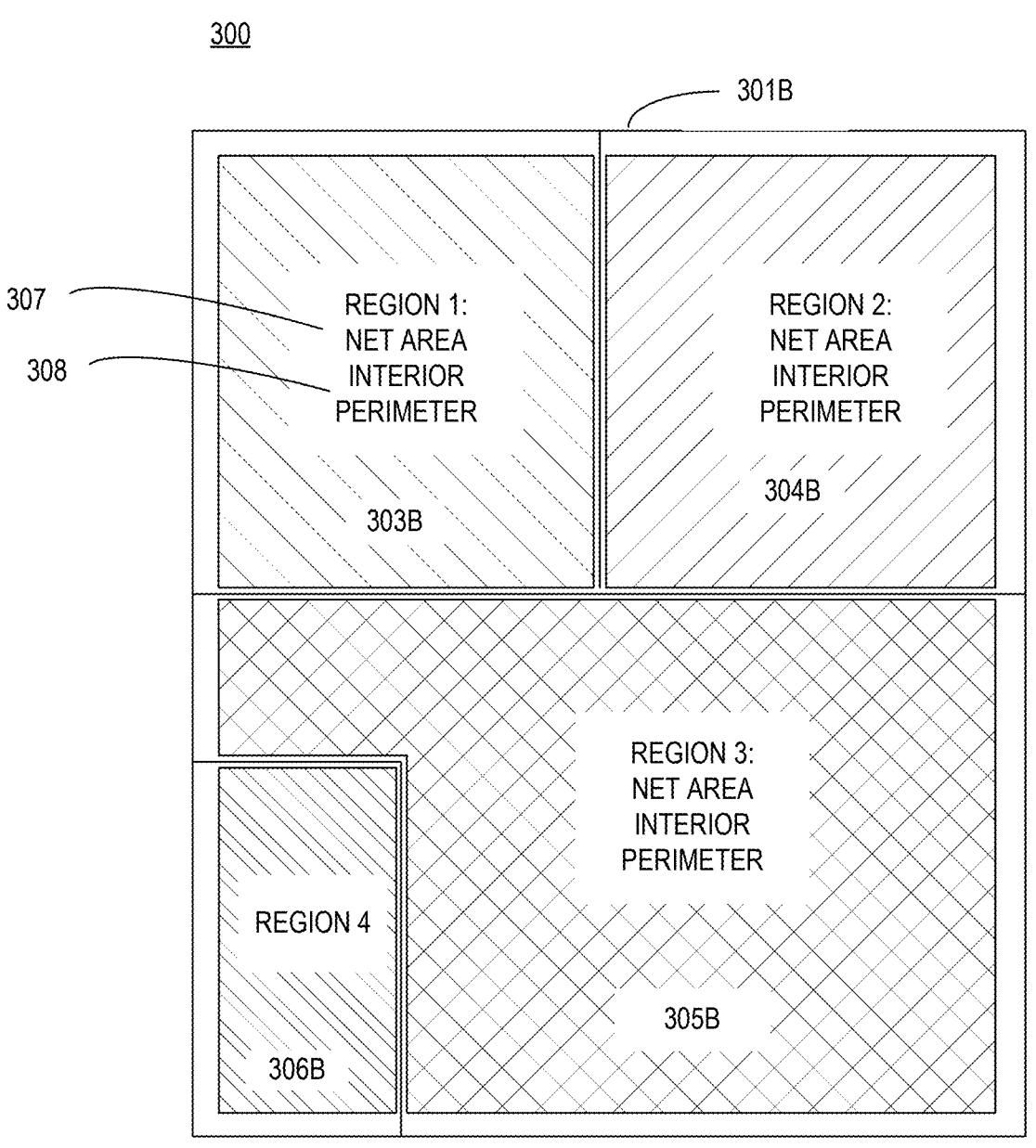
Figure 3C:
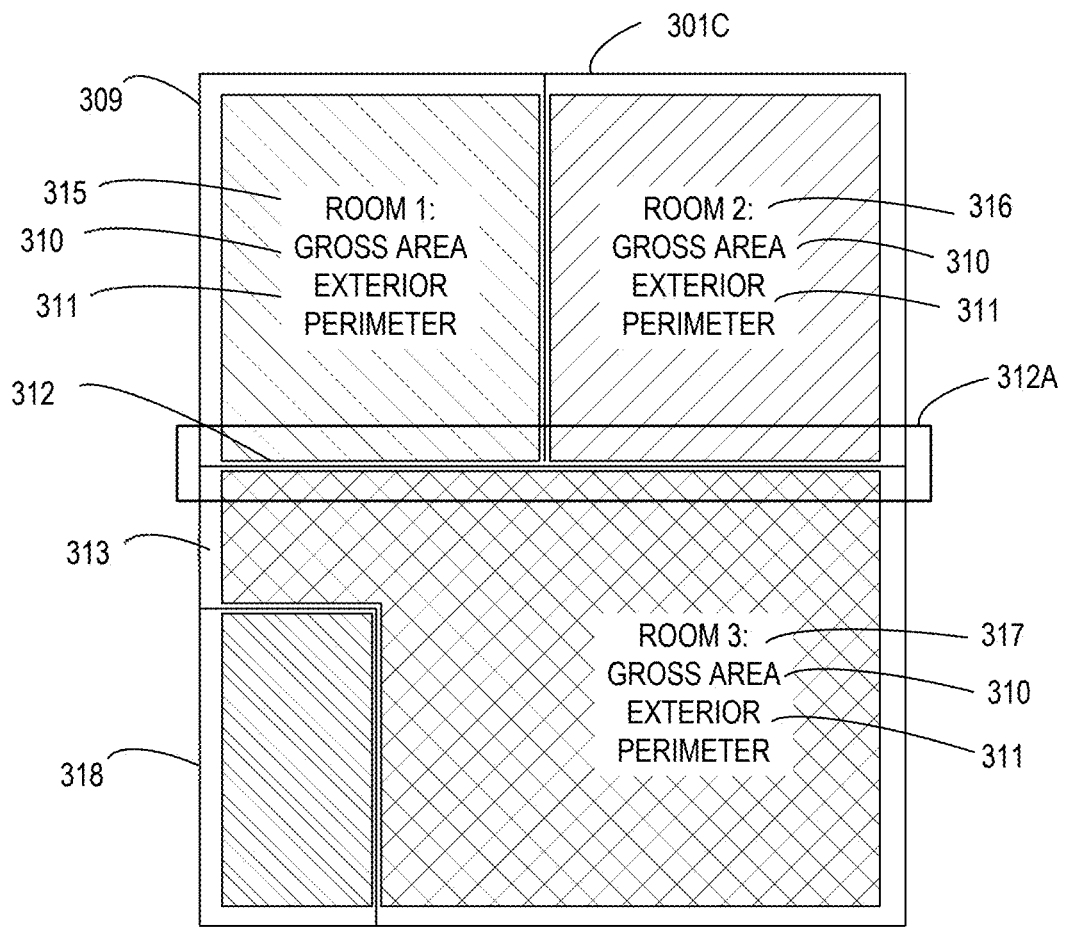

Referring now to FIGS. 3A-3C a user interface 300 may generate multiple different user views, each view has different aspects related to the two-dimensional reference drawing inputted. For example, referring now to FIG. 3A, a user interface 300 with a replication view 301A may include replication of an original floor plan represented by a two-dimensional reference, without any controller-added features, vectors, lines, or polygons integrated or overlaid into the floorplan. The replication view 301A includes various spaces 303-306 that are undefined in the replication view 301A but may be defined during the processes described herein. For example, some or all of a space 303-306 may correlate to a region in a region view 301B.

The replication view 301A, may also include one or more fixtures 302. A rasterized version (or pixel version) of the fixtures 302 may be identified via an AI engine. If a pattern is present that is not identified as a fixture 302, a user may train the AI engine to recognize the pattern as a fixture of a particular type. The controller may generate a tally of multiple fixtures 302 identified in the two-dimensional reference. The tally of multiple fixtures 302 may include some or all of the fixtures identified in the two-dimensional reference and may be used to generate an estimate for completion of a project illustrated by, or otherwise represented by, the two-dimensional reference.

Referring now to FIG. 3B, in the user interface 300 a user may specify to a controller that one of multiple views available is to be presented via the interface. For example, a user may designate via an interactive portion of a screen displaying the user interface 300 that a region view 301B be presented. The region view 301B may identify one or more regions and/or spaces 303B-306B identified via processing by a controller, such as, for example, via an AI engine running on the controller. The region view 301B may include information about one or more regions 303-306 delineated in the region view 301B of the user interface 300. For example, the controller may automatically generate and/or display information descriptive of one or more of: user displays, printouts or summary reports showing a net interior area 307 (e.g., a calculation of square footage available to an occupant of a region), an interior perimeter 308, a type of use a region 303B-306B will be deployed for, or a particular material to be used in the region 303B-306B. For example, Region 4 306B may be designated for use as a bathroom; and flooring and wallboard associated with Region 4 may be designated as needing to be waterproof material.

Referring now to FIG. 3C, a gross area region view 301C and 309 is illustrated. As illustrated in FIG. 3B, a user interface may include interactive devices for display of additional parameters, such as, for example, one or more of: a net interior area 307 may generate a designation of a value that is in contrast to a gross area 310 and exterior perimeter 311. The selection of gross area 310 may be more useful to a proprietor charging for a leased space, but may be less useful to an occupant than a net interior area 307 and interior perimeter 308. One or more of the net interior areas 307, interior perimeter 308 gross area 310 and exterior perimeter 311 may be calculated based upon analysis by an AI engine of a two-dimensional reference.

In addition, a height for a region may also be made available to the controller and/or an AI engine, then the controller may generate a net interior volume and vertical wall surface areas (interior and/or exterior).

In some embodiments, an output, such as a user interface of a computing device, smart device, tablet and the like, or a printout or other hardcopy, may illustrate one or both of:

a gross area 310 and/or an exterior perimeter 311. Either output may include automatically populated information, such as the gross area of one or more rooms (based upon the above boundary computations) or exterior perimeters of one or more rooms.

In some embodiments, the present invention calculates an area bounded within a series of polygon elements (such as, for example, using mathematical principals or via pixel counting processes), and/or line segments.

In some embodiments, in an area of a bounded by lines intersecting at vertices, the vertices may be ordered such that they proceed in a single direction such as clockwise around the bounded area. The area may then be determined by cycling through the list of vertices and calculating an area between two points as the area of a rectangle between the lower coordinate point and an associated axis and the area of the triangle between the two points. When a path around the vertices reverses direction, the area calculations may be performed in the same manner, but the resulting area is subtracted from the total until the original vertex is reached. Other numerical methods may be employed to calculate areas, perimeters, volumes, and the like.

These views may be used in generating estimation analysis documents. Estimation analysis documents may rely on fixtures, regional area, or other details. By assisting in generating net area, estimation documents may be generated more accurately and quickly than is possible through human-engendered estimation parameters.

With reference now again to FIGS. 3B and 3C, regions 303B-306B defined by an AI engine may include one or more Rooms in FIG. 3B subsequently have regions assigned as "Rooms" in FIG. 3C.

Referring now to FIG. 3D, a table is illustrated containing hierarchical relationships between area types 322-327 that may be defined in and/or by an AI engine and/or via the user interface. The area types 322-327 may be associated with dominance relationship values in relation to adjacent areas. For example, a border region 312-313 (as illustrated in FIG. 3C) will have an area associated with it. According to the present invention, an area 315-318 associated with the border region 312-313 may have an area type 322-327 associated with the area 315-318. An area 312A included in the border region 312-313 may be allocated according to a ratio based upon a dominance ranking of one feature as compared to another feature, which may be represented as a hierarchical relationship between the features, such as, for example, adjacent areas (e.g., area 315 and area 317 or area 317 and area 318), the hierarchical relationship may be used to generate a dominance ranking of one area over another area, or to ascertain factors useful in one or both of: annotating a design element or modifying a design element. For example, a dominance ranking may allocate space used to calculate one or more of: an occupancy load; a width and/or area of an egress path; a width and/or area of a common path; a length of a dead-end; egress capacity; and travel distance from a furthest point. In this context, regions assigned a higher dominance ranking are designated to be inherently associated with elevated safety standards.

Some embodiments of the present invention allocate one or more areas according to a user input (wherein the user input may be programmed to override and automated hierarchical relationship or be subservient to the automated hierarchical relationship). For example, as indicated in the table, a private office located adjacent to a private office may have an area in a border region split between the two adjacent areas in a 50/50 ratio, but a private office adjacent to a general office space may be allocated 60 percent of an area included in a border region, and so on.

Dominance associated with various areas or regions may be systemic throughout a project, according to customer preference, indicated on a two-dimensional reference by two-dimensional reference basis or another defined basis.

Figure 4A:
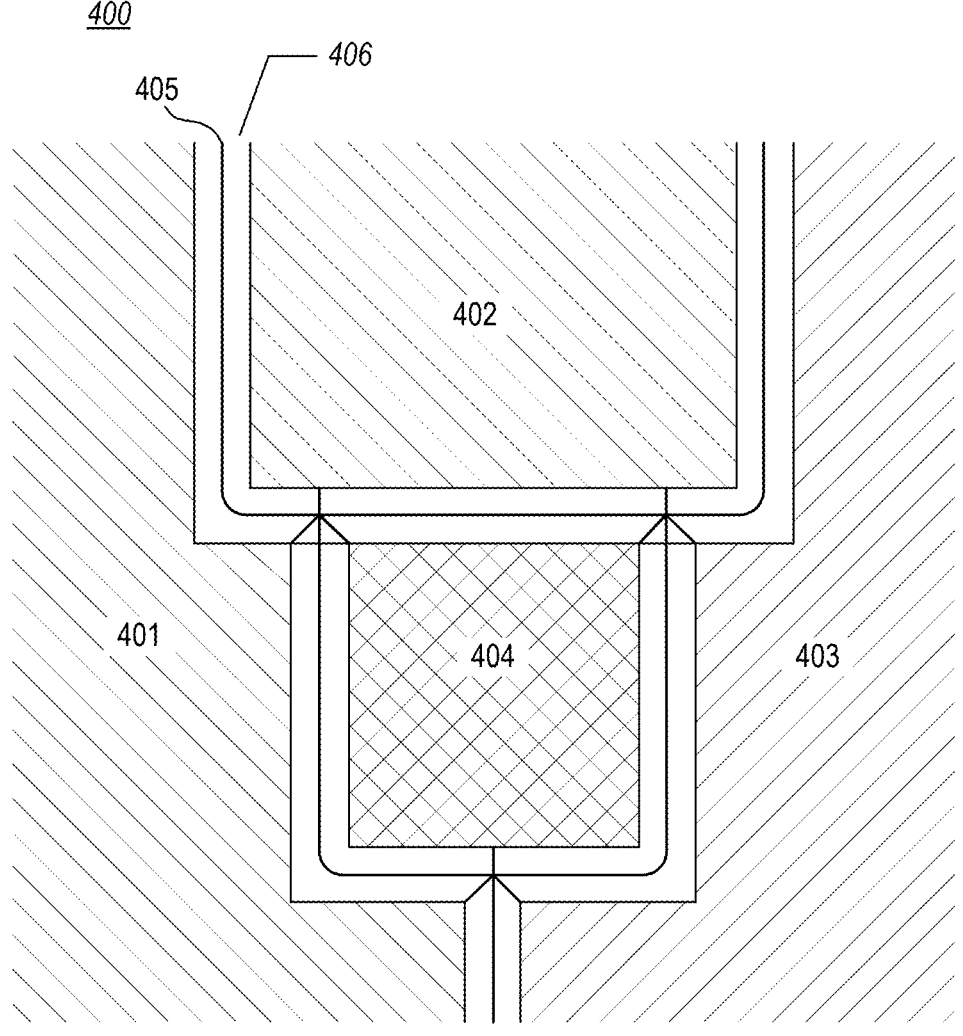

Referring now to FIG. 4A, an exemplary user interface 400 may include boundaries (which, as discussed above, may include one or more of: line segments, polygons, and icons) and regions overlaid on aspects included in a two-dimensional reference is illustrated. A defined space within a boundary (sometimes referred to as a region or area) may include an entire area within perimeters of a structure.

For example, a controller running an AI engine may determine locations of boundaries, edges, and inflections of neighboring and/or adjacent areas 401-404. There may be portions of boundary regions 405 and 406 that are initially not associated with an adjacent area 401-404. The controller may be operative via executing software in the AI engine to determine the nature of respective adjacent areas 401-404 on either side of a boundary and apply a dominance-based ranking upon an area type, or an allocation of respective areas 401-404. Different classes or types of spaces or areas may be scored to be equal to, dominant (e.g., above) others or subservient (e.g., below) others.

Referring now to FIG. 4B, an exemplary table A indicating classes of space types and their associated ranks 411-413. In some embodiments, a controller may be operative via execution of software to determine relative ranks associated with a region on one or either side of a boundary. For example, area 402 may represent office space and area 404 may represent a stairwell. An associated rank lookup value for office space may be found at rank 411, and the associated rank lookup value for stairwells may be found at rank 413. Since the rank 412 of stairwells may be higher, or dominant, over the rank 411 of office space then the boundary space may be associated with the dominant stairs 412 or stairwell space. In some embodiments, a dominant rank may be allocated to an entirety of boundary space at an interface region. In other examples, more complicated allocations may be made where the dominant rank may get a larger share of boundary space than another rank allocated by some functional relationship. In still other examples (Table B), controller may execute logical code to be operative to assign pre-established work costs to elements identified within boundaries.

In some embodiments, a boundary region may transition from one set of interface neighbors to a different set. For example, again in FIG. 4A, a boundary 405 between office region 402 and stairwell 404 may transition to a boundary region between office region 402 and unallocated space 403. The unallocated space may have a rank associated with the unallocated space 403 that is dominant. Accordingly, the nature of allocated boundary space 405 may change at such transitions where one space may receive allocation of boundary space in one pairing and not in a neighboring region. The allocation of the boundary space 405 may support numerous downstream functionalities and provide an input to various application programs. Summary reports may be generated and/or included in an interface based upon a result after incorporation of assignment of boundary areas.

In another aspect, in FIG. 4B, a table 422 illustrates fields 414 that may have variable values 415-421 designated by an AI engine or other process run by a controller based upon the two-dimensional reference, such as a floor plan, design plan or architectural blueprint. For example, as illustrated, variables 415-421 may include a unit 415, a work type 416, work quantity 417, work hours 418, additional cost 419, expedite cost 420, and line-item cost 421. In some embodiments, the variables 415-421 may include aspects that may affect one or more of: one or both of: annotating a design element, modifying a design element, or modifying a physical version of the design element. In other embodiments, the variables 415-421 may include design considerations for the fields 414.

The determination of boundary definitions for a given inputted design plan, which may be a single drawing or set of drawings or other image, has many important uses and aspects as has been described. However, it can also be important for a supporting process executed by a controller, such as an AI algorithm to take boundary definitions and area definitions and generate classifications of a space. As mentioned, this can be important to support processes executed by a controller that assigns boundary areas based on dominance of these classifications.

Classification of areas can also be important for further aggregations of space. In a non-limiting example, accurate automatic classification of room spaces may allow for a combination of all interior spaces to be made and presented to a user. Overlays and boundary displays can accordingly be displayed for such aggregations. There may be numerous functionalities and purposes for automatic classification of regions from an input drawing.

An AI engine or other process executed by a controller may be refined, trained, or otherwise instructed to utilize a number of recognized characteristics to accomplish area classification. For example, an AI engine may base predictions for a type "/"category" of a region with a starting point of the determination that a region exists from the previous predictions by the segmentation engine.

In some embodiments, a type may be inferred from text located on an input drawing or other two-dimensional reference. An AI engine may utilize a combination of factors to classify a region, but it may be clear that the context of recognized text may provide direct evidence upon which to infer a decision. For example, a recognized textual comment in a region may directly identify the space as a bedroom, which may allow the AI engine to make a set of hierarchical assignments to space and neighboring spaces, such as adjoining bathrooms, closets, and the like.

Classification may also be influenced by, and use, a geometric shape of a predicted region. Common shapes of certain spaces may allow a training set to train a relevant AI engine to classify a space with added accuracy. Furthermore, certain space classes may typically fall into ranges of areas which also may aid in the identification of a region's class. Accordingly, it may be important to influence the makeup of training sets for classification that contain common examples of various classes as well as common variations on that theme.

Figure 5A:
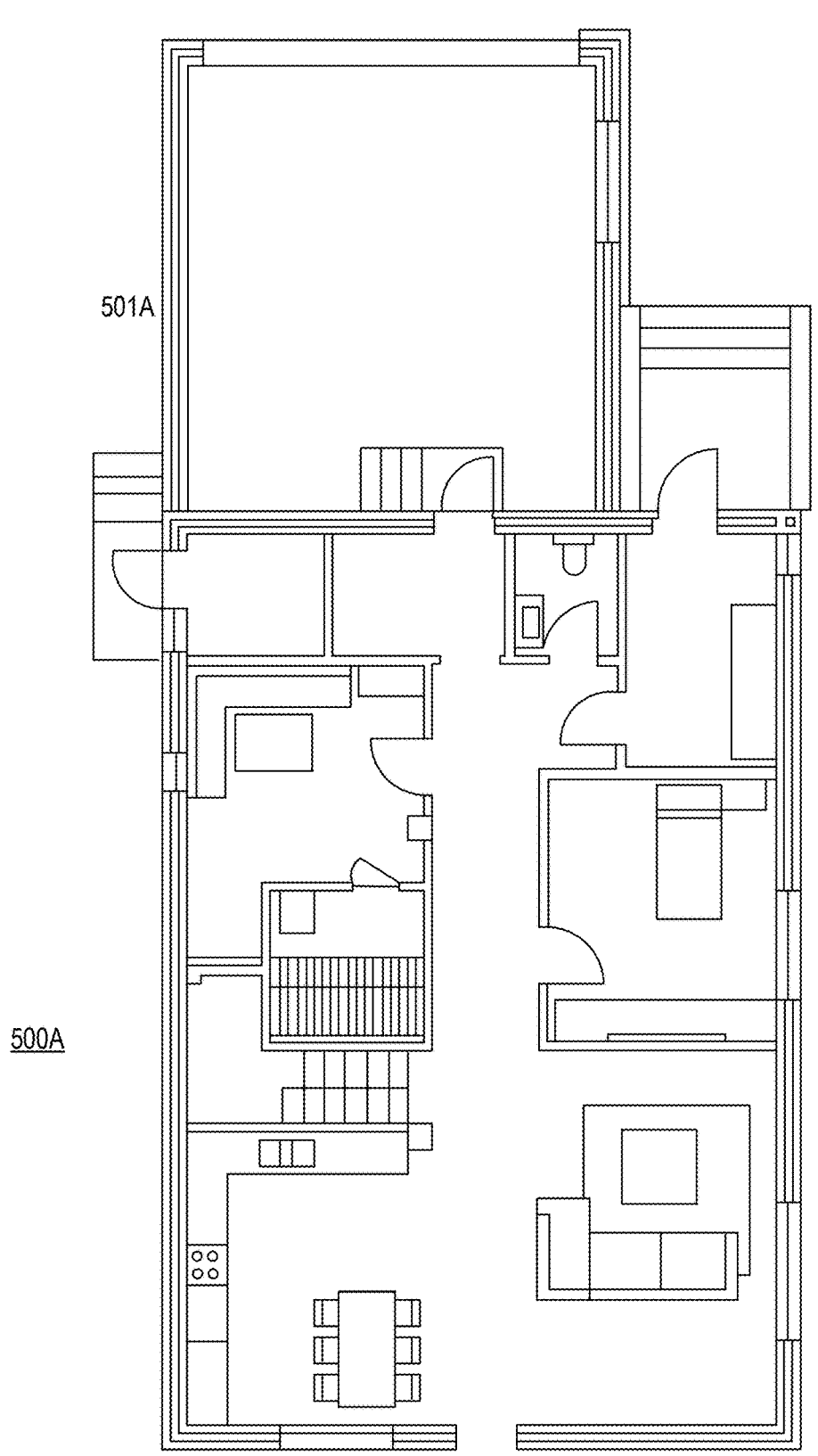
FIGS. 5A-5D illustrate various aspects of region identification and area allocation.

Referring now to FIGS. 5A-5D, a progressive series of outputs that may be included in various user interfaces are illustrated and provide examples of a recognition process that may be implemented in some embodiments of the present invention. Referring now to FIG. 5A, a relatively complex drawing of a floorplan may be input as a design plan 501A into a controller running an AI engine. The two-dimensional reference 501 may be included in an initial user interface 500A.

Figure 5B:
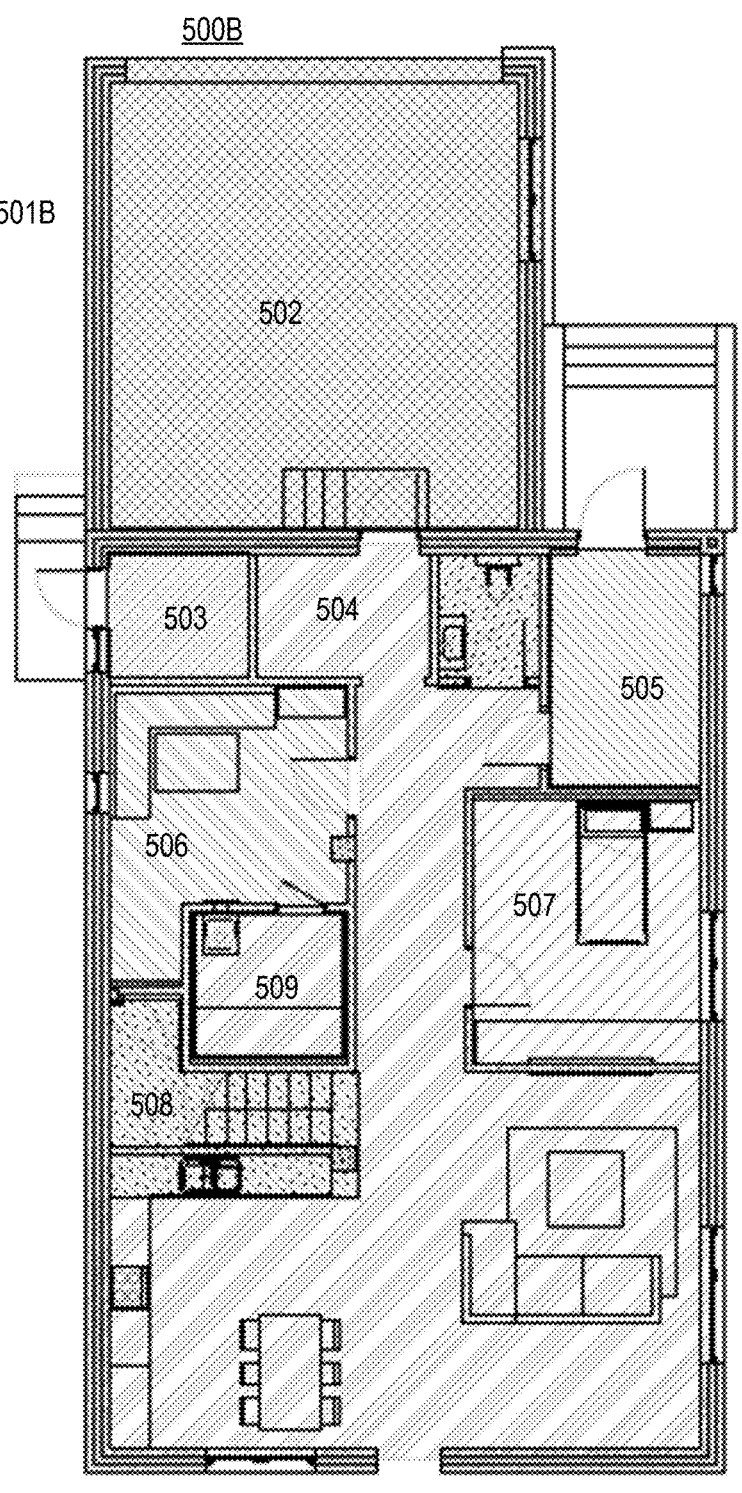

An AI engine based automated recognition process executes method steps via a controller, such as a cloud server, and identifies multiple disparate regions 502-509. Designation of the regions 502-509 may be integrated according to a shape and scale of the two-dimensional reference and presented as a region view 501B user interface 500B, with symbolic hatches or colors etc., as shown in FIG. 5B.

The region view 501B may include the multiple regions 502-509 identified by the AI engine arranged based upon a size and shape and relative position derived from the two-dimensional reference 501.

Figure 5C:
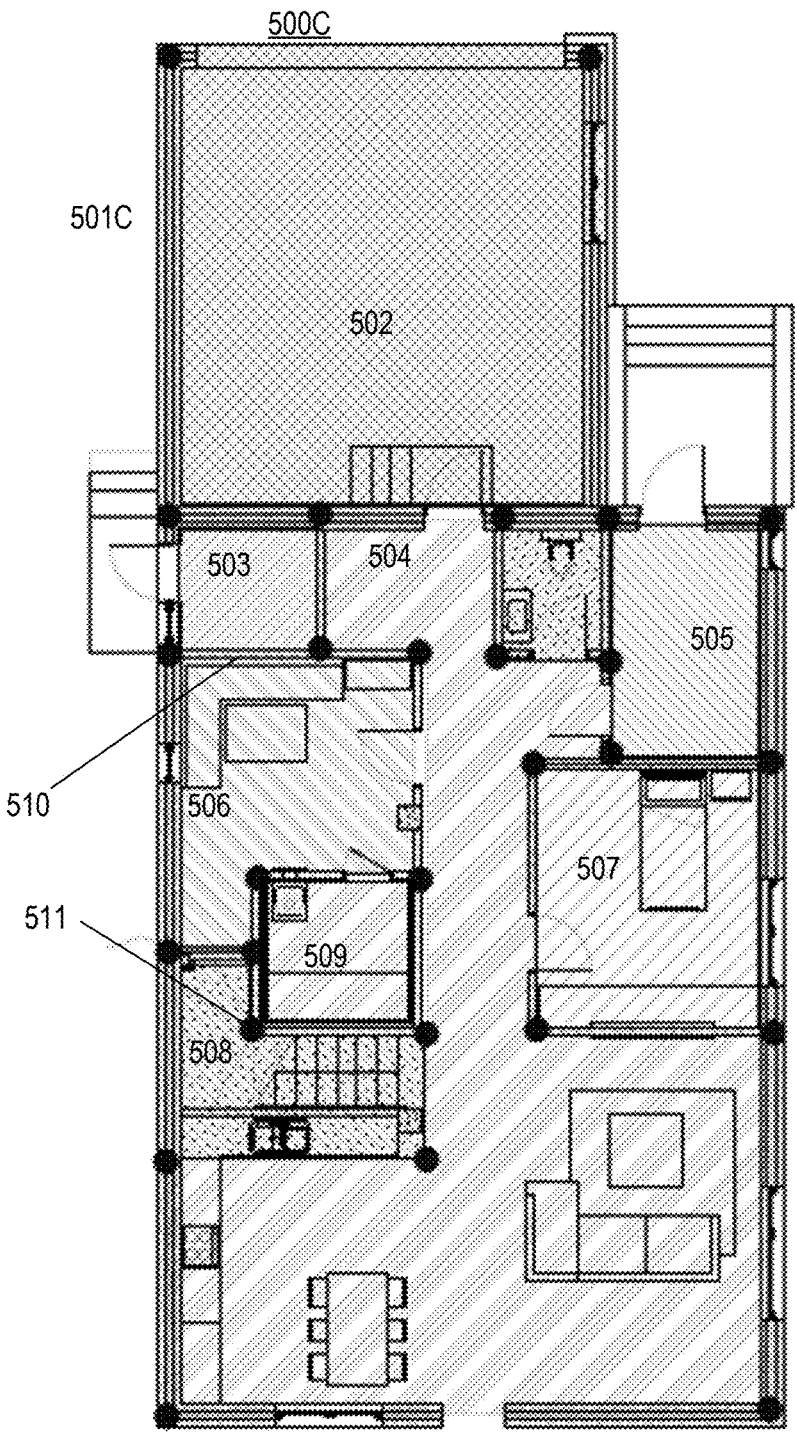

Referring now to FIG. 5C, a line segment view 501C may include identified boundary line segments 510 and vertices 511 may also be presented as an overlay of the regions 502-509 illustrated as delineated symbolic hatches or colors etc., as illustrated in FIG. 5C. Said line segments 510 may also be represented as symbols such as but not limited to dots. Such an interactive user interface 500C may allow a user to review and correct assignments in some cases. A component of the AI engine may further be trained to recognize aggregations of regions 502-509 spaces, or areas, such as in a non-limiting sense the aggregation of internal regions 502-509, spaces or areas.

Figure 5D:
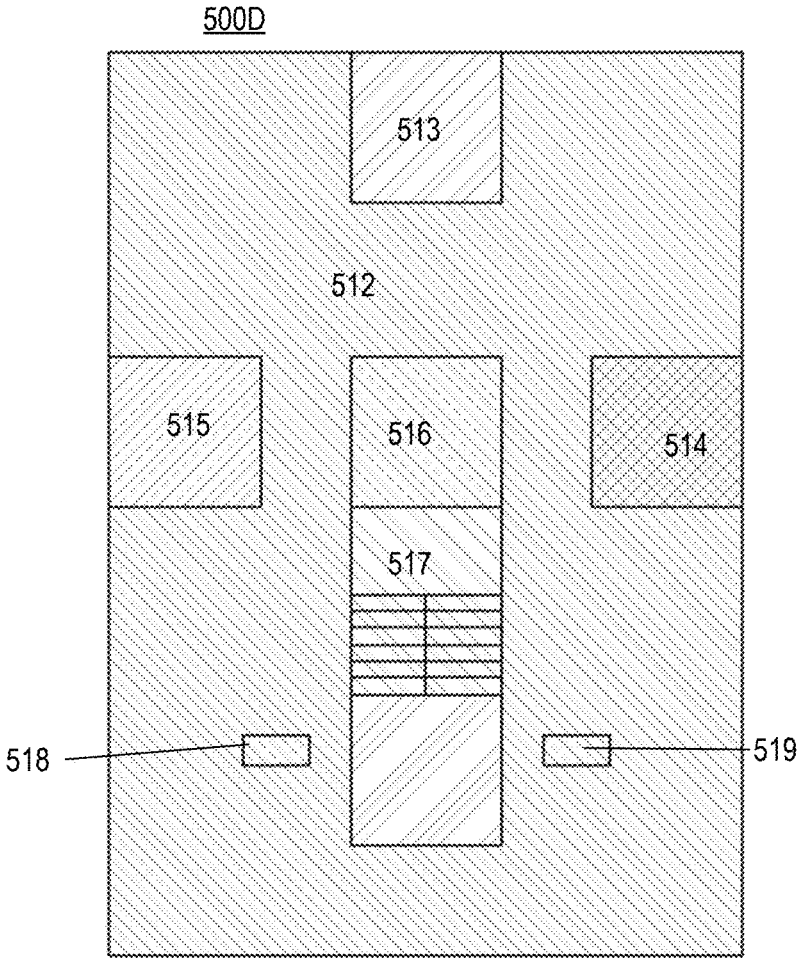

Referring now to FIG. 5D, an illustration of exemplary aggregation of regions 512-519 is provided where a user interface 500D includes patterned portions 512-519 and the patterned portions 512-519 may be representative of regions, spaces, or areas, such as, for example, aggregated interior living spaces.

In some embodiments, integrated and/or overlaid aggregations of some or all: of regions; spaces; patterned portions; line segments; polygons; symbols; icons or other portions of the user interfaces may be assembled and presented in a user output and our user interface, or as input into another automated process. In some embodiments, selection or marking of the desired segments or design elements may be incorporated on the user interfaces 500A-500D as shown in FIGS. 5A-5D.

Figure 6A:
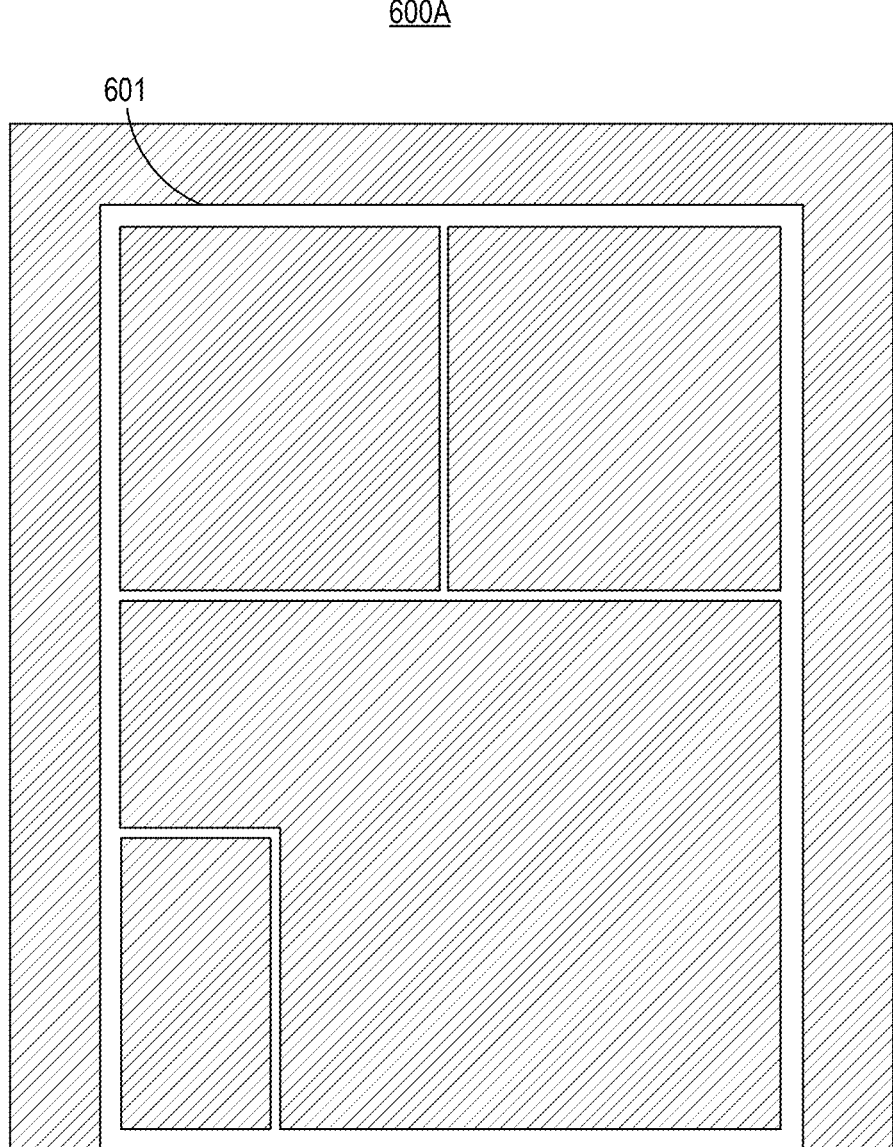
FIGS. 6A-6C illustrate various aspects of boundary segmentation and classification.
Figure 6B:
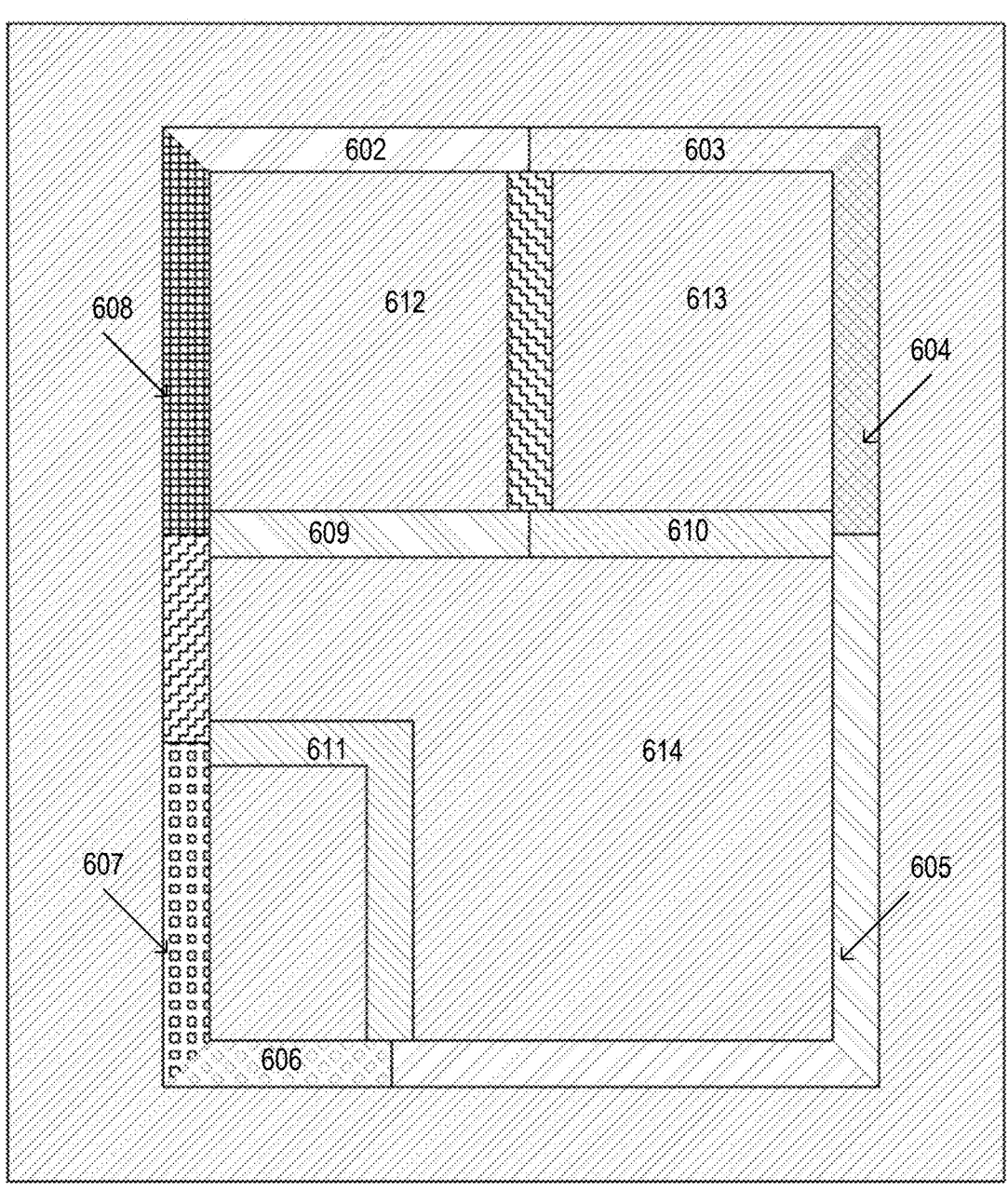
Figure 6C:
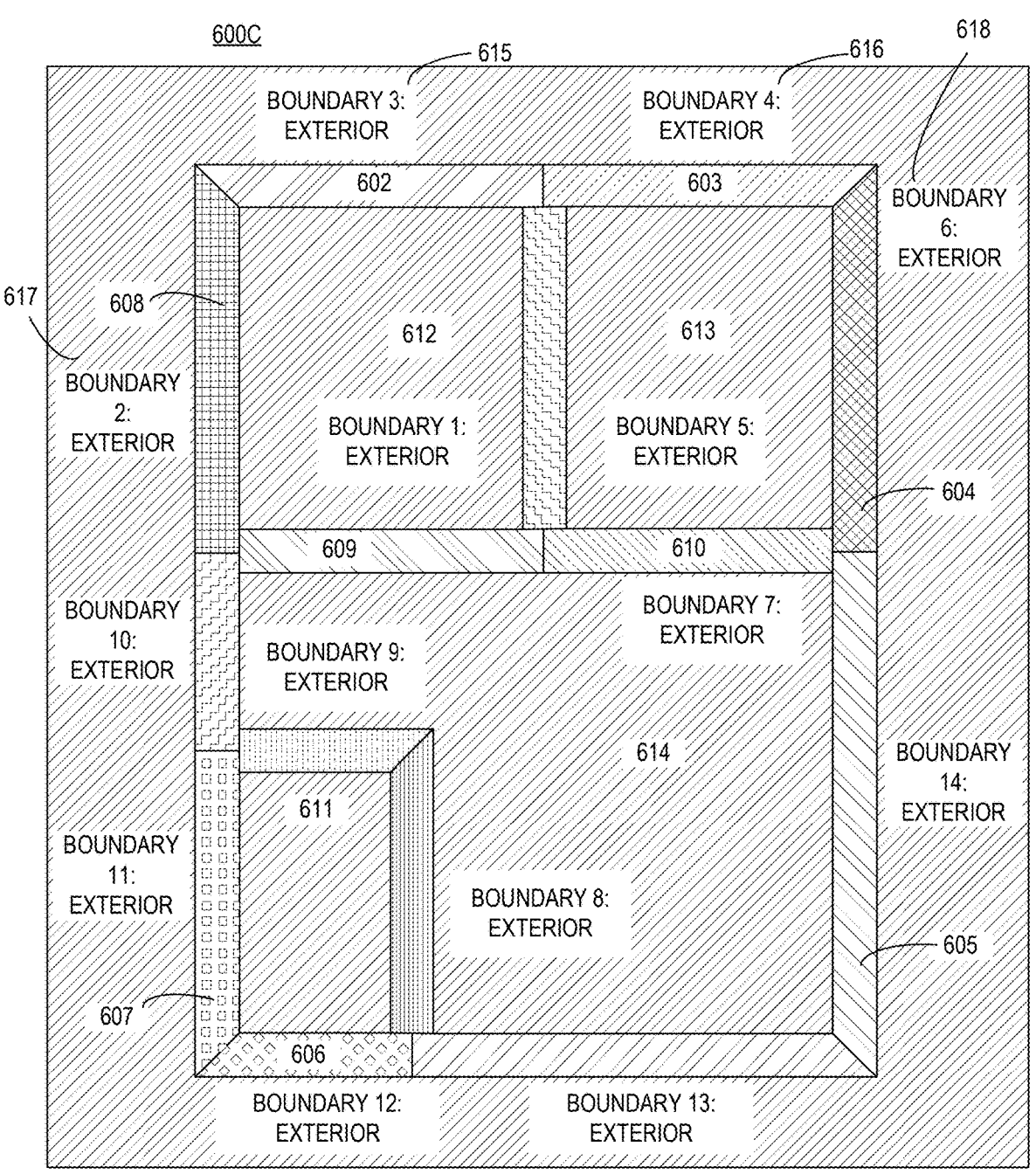

Referring now to FIGS. 6A-6C, in some embodiments, automated and/or user-initiated processes may include refinement of regions, spaces, or areas may involve one or both of a user and a controller identifying individual wall segments 211A from previously defined boundaries.

For example, in some embodiments, a controller running an AI engine may execute processes that are operative to divide a previously predicted boundary into individual wall segments. In FIG. 6A, a user interface 600A includes a representation of a design plan with an original boundary 601 defined from an inputted design.

In FIG. 6B, an AI engine may be operative to take one or more original boundaries 601 and isolate one or more individual line segments 602-611 as shown by different hatching symbols in an illustrated user interface 600B. The identification of individual line segments 602-611 of a boundary 601 enables one or both of a controller and a user to assign and/or retrieve information about the individual line segment 602-611 such as, for example, one or more of: the length of the segment 602-611, a type of wall segment 211A, materials used in the wall segment 211A, parameters of the segment 602-611, height of the segment 602-611, width of the segment 602-611, allocation of the segment 602-611 to a region 612-614 or another, and almost any digital content relevant to the segment.

Referring now to FIG. 6C, in some embodiments, a controller executing an AI engine or other method steps, may be operative, in some embodiments, to classify individual line segments 602-611 of a boundary 601 and present a user interface 600C indicating the classified individual line segments 602-611. The AI engine may be trained, and subsequently operative, to classify individual line segments 602-611 included in a boundary 601 in different classes. As a non-limiting example, an AI engine may classify walls as interior walls, exterior walls and/or demising walls that separate internal spaces.

As illustrated in FIG. 6C, in some embodiments, an individual line segment 602-611 may be classified by the AI engine and an indication of the classification 615-618, such as alphanumeric or symbolic content, may be associated with the individual line segment 602-611 and presented in the user interface 600C.

In some embodiments, functionality may be allocated to classified individual line segments 602-611, such as, by way of non-limiting example, a process that generates an estimated materials list for a region or an area defined by a boundary, based on the regions or area's characteristics and its classification. In some embodiments, selection or marking of the desired segments or design elements may be incorporated on the user interfaces 600A-600C as shown in FIGS. 6A-6C.

Figure 7:
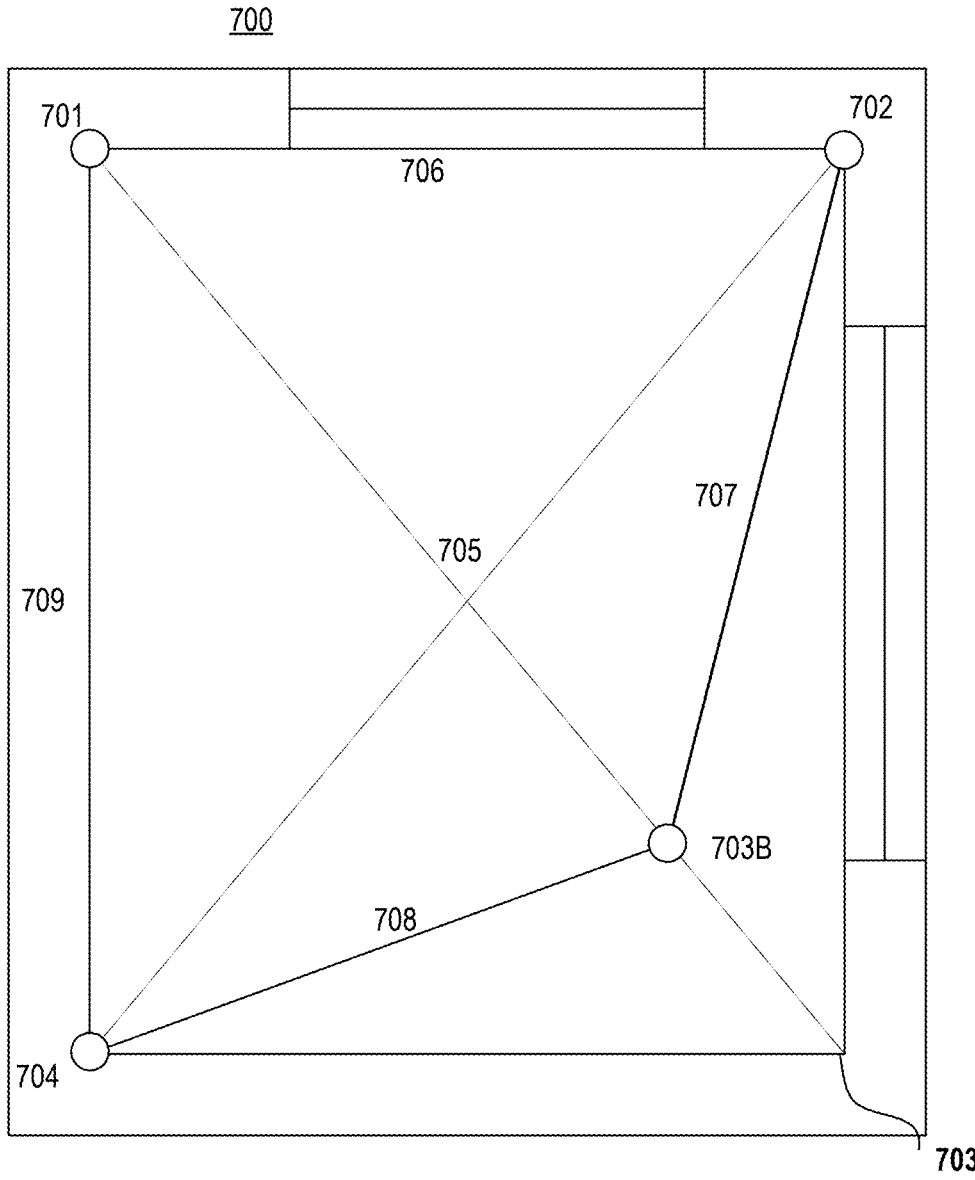
FIG. 7 illustrates aspects of correction protocols and an exemplary method for making changes to a design element of the design plan.

Referring now to FIG. 7, in some embodiments, a user interface 700 may include user interactive controls operative to execute process steps described herein (e.g. make a boundary determination, region classification, segmentation decision or the like) in an automated process (e.g. via an AI routine) and also be able to receive an instruction (e.g. from a user via a user interface, or a controller operative via an executable software to perform a process) that modify one or more boundary segments.

For example, a user interface may include one or more vertex 701-704 (e.g., points where two or more line segments meet) that may be user interactive such that a user may position the one or more vertex 701-704 at a user selected position. User positioning may include, for example, user drag and drop of the one or more vertex 701-704 at a desired location or entering a desired position, such as via coordinates. A new position for a vertex 703B may allow an area 705 bounded by user defined boundaries 706-709. User interactive portions of a user interface 700 are not limited to vertex 701-704 and can be any other item 701-709 in the user interface 700 that may facilitate achievement of a purpose by allowing one or both of: the user, and the controller, to control dynamic sizing and/or placement of a feature or other item 701-709.

Still further, in some embodiments, user interaction involving positioning of a vertex 701-704 or modification of an item 705-709 may be used to train an AI engine to improve performance. Additionally, in some embodiments, user interaction involving positioning of a vertex 701-704 may comprise selection of a desired segment or design element in a design plan by marking and combining a plurality of vertex points similar to vertex 701-704.

An important aspect of the operation of the systems as have been described is the training of the AI engines that perform the functions as have been defined. A training dataset may involve a set of input drawings associated with a corresponding set of verified outputs. In some embodiments, a historical database of drawings may be analyzed by personnel with expertise in the field. user, including in some embodiments experts in a particular field of endeavor may manipulate dynamic features of a design plan or other aspects of a user interface to be used to train an AI engine, such as by creating or adding to an AI referenced database.

In some other examples, a trained version of an AI engine may produce user interfaces and/or other outputs based on the trained version of the AI engine. Teams of experts may review the results of the AI processing and make corrections as required. Corrected drawings may be provided to the AI engine for renewed training.

Aspects that are determined by a controller running an AI engine to be represented in a design plan may be used to generate an estimate of what will be required to complete a project. For example, according to various embodiments of the present invention, an AI engine may receive as input a two-dimensional reference and generate one or more of: boundaries, areas, fixtures, architectural components, perimeters, linear lengths, distances, volumes, and the like may be determined by a controller running an AI engine to be required to be required to complete a project.

For example, a derived area or region comprising a room and/or a boundary, perimeter or other beginning and end indicator may allow for a building estimate that may integrate choices of materials with associated raw materials costs and with labor estimates all scaled with the derived parameters. The boundary determination function may be integrated with other standard construction estimation software and feed its calculated parameters through APIs. In other examples, the boundary determination function may be supplemented with the equivalent functions of construction estimation to directly provide parametric input to an estimation function. For example, the parameters derived by the boundary determinations may result in estimation of needed quantities like cement, lumber, steel, wallboard, floor treatments, carpeting, and the like. Associated labor estimates may also be calculated.

As described herein, a controller executing an AI engine may be functional to perform pattern recognition and recognize features or other aspects that are present within an input two-dimensional reference or other graphic design. In a segmentation phase used to determine boundaries of regions or other space features, aspects that are recognized as some artifact other than a boundary may be replaced or deleted from the image. An AI engine and/or user modified resulting boundary determination can be used in additional pattern recognition processing to facilitate accurate recognition of the non-wall features present in the graphic.

For example, in some embodiments, a set of architectural drawings may include many elements depicted such as, by way of non-limiting example, one or more of: windows, exterior doors, interior doors, hallways, elevators, stairs, electrical outlets, wiring paths, floor treatments, lighting, appliances, and the like. In some two-dimensional references, furniture, desks, beds, and the like may be depicted in designated spaces. AI pattern recognition capabilities can also be trained to recognize each of these features and many other such features commonly included in design drawings. In some embodiments, a list of all the recognized image features may be created and also used in the cost estimation protocols as have been described.

Figure 8:
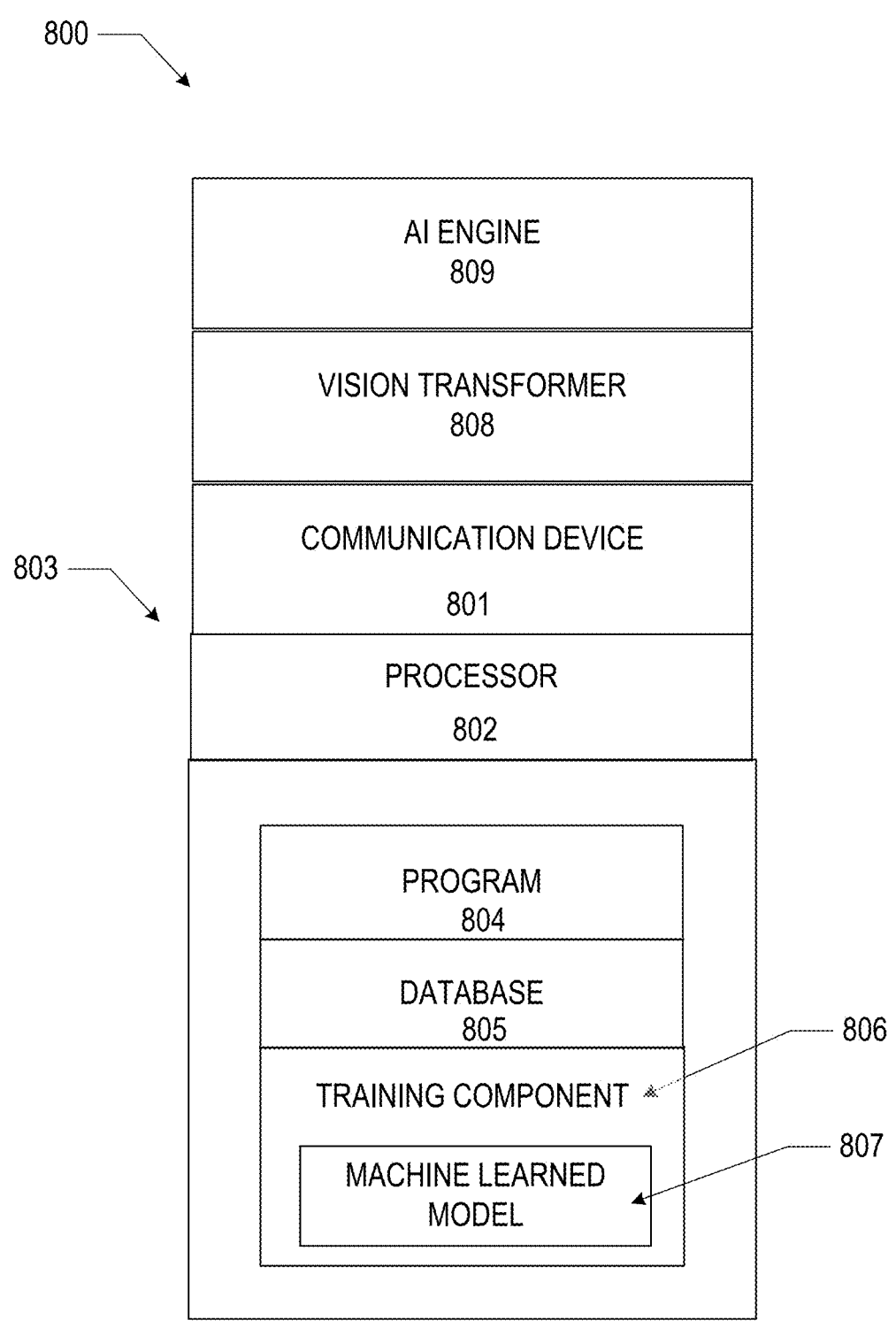
FIG. 8 illustrates exemplary processor architecture for use with the present disclosure.

Referring now to FIG. 8, an automated controller is illustrated, which may be used to implement various aspects of the present disclosure, in various embodiments, and for various aspects of the present disclosure, controller 800 may be included in one or more of: a wireless tablet or handheld device, a server, a rack mounted processor unit. The controller may be included in one or more of the apparatuses described above, such as a Server, and a Network Access Device. The controller 800 includes a processor unit 802, such as one or more semiconductor-based processors, coupled to a communication device 801 configured to communicate via a communication network (not shown in FIG. 8). The communication device 801 may be used to communicate, for example, with one or more online devices, such as a personal computer, laptop, or a handheld device.

The processor unit 802 is also in communication with a storage device 803. The storage device 803 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 803 can store a software program 804 with executable logic for controlling the processor unit 802. The processor unit 802 performs instructions of the software program 804 and thereby operates in accordance with the present disclosure. In some embodiments, the processor unit may be supplemented with a specialized processor for AI related processing. The processor unit 802 may also cause the communication device 801 to transmit information, including, in some instances, control commands to operate apparatus to implement the processes described above. The storage device 803 can additionally store related data in a database 805. The processor unit and storage devices may access an AI training component 806 and database as needed, which may also include storage of machine-learned models 807.

In some embodiments, a controller may include a Vision Transformer (ViT) 808. In some embodiments, a controller 800, which may run an AI engine 809 may include a vision encoder, such as, for example, Vision Transformer 808 models or the such as, to convert images into a form the AI Engine 809 may better understand. For example, in some processes, an scanned image, such as a design plan may be divided into patches. One or more patches may be transformed into one or more embedding vectors. The embedding vectors may be processed using transformer-based layers that capture spatial relationships and features included in the image.

An encoded image may be combined with text, lines, polygons, or other input types. In some embodiments, the controller may use cross-attention mechanisms to align visual features with linguistic inputs (e.g., a question about the image). Alignment may enable the controller to perform tasks such as, for example, without limitation, one or more of: image captioning, visual question answering, and image-text matching.

For specific applications, such as, for example, one or more of: identifying objects, describing scenes, or analyzing diagrams). In some embodiments, a controller may access fine-tuned on curated datasets, such as for example design plans or portions of design plans. A model run the controller learns how to interpret images in these domains and respond accordingly.

An AI engine 809 may be executable to provide reasoning, not just recognition, such that the controller may: infer relationships between objects. It may also support chain-of-thought-style reasoning based on visual context. For example, given access to previous design plans and a question, it can analyze trends, make inferences, and justify answers in natural language. I addition, it may generate one or more of: diagrams showing revised plans, new plans, compliance with a set of given requirements, quantities of specified items, pricing for items included in a design plan, alternatives to design plan specifications, and other user requests or requirements specified. In some embodiments, image generation and editing may be paired with tools.

A ViT 808 may include a deep learning model architecture that applies the transformer architecture (originally designed for natural language processing) to image data. Instead of using convolutional layers such as, in CNNs, a controller running ViTs 808 may treat images more such as, sequences of data, similar to words in a sentence.

In some embodiments, ViTs 808 run by a controller, may include one or more of the following:

Image Patching: An input image (e.g., 224×224 pixels) may be split into fixed-size patches, such as 16×16 pixels. Each patch may be flattened into a 1D vector—for example, a 16×16 RGB patch becomes a 768-dimensional vector (16×16×3).

Linear Embedding (Embedding Layer): Multiple patch vectors may be passed through a linear layer (fully connected layer) to map it into an embedding space, such in a process similar to word embeddings in NLP.

Positional Encoding: Transformers may be position-agnostic (they do not require an inherent sense of spatial location), ViTs 808 add positional encodings to each patch embedding. This helps the model understand where each patch may be located in the image.

Transformer Encoder: Multiple patch embeddings (now with positional info) may be passed through multiple layers of transformer encoders. Layers include may include multi-head self-attention, which lets the model weigh the importance of each patch in relation to others. This may be useful for capturing long-range dependencies, such as, for example, understanding that a toilet and a sink belong to a same area within a design plan.

Classification or Task Output (CLS): A CLS token (classification token) may be prepended to the input sequence, and its output embedding after all transformer layers may be used for classification or other downstream tasks. For image-to-text tasks, patch embeddings may be passed to a decoder or used directly with cross-modal attention.

ViTs 808 may produce tokenized representations of images, making it easier to integrate with text-based models. Self-attention allows the controller to reason across both image and text tokens holistically. ViTs 808 can handle high-level reasoning (e.g., spatial relationships, object interaction) with increased flexibility.

Figure 9:
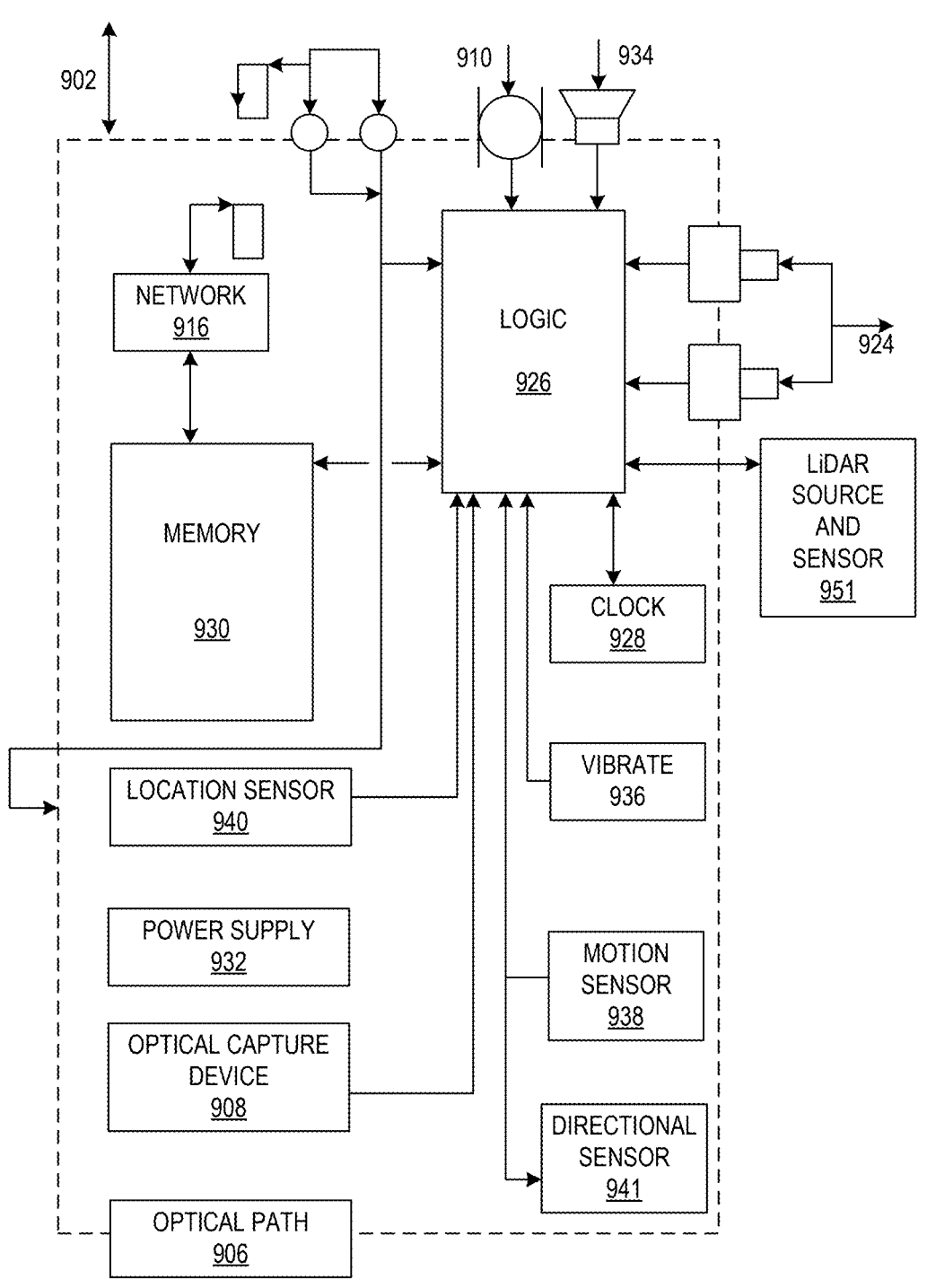
FIG. 9 illustrates exemplary mobile device architecture for use with the present disclosure.

Referring now to FIG. 9, a block diagram of an exemplary mobile device 902 is illustrated. The mobile device 902 comprises an optical capture device 908 to capture an image and convert it to machine-compatible data, and an optical path 906, typically a lens, an aperture, or an image conduit to convey the image from the rendered document to the optical capture device 908. The optical capture device 908 may incorporate a Charge-Coupled Device (CCD), a Complementary Metal Oxide Semiconductor (CMOS) imaging device, or an optical Sensor 924 of another type.

A microphone 910 and associated circuitry may convert the sound of the environment, including spoken words, into machine-compatible signals. The microphone 910 may also be utilized by users to provide audio annotations (or for speech-to-text annotations) of the present invention. Input facilities may exist in the form of buttons, scroll wheels, or other tactile Sensors such as touchpads. In some embodiments, input facilities may include a touchscreen display.

Visual feedback to the user is possible through a visual display, touchscreen display, or indicator lights. Audible feedback 934 may come from a loudspeaker or other audio transducer. Tactile feedback may come from a vibrate module 936.

A motion Sensor 938 and associated circuitry convert the motion of the mobile device 902 into machine-compatible signals. The motion Sensor 938 may comprise an accelerometer that may be used to sense measurable physical acceleration, orientation, vibration, and other movements. In some embodiments, motion Sensor 938 may include a gyroscope or other device to sense different motions.

A location Sensor 940 and associated circuitry may be used to determine the location of the device. The location Sensor 940 may detect Global Position System (GPS) radio signals from satellites or may also use assisted GPS where the mobile device may use a cellular network to decrease the time required to determine location.

The mobile device 902 comprises logic 926 to interact with the various other components, possibly processing the received signals into different formats and/or interpretations. Logic 926 may be operable to read and write data and program instructions stored in associated storage or memory 930 such as RAM, ROM, flash, or other suitable memory. It may read a time signal from the clock unit 928. In some embodiments, the mobile device 902 may have an on-board power supply 932. In other embodiments, the mobile device 902 may be powered from a tethered connection to another device, such as a Universal Serial Bus (USB) connection.

The mobile device 902 also includes a network interface 916 to communicate data to a network and/or an associated computing device. Network interface 916 may provide two-way data communication. For example, network interface 916 may operate according to the internet protocol. As another example, network interface 916 may be a local area network (LAN) card allowing a data communication connection to a compatible LAN. As another example, network interface 916 may be a cellular antenna and associated circuitry which may allow the mobile device to communicate over standard wireless data communication networks. In some implementations, network interface 916 may include a Universal Serial Bus (USB) to supply power or transmit data. In some embodiments, other wireless links may also be implemented.

As an example of one use of mobile device 902, a reader may scan an input drawing with the mobile device 902. In some embodiments, the scan may include a bit-mapped image via the optical capture device 908. Logic 926 causes the bit-mapped image to be stored in memory 930 with an associated timestamp read from the clock unit 928. Logic 926 may also perform optical character recognition (OCR) or other post-scan processing on the bit-mapped image to convert it to text.

A directional sensor 941 may also be incorporated into the mobile device 902. The directional device may be a compass and be based upon a magnetic reading or based upon network settings.

A LIDAR sensing system 951 may also be incorporated into the mobile device 902. The LiDAR system may include a scannable laser light (or other collimated) light source which may operate at nonvisible wavelengths such as in the infrared. An associated sensor device, sensitive to the light of emission may be included in the system to record time and strength of returned signal that is reflected off of surfaces in the environment of the mobile device 902. In some embodiments, as have been described herein, a 2-dimensional drawing or representation may be used as the input data source and vector representations in various forms may be utilized as a fundamental or alternative input data source. Moreover, in some embodiments, files which may be classified as BIM input files may be directly used as a source on which method steps may be performed. BIM and CAD file formats may include, by way of non-limiting example, one or more of: BIM, RVT, NWD, DWG, IFC and COBie. Features in the BIM or CAD datafile may already have defined boundary aspects having innate definitions such as walls and ceilings and the like. An interactive interface may be generated that receives input from a user indicating a user choice of types of innate boundary aspects a user provides instruction to the controller to perform subsequent processing on.

In some embodiments, a controller may receive user input enabling input data from either a design plan format, or similar such formats, or also allow the user to access BIM or CAD formats. Artificial intelligence may be used to assess boundaries in different manners depending on the type of input data that is initially inputted. Subsequently, similar processing may be performed to segment defined spaces in useable manners as have been discussed. The segmented spaces may also be processed to determine classifications of the spaces.

As has been described, a system may operate (and AI Training aspects may be focused upon) recognition of lines or vectors as a basic element within an input design plan. However, in some embodiments, other elements may be used as a fundamental element, such as, for example, a polygon and/or series of polygons. The one or more polygons may be assembled to define an area with a boundary, as compared, in some embodiments, with an assembly of line segments or vectors, which together may define a boundary which may be used to define an area. Polygons may include different vertices; however common examples may include triangular facets and quadrilateral polygons. In some embodiments, AI training may be carried out with a singular type of polygonal primitive element (e.g., rectangles), other embodiments will use a more sophisticated model. In some other examples, AI engine training may involve characterizing spaces where the algorithms are allowed to access multiple diverse types of polygons simultaneously. In some embodiments, a system may be allowed to represent boundary conditions as combinations of both polygons and line elements or vectors.

Depending upon one or more factors, such as processing time, a complexity of the feature spaces defined, and a purpose for AI analysis, simplification protocols may be performed as have been described herein. In some embodiments, object recognition, space definition or general simplification may be aided by various object recognition algorithms. In some embodiments, Hough type algorithms may be used to extract diverse types of features from a representation of a space. In other examples, Watershed algorithms may be useful to infer division boundaries between segmented spaces. Other feature recognition algorithms may be useful in determining boundary definitions from building drawings or representations.

In some embodiments, the user may be given access to movement of boundary elements and vertices of boundary elements. In examples where lines or vectors are used to represent boundaries and surrounding areas, a user may move vertices between lines or center points of lines (which may move multiple vertices). In other examples, elements of polygons such as the user may move vertices, sides, and center points. In some embodiments, the determined elements of the space representation may be bundled together in a single layer. In other examples, multiple layers may be used to distinguish distinct aspects. For example, one layer may include the AI optimized boundary elements, another layer may represent area and segmentation aspects, and still another layer may include object elements. In some embodiments, when the user moves an element such as a vertex the effects may be limited only to elements within its own layer. In some examples, a user may elect to move multiple or all layers in an equivalent manner. In still further examples, all elements may be assigned to a single layer and treated equivalently. In some embodiments, users may be given multiple menu options to select disparate elements for processing and adjustment. Features of elements such as color and shading and stylizing aspects may be user selectable. A user may be presented with a user interface that includes dynamic representations of a feature, or other aspects of a design plan, and associated values and changes may be input by a user. In some embodiments, an algorithm and processor may present to the user comparisons of various aspects within a single model or between different models. Accordingly, in various embodiments, a controller and a user may manipulate aspects of a user interface and AI engine.

Referring now to FIGS. 10A-10B, method steps 1000 are illustrated for detecting, analyzing, and managing maintenance requirements in a constructed building using artificial intelligence (AI), automated processing, and real-time data integration. The method steps 1000 describe a systematic approach for extracting building components from a two-dimensional (2D) design plan, analyzing maintenance issues, and generating a structured maintenance execution plan. The process involves receiving a 2D representation of a building, converting it into a raster image, and applying an AI-driven analysis engine to detect, classify, and analyze structural and functional components of the building. The AI engine processes the spatial layout, dimensions, and component attributes to determine areas requiring repair, replacement, or preventive maintenance. The method further includes generating prioritized maintenance tasks, calculating costs, labor, and materials, and notifying stakeholders for efficient facility management. The system may integrate real-time sensor data, IoT-enabled monitoring, and predictive analytics to refine the maintenance execution plan and update the design plan dynamically.

At step 1001, the process begins by receiving into a controller a first two-dimensional representation (design plan) of at least a portion of a physical building. This two-dimensional representation may come from a variety of sources, including a design file from a CAD system, a scanned architectural drawing, or even a hand-drawn sketch. For example, a user may submit a blueprint of a residential building or a commercial floor plan. This step is the starting point where the controller accesses the design that forms the basis of all further modifications and analysis. The input file can be in various formats, such as DWG, DXF, PDF, JPEG, or even TIFF, representing different types of drawings, including technical schematics or hand-rendered layouts. This initial submission is vital for the controller's analysis because it provides the spatial framework, dimensions, and elements that the system will work with throughout the process. In some embodiments, the first two-dimensional representation may be received from a BMS of the physical building.

At step 1002, the controller processes the received two-dimensional representation by converting it into a raster image. This conversion is important when the input file is in vector format, such as a DWG or DXF file, which stores data as geometric shapes, lines, and curves. Rasterization turns these elements into pixels, allowing the controller to work with a detailed grid-based representation of the design. This step is important for enabling the AI engine to interpret the design in a way that supports component recognition, boundary formation, and further manipulation of the design. For example, if the design includes multiple walls and doorways in vector format, they will be translated into a raster image composed of pixels that represent those elements. This step enables the system to analyze the plan as an image, which becomes the basis for AI-driven analysis in subsequent steps.

At step 1003, the controller employs an artificial intelligence engine to analyze the rasterized image and identify architectural components. These components may include elements such as walls, doors, windows, columns, and other features present in the design. For example, if the input file contains a blueprint of a house, the AI engine recognizes where walls begin and end, the placement of windows, and the dimensions of rooms. This process may involve segmentation techniques where the AI divides the image into distinct regions based on pixel patterns and contrast. This segmentation allows the system to discern individual components in the design and associate them with specific architectural elements. The system may also rely on a pre-trained model, which has been trained on thousands of architectural designs to recognize common features. Once the components are identified, they are tagged and categorized for use in later steps.

At step 1004, the system determines the scale of the components identified in the two-dimensional representation. Scaling is important because architectural drawings are often reduced or enlarged for presentation purposes, and the system needs to work with real-world dimensions. The controller may extract scale information directly from the input file, such as a dimension line or a scale bar included in the original drawing. If no scale information is present, the user may be prompted to provide known dimensions, such as the width of a doorway or the length of a wall. For example, the user could input that a doorway is three feet wide, and the system would use that information to proportionally calculate the size of all other elements in the design. This step is important to the conversion of pixel-based data into accurate real-world measurements, allowing the system to manipulate the design with precision.

At step 1005, the controller arranges the identified components into a user interface to form boundaries between various spaces in the design. For example, walls identified by the AI engine in step 1003 are used to define the boundaries of rooms, hallways, and other architectural spaces. These boundaries are presented in the user interface, allowing the user to visualize how the different components relate to each other spatially. For example, in the design of an office floor plan, the system would use wall elements to separate individual office spaces, meeting rooms, and common areas. These boundaries are dynamic and can be adjusted by the user if needed. The user can interact with the interface by selecting boundaries to modify them, such as moving a wall or expanding a room, and the system will automatically update the design in real time based on those inputs.

At step 1006, the system generates an area for a feature based upon the boundaries that have been formed. Once the boundaries of rooms, hallways, and other spaces are defined, the system calculates the area of each enclosed space. For example, in a residential floor plan, the system will calculate the square footage of each bedroom, living area, kitchen, and other rooms. This information is important for both the user and the system, as it provides real-time feedback about the dimensions and proportions of spaces within the design. The system can use this area information to facilitate that the design adheres to user-specified requirements or spatial constraints, such as facilitating that a room meets minimum size requirements for comfort or function. The user can then adjust the layout if the calculated areas do not meet their expectations.

At step 1007, the system goes further to generate the length and/or area of a feature based upon a formed boundary. In this step, the system provides detailed dimensions for individual elements within the design. For example, the system may calculate the length of a hallway, or the area of a patio, based on the boundaries formed in the previous steps. If the design includes special features such as curved walls or non-rectangular rooms, the system will use advanced algorithms to calculate the precise area and length of those features. This allows the user to gain a more comprehensive understanding of the design and make any important modifications. The system also provides measurements for specific architectural details, such as the width of doorways, the height of ceilings, or the surface area of windows, giving the user the detailed information needed to refine the design.

At step 1008, the system receives sensor data and maintenance history associated with a two-dimensional representation of a constructed building. The sensor data may originate from a BMS comprising temperature sensors, leakage sensors, structural integrity sensors, electrical monitoring devices, HVAC sensors, motion detectors, and other IoT-enabled components deployed throughout the building. The maintenance history may include records of previous repairs, replacements, routine servicing, and component failure logs, providing insights into components that have exhibited frequent failures or deterioration over time.

For example, if a leakage sensor installed within a bathroom detects excessive moisture, the system may correlate this real-time data with prior maintenance records indicating frequent plumbing issues in that area. Similarly, temperature fluctuations in an HVAC system may be linked to a prior compressor failure, suggesting potential overheating problems. The system can continuously accumulate and analyze such historical and real-time data to create a comprehensive maintenance profile for each component within the building.

In some embodiments, image and video feeds from security cameras, thermal imaging sensors, and structural health monitoring systems may also be received at this step. For example, thermal cameras may detect abnormal heat signatures indicating electrical faults in wiring, which can be analyzed alongside maintenance logs to determine whether past wiring repairs were effective. The data received enables predictive maintenance analysis, allowing the system to detect early signs of failure before an actual breakdown occurs.

At step 1009, the system identifies components requiring maintenance based on a combination of historical maintenance logs and real-time sensor data received from the BMS. This identification process involves an AI-based pattern recognition model that cross-references historical maintenance trends with live operational data to detect components that require servicing, repair, or replacement.

For example, if the maintenance history indicates that a particular water pump has been repaired multiple times within a short period, the system may classify it as a high-risk component that requires replacement instead of another repair. Similarly, if a BMS sensor detects abnormally high energy consumption in a lighting system, the system may check historical maintenance logs to determine whether frequent bulb replacements have been logged, indicating potential voltage instability or power surges.

In some embodiments, AI-based fault detection models may analyze structural components such as walls, ceilings, flooring, and load-bearing beams using data from vibration sensors, pressure sensors, and acoustic monitoring devices. For example, if floor vibration data suggests an increasing trend in structural stress, the system may flag the flooring for further inspection or reinforcement. By integrating historical failure trends with real-time operational data, the system facilitates that maintenance is proactively scheduled before component failures escalate.

At step 1010, the system analyzes wear, damage, or anomalies in building components using an AI-engine. This AI-driven analysis involves pattern recognition, predictive analytics, anomaly detection, and image processing to assess the condition of various building elements. The AI-engine processes sensor data, visual images, infrared scans, and historical maintenance trends to generate a probability score for component degradation.

For example, if thermal imaging cameras detect heat inconsistencies in electrical panels, the AI-engine may correlate this anomaly with past circuit breaker replacements, predicting a potential short-circuit risk. Similarly, if acoustic sensors detect unusual vibrations in a structural column, the AI may compare this data with previous reinforcement repairs to assess whether the structural integrity is declining.

Additionally, AI-based computer vision algorithms may analyze visual cracks on walls, flooring, and ceilings using images captured by high-resolution cameras. For example, if hairline cracks detected in concrete walls are progressively widening over time, the system may generate an alert indicating structural weakening, prioritizing repairs before further deterioration.

At step 1011, the system determines the urgency of maintenance tasks and prioritizes components based on predicted failure risk. This prioritization process is governed by AI-based failure probability models that analyze historical failure rates, current sensor readings, and environmental conditions to rank components requiring immediate attention.

For example, if a ceiling-mounted fire sprinkler has been leaking continuously, it may be prioritized above routine HVAC maintenance, as an active water leak poses an immediate hazard. Similarly, if BMS data indicates excessive $CO_2$ levels in a ventilation system, it may be classified as urgent, requiring immediate action to prevent air quality deterioration.

The system may categorize maintenance priorities as:

Emergency Issues—Must be repaired immediately (e.g., gas leaks, electrical hazards, critical HVAC failures).

High Priority Issues—Require urgent attention but may be scheduled (e.g., escalating water damage, degrading structural integrity, frequent equipment malfunctions).

Medium Priority Issues—Can be scheduled for preventive maintenance (e.g., paint deterioration, cosmetic surface cracks).

Low Priority Issues—Routine maintenance tasks that do not impact safety or operations (e.g., minor scratches on flooring, aesthetic improvements).

By classifying and prioritizing maintenance tasks, the system optimizes resource allocation and prevents unnecessary downtime in building operations.

At step 1012, the system estimates maintenance requirements for identified components. This estimation involves determining labor effort, materials needed, repair duration, and associated costs. The system retrieves information from a centralized inventory database, cross-referencing it with component specifications and historical repair cost data.

For example, if the system detects a defective HVAC compressor, it may estimate:

Required replacement parts (compressor unit, refrigerant, piping).

Expected repair duration (e.g., 6 hours including recharging and testing).

Estimated labor requirements (2 certified technicians).

Total projected cost (including materials, labor, and service charges).

Similarly, if flooring deterioration is detected in a high-traffic lobby area, the system may estimate tile replacements, including material costs and labor hours required for installation.

At step 1013, the system generates a maintenance execution plan based on the identified issues and estimated maintenance requirements. This step involves formulating a structured execution strategy that outlines task sequencing, labor allocation, material procurement, and expected downtime for performing the required maintenance. The execution plan may be designed to minimize operational disruptions, so that maintenance tasks are conducted efficiently and effectively. If a detected issue involves HVAC system malfunctions, the execution plan may include scheduling the maintenance during low occupancy hours, allocating a specialized technician with expertise in HVAC repairs, ordering the required air filters or compressors, and issuing notifications to building occupants regarding the planned downtime. If multiple faults are detected across different areas of the building, the system may group tasks based on priority levels, so that the most urgent repairs are executed first, followed by lower-priority preventive maintenance activities. For interdependent repairs, such as plumbing fixes required before repainting walls, the system arranges tasks in a logical order to prevent rework and redundant efforts.

In some embodiments, the maintenance execution plan may be dynamically adjusted in real-time based on external variables such as weather conditions, technician availability, supply chain constraints, or emergency maintenance requirements. For example, if a supplier reports a delay in delivering an important component, the system may reschedule tasks, so that available resources are utilized effectively. The system may also include contingencies for unexpected developments, such as alternative workarounds if primary materials are unavailable, or reallocating tasks to another shift if the initially assigned personnel are unavailable.

At step 1014, the system calculates the material, labor, and cost estimates required for executing the maintenance plan. This step facilitates that stakeholders receive transparent cost projections before approving the execution. The cost estimation process involves retrieving material pricing information from existing inventory databases or external vendor sources, allowing users to compare pricing and select the most economical yet effective option. If a security camera replacement is required, the system may display a range of available cameras, highlighting price differences, technical specifications, and estimated delivery timelines. Similarly, labor costs are calculated based on technician availability, hourly rates, and required skill levels. If the repair involves electrical rewiring, the system may assign an experienced electrician, factoring in labor rates based on complexity and estimated work hours. Additional overheads, including permit fees, transportation costs, and disposal expenses, are integrated into the final estimate, so that the total projected cost accounts for every potential expenditure.

In some implementations, the system may suggest cost-saving alternatives to optimize the maintenance budget. If multiple light bulbs require replacement, the system may recommend purchasing in bulk to obtain volume discounts, reducing the overall procurement cost. If available, the system may also suggest using existing inventory items rather than placing new orders, accelerating the maintenance timeline while controlling expenditures. The system further categorizes estimated costs into urgent repairs that require immediate budget approvals, planned maintenance costs that can be scheduled over time, and long-term infrastructure investments that require higher financial planning. The automated cost breakdown allows stakeholders to make informed decisions regarding resource allocation, so that maintenance expenses align with the available budget while addressing urgent repair needs.

At step 1015, the system updates the maintenance logs and the two-dimensional representation of the building based on completed maintenance activities. This step facilitates that executed maintenance tasks are systematically recorded, enabling future reference and compliance tracking. The system logs each completed task with timestamps, technician details, labor hours, and materials used, creating an accurate historical record. If a faulty security system is replaced, the system updates the digital twin of the building, marking the replacement with relevant metadata such as installation date, supplier details, warranty coverage, and future maintenance schedules. The system may also color-code repaired areas, visually distinguishing recently maintained zones from pending maintenance requirements.

The system's ability to modify the two-dimensional design plan extends beyond simple logging. It actively reflects infrastructure updates, providing an up-to-date representation of the building's physical condition. If an entire floor undergoes a renovation, the system updates the design plan with revised layouts, material specifications, and installation details. This feature eliminates the reliance on outdated blueprints, providing real-time accessibility to maintenance personnel who need immediate information on building components. Additionally, if an asset, such as a generator or HVAC unit, is relocated, the system updates its position, so that technicians refer to the correct placement when planning future inspections or repairs.

In some embodiments, the system generates summary reports detailing recent maintenance activities, associated expenditures, and performance insights into repaired components. These reports allow facility managers to evaluate long-term maintenance trends, identifying components that may require redesign or upgraded replacements to mitigate recurring issues. If a fire alarm system experiences frequent sensor failures, the system may recommend replacing the entire network rather than conducting individual repairs. Similarly, if HVAC compressor failures continue despite routine servicing, the system may propose investing in a more robust system that enhances energy efficiency and reduces long-term operational costs.

Beyond simple logging, the system integrates predictive analytics to refine maintenance strategies. If the system detects that certain areas require frequent painting due to wall deterioration, it may recommend applying higher-quality, longer-lasting paint to reduce future maintenance frequency. If the building experiences recurrent power surges impacting electronic devices, the system may suggest installing voltage stabilizers to prevent damage, reducing the need for repeated electrical repairs. Such AI-driven recommendations enhance cost efficiency while improving the building's overall sustainability.

Referring now to FIG. 11, method steps 1100 illustrate an exemplary process for dynamically interacting with a design plan of a building, where annotations comprising metadata may be automatically associated by a controller or manually added by users through an interactive user interface. The design plan received into the controller represents a portion of a physical structure, wherein elements such as walls, fixtures, electrical wiring, plumbing systems, HVAC components, and other infrastructure elements are identified as dynamic components. The system enables users to annotate specific portions of the design plan, such as polygons, lines, or design elements, for adding or reviewing metadata relevant to the selected components. The metadata annotations may include but are not limited to material specifications, component dimensions, manufacturer details, installation dates, warranty information, past maintenance records, and compliance verification data.

In some embodiments, an AI engine operative on the controller analyzes the annotated elements to determine relevant associations, identifying missing metadata, suggesting contextually relevant annotations, and raising flags where compliance violations are detected. The AI-driven process enhances design validation, compliance monitoring, and maintenance tracking by intelligently integrating historical data, real-time system inputs, and predictive analytics. The annotations may also be dynamically modified, either manually by a user or automatically by the controller, to update information based on real-time changes occurring in the building environment. Through this system, users can effectively track modifications, refine design accuracy, and provide consistency between the digital representation of the building and its physical counterpart.

At step 1102, the system receives into a controller a design plan of at least a portion of a building, where the design plan may represent an architectural layout, an engineering blueprint, a structural schematic, or any digitized representation of a constructed environment. The design plan may be obtained from a variety of sources, such as computer-aided design (CAD) files, building information modeling (BIM) data, scanned floor plans, or real-time LiDAR-generated spatial mappings. The controller may process the received design plan to convert it into a structured, interactive format, enabling modifications, annotations, and computational analysis. In some embodiments, the design plan may correspond to an as-built representation, incorporating metadata such as installation dates, material types, component dimensions, sensor placements, and historical maintenance logs. The system facilitates real-time integration of dynamically updated data streams, allowing stakeholders such as architects, engineers, facility managers, and building owners to interact with and modify the design plan as required.

At step 1104, the controller represents a portion of the design plan as multiple dynamic components, where each dynamic component corresponds to a distinct structural, mechanical, or electrical element present in the physical building. These dynamic components may include walls, doors, windows, HVAC units, electrical wiring, plumbing fixtures, fire suppression systems, security devices, and other important building elements. Each dynamic component may possess associated metadata, which the controller extracts from the database linked to the system. The metadata may comprise details such as brand, manufacturer, material specifications, compliance standards, maintenance history, and operational constraints. The segmentation of the design plan into dynamic components enables granular interaction, wherein users may view, modify, or annotate specific building elements without altering the entire layout. In some embodiments, the system may allow hierarchical categorization, where components may be grouped based on zones, floors, or functional dependencies.

At step 1106, the controller generates a first user interactive interface, allowing users to interact with dynamic components, where each component may include at least one parameter changeable via the user interface. The interactive user interface may be presented on computing devices such as desktop computers, tablets, AR/VR headsets, or mobile applications, enabling real-time engagement with the design plan. Users may access the interactive interface to modify structural attributes, adjust positional placements, update maintenance metadata, or simulate potential design modifications. In some embodiments, a user may alter a parameter such as the height of a partition wall, the location of electrical outlets, or the load-bearing capacity of a structural beam, triggering real-time recalculations by the controller to verify structural integrity and compliance adherence. AI-based algorithms may also provide context-aware recommendations, suggesting optimal configurations based on industry standards, historical performance data, or predefined user preferences.

At step 1108, the controller arranges the dynamic components included in the first user interactive interface to form a first set of boundaries, where the boundaries may define spatial limits, inter-component dependencies, and functional constraints within the design plan. The boundaries may be determined based on predefined architectural constraints, regulatory compliance factors, and construction feasibility guidelines. The controller may generate polygonal enclosures around selected dynamic components, providing visual demarcation for specific zones or areas within the building layout. In some embodiments, the system may differentiate load-bearing walls from non-load-bearing walls, primary electrical circuits from secondary circuits, and plumbing distribution networks from isolated water supply lines, providing accurate representation of component interactions. The generated boundaries allow users to selectively focus on specific portions of the design plan, facilitating localized modifications and maintenance assessments.

At step 1110, the system enables a user to select a polygon, line, or design element within the interactive user interface to provide annotations, where the annotations may serve as metadata markers for individual components. A user, such as a facility manager, engineer, or maintenance personnel, may select a specific HVAC duct, an important load-bearing beam, or a high-traffic flooring section to add contextual annotations. The annotations may indicate pending maintenance tasks, recent modifications, historical repair records, or operational constraints. In some embodiments, the annotations may be color-coded to indicate urgency levels, where a red annotation may signify an immediate repair requirement, while a yellow annotation may denote a scheduled inspection task. The controller may automatically retrieve relevant historical data associated with the selected component, allowing users to review previous modifications, compliance certifications, and performance evaluations.

At step 1112, the controller, running an AI engine, analyzes the selected polygon, line, or design element, along with its associated annotations, to determine structural implications, compliance requirements, and predictive maintenance needs. The AI engine may apply machine learning models trained on architectural blueprints, construction standards, and historical building performance data to infer structural dependencies and operational constraints. The AI analysis may detect potential risks such as load imbalances, airflow obstructions, electrical circuit overloads, or plumbing pressure inconsistencies based on the annotated component and its surrounding environment. In some embodiments, the controller may conduct a predictive assessment, forecasting potential failure points and maintenance schedules based on historical degradation patterns and environmental factors.

At step 1114, the controller generates AI-based annotation suggestions and/or raises flags based on detected compliance violations or potential design conflicts. The annotation suggestions may propose corrective actions, such as adjusting structural reinforcements, modifying ventilation duct pathways, or relocating high-voltage electrical circuits to mitigate design flaws. The controller may also raise flags where compliance discrepancies are identified, such as non-conformance with fire safety codes, ADA accessibility violations, or energy efficiency standards. The AI-driven system may recommend alternative material choices, energy-efficient layout optimizations, or enhanced load distribution techniques to improve the overall safety and operational effectiveness of the building.

At step 1116, the system associates the generated annotations with the selected polygon, line, or design element, embedding the metadata insights within the design plan. The associations may enable automated tracking, allowing stakeholders to retrieve historical records, compliance reports, and maintenance logs directly linked to specific building components. In some embodiments, the controller may generate real-time alerts, notifying stakeholders of important structural or operational concerns based on the associated annotations. The associations serve as persistent records, so that all modifications and compliance checks remain documented and accessible for future review and regulatory audits.

At step 1118, the controller modifies the design plan based on the associated annotations, dynamically integrating user-provided insights, AI-generated recommendations, and compliance-based modifications. The modifications may involve updating spatial layouts, adjusting structural alignments, incorporating newly added elements, or replacing outdated infrastructure representations. The design plan is continuously updated to reflect the most current state of the physical building, facilitating synchronized decision-making among stakeholders. In some embodiments, the system may generate version-controlled snapshots of the design plan, allowing users to track historical changes, revert to previous configurations, or simulate alternative design scenarios for optimized building management and operational planning.

Some embodiments of the present invention enable the collaborative platform to serve not just as a static repository of design plans but as a dynamic, intelligent system that guides users through the annotation process, helps maintain compliance, and facilitates a more efficient design workflow. For example, upon selecting a staircase element (design element), the system may suggest annotations regarding tread depth standards, highlight potential accessibility issues, or even propose alternative designs that are better suited to the overall building layout. This intelligent guidance may serve to streamline the collaborative process, making the system invaluable to architects, engineers, and other stakeholders involved in the design and building process.

In some embodiments of the present invention, the system's capabilities extend beyond the creation and management of annotations within design plans. The AI engine, through an integrated and responsive user interface, may offer intelligent equipment recommendations based on selected design elements, annotations context, or modifications within the design plan.

Upon selection of a design element for annotation or modification, the AI engine may analyze the context and specifics of the change, such as the function of the space, dimensions of the design element, or materials specified in annotations. Leveraging this information, the AI may then suggest equipment(s) that is optimally compatible with the design requirements. These suggestions may include a variety of equipment(s) from different brands, along with detailed pricing information.

The system may also integrate with third-party vendor databases to pull real-time pricing and availability data, providing users with a possible comprehensive shopping experience within the platform. Users can review these recommendations, compare options, and even access reviews or ratings within the same interface.

For example, if a user annotates a design element to convert a space into a high-traffic area, the AI engine may recommend durable flooring options available from specific brands and present the cost implications directly within the interface. If the annotation specifies the need for an eco-friendly HVAC system, the system may suggest several models that meet the latest environmental standards, complete with efficiency ratings and prices.

Moreover, the platform may also offer a feature to directly add the recommended equipment to a virtual cart, facilitating immediate or later purchases. The platform may also automatically update a takeoff, material list, workforce requirements, project budget or other related project aspect. Platform integration into such associated functions may streamline bidding, procurement, labor engagement, supply chain, and other related processes, facilitating project planning and execution phases that are closely aligned. Required resources may be accounted for and procured efficiently.

Referring now to FIG. 12, an exemplary system and method are illustrated for analyzing maintenance logs, detecting recurring issues in a constructed building, and generating automated suggestions to optimize maintenance strategies. The design plan 1200 represents at least a portion of a physical building, comprising as-built data that reflects the current structural elements, components, and fixtures present in the building. The design plan 1200 is processed by a controller 1201, which may be in real-time communication with a BMS of the physical building to receive sensor-based data, historical maintenance logs, and real-time operational alerts.

The controller 1201 is configured to present the design plan 1200 on an interactive user interface, allowing users to view, select, and interact with building components. The controller 1201 may periodically or upon user input analyze a maintenance log 1202 corresponding to the design plan 1200 or at least a subset of the design plan 1200. The maintenance log 1202 maintains a historical record of maintenance activities, including repairs, replacements, and routine servicing of building components, such as HVAC systems, security systems, lighting fixtures, plumbing, roofing, elevators, and painting work.

In some embodiments, the controller 1201 may be programmed to identify discrepancies in maintenance frequency, such as repeated servicing of the same component, which may indicate an underlying issue rather than independent faults. The controller 1201 may use AI-driven analysis to predict possible causes of frequent failures and assess whether the maintenance trend follows a predictable pattern.

For example, FIG. 12 shows that the security system 1203 has undergone ten maintenance operations, suggesting an abnormally high failure rate. The controller 1201 may analyze historical repair records, real-time sensor inputs, and environmental data to determine whether the root cause is associated with an external factor, such as power surges, tampering, software glitches, or hardware malfunctions. If the controller 1201 detects voltage fluctuations as a common factor leading to security system failures, it may recommend installing voltage regulators or surge protectors to prevent future failures.

The controller 1201 may generate automated suggestions 1204 based on predictive analysis to minimize the frequency of repetitive maintenance tasks. The automated suggestions 1204 may include component upgrades, preventive maintenance strategies, system reconfigurations, or workflow adjustments.

For example, the HVAC system has undergone multiple air filter replacements within a short time frame. The controller 1201 may analyze air quality metrics, environmental conditions, and past maintenance logs to determine whether the frequency of filter replacements is excessive due to high levels of dust or improper ventilation settings. If the controller 1201 detects rapid clogging of filters, it may suggest switching to a high-efficiency filtration system, improving ventilation pathways, or modifying airflow configurations.

Similarly, the lighting system has undergone five maintenance cycles due to burnt-out bulbs. The controller 1201 may assess whether the issue is related to power surges, low-quality bulbs, or faulty electrical connections. If AI analysis indicates voltage irregularities, the controller 1201 may recommend installing voltage stabilizers or using energy-efficient LED lighting with longer lifespans.

The controller 1201 may also analyze roofing maintenance logs and detect repeated leak repairs. If multiple leak fixes are recorded, the controller 1201 may determine that small-scale patchwork is ineffective and recommend a complete roof replacement using a more durable material. The controller 1201 may further cross-reference weather patterns, historical repair data, and material degradation trends to determine whether a specific roofing material is unsuitable for the building's location.

In another embodiment, the controller 1201 may detect recurring maintenance on elevators, where periodic routine maintenance checks have been recorded. If AI-driven prediction models identify anomalies in elevator operation logs, such as inconsistent motor performance, excessive vibration, or weight distribution inconsistencies, the controller 1201 may suggest pre-emptive part replacements or upgrades to avoid future breakdowns.

In some embodiments, the controller 1201 integrates AI-based failure pattern detection to predict upcoming maintenance needs based on historical data and real-time sensor inputs. The controller 1201 may classify components into low-risk, medium-risk, and high-risk categories, where high-risk components may require immediate inspection to prevent major failures.

For example, if the plumbing system has shown multiple instances of leaks, the controller 1201 may recommend pressure regulation modifications or replacement of outdated pipes before the issue escalates. If the controller 1201 detects increased vibration levels in motors, it may suggest lubrication of moving parts or thermal insulation to reduce overheating risks.

The controller 1201 may prioritize maintenance tasks based on urgency, severity, and cost-effectiveness. If multiple maintenance tasks are identified, the controller 1201 may categorize them into high-priority, medium-priority, and low-priority actions.

For example, if both the fire alarm system and HVAC system require servicing, the controller 1201 may prioritize fire safety components due to their higher impact on building safety. Similarly, if a minor paint touch-up is scheduled along with a plumbing repair, the controller 1201 may recommend completing the plumbing work first to prevent repainting after potential water damage.

The controller 1201 may be integrated with BMS sensors to detect faults in real time. If a sensor detects abnormal fluctuations in air quality, temperature, or energy consumption, the controller 1201 may initiate an automatic analysis to determine whether the detected abnormality aligns with past maintenance records. If a correlation is found, the controller 1201 may pre-emptively schedule maintenance tasks before a critical failure occurs.

Figure 13:
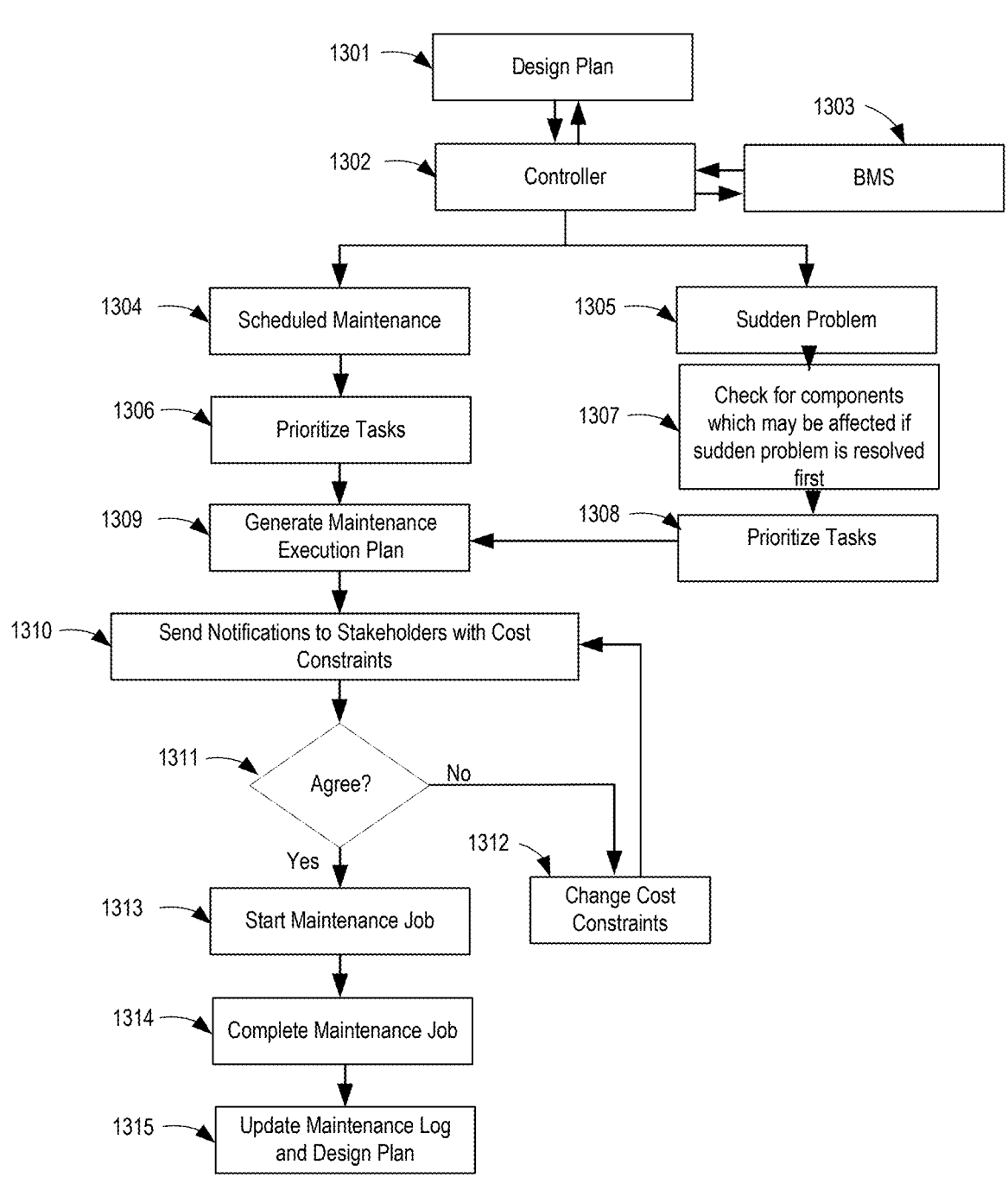
FIG. 13 illustrates a flowchart depicting an exemplary process of prioritizing maintenance tasks, generating an execution plan, notifying stakeholders, and updating maintenance logs and design plan.

Referring now to FIG. 13, an exemplary flowchart 1300 is illustrated depicting a process for prioritizing maintenance tasks, generating a maintenance execution plan, notifying stakeholders regarding cost constraints, executing the maintenance job, and updating the maintenance log and design plan. The process integrates a design plan (1301), a controller (1302), and a BMS (1303) to systematically handle both scheduled maintenance tasks and sudden maintenance problems within a constructed building. The controller (1302) communicates with the BMS (1303) to receive real-time status updates and detect faults, which are then analyzed for task prioritization and execution. The system accommodates both pre-planned maintenance activities (1304) and unexpected issues (1305), so that urgent problems are addressed while considering the broader maintenance schedule. Stakeholders are informed regarding cost implications, and modifications to cost constraints may be made before execution. Upon completion, maintenance records are updated in the design plan (1301), contributing to an evolving, accurate representation of the building's status.

At step 1301, the design plan serves as the foundation for the maintenance workflow. The design plan (1301) represents an as-built digital model of the building, which may incorporate architectural elements, structural components, dynamic fixtures, utilities, and metadata related to individual elements. The controller (1302) continuously references this design plan to map faults, track completed maintenance jobs, and assess upcoming maintenance requirements. In some embodiments, the design plan (1301) may be dynamically updated with real-time input from IoT sensors, BMS logs, or manual user inputs. For example, if an HVAC component requires servicing, the design plan (1301) may reflect its last maintenance date, operational efficiency metrics, and any historical issues previously logged, thereby providing contextual information required for effective maintenance decision-making.

At step 1302, the controller acts as the central processing unit for managing maintenance tasks. The controller (1302) may be configured with AI-based analysis algorithms, machine learning models, and automated task prioritization mechanisms. The controller (1302) processes data received from BMS (1303), maintenance logs, and user inputs to determine which components require immediate attention and how they fit within the broader maintenance schedule. The controller (1302) may also execute predictive failure analysis, forecasting potential breakdowns before they occur. For example, if sensor readings indicate increased vibration in a mechanical component, the controller (1302) may infer that preventive maintenance is required and integrate it into the upcoming maintenance cycle.

At step 1303, the BMS provides sensor-driven monitoring and real-time alerts regarding building components. The BMS (1303) may include temperature sensors, motion detectors, fluid leak detectors, pressure monitors, and surveillance cameras to detect anomalies in electrical, mechanical, plumbing, security, and HVAC systems. For example, if a water leak is detected in the plumbing system, the BMS (1303) communicates this information to the controller (1302), which then integrates the required leak repair task into the maintenance execution plan. The BMS (1303) may also include historical maintenance data, allowing the controller (1302) to analyze trends in recurring issues, thereby optimizing future maintenance cycles.

At step 1304, the system processes scheduled maintenance tasks based on predefined intervals or previously logged requirements. Scheduled maintenance (1304) may include routine servicing of HVAC systems, lubrication of mechanical components, periodic electrical inspections, structural integrity assessments, or repainting of surfaces subject to wear and tear. These tasks are pre-logged in the system based on industry-standard maintenance schedules or organizational protocols. In some embodiments, the controller (1302) may integrate external data sources, such as weather conditions, occupancy levels, and historical degradation trends, to optimize maintenance scheduling. For example, roof inspections may be scheduled more frequently during heavy rainfall seasons to mitigate potential leak risks.

At step 1305, the system detects and processes sudden maintenance problems, which may arise due to unexpected component failures, structural damage, power surges, or equipment malfunctions. Unlike scheduled maintenance (1304), which is planned in advance, sudden problems (1305) require immediate assessment and prioritization. The BMS (1303) detects these anomalies, triggering an automatic assessment routine within the controller (1302). For example, if an electrical surge damages a security camera, the BMS (1303) may generate an alert, prompting the controller (1302) to determine whether an immediate replacement is required or whether temporary adjustments can be made to minimize security risks.

At step 1306, the controller (1302) prioritizes maintenance tasks based on urgency, interdependencies, and cost-effectiveness. Maintenance prioritization may be based on several factors, including safety risk, operational impact, compliance with regulations, and financial constraints. For example, if a fault in the fire suppression system is detected, the system may rank this maintenance job higher than non-critical cosmetic repairs. In some embodiments, the controller (1302) assigns priority scores to maintenance tasks, allowing decision-makers to visually assess and adjust task order accordingly.

At step 1307, if a sudden problem (1305) is detected, the controller (1302) evaluates its impact on other building components. For example, if a major pipe burst occurs, it may affect electrical wiring, flooring materials, and wall structures. The controller (1302) evaluates the cascade effect of resolving the sudden problem first, so that subsequent maintenance tasks are not adversely affected. In some embodiments, the controller (1302) may suggest a temporary workaround for less critical affected elements, facilitating that more pressing concerns are resolved without unnecessary delays.

At step 1308, tasks associated with sudden problems (1305) are prioritized, similar to step 1306, but with additional real-time urgency assessments. The controller (1302) may determine if a failure could cause safety hazards, disrupt operations, or cause significant financial losses. For example, if a primary air conditioning system in a hospital building fails, the system may override existing scheduled maintenance tasks and allocate resources immediately.

At step 1309, a maintenance execution plan is generated, detailing what needs to be repaired, the materials required, labor estimates, execution timeline, and cost estimations. The controller (1302) may access an inventory database to determine whether replacement components are available or if procurement is required. The execution plan balances maintenance efficiency with cost considerations, allowing stakeholders to review cost constraints before approving.

At step 1310, stakeholders are notified of the maintenance execution plan, including cost estimates, proposed timelines, and resource allocations. Stakeholders may include building managers, financial decision-makers, safety inspectors, and facility maintenance personnel. The system facilitates collaborative decision-making by allowing stakeholders to accept, modify, or negotiate cost constraints before proceeding.

At step 1311, stakeholders decide whether to approve the execution plan or request adjustments. If cost constraints are acceptable, the system proceeds to step 1313 to initiate the maintenance job. If adjustments are required, the system proceeds to step 1312, allowing stakeholders to modify cost constraints or suggest alternate execution strategies.

At step 1313, the maintenance job begins as per the execution plan. The controller (1302) may track real-time progress, updating the status of individual tasks. At step 1314, once maintenance is completed, the system records the completion timestamp, labor hours utilized, materials consumed, and name, type, brand, price, warranty of the materials used.

At step 1315, the maintenance log and design plan (1301) are updated to reflect the completed tasks. The design plan (1301) now incorporates the latest modifications, providing an up-to-date representation of the building's structural and operational status. These updates serve as historical records for future maintenance planning and predictive analytics.

Referring now to FIGS. 14A-14B, method steps 1400 are illustrated that may be performed in some implementations of the present invention for detecting, prioritizing, executing, and managing maintenance tasks related to a physical building. FIGS. 14A-14B illustrate a systematic approach wherein a controller processes a design plan and dynamically associates metadata with components, determines maintenance needs, assigns priority levels based on urgency and impact, and generates an execution plan incorporating task prioritization, labor allocation, and material considerations. The method further optimizes maintenance execution by evaluating inventory availability, integrating stakeholder feedback, and adjusting execution plans based on constraints and preferences. The execution of maintenance tasks is systematically logged using real-time IoT sensors, cameras, and user inputs, enabling AI-based analysis of the effectiveness of maintenance interventions. Additionally, the controller updates the design plan to reflect completed maintenance tasks and implements modifications while leveraging AI-driven fault detection to identify recurring maintenance issues and underlying causes.

In some embodiments, the controller may receive a design plan into a system that includes an AI engine, which processes and presents the design plan on an interactive user interface. Metadata may be automatically associated with various dynamic components of the design plan using historical data, sensor readings from a BMS, and an external component database. The controller may then allow users to select one or more dynamic components or portions of the design plan to analyze maintenance requirements. Maintenance detection may be based on sensor inputs, AI-based analysis of degradation patterns, and user-specified inspections. The controller may further determine dependencies between various components to assess the cascading effects of maintenance actions. For example, if a plumbing issue is detected in a specific region of the building, the controller may evaluate the impact on structural elements, electrical wiring, and HVAC systems, providing a comprehensive maintenance plan that addresses all interrelated issues.

Once maintenance requirements have been detected, the controller may assign priority levels based on urgency, functional impact, and cost considerations. Maintenance prioritization may be guided by AI-driven analytics that assess failure risks, operational dependencies, and cost implications of delaying certain tasks. The maintenance execution plan generated by the controller may incorporate details such as required materials, estimated labor hours, and scheduling constraints. Furthermore, the execution plan may be optimized by comparing available inventory with required materials to minimize unnecessary procurement costs and resource wastage. For example, if maintenance requires specific replacement parts or construction materials, the controller may analyze an inventory database to determine if in-stock components can be used before initiating external procurement.

Stakeholder feedback and constraints may be integrated into the execution plan, allowing facility managers and maintenance personnel to adjust schedules, modify task sequences, or apply budget constraints. The execution of maintenance tasks may then be initiated based on a predefined or dynamically adjusted task order, so that high-priority and interdependent tasks are executed in the appropriate sequence. Throughout the maintenance process, real-time updates may be captured and logged via IoT sensors, cameras, and manual user inputs. These updates may be analyzed using AI-based performance evaluation models to determine whether maintenance actions were successful or if further interventions are required. The controller may then update the design plan to reflect completed maintenance tasks, modifying metadata and system annotations accordingly.

At step 1402, the controller receives a design plan of at least a portion of a physical building, wherein the design plan may include a floor plan, an as-built drawing, or a digital representation of the building layout. The design plan may be stored in a database or received from an external source, such as a Building Information Modeling (BIM) system, a Computer-Aided Design (CAD) file, or a cloud-based architectural repository. The design plan may include multiple layers, such as structural, electrical, plumbing, and HVAC components, each represented as distinct elements within the plan. In some embodiments, the design plan may also contain metadata associated with various building components, including installation dates, manufacturer details, maintenance history, and warranty information. The controller may retrieve this data and process it using an AI engine to facilitate subsequent maintenance detection and prioritization.

At step 1404, the controller presents the design plan on an interactive user interface, allowing a user to view, navigate, and interact with the elements of the plan. The user interface may provide multiple viewing modes, including a two-dimensional (2D) plan view, a three-dimensional (3D) visualization, or a sectional view to inspect specific areas of the building. In some implementations, the user may filter the displayed information based on component type, maintenance history, or operational status. For example, a facility manager may choose to display only HVAC components requiring maintenance, while a technician may focus on electrical wiring and circuit breakers. Additionally, the user interface may support zooming, panning, and rotating the design plan, enabling detailed inspection of building elements. The interactive interface may also allow users to add annotations, select components for analysis, and trigger automated maintenance assessments.

At step 1406, the controller associates metadata with dynamic components of the design plan based on historical data, sensor readings from the BMS, and a database of components. Each component within the design plan may be assigned specific attributes, such as its material composition, operational status, expected lifespan, and prior maintenance records. The metadata may be retrieved from a centralized database, wherein each component is uniquely identified by a tag, serial number, or RFID identifier. For example, an HVAC unit within the building may have metadata indicating its last maintenance date, filter replacement schedule, and energy consumption patterns. In some embodiments, real-time sensor readings from the BMS may be analyzed to update metadata dynamically, such that temperature sensors, humidity monitors, and electrical load analyzers provide continuous data for assessing component health.

At step 1408, the user selects one or more dynamic components or portions of the design plan for further analysis. The selection may be performed through the interactive user interface, wherein the user clicks on or highlights a specific area of the design plan. The selected component may be an individual item, such as a light fixture, or a broader system, such as an entire plumbing network. In some embodiments, the user may select a predefined zone, such as an entire floor, a room, or a section of the building, to assess maintenance requirements collectively. For example, if a building owner identifies persistent water leakage in multiple rooms, they may select all affected areas simultaneously for analysis. The selection process may also involve filtering by component attributes, such as selecting only elements with pending maintenance tasks, warranty expiration dates, or high failure probabilities.

At step 1410, the controller detects maintenance requirements for the selected dynamic components or portions of the design plan. Maintenance requirements may be identified based on historical failure patterns, real-time sensor alerts, or AI-driven predictive maintenance models. For example, if an air conditioning unit has consistently required refrigerant refilling beyond its expected maintenance interval, the controller may flag it for further inspection. Similarly, if electrical wiring experiences repeated voltage fluctuations, the controller may suggest checking circuit integrity and replacing aged wiring. In some embodiments, maintenance detection may incorporate user-reported issues, wherein facility staff manually log observations such as unusual noises, flickering lights, or structural cracks.

At step 1412, the controller determines component dependencies and interrelations to assess the impact of identified maintenance requirements or issues. Certain maintenance activities may influence other components or systems, necessitating a comprehensive evaluation before executing repairs. For example, replacing a damaged ceiling panel may require repositioning overhead lighting fixtures, while fixing a leaking pipe may necessitate temporarily shutting off water supply to connected sections. The controller may use AI-based simulations to model the cascading effects of maintenance actions, facilitating that related dependencies are identified and addressed. In some embodiments, the controller may reference past maintenance logs to determine whether prior interventions influenced nearby components, enabling a data-driven approach to maintenance planning.

At step 1414, the controller assigns priority levels to maintenance tasks based on urgency, functional impact, and cost considerations. Priority levels may be categorized as high, medium, or low, with high-priority tasks requiring immediate attention due to safety hazards, operational disruptions, or regulatory compliance issues. For example, an electrical short circuit poses a severe safety risk and would be ranked higher than cosmetic wall painting. Functional impact assessments may consider the operational significance of affected components, such that HVAC failures in a data center receive higher priority than minor leaks in a storage room. Cost considerations may involve evaluating repair expenses, downtime implications, and resource availability, balancing economic constraints with maintenance effectiveness.

At step 1416, the controller generates a maintenance execution plan incorporating task prioritization, labor allocation, and material requirements. The execution plan outlines the sequence of maintenance actions, recommended personnel assignments, and the estimated time for completion. In some implementations, the plan may integrate workforce scheduling, matching technicians' availability with priority tasks. The plan may also specify required replacement parts, consumables, and tools needed for each task. For example, if a fire alarm system requires battery replacements, the execution plan may list the exact battery model, supplier information, and inventory status. The execution plan may further integrate automated procurement workflows, wherein components that are not readily available in inventory trigger purchase requests from designated vendors.

At step 1418, the controller calculates the estimated cost and time required for completing the maintenance execution plan. The cost estimation process may include analyzing various expense components such as labor costs, material procurement costs, equipment rental fees, and potential downtime costs incurred due to maintenance activities. The controller may reference historical maintenance logs to identify cost trends for similar tasks, enabling more accurate budgeting. Additionally, cost estimation may account for variable factors such as inflation rates, supplier pricing variations, and emergency repair surcharges. Time estimation, on the other hand, may involve determining the expected duration for each maintenance task based on complexity, dependencies, and available workforce. For example, replacing a single HVAC filter may take a few hours, whereas a full system overhaul could span multiple days. In some implementations, the controller may generate time estimates dynamically based on workforce availability, real-time sensor data, and predefined work schedules.

At step 1420, the controller compares available inventory with the required materials to optimize resource utilization and minimize unnecessary procurement. The inventory database may store real-time stock levels of components, tools, and consumables needed for maintenance activities. When generating a maintenance execution plan, the controller cross-references inventory records with the required materials list to determine whether existing stock can fulfill the maintenance requirements. If a specific part is unavailable or below the required threshold, the controller may trigger an automated procurement request, selecting vendors based on cost, delivery time, and historical reliability. Additionally, the controller may suggest material substitutions based on compatibility, availability, and cost efficiency. For example, if a specific brand of plumbing sealant is out of stock, the system may recommend an alternative sealant with similar properties. By minimizing unnecessary purchases and prioritizing in-stock materials, the controller helps reduce operational expenses and expedite the maintenance process.

At step 1422, the controller integrates stakeholder feedback and adjusts the maintenance execution plan based on constraints and preferences. Stakeholders may include facility managers, maintenance personnel, building occupants, and financial decision-makers, each providing input on scheduling, budgetary considerations, or operational impact. The controller may facilitate real-time communication through an interactive user interface where stakeholders can approve, modify, or delay maintenance tasks. For example, if a planned elevator maintenance conflicts with a high-traffic event in the building, the facility manager may request rescheduling to a low-occupancy period. Additionally, cost-related constraints may require prioritization of important repairs while deferring non-urgent tasks. In some embodiments, AI-driven decision-making may suggest optimal scheduling adjustments based on usage patterns, predictive failure risks, and cost-benefit analysis, so that stakeholder requirements are effectively balanced against operational needs.

At step 1424, the controller initiates the execution of approved maintenance tasks in a predefined or dynamic order based on priority levels. Tasks designated with higher priority, such as electrical failures or structural damage, may be executed immediately, while lower-priority tasks, such as cosmetic improvements, may be scheduled for later execution. The execution order may also consider component dependencies, preventing conflicts between concurrent tasks. For example, a plumbing repair requiring water supply shutdown should be completed before scheduling floor tiling to avoid redoing work. The controller may communicate task assignments to maintenance personnel, generate work orders, and trigger automated system adjustments where applicable. In some cases, maintenance execution may involve IoT-enabled automation, such as activating standby HVAC units when primary systems are undergoing maintenance. Additionally, the system may provide real-time monitoring to track progress, update task statuses, and reallocate resources if unexpected delays occur.

At step 1426, the controller captures and logs real-time updates on maintenance progress using IoT sensors, cameras, and user inputs. Sensors embedded in the building infrastructure may detect changes in operational parameters, such as temperature stabilization after an HVAC repair or reduced water leakage post-plumbing maintenance. Cameras may document visual evidence of completed work, providing transparency and accountability. Maintenance personnel may also input manual updates through an interactive dashboard, confirming task completion, logging issues encountered, or adjusting estimated timelines. The system may generate time-stamped logs for each maintenance event, recording relevant parameters such as worker assignments, tools used, and any deviations from the original execution plan. By maintaining a continuously updated record of maintenance activities, the controller facilitates data-driven decision-making for future maintenance planning and compliance tracking.

At step 1428, the controller evaluates the effectiveness of maintenance actions using AI-based performance analysis. AI models may assess post-maintenance sensor data, operational efficiency metrics, and failure recurrence probabilities to determine whether maintenance interventions have successfully resolved identified issues. For example, if an HVAC unit continues experiencing airflow restrictions after filter replacement, the AI system may flag the need for additional diagnostics. Performance analysis may also compare maintenance execution against industry benchmarks, identifying areas for process optimization. In some implementations, AI-driven insights may guide predictive maintenance strategies, enabling proactive interventions before failures escalate. Additionally, AI analysis may identify recurring patterns in maintenance failures, such as frequent breakdowns of a specific brand of equipment, prompting recommendations for alternative solutions.

At step 1430, the controller updates the design plan to reflect completed maintenance tasks and implemented modifications. Updates may include marking components as serviced, revising maintenance schedules, and updating metadata fields with new installation dates or part replacements. If modifications alter the structural, electrical, or mechanical configuration of the building, the design plan may undergo dynamic updates to maintain an accurate representation of the built environment. For example, if a section of the building undergoes reconfiguration due to maintenance work, the updated design plan may incorporate layout adjustments. The updated design plan serves as a reference for future maintenance planning, preventing redundant work and facilitating streamlined decision-making. Additionally, regulatory compliance documentation may be generated automatically, facilitating adherence to industry standards and safety protocols.

At step 1432, the controller identifies recurrent maintenance issues and analyzes underlying causes using AI-based fault detection algorithms. The AI system may detect patterns in historical maintenance logs, sensor anomalies, and operational inefficiencies to determine why specific components frequently require servicing. For example, if multiple lighting fixtures in the same corridor experience repeated failures, AI analysis may reveal voltage inconsistencies or poor wiring installations as contributing factors. The system may generate detailed fault reports, categorizing issues by frequency, severity, and probable causes. Additionally, AI-driven recommendations may suggest preventive measures, such as upgrading faulty components, adjusting operational parameters, or implementing stricter quality control in installations. By proactively addressing root causes rather than reacting to symptoms, the controller enhances long-term maintenance efficiency, reducing costs and extending the lifespan of building components.

In some embodiments of the present invention, an AI-powered collaborative platform is provided for spatial annotation process within architectural and construction projects. Initially, a controller receives a detailed two-dimensional or three-dimensional static representation of a building's design plan. An AI engine, integral to this system, delves into the representation, identifying various architectural elements and their spatial arrangements as depicted through a complex pattern of pixels. This initial analysis lays the groundwork for an interactive user interface that showcases these elements, making them ready for user interaction and annotation.

Users engage with this interface, selecting design elements to annotate, thereby infusing the digital blueprint with valuable insights and specifications. The AI engine plays a pivotal role, determining the precise spatial coordinates of each annotated element, effectively bridging the gap between digital annotation and physical reality. These annotations are dynamically linked to their corresponding elements, facilitating real-time updates across the collaborative environment for all participants.

Further sophistication is introduced as the platform accommodates the movement of both digital and physical versions of design elements. When an element's position is adjusted within the building's layout or the actual construction site, its associated annotations are automatically realigned within the two-dimensional or three-dimensional static representation, maintaining an unwavering accuracy and relevance of the project documentation.

An innovative question-and-answer feature empowers users to inquire about various project aspects directly through the interface. Leveraging the latest data, including recent changes or updates, the AI engine responds with precise, automated answers, effectively serving as an intelligent assistant.

Through the integration of third-party platforms, the system extends its utility beyond mere annotation. It facilitates material procurement, compliance checks, and even labor hiring, streamlining project management tasks and facilitating adherence to relevant standards and regulations.

In some embodiments of the present invention, the method additionally comprises determining a scale of the components included in the design plan and/or generating a user interface including user interactive areas to change at least one of: a size and shape of at least one of the dynamic components, the dynamic components may include, by way of non-limiting example, one or more of: architectural features, polygons or arcuate shapes; regions, areas, spaces, travel paths, egress paths, dominance hierarchies, occupancy loads, doorways, stairs, or other portion of a design plan that may be modified.

In some embodiments, dynamic components may include a polygon and/or arcuate shape. A method of practice of the present invention may further include the steps of receiving an instruction via the interactive user interface to modify a parameter of the polygon and modifying the parameter of the polygon based upon the instruction received via the interactive user interface. The parameter modified may include one or both of: an area of the polygon; and a shape of the polygon.

In another aspect a dynamic component may include a line segment and/or arcuate segment, and methods of practice may include one or more of: receiving an instruction via an interactive user interface to modify a parameter of the line segment, and the method further includes the step of modifying the parameter of the line segment based upon the instruction received via the interactive user interface. The parameter of the line segment may include a length of the line segment, and the method may additionally include modifying a length of a wall based upon the modifying the length of the line segment.

The parameter modified may additionally include a direction of the line segment and the method may additionally include modifying an area of a room based upon the modifying of the length and direction of the line segment. A boundary may be set based upon reference to a boundary allocation hierarchy.

In another aspect, a price may be associated with each of the quantities of items to be included in maintenance of the building. In addition, a type of labor associated with at least one of the items to be included in maintenance of the building may be designated based upon AI analysis of the first two-dimensional reference (i.e., first design plan) and the second two-dimensional reference (i.e., second design plan), respectively.

Methods of practice may additionally include the steps of determining whether a design plan received into the controller includes a vector image, and if one of the first and the second design plans received into the controller includes a vector image, converting at least a portion of the vector image into a raster image. Implementations of the described techniques may include hardware, a method or process, or computer software on a computer-accessible medium.

A dynamic component may include a line segment and/or vector, and the method may further include the steps of receiving an instruction via the interactive user interface to modify a parameter of the line segment and/or vector, and modifying the parameter of the line segment and/or vector based upon the instruction received via the interactive user interface. The modified parameter may include a magnitude of the line segment and/or vector and/or a direction of the vector.

The method may additionally include the step of training the AI engine based upon a human identifying portions of a design plan to indicate that it includes a particular type of item; or to identify portions of the design plan that include a boundary. The AI engine via may also be trained by reference to a boundary allocation hierarchy.

The methods may additionally include the steps of: determining whether the design plans received into the controller includes a vector image, and if the design plan received into the controller does include a vector image converting at least a portion of the vector image into a raster image; and/or whether a design plan includes a vector image format. Implementations of the described techniques and method steps may include hardware (such as a controller and/or computer server), a method or process, or computer software on a computer-accessible medium.

Still further, in some embodiments, the controller may assess how assignment of different classes of space to one or more designated areas may alter conformance of a design with a specified code. Furthermore, in some embodiments, particular attributes of a building may be analyzed based upon laws or regulations in effect within a geopolitical boundary encompassing the building. In some embodiments, multiple disparate user interfaces may be used to communicate calculated parameters associated with determined attributes.

There may be alternative methods of receiving data from various sources that can be used to generate a design or to supplement a design created in the manners as have been described previously. For example, the system may receive an architectural file with intelligent features of various kinds which will be discussed in further detail.

The present system may operate in concert with a BIM or CAD design system, for example, as an add-in to these design systems and then the present system may have access to design elements, location data and the like directly. In other examples, the present system may access BIM or CAD design system data by loading data files from said systems. In still further examples, the present system may operate to capture data from display screens that are displaying designs from the said BIM or CAD design systems.

As an additional example, the present compliance assessment system exhibits versatility by harmoniously integrating with prominent design frameworks like BIM or CAD. This integration facilitates a proactive approach to evaluate the compliance of building designs in the nascent or initial stages of the creative process, considering an array of potential best practices. This early-stage assessment not only facilitates that the design in progress aligns with regulatory standards but also serves as a strategic time-saving measure, optimizing the efficiency of the overall design workflow. Synergy between compliance analysis and design systems may not only enhance the precision of the evaluation at early stages but also contribute to a more streamlined and resource-efficient architectural and engineering endeavour.

In a non-limiting example, the present system may receive a file in one of the REVIT native formats such as files of types RVT, RFA, RTE and RFT. Embodiments may also include receiving non-Revit compatible file formats, such as, one or more of: BMP, PNG, JPG, JPEG, and TIF. Glossary:

"Artificial Intelligence" as used herein means machine-based decision making and machine learning including but not limited to: supervised and unsupervised recognition of patterns, classification, and numerical regression. Supervised learning of patterns includes a human indicating that a pattern (such as a pattern of dots formed via the rasterization of a two-dimensional image) is representative of a line, polygon, shape, angle or other geometric form, or an architectural aspect, unsupervised learning can include a machine finding a pattern submitted for analysis. One or both may use mathematical optimization, formal logic, artificial neural networks, and methods based on one or more of: statistics, probability, linear regression, linear algebra, and/or matrix multiplication.

"AI Engine" as used herein an AI Engine (sometimes referred to as an AI model) refers to methods and apparatus for applying artificial intelligence and/or machine learning to a task performed by a controller. In some embodiments, a controller may be operative via executable software to function as an AI engine capable of recognizing aspects and/or tally aspects of a design plan that are relevant to generating an estimate for performing projects included in construction or maintenance of a building or other activities related to construction or maintenance of a building.

"Computer Aided Design," sometimes referred to as "CAD," as used herein shall mean the use of automation for the creation, modification, analysis, or optimization of a design plan or design plan file.

"Building Information Modeling" sometimes referred to as "BIM," as used herein a means a digital process used in architecture, engineering, and construction (AEC) that involves the generation and management of digital representations of physical and functional characteristics of places.

"Vector File" as used herein a vector file is a computer graphic that uses mathematical formulas to render its image. In some embodiments, a sharpness of a vector file will be agnostic to size within a range of sizes viewable on smart devices and personal computer display screens.

Typically, a vector image includes segments with two points. The two points create a path. Paths can be straight or curved. Paths may be connected at connection points. Connected paths form more complex shapes. More points may be used to form longer paths or closed shapes. Each path, curve, or shape has its own formula, so they can be sized up or down and the formulas will maintain the crispness and sharp qualities of each path.

A vector file may include connected paths that may be viewed as graphics. The paths that make up the graphics may include geometric shapes or portions of geometric shapes, such as: circles, ellipsis, Bezier curves, squares, rectangles, polygons, and lines. More sophisticated designs may be created by joining and intersecting shapes and/or paths. Each shape may be treated as an individual object within the larger image. Vector graphics are scalable, such that they may be increased or decreased without significantly distorting the image.

The terms "design plan," "building plan," "building design," "floor plan," "two-dimensional reference," "two-dimensional or three-dimensional static representation," or simply "design" are used interchangeably, often referring to the same or similar concepts in the context of architectural or construction documentation.

The present invention provides for systems of one or more computers that can be configured to perform particular operations or actions by virtue of having software, firmware, hardware, or a combination of them installed on the system that in operation causes or cause the system to perform the actions. One or more computer programs can be configured to perform artificial intelligence operations or actions by virtue of including instructions that, when executed by data processing apparatus, cause the apparatus to perform the actions.

CONCLUSION

A number of embodiments of the present disclosure have been described. While this specification contains many specific implementation details, they should not be construed as limitations on the scope of any disclosures or of what may be claimed, but rather as descriptions of features specific to particular embodiments of the present disclosure. While embodiments of the present disclosure are described herein by way of example using several illustrative drawings, those skilled in the art will recognize the present disclosure is not limited to the embodiments or drawings described. It should be understood the drawings, and the detailed description thereto, are not intended to limit the present disclosure to the form disclosed, but to the contrary, the present disclosure is to cover all modifications, equivalents and alternatives falling within the spirit and scope of embodiments of the present disclosure as defined by the appended claims.

For illustrative purposes, certain building systems have been described and depicted in detail; however, the disclosed methods, systems, and apparatus for managing maintenance are not limited to these specific examples. The principles and techniques described herein apply equally to other building systems, including but not limited to electrical networks, plumbing frameworks, HVAC configurations, security infrastructures, fire suppression systems, and smart automation networks. The scope of the invention encompasses maintenance management for any structural, mechanical, or operational system within a physical building, regardless of variations in design, function, or implementation. The described embodiments serve as representative implementations and should not be construed as limiting; modifications, adaptations, and extensions of the disclosed concepts fall within the purview of the invention as defined by the claims.

The headings used herein are for organizational purposes only and are not meant to be used to limit the scope of the description or the claims. As used throughout this application, the word "may" be used in a permissive sense (i.e., meaning having the potential to), rather than the mandatory sense (i.e., meaning must). Similarly, the words "include," "including," and "includes" mean including but not limited to. To facilitate understanding, like reference numerals have been used, where possible, to designate like elements common to the figures.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising," "including," and "having" can be used interchangeably.

Certain features that are described in this specification in the context of separate embodiments can also be implemented in combination in a single embodiment. Conversely, various features that are described in the context of a single embodiment can also be implemented in combination in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while method steps may be depicted in the drawings in a particular order, this should not be understood as requiring that such operations be performed in the particular order shown or in a sequential order, or that all illustrated operations be performed, to achieve desirable results.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. Apparatus for managing building maintenance using a digital representation of a physical building, the apparatus comprising:

a display screen configured to present an interactive user interface;

a digital storage medium comprising an executable software code; and a controller operating an Artificial Intelligence (AI) engine comprising a Vision Transformer (ViT) configured for pixel-level analysis of rasterized design plans, wherein the controller comprises a processor, and wherein the executable software code, when executed by the processor, causes the processor to:

a. receive, by the controller, a two-dimensional or vector design plan of at least a portion of the physical building, the controller converting any non-raster vectors in the two-dimensional or vector design plan to a raster image, and extracting therefrom dynamic components representing As-Built building elements using the ViT for pixel-level segmentation and object recognition;

b. associate a time-stamped metadata record including installation date, warranty, stock availability, and preferred vendor rankings with some or all of the dynamic components by automatically linking historical maintenance logs, real-time sensor data from a building management system (BMS), a component database, and an inventory and vendor availability data;

c. detect, by the controller, maintenance requirements for at least one dynamic component or portion of the design plan using the ViT and predictive failure models to generate a probabilistic failure score based on one or more of: sensor data from the BMS, historical failure patterns, associated metadata, user-input data, and image-derived degradation indicators;

d. determine, by the controller, an explicit edge-weighted interdependency graph mapping interrelations between the dynamic components including spatial adjacency, functional dependency and shared services to simulate cascading effects on other building elements to quantify downstream impact of the detected maintenance requirements;

e. assign, by the controller, priority levels to the detected maintenance requirements by computing a composite priority score that combines urgency, functional impact, cost considerations, predicted failure risk, occupancy impact windows, and vendor dead time, and wherein the assignment is constrained to satisfy regulations; and f. generate, by the controller, a dependency-aware maintenance execution plan that sequences execution of the detected maintenance requirements based on the explicit edge-weighted interdependency graph, the dependency-aware maintenance execution plan including task prioritization, labor allocation, required material list cross-checked against on-hand inventory, automated procurement requests to ranked vendors upon determining that stock in the on-hand inventory is insufficient, contingency tasks for delayed deliveries, and estimated execution timelines that minimize disruption and complies with safety windows.

2. Apparatus for managing building maintenance, the apparatus comprising:

a display screen configured to present an interactive user interface;

a digital storage medium comprising an executable software code; and a controller comprising a processor, in logical communication with the executable software code, executable upon command, to cause the processor to:

a. receive, by the controller, a design plan of at least a portion of a physical building:

b. generate the interactive user interface comprising dynamic components representing As-Built building elements represented in the design plan:

c. associate, by the controller, metadata with a spatial designation corresponding to at least one of the dynamic components or a space represented in the design plan, wherein the metadata comprises real-time sensor data, historical maintenance patterns for the spatial designation, and compliance status with building codes, and wherein the metadata is dynamically updated in real time; and d. detect, by the controller, maintenance requirements associated with the spatial designation, wherein detecting the maintenance requirements comprises cross-referencing the real-time sensor data to detect current anomalies requiring maintenance, the historical maintenance patterns for the spatial designation to infer predicted maintenance needs, and the compliance status with building codes in real time to identify compliance violation with the spatial designation.

3. The apparatus of claim 2, wherein the executable software code, executable upon command, additionally causes the processor to assign, by the controller, priority levels to the maintenance requirements based on urgency, functional impact, cost considerations, and predicted failure risk.

4. The apparatus of claim 2, wherein the executable software code executable upon command additionally causes the processor to generate, by the controller, a maintenance execution plan for the maintenance requirements, the maintenance execution plan comprising task prioritization, labor allocation, material requirements, and estimated execution timelines.

5. The apparatus of claim 2, wherein the associated metadata comprises text data, the text data including descriptive information about a product.

6. The apparatus of claim 5, wherein the associated metadata further comprises image data, the image data including photographs or illustrations of the product.

7. The apparatus of claim 6, wherein the associated metadata further comprises video data, the video data including a demonstration of the product in use.

8. The apparatus of claim 7, wherein the associated metadata further comprises audio data, the audio data including a spoken description or instructions related to the product.

9. The apparatus of claim 8, wherein the associated metadata further comprises an instructional video, the instructional video providing step-by-step guidance on assembly or operation of the product.

10. The apparatus of claim 9, wherein the associated metadata further comprises a parts manual, the parts manual detailing the dynamic components and assembly instructions for the product.

11. The apparatus of claim 10, wherein the associated metadata further comprises a link to an e-commerce site, the link enabling a user to purchase the product or related accessories.

12. The apparatus of claim 11, wherein the associated metadata includes a combination of text, image, video, and audio data to provide a comprehensive overview of the product.

13. The apparatus of claim 12, wherein the associated metadata is dynamically updated to reflect changes in product specifications or availability.

14. The apparatus of claim 13, wherein the associated metadata is accessible via the interactive user interface that allows for interactive exploration of product features and specifications.

15. The apparatus of claim 6, wherein the associated metadata further comprises video data, the video data including a demonstration of a maintenance procedure.

16. Apparatus for managing a physical building, the apparatus comprising:

a display screen configured to present an interactive user interface;

a digital storage medium comprising an executable software code; and a controller comprising a processor, in logical communication with the executable software code executable upon command to cause the processor:

a. receive, by the controller, a design plan of at least a portion of the physical building:

b. generate the interactive user interface comprising dynamic components representing As-Built building elements represented in the design plan, the dynamic components identified by an Artificial Intelligence (AI) engine configured to analyze pixel patterns, vectors or polygons of the design plan and associating metadata with the dynamic components, the metadata including at least one of installation date, material type, expected lifespan, maintenance history, warranty information, and real-time sensor data;

c. calculate a quantity of a building feature to be maintained during building maintenance based on the metadata associated with the dynamic components; and d. referencing the quantity of the building feature to be maintained during the building maintenance, display on the interactive user interface a prioritized maintenance execution plan comprising one or more maintenance requirements, wherein the prioritized maintenance execution plan is determined by analyzing interdependencies between the dynamic components, and wherein the one or more maintenance requirements are further refined to rank execution of the one or more maintenance requirements based on predictive analysis of the metadata including the real-time sensor data to mitigate cascading effects arising from the interdependencies between the dynamic components.

* * * * *